(12) United States Patent
Yellin et al.

(10) Patent No.: US 11,095,743 B2
(45) Date of Patent: Aug. 17, 2021

(54) OPTIMIZED CONTENT-DELIVERY NETWORK (CDN) FOR THE WIRELESS LAST MILE

(71) Applicant: TENSERA NETWORKS LTD., Hod Hasharon (IL)

(72) Inventors: Daniel Yellin, Raanana (IL); Roee Peled, Givatayim (IL); David Ben Eli, Modiin (IL); Shimon Moshavi, Beit Shemesh (IL); Ehud Weinstein, Tel Aviv (IL); Navot Goren, Kibbutz Ramot Menashe (IL); Eilon Regev, Givatayim (IL); Amit Wix, Petach-Tikva (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 187 days.

(21) Appl. No.: 16/332,005

(22) PCT Filed: Sep. 19, 2017

(86) PCT No.: PCT/IB2017/055646
§ 371 (c)(1),
(2) Date: Mar. 11, 2019

(87) PCT Pub. No.: WO2018/055506
PCT Pub. Date: Mar. 29, 2018

(65) Prior Publication Data
US 2019/0230186 A1 Jul. 25, 2019

Related U.S. Application Data

(63) Continuation-in-part of application No. 14/691,597, filed on Apr. 21, 2015, now Pat. No. 9,961,159.
(Continued)

(51) Int. Cl.
H04L 29/08 (2006.01)
G06F 9/445 (2018.01)
G06F 9/54 (2006.01)

(52) U.S. Cl.
CPC ...... H04L 67/2847 (2013.01); G06F 9/44505 (2013.01); G06F 9/547 (2013.01); H04L 67/10 (2013.01); H04L 67/2857 (2013.01)

(58) Field of Classification Search
CPC . H04L 67/2847; H04L 67/10; H04L 67/2857; G06F 9/44505; G06F 9/547
(Continued)

(56) References Cited

U.S. PATENT DOCUMENTS 6,311,223 B1   10/2001   Bodin et al.
6,446,238 B1   9/2002    Canestaro et al.
(Continued)

FOREIGN PATENT DOCUMENTS

CN   101807180 A   8/2010
CN   108595224 A   9/2018
(Continued)

OTHER PUBLICATIONS

Yan et al., "Fast App Launching for Mobile Devices Using Predictive User Context", MobiSys 12, 14 pages, Jun. 25-29, 2012.
(Continued)

Primary Examiner — James E Springer
(74) Attorney, Agent, or Firm — Kligler & Associates Patent Attorneys Ltd

(57) ABSTRACT

A system (20) includes one or more interfaces and multiple processors. The one or more interfaces are configured to communicate over a communication network (40). At least a first processor from among the processors is included in a user device (24) and at least a second processor from among the processors is included in a server (52) external to the user
(Continued)

device. The processors are configured to track content items that are provided by one or more content sources (36) and to deliver the content items to one or more applications (32) installed in the user device.

50 Claims, 18 Drawing Sheets

Related U.S. Application Data

(60) Provisional application No. 62/397,927, filed on Sep. 22, 2016, provisional application No. 62/399,572, filed on Sep. 26, 2016, provisional application No. 62/401,251, filed on Sep. 29, 2016, provisional application No. 62/404,820, filed on Oct. 6, 2016, provisional application No. 62/415,598, filed on Nov. 1, 2016, provisional application No. 62/418,803, filed on Nov. 8, 2016, provisional application No. 62/419,483, filed on Nov. 9, 2016, provisional application No. 62/419,484, filed on Nov. 9, 2016, provisional application No. 62/419,485, filed on Nov. 9, 2016, provisional application No. 62/419,486, filed on Nov. 9, 2016, provisional application No. 62/419,487, filed on Nov. 9, 2016, provisional application No. 62/419,488, filed on Nov. 9, 2016, provisional application No. 62/419,490, filed on Nov. 9, 2016, provisional application No. 62/422,096, filed on Nov. 15, 2016, provisional application No. 62/422,163, filed on Nov. 15, 2016, provisional application No. 62/424,630, filed on Nov. 21, 2016, provisional application No. 62/426,256, filed on Nov. 24, 2016, provisional application No. 62/426,260, filed on Nov. 24, 2016, provisional application No. 62/426,262, filed on Nov. 24, 2016, provisional application No. 62/427,158, filed on Nov. 29, 2016, provisional application No. 62/427,928, filed on Nov. 30, 2016, provisional application No. 62/459,675, filed on Feb. 16, 2017, provisional application No. 62/459,686, filed on Feb. 16, 2017, provisional application No. 62/476,973, filed on Mar. 27, 2017, provisional application No. 62/515,551, filed on Jun. 6, 2017, provisional application No. 62/515,552, filed on Jun. 6, 2017, provisional application No. 62/151,554, filed on Jun. 6, 2017, provisional application No. 62/515,555, filed on Jun. 6, 2017, provisional application No. 62/515,556, filed on Jun. 6, 2017, provisional application No. 62/515,557, filed on Jun. 6, 2017, provisional application No. 62/515,558, filed on Jun. 6, 2017, provisional application No. 62/515,560, filed on Jun. 6, 2017, provisional application No. 62/521,552, filed on Jun. 19, 2017, provisional application No. 62/534,791, filed on Jul. 20, 2017, provisional application No. 62/544,961, filed on Aug. 14, 2017, provisional application No. 62/559,587, filed on Sep. 17, 2017, provisional application No. 62/025,021, filed on Jul. 16, 2014, provisional application No. 62/100,933, filed on Jan. 8, 2015.

(58) Field of Classification Search
USPC ........................................................ 709/213
See application file for complete search history.

(56) References Cited

U.S. PATENT DOCUMENTS

| | | | |
|---|---|---|---|
| 6,553,409 B1 | 4/2003 | Zhang et al. | |
| 8,089,892 B2 | 1/2012 | Liu et al. | |
| 8,341,245 B1 | 12/2012 | Roskind et al. | |
| 8,447,837 B2 | 5/2013 | Devanneaux et al. | |
| 8,566,867 B1 | 10/2013 | Yang et al. | |
| 8,601,052 B2 | 12/2013 | Mir et al. | |
| 8,625,667 B2 | 1/2014 | Cilli et al. | |
| 8,635,339 B2 | 1/2014 | Luna | |
| 8,655,404 B1 | 2/2014 | Singh et al. | |
| 8,732,237 B2 | 5/2014 | Li et al. | |
| 8,762,456 B1 | 6/2014 | Chan et al. | |
| 8,826,102 B2 | 9/2014 | Liu et al. | |
| 8,849,731 B2 | 9/2014 | Lymberopoulos et al. | |
| 8,881,033 B2 | 11/2014 | Mentchoukov et al. | |
| 8,886,176 B2 | 11/2014 | Luna et al. | |
| 8,902,777 B1 | 12/2014 | Huang | |
| 8,943,197 B1 | 1/2015 | Taylor et al. | |
| 8,949,420 B2 | 2/2015 | Banavar et al. | |
| 9,009,103 B2 | 4/2015 | Rangarajan et al. | |
| 9,043,433 B2 | 5/2015 | Backholm | |
| 9,049,179 B2 | 6/2015 | Luna | |
| 9,111,309 B2 | 8/2015 | Howard et al. | |
| 9,118,623 B2 | 8/2015 | Devanneaux et al. | |
| 9,160,968 B2 | 10/2015 | Hines et al. | |
| 9,208,123 B2 | 12/2015 | Luna | |
| 9,247,019 B2 | 1/2016 | Luna et al. | |
| 9,256,484 B2 | 2/2016 | Stanley-Marbell et al. | |
| 9,307,007 B2 | 4/2016 | Kapadia et al. | |
| 9,392,393 B2 | 7/2016 | Wood et al. | |
| 9,407,713 B2 | 8/2016 | Luna et al. | |
| 9,811,501 B2 | 11/2017 | Kim et al. | |
| 9,826,052 B2 | 11/2017 | Zong et al. | |
| 9,979,796 B1 | 5/2018 | Yellin et al. | |
| 10,013,497 B1 | 7/2018 | Boodman | |
| 10,613,735 B1 | 4/2020 | Karpe et al. | |
| 2002/0198991 A1 | 12/2002 | Gopalakrishnan et al. | |
| 2003/0101234 A1 | 5/2003 | McBrearty et al. | |
| 2003/0126232 A1 | 7/2003 | Mogul et al. | |
| 2003/0187984 A1 | 10/2003 | Banavar et al. | |
| 2003/0195940 A1 | 10/2003 | Basu et al. | |
| 2004/0088375 A1 | 5/2004 | Sethi et al. | |
| 2005/0154781 A1 | 7/2005 | Carlson et al. | |
| 2005/0198191 A1 | 9/2005 | Carlson et al. | |
| 2006/0056336 A1 | 3/2006 | Dacosta | |
| 2006/0277271 A1 | 12/2006 | Morse et al. | |
| 2006/0277308 A1 | 12/2006 | Morse et al. | |
| 2007/0067698 A1 | 3/2007 | King et al. | |
| 2007/0088852 A1 | 4/2007 | Levkovitz | |
| 2007/0198634 A1 | 8/2007 | Knowles et al. | |
| 2008/0229025 A1 | 9/2008 | Plamondon | |
| 2008/0232290 A1 | 9/2008 | Ezur et al. | |
| 2008/0253693 A1 | 10/2008 | Chu et al. | |
| 2008/0301300 A1 | 12/2008 | Toub | |
| 2009/0037393 A1 | 2/2009 | Fredricksen et al. | |
| 2009/0077261 A1 | 3/2009 | Broadhurst | |
| 2009/0157811 A1 | 6/2009 | Bailor et al. | |
| 2009/0292819 A1 | 11/2009 | Kandekar et al. | |
| 2010/0088369 A1 | 4/2010 | Sebastian et al. | |
| 2010/0161831 A1 | 6/2010 | Haas et al. | |
| 2010/0161906 A1 | 6/2010 | Bolger et al. | |
| 2010/0332589 A1 | 12/2010 | Schwimer | |
| 2011/0029670 A1 | 2/2011 | Klein et al. | |
| 2012/0023226 A1 | 1/2012 | Petersen et al. | |
| 2012/0026908 A1 | 2/2012 | Tzannes et al. | |
| 2012/0072671 A1 | 3/2012 | Chirca et al. | |
| 2012/0159393 A1 | 6/2012 | Sethi | |
| 2012/0278432 A1* | 11/2012 | Luna | G06F 9/5027 709/217 |
| 2012/0289147 A1 | 11/2012 | Raleigh et al. | |
| 2012/0317188 A1* | 12/2012 | Fredricksen | H04L 67/1097 709/203 |
| 2013/0019159 A1 | 1/2013 | Civelli et al. | |
| 2013/0031204 A1 | 1/2013 | Graham et al. | |
| 2013/0067170 A1 | 3/2013 | Lam | |
| 2013/0263180 A1 | 10/2013 | Yang et al. | |

(56) References Cited

U.S. PATENT DOCUMENTS

| | | |
|---|---|---|
| 2013/0290557 A1 | 10/2013 | Baratz |
| 2013/0343450 A1 | 12/2013 | Solka et al. |
| 2014/0032718 A1 | 1/2014 | Berger et al. |
| 2014/0053057 A1 | 2/2014 | Reshadi et al. |
| 2014/0059156 A1 | 2/2014 | Freeman, II et al. |
| 2014/0064138 A1 | 3/2014 | Urdang |
| 2014/0094163 A1 | 4/2014 | Widdowson et al. |
| 2014/0095943 A1 | 4/2014 | Kohlenberg et al. |
| 2014/0150019 A1 | 5/2014 | Ma et al. |
| 2014/0219088 A1 | 8/2014 | Oyman et al. |
| 2014/0250358 A1 | 9/2014 | Milener et al. |
| 2014/0274078 A1 | 9/2014 | Hyde et al. |
| 2014/0279026 A1 | 9/2014 | Nath et al. |
| 2014/0280485 A1* | 9/2014 | A Hummaida ..... H04L 67/1097 709/203 |
| 2014/0280996 A1 | 9/2014 | Harrang et al. |
| 2014/0283108 A1 | 9/2014 | Torgerson et al. |
| 2014/0344331 A1 | 11/2014 | Johns et al. |
| 2014/0362768 A1 | 12/2014 | Wood et al. |
| 2014/0364104 A1 | 12/2014 | Wood et al. |
| 2014/0366041 A1 | 12/2014 | Stanley-Marbell et al. |
| 2014/0366042 A1 | 12/2014 | Chan et al. |
| 2014/0372511 A1 | 12/2014 | Kapadia et al. |
| 2014/0373032 A1* | 12/2014 | Merry .................. G06F 9/4843 719/328 |
| 2014/0379840 A1 | 12/2014 | Dao |
| 2015/0039601 A1 | 2/2015 | Harrang et al. |
| 2015/0046519 A1 | 2/2015 | Shukla et al. |
| 2015/0100664 A1 | 4/2015 | Flack et al. |
| 2015/0100666 A1 | 4/2015 | Harrang et al. |
| 2015/0120821 A1 | 4/2015 | Bendell et al. |
| 2015/0120858 A1 | 4/2015 | Anderson |
| 2015/0172345 A1 | 6/2015 | Mantin et al. |
| 2015/0178337 A1 | 6/2015 | Hellstrom et al. |
| 2015/0188959 A1 | 7/2015 | Sayed |
| 2015/0215816 A1* | 7/2015 | Abou-Elkheir ..... H04L 67/2847 370/230 |
| 2015/0241941 A1 | 8/2015 | Luna et al. |
| 2015/0256641 A1 | 9/2015 | Agarwal et al. |
| 2015/0296505 A1 | 10/2015 | Luna et al. |
| 2015/0347204 A1 | 12/2015 | Stanley-Marbell et al. |
| 2015/0347205 A1 | 12/2015 | Stanley-Marbell et al. |
| 2015/0347615 A1 | 12/2015 | McGushion et al. |
| 2015/0347907 A1 | 12/2015 | Mathew et al. |
| 2015/0347908 A1 | 12/2015 | Mathew et al. |
| 2015/0350807 A1 | 12/2015 | Andrews et al. |
| 2015/0350885 A1 | 12/2015 | Stanley-Marbell et al. |
| 2015/0351033 A1 | 12/2015 | Stanley-Marbell et al. |
| 2015/0355893 A1 | 12/2015 | Luk et al. |
| 2015/0365904 A1 | 12/2015 | Luna et al. |
| 2015/0371142 A1 | 12/2015 | Jain |
| 2016/0004410 A1 | 1/2016 | Srinivasan et al. |
| 2016/0021211 A1 | 1/2016 | Yellin et al. |
| 2016/0028637 A1 | 1/2016 | Vasseur et al. |
| 2016/0063577 A1 | 3/2016 | Yellin et al. |
| 2016/0065662 A1 | 3/2016 | Yellin et al. |
| 2016/0191651 A1 | 6/2016 | Balakrishnan et al. |
| 2016/0191664 A1 | 6/2016 | Balakrishnan et al. |
| 2016/0205028 A1 | 7/2016 | Luna et al. |
| 2016/0227464 A1 | 8/2016 | Senarath et al. |
| 2016/0353268 A1 | 12/2016 | Senarath et al. |
| 2017/0011681 A1 | 1/2017 | Bathiche et al. |
| 2017/0031869 A1 | 2/2017 | Franczyk et al. |
| 2017/0048111 A1 | 2/2017 | Kodaypak |
| 2017/0126833 A1 | 5/2017 | Deluca |
| 2018/0159746 A1 | 6/2018 | Li et al. |
| 2018/0241837 A1 | 8/2018 | Yellin et al. |
| 2019/0347107 A1 | 11/2019 | Ma et al. |
| 2019/0347113 A1 | 11/2019 | Ma et al. |
| 2019/0347128 A1 | 11/2019 | Han et al. |
| 2019/0354384 A1 | 11/2019 | Huang |
| 2019/0370021 A1 | 12/2019 | Chen et al. |
| 2019/0370022 A1 | 12/2019 | Han et al. |
| 2019/0370095 A1 | 12/2019 | Chen et al. |
| 2019/0370603 A1 | 12/2019 | Chen et al. |
| 2019/0370657 A1 | 12/2019 | Chen et al. |
| 2020/0159816 A1 | 5/2020 | Bostrom et al. |
| 2020/0183822 A1* | 6/2020 | Bates ..................... H04L 43/50 |
| 2020/0225818 A1* | 7/2020 | Ozuysal .............. G06F 16/9577 |

FOREIGN PATENT DOCUMENTS

| | | |
|---|---|---|
| CN | 108628645 A | 10/2018 |
| CN | 108647052 A | 10/2018 |
| WO | 2016063161 A1 | 4/2016 |

OTHER PUBLICATIONS

Andtaus et al., "File Prefetching for Mobile Devices Using On-Line Learning", 10 pages, Aug. 2008.

U.S. Appl. No. 15/285,503 office action dated Dec. 3, 2019.

Apple Inc., "Example Playlist Files for use with HTTP Live Streaming", iOS Developer Library, Technical Note TN2288, 16 pages, May 9, 2012.

Apple Inc., "HTTP Live Streaming Overview—Introduction", Mac Developer Library, 3 pages, Feb. 11, 2014.

Pantos et al., "HTTP Live Streaming draft-pantos-http-live-streaming-13", Internet-Draft, 56 pages, Apr. 16, 2014.

Higgins et al., "Informed Mobile Prefetching", MobiSys'12, 14 pages, Jun. 25-29, 2012.

Yellin et al U.S. Appl. No. 15/285,503, filed Oct. 5, 2016.

U.S. Appl. No. 15/955,719 office action dated Sep. 30, 2019.

Yellin et al., U.S. Appl. No. 15/285,506, filed Oct. 5, 2016.

U.S. Appl. No. 15/955,719 office action dated Mar. 6, 2020.

KR Application # 10-2017-7002520 Office Action dated Nov. 25, 2020.

International Application # PCT/IB2020/057046 Search Report dated Nov. 17, 2020.

U.S. Appl. No. 16/537,577 Office Action dated Feb. 3, 2021.

International Application # PCT/IB2021/051055 Search Report dated May 20, 2021.

* cited by examiner

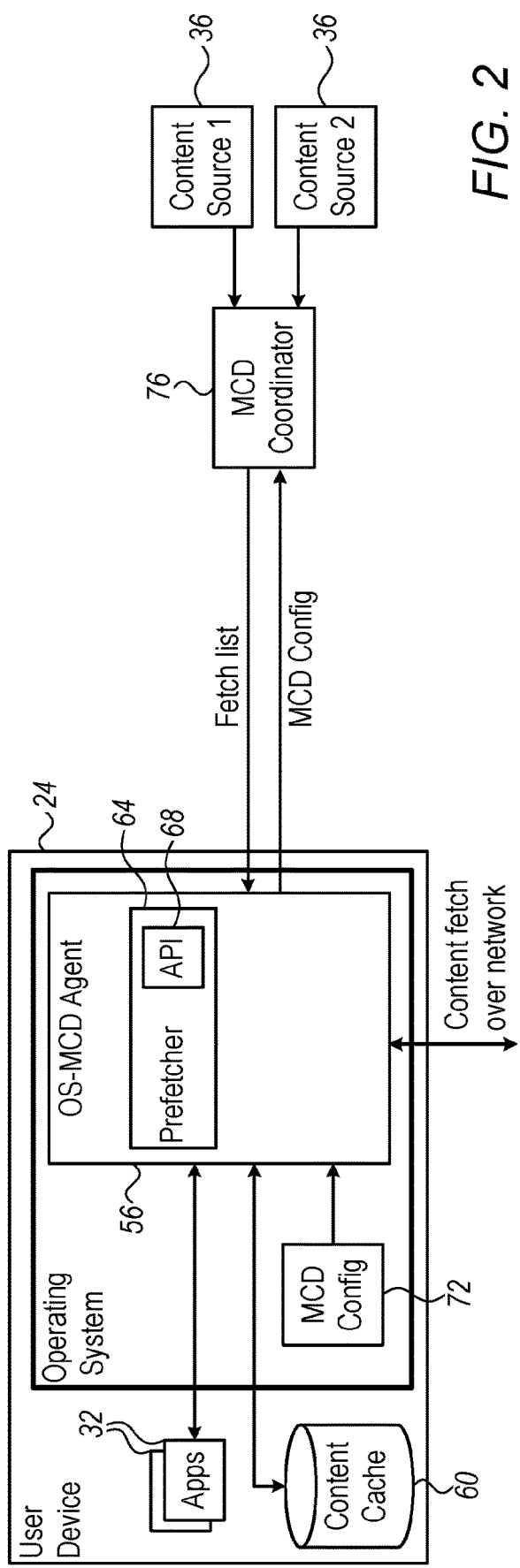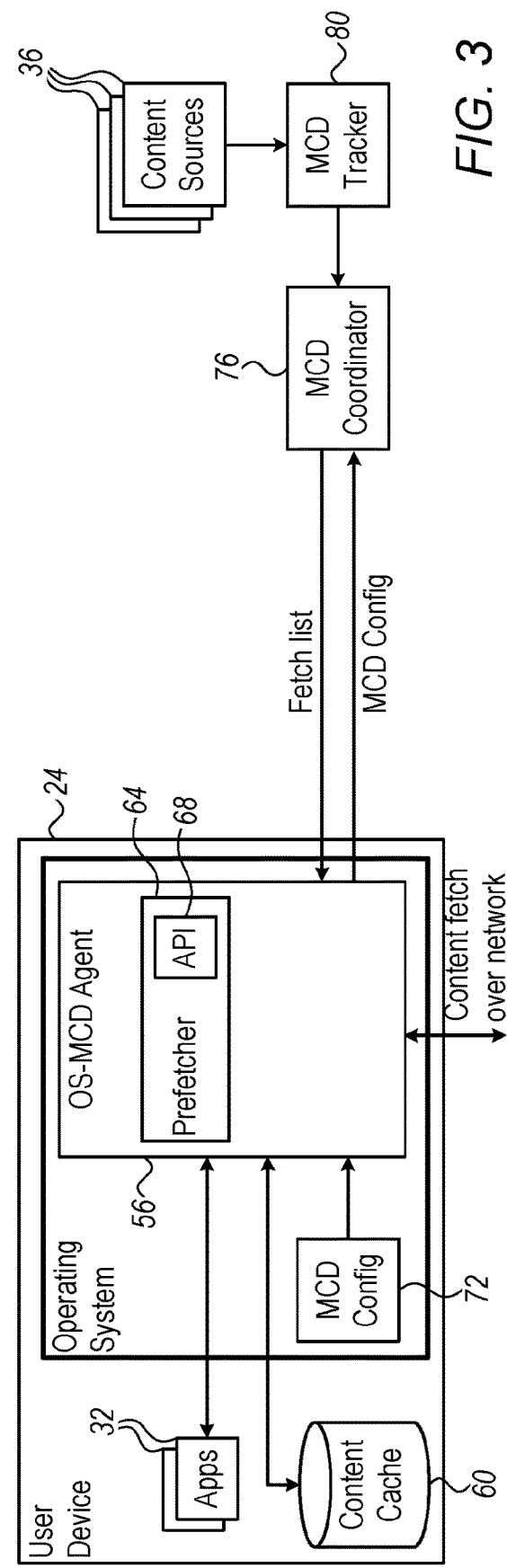

OPTIMIZED CONTENT-DELIVERY NETWORK (CDN) FOR THE WIRELESS LAST MILE

CROSS-REFERENCE TO RELATED APPLICATIONS

This application is U.S. National Phase of PCT Application PCT/IB2017/055646, which is a continuation-in-part of U.S. patent application Ser. No. 14/691,597, published as U.S. Patent Application Publication 2016/0021211, and also claims the benefit of the following U.S. Provisional Patent Applications:

62/397,927, filed Sep. 22, 2016
62/399,572, filed Sep. 26, 2016
62/401,251, filed Sep. 29, 2016
62/404,820, filed Oct. 6, 2016
62/415,598, filed Nov. 1, 2016
62/418,803, filed Nov. 8, 2016
62/424,630, filed Nov. 21, 2016
62/427,158, filed Nov. 29, 2016
62/515,551, filed Jun. 6, 2017
62/422,096, filed Nov. 15, 2016
62/426,256, filed Nov. 24, 2016
62/515,557, filed Jun. 6, 2017
62/426,260, filed Nov. 24, 2016
62/427,928, filed Nov. 30, 2016
62/515,558, filed Jun. 6, 2017
62/426,262, filed Nov. 24, 2016
62/515,560, filed Jun. 6, 2017
62/419,483, filed Nov. 9, 2016
62/515,555, filed Jun. 6, 2017
62/419,484, filed Nov. 9, 2016
62/419,485, filed Nov. 9, 2016
62/515,552, filed Jun. 6, 2017
62/419,486, filed Nov. 9, 2016
62/419,487, filed Nov. 9, 2016
62/515,556, filed Jun. 6, 2017
62/419,488, filed Nov. 9, 2016
62/419,490, filed Nov. 9, 2016
62/515,554, filed Jun. 6, 2017
62/544,961, filed Aug. 14, 2017
62/521,552, filed Jun. 19, 2017
62/476,973, filed Mar. 27, 2017
62/422,163, filed Nov. 15, 2016
62/559,587, filed Sep. 17, 2017
62/459,675, filed Feb. 16, 2017
62/459,686, filed Feb. 16, 2017

The disclosures of all these related applications are incorporated herein by reference.

FIELD OF THE INVENTION

The present invention relates generally to communication networks, and particularly to methods and systems for content delivery over wireless networks.

BACKGROUND OF THE INVENTION

A major challenge facing internet usage today is the ability to access content in a timely way. The amount of data traffic has been growing exponentially in recent years, which has caused significant network congestion and overloaded servers. This often results in unacceptably long delays between a user's request for content and his receiving it—including long file download times and delays in display of requested content. The delay problems are particularly acute in the case of mobile devices connected to the internet wirelessly, particularly in cases of a cellular connection.

One approach which has been proposed in recent years to improve content delivery is to employ prefetching (e.g., [1]). In this case, web content is downloaded from a content source to the user's device cache before it is actually being accessed by the user. In this way the latency involved in transferring the content to the user's device occurs in the background and does not degrade the user experience.

Any prefetch solution to improve the mobile user experience must also take into account battery life and data plan restrictions for the user as well as content delivery network (CDN) costs for the content provider. Overly-aggressive and uncoordinated prefetch can lead to unnecessary and inefficient modem usage, which will shorten device battery life and consume limited data plan resources, and will incur large CDN costs.

SUMMARY OF THE INVENTION

An embodiment of the present invention that is described herein provides a system including one or more interfaces and multiple processors. The one or more interfaces are configured to communicate over a communication network. At least a first processor from among the processors is included in a user device and at least a second processor from among the processors is included in a server external to the user device. The processors are configured to track content items that are provided by one or more content sources and to deliver the content items to one or more applications installed in the user device.

In some embodiments, the second processor is included in a cloud-based infrastructure system. In an embodiment, the processors are configured to prefetch one or more of the content items over the communication network, from the content sources to a cache of the user device. In an embodiment, the processors are configured to preload an application installed in the user device, before a user requests to activate the application.

In another embodiment, the first processor is configured to run an Operating System (OS) of the user device, including running within the OS a software component that prefetches one or more of the content items from the content sources over the communication network to a cache of the user device. In yet another embodiment, the first processor is configured to run an Operating System (OS) of the user device, including running within the OS a software component that preloads an application installed in the user device before the application is activated by a user. In still another embodiment, the first processor is configured to run an Operating System (OS) of the user device, including running within the OS a software component that performs, in response to an update of one or more of the content items, refreshing of one or more of the applications that run in a background mode in the user device.

In some embodiments, the second processor is configured to track one or more of the content items by crawling one or more of the content sources. In a disclosed embodiment, the second processor is configured to track one or more of the content items by receiving indications of updates to one or more of the content items from one or more other user devices. In an example embodiment, the second processor is configured to receive, directly from one or more of the content sources, information relating to tracking one or more of the content items.

In an embodiment, the second processor is configured to receive, from an advertisement source, one or more advertisement items to be presented in association with one or more of the content items, or to receive information relating to the one or more advertisement items. In another embodiment, the second processor is configured to send over the communication network to the first processor a policy, which assists the user device in deciding one or more of (i) which of the content items are to be delivered to the applications, and (ii) which of the applications are to be provided with the content items.

In some embodiments, the second processor is configured to apply a machine-learning process, for deriving a model that predicts one or more of (i) which of the content items are to be used by the applications, and (ii) which of the applications are to be provided with the content items. In an example embodiment, the machine-learning process is based at least partially on information reported to the second processor over the communication network by the first processor. In an embodiment, the first processor is configured to receive the model from the second processor over the communication network, and to predict using the model one or more of (i) which of the content items are to be used by the applications, and (ii) which of the applications are to be provided with the content items.

In some embodiments, the first processor is configured to preload the applications that are predicted by the model. In an embodiment, in preloading the applications, the first processor is configured to prefetch one or more of the content items to be provided to the applications. In another embodiment, in preloading the applications, the first processor is configured to pre-render one or more of the content items provided to the applications.

In yet another embodiment, the processors are configured to receive differential prefetch updates from one or more of the content sources. In still another embodiment, the processors are configured to deliver differential prefetch updates.

There is additionally provided, in accordance with an embodiment of the present invention, a method including, using multiple processors, wherein at least a first processor from among the processors is included in a user device and at least a second processor from among the processors is included in a server external to the user device, tracking content items that are provided by one or more content sources. The content items are delivered using the processors to one or more applications installed in the user device.

There is also provided, in accordance with an embodiment of the present invention, an apparatus including an interface and a processor. The interface is included in a user device and is configured to communicate over a communication network. The processor is included in the user device and is configured to run an Operating System (OS) of the user device, to run one or more user applications, and to run within the OS a software component that preloads a user application installed in the user device before the user application is activated by a user.

In some embodiments, the processor is configured to run, within the OS, an Application Programming Interface (API) for configuration of preloading of the user application. In an embodiment, the processor is configured to receive API input from the user application via the API, and to preload the user application using the API input. In an embodiment, the API input includes access to an executable code of the user application, and the processor is configured to execute the executable code in preloading the user application. In an embodiment, by executing the executable code, the processor is configured to prefetch one or more content items over the communication network, for use by the preloaded user application.

In some embodiments, in preloading the user application, the processor is configured to load the application via the API in a first loading scheme, which differs from a second loading scheme that is used when the user application is activated by the user. In an example embodiment, the first loading scheme excludes one or more operations that are performed by the second loading scheme. The processor may be configured to complete one or more of the excluded operations in response to activation of the user application by the user.

In some embodiments, the API includes an external interface for access by an application developer. In an embodiment, the processor is configured to preload the user application transparently to the user. In a disclosed embodiment, the processor is configured to omit the preloaded user application from a recent-tasks list of the user device. In an example embodiment, in preloading the user application, the processor is configured to prefetch, from within the OS, one or more of the content items over the communication network, and provide the prefetched content items to the user application.

In another embodiment, in preloading the user application, the processor is configured to pre-render, from within the OS, one or more of the content items provided to the user application. In yet another embodiment, in preloading the user application, the processor is configured to preload in-app content. In still another embodiment, the processor is configured to refrain from performing pre-rendering upon preloading the user application, and to perform the pre-rendering upon subsequent activation of the user application by the user.

In some embodiments, in preloading the user application, the processor is configured to perform one or more of: loading code of the user application to Random Access Memory (RAM), loading data for use by the user application to Random Access Memory (RAM), initializing a process of the operating system associated with the user application, running one or more components of the code of the user application, and fetching Domain Name Service (DNS) information. In an embodiment, the processor is configured to preload the user application based at least in part on a user-defined configuration.

In another embodiment, the processor is configured to preload the user application based at least in part on a machine-learning process, which predicts applications or content that the user device is expected to access. In yet another embodiment, the processor is configured to run, within the OS, an Application Programming Interface (API) for receiving from the user applications reports relating to application usage and content access. In still another embodiment, the processor is configured to run, within the OS, an Application Programming Interface (API) for sending reports from the user device to an external server, for use by the external server in formulating a preload policy.

There is further provided, in accordance with an embodiment of the present invention, a method including running on a processor of a user device an Operating System (OS) of the user device, and one or more user applications. A software component, which preloads a user application installed in the user device before the user application is activated by a user running, is run within the OS.

There is also provided, in accordance with an embodiment of the present invention, an apparatus including an interface and a processor. The interface is included in a user device and is configured to communicate over a communication network. The processor is included in the user device and is configured to run an Operating System (OS) of the user device, to run one or more user applications in a background mode, and to run within the OS a software component that refreshes a user application that runs in the background mode before the user application is activated by a user.

In some embodiments, the user application that runs in the background mode has been preloaded. In an embodiment, the preloaded user application has been pre-rendered. In an embodiment, the user application, which runs in the background mode, previously ran in a foreground mode due to an action of the user. In an embodiment, the processor is configured to refresh the user application by updating one or more of (i) content used by the user application, (ii) data used by the user application, (iii) a display displayed by the user application, and (iv) a configuration of the user application.

In some embodiments, the processor is configured to run, within the OS, an Application Programming Interface (API) for configuration of refreshing of the user application. In an example embodiment, the API includes an external interface for access by an application developer. In another embodiment, the processor is configured to receive, via the API, a notification regarding an available update for refreshing the user application. In an embodiment, the processor is configured to receive, via the API, an available update for refreshing the user application. In another embodiment, the processor is configured to receive, via the API, access to an executable code of the user application, and to execute the executable code in refreshing the user application.

In some embodiments, in refreshing the user application, the processor is configured to update a display of the user application that is rendered in the background mode. In some embodiments, in refreshing the user application, the processor is configured to terminate and subsequently re-launch one or more components of the user application. In an embodiment, in refreshing the user application, the processor is configured to terminate and subsequently re-launch all components of the user application. In an embodiment, one or more of the components include Android Activities.

In some embodiments, in refreshing the user application, the processor is configured to apply a first refreshing scheme, which differs from a second refreshing scheme that is used when the user application is refreshed by the user. In an example embodiment, the first refreshing scheme excludes one or more operations that are performed by the second refreshing scheme. In an embodiment, the processor is configured to complete one or more of the excluded operations in response to activation of the user application by the user.

In some embodiments, the processor is configured to select the user application to be refreshed based on an estimated likelihood that the user will access the user application. In an embodiment, the estimated likelihood has been estimated using a machine-learning process. In an embodiment, the processor is configured to refresh the user application transparently to the user. In another embodiment, the processor is configured to refresh the user application only in response to an availability of a content update for the user application. In a disclosed embodiment, the processor is configured to refresh the user application at a predefined set of times. In an embodiment, the processor is configured to refresh the user application once every predefined number of minutes.

There is also provided, in accordance with an embodiment of the present invention, a method including running on a processor of a user device an Operating System (OS) of the user device, and one or more user applications in a background mode. A software component, which refreshes a user application that runs in the background mode before the user application is activated by a user, is run within the OS.

There is also provided, in accordance with an embodiment of the present invention, an apparatus including an interface and a processor. The interface is included in a user device and is configured to communicate over a communication network. The processor is included in the user device and is configured to receive, from a user of the user device, an input requesting immediate prefetching of content for one or more user applications that are installed in the user device, and, in response to the input from the user, to prefetch the content for the one or more user applications over the communication network.

In some embodiments, the processor is configured to prefetch the content in accordance with a predefined setup that is at least partially configured by the user. In an embodiment, the predefined setup relates to selection of the one or more user applications for which the content is to be prefetched. In another embodiment, the predefined setup relates to selection of the content to be prefetched. In an embodiment, the one or more user applications, for which the content is to be prefetched, are selected at least partly using a machine-learning process that predicts one or more of (i) user-application usage on the user device, and (ii) content access on the user device.

In another embodiment, the content to be prefetched is selected at least partly using a machine-learning process that predicts one or more of (i) user-application usage on the user device, and (ii) content access on the user device. In yet another embodiment, in prefetching the content for a user application, the processor is configured to synchronize at least some of the previously prefetched content at the user device with a content server associated with the user application. In still another embodiment, the processor is configured to receive, via an Application Programming Interface (API), access to an executable code of a user application, and to execute the executable code in prefetching the content for the user application.

In a disclosed embodiment, upon prefetching the content for a user application that has been preloaded, the processor is configured to refresh the preloaded user application. In an example embodiment, upon prefetching content or in-app content for a user application, the processor is configured to execute one or more additional preload operations for the user application or the in-app content. In another embodiment, in preloading the user application or the in-app content, the processor is configured to pre-render the user application or the in-app content.

In some embodiments, the processor is configured to preload the one or more user applications in response to the input from the user. In some embodiments, the input from the user includes the user clicking or selecting a displayed option. In an alternative embodiment, the input from the user includes a voice input from the user.

There is additionally provided, in accordance with an embodiment of the present invention, a method including receiving, in a processor of a user device, an input from a user of the user device requesting immediate prefetching of content for one or more user applications that are installed in the user device. In response to the input from the user, the content is prefetched for the one or more user applications over a communication network.

There is also provided, in accordance with an embodiment of the present invention, an apparatus including an interface and a processor. The interface is included in a user device and is configured to communicate over a communication network. The processor is included in the user device and is configured to estimate one or more likelihoods that one or more respective user applications, which currently occupy Random Access Memory (RAM) space in the user device, will be re-used by a user of the user device, and, based on the estimated likelihoods, to deactivate one or more of the user applications so as to free the RAM space occupied by the deactivated user applications.

In some embodiments, the processor is configured, based on the estimated likelihoods, to refrain from deactivating a given user application even though the user requested that the given user application be deactivated. In an embodiment, the processor is configured to remove the given user application from a recent-tasks list of the user device, even though the given user application has not been deactivated. In another embodiment, the processor is configured to estimate the likelihoods based, at least partially, on a request from the user to deactivate a given user application.

In some embodiments, the processor is configured to select the user applications to be deactivated, based on an extent of freshness of one or more of (i) content of the user applications (ii) data of the user applications, and (iii) background rendering of the user applications.

There is further provided, in accordance with an embodiment of the present invention, a method including, in a processor of a user device, estimating one or more likelihoods that one or more respective user applications, which currently occupy Random Access Memory (RAM) space in the user device, will be re-used by a user of the user device. Based on the estimated likelihoods, one or more of the user applications are deactivated so as to free the RAM space occupied by the deactivated user applications.

There is additionally provided, in accordance with an embodiment of the present invention, an apparatus including an interface and a processor. The interface is included in a user device and is configured to communicate over a communication network. The processor is included in the user device and is configured to run an Operating System (OS) of the user device, to run within the OS a software component that predicts future requests for content expected at the user device, and coordinates content fetch operations based on the predicted future requests, and to perform the coordinated content fetch operations over the communication network.

In some embodiments, the processor is configured to coordinate the content fetch operations in collaboration with a server external to the user device. In some embodiments, the processor is configured to coordinate the content fetch operations for a plurality of user applications in the user device. In some embodiments, the processor is configured to coordinate the content fetch operations for content items to be fetched from a plurality of content sources.

In some embodiments, the content fetch operations include prefetch operations. In an embodiment, the processor is configured to coordinate the prefetch operations using a criterion that is set to reduce an amount of modem activity in the user device. In some embodiments, the criterion is set to perform one or more of: give preference to scheduling the prefetch operations for times in which the modem is already known to be active, constrain an extent of toggling the modem between active and inactive states, and constrain an amount of time the modem is active.

In some embodiments, the processor is configured to coordinate the prefetch operations using a criterion that is set to perform one or more of: improve usage efficiency of a network protocol over the communication network, improve usage efficiency of an application protocol, prefer communication over a non-metered network connection, prefer communication over a Wi-Fi network connection, prefer communication via a low-power hotspot cell or access point, reduce consumption of a user's data plan, prefer communication over a wireless channel having good channel conditions, reduce power consumption in the user device, improve utilization of network resources, and reduce content-access latency.

In some embodiments, the processor is configured to coordinate the prefetch operations based, at least partially, on a prediction of one or more of: modem activity in the user device, availability of a non-metered network connection, availability of a Wi-Fi network connection, availability of a low-power hotspot cell or access point, and availability of a wireless channel having good channel conditions.

In some embodiments, the apparatus further includes an intermediate server, which is external to the user device and is configured to accumulate content for the coordinated content fetch operations, and to send the accumulated content to the user device over the communication network. In some embodiments, the intermediate server is configured to pre-process the accumulated content, so as to improve an efficiency of transferring the accumulated content to the user device over the communication network. The intermediate server may be configured to improve an efficiency of transferring the accumulated content by bundling multiple content items. In an embodiment, in bundling multiple content items, the intermediate server is configured to include respective HTTP response headers of the content items.

There is additionally provided, in accordance with an embodiment of the present invention, a method including, in a processor of a user device, running an Operating System (OS) of the user device. A software component, which predicts future requests for content expected at the user device, and which coordinates content fetch operations based on the predicted future requests, is run within the OS. The coordinated content fetch operations are performed over the communication network.

There is also provided, in accordance with an embodiment of the present invention, an apparatus including one or more interfaces and one or more processors. The one or more interfaces are configured to communicate over a communication network. The one or more processors are configured to receive or produce control information relating to tracking of content updates for prefetching content to a user device, and to opportunistically schedule exchange of the control information with the user device over the communication network.

In some embodiments, at least one of the processors is included in the user device. In some embodiments, at least one of the processors is included in a server external to the user device. In an embodiment, the control information includes one or more of: a report, which is sent to the user device and is indicative of one or more content items that are available for prefetching, one or more of (i) metadata, (ii) Domain Name Service (DNS) information and (iii) content-access likelihood metrics, which are sent to the user device and are associated with the content updates, a request sent from the user device for a report indicative of one or more content items that are available for prefetching, a report sent from the user device for enabling estimation of the likelihood metrics, and a crowd-wisdom report, which is sent from the user device and relates to the content updates.

In some embodiments, the one or more processors are configured to coordinate multiple transfers of control information to be performed at the same time. In an embodiment, the one or more processors are configured to bundle multiple transfers of control information. In another embodiment, the one or more processors are configured to schedule the exchange of the control information using a criterion that is set to reduce an amount of modem activity in the user device. In some embodiments, the criterion is set to perform one or more of: give preference to scheduling the prefetch operations for times in which the modem is already known to be active, constrain an extent of toggling the modem between active and inactive states, and constrain an amount of time the modem is active.

In an embodiment, the one or more processors are configured to schedule the exchange of the control information using a criterion that is set to perform one or more of: improve usage efficiency of a network protocol over the communication network, improve usage efficiency of an application protocol, prefer communication over a non-metered network connection. prefer communication over a Wi-Fi network connection, prefer communication via a low-power hotspot cell or access point, reduce consumption of a user's data plan, prefer communication over a wireless channel having good channel conditions, reduce power consumption in the user device, and improve utilization of network resources.

In an embodiment, the one or more processors are configured to schedule the exchange of the control information based, at least partially, on a prediction of one or more of: modem activity in the user device, availability of a non-metered network connection, availability of a Wi-Fi network connection, availability of a low-power hotspot cell or access point, and availability of a wireless channel having good channel conditions. In some embodiments, the one or more processors are configured to exchange the control information combined with prefetching of the content to the user device.

There is additionally provided, in accordance with an embodiment of the present invention, a method including receiving or producing control information relating to tracking of content updates for prefetching content to a user device. Exchange of the control information with the user device is scheduled opportunistically over a communication network.

There is also provided, in accordance with an embodiment of the present invention, an apparatus including one or more interfaces and one or more processors. The one or more interfaces are configured to communicate over a communication network. The one or more processors are configured to designate one or both of a first set and a second set of user application activities in a user device, and to preload, in the user device, one or both of the first set and the second set of the user application activities, in a background mode before being executed by a user of the user device. A first decision on whether to preload the user application activities in the first set is independent of a first predicted current likelihood of the user executing the user application activities in the first set. A second decision on whether to preload the user application activities in the second set depends, at least in part, on a second predicted current likelihood of the user executing the user application activities in the second set. An amount of preload, performed for the user application activities in the second set, varies based on the second predicted current likelihood.

In some embodiments, the user application activities include one or more operations executed upon the user triggering loading of a user application or of an in-app component. In an embodiment, the one or more processors are configured to run, within an operating system of the user device, a software component that preloads the user application activities. In an embodiment, the one or more processors are configured to run an Application Programming Interface (API), accessible to an application developer, for configuring preloading of the user application activities.

In another embodiment, the first or second predicted current likelihood is associated with a current point in time, or with a time window that comprises the current point in time. In another embodiment, the first or second predicted current likelihood is estimated at a current point in time, or within a time window that comprises the current point in time, and is associated with a future point in time.

In some embodiments, the one or more processors are configured to predict the first or second predicted current likelihood by predicting one or more of: a current likelihood that at least some of the user application activities in the second set will be executed by the user, a current likelihood that at least some of the user application activities in the second set, which are associated with a specific user application, will be executed by the user, and a current likelihood that a specific user application activity in the second set will be executed by the user.

In an example embodiment, the second decision depends on a comparison of the second predicted current likelihood to a threshold. In a disclosed embodiment, the one or more processors are configured to predict the first or second predicted current likelihood using a machine-learning process. In another embodiment, the one or more processors are configured to predict the first or second predicted current likelihood in a cloud-based infrastructure system, and to transfer the predicted first or second predicted current likelihood to the user device.

In some embodiments, the one or more processors are configured to designate the user application activities by performing one or more of: designating one or more types of preload operations for preload, designating one or more application properties for preload, designating one or more properties of content items for preload, and designating an amount of content item for preload.

In some embodiments, the types of preload operations include one or more of: loading of application code to a RAM of the user device, loading of application data to the RAM, initialization of an operating-system process associated with a user application instance, running of an initial component of a user application, prefetching of Domain Name Service (DNS) information, prefetching of content or data for a user application over the communication network, and pre-rendering a visual display associated with a user application.

In some embodiments, the one or more processors are configured to designate the amount of the content item based on one or more of: a number of bytes of the content item, a percentage of the content item, a time duration or a number of segments of a video or audio clip, a resolution of the content item, and a distance of the content item from a top of a display in the user device.

In some embodiments, the properties of the content items include one or more of: a type of the content items, availability of the content items on a foreground screen of the user device, placement of the content items on a screen of the user device, a depth of link associated with the content items, a resolution of the content items, a size of the content items, and metadata associated with the content items.

In some embodiments, the content items are of types including one or more of: a configuration file, an image, a video, an advertisement, a Java script, and a content page. In an embodiment, the one or more processors are configured to receive from the user a manual designation of the user application activities. In an embodiment, the one or more processors are configured to calculate a designation of the user application activities. In an example embodiment, the one or more processors are configured to calculate the designation in one or both of (i) a cloud-based infrastructure system and (ii) the user device. In another embodiment, the one or more processors are configured to calculate the designation in a user-specific manner. In yet another embodiment, the one or more processors are configured to calculate the designation based on usage statistics of one or both of (i) one or more user applications and (ii) content.

In a disclosed embodiment, the one or more processors are configured to occasionally update designation of the user application activities. In an example embodiment, the one or more processors are configured to vary the amount of preload for the user application activities in the second set by varying types of preload operations designated in the second set. In another embodiment, the one or more processors are configured to vary the amount of preload for the user application activities in the second set by varying the amount of preload for a content item designated in the second set. In an embodiment, the one or more processors are configured to vary the amount of preload for the user application activities in the second set by varying an amount of content items for which preloading is performed, based on properties of the content items or of user applications associated with the content items that are designated for preload in the second set.

In an embodiment, the one or more processors are configured to modify an amount of the designated user application activities based on a cost factor. In another embodiment, the one or more processors are configured to vary, or suspend, the amount of preload for the user application activities in the second set, based on a cost factor. In an embodiment, the cost factor relates to one or more of (i) power consumption, (ii) data consumption, (iii) RAM consumption, and (iv) CPU consumption in the user device. In an embodiment, the cost factor relating to power consumption includes enabling or disabling of a power-saving mode in the user device. In an embodiment, the cost factor relating to power consumption includes activity or inactivity of a modem in the user device. In an embodiment, the cost factor relating to power consumption includes a quality of a wireless communication link of the user device. In an embodiment, the cost factor relating to data consumption includes availability of a non-metered wireless network link.

There is further provided, in accordance with an embodiment of the present invention, a method including designating one or both of a first set and a second set of user application activities in a user device, and preloading, in the user device, one or both of the first set and the second set of the user application activities, in a background mode before being executed by a user of the user device. A first decision on whether to preload the user application activities in the first set is independent of a first predicted current likelihood of the user executing the user application activities in the first set. A second decision on whether to preload the user application activities in the second set depends, at least in part, on a second predicted current likelihood of the user executing the user application activities in the second set. An amount of preload, performed for the user application activities in the second set, varies based on the second predicted current likelihood.

The present invention will be more fully understood from the following detailed description of the embodiments thereof, taken together with the drawings in which:

BRIEF DESCRIPTION OF THE DRAWINGS

FIG. 2 is a block diagram that schematically illustrates an Operating-System Mobile Content Delivery module (OS-MCD), in accordance with an embodiment of the present invention;

FIG. 3 is a block diagram that schematically illustrates the use of an MCD tracker in an OS-MCD, in accordance with an embodiment of the present invention;

DETAILED DESCRIPTION OF EMBODIMENTS

1. General Overview

Embodiments of the present invention introduce improved methods and systems for content access for user devices. Some of the disclosed approaches are most naturally integrated, at least partially, into the mobile device at the operating system (OS) level. In particular, these approaches can be implemented by introducing new functions in the OS that together serve as a flexible platform for enhanced mobile content access. These functions can be added, for example, by the OS vendor or by a handset manufacturer. The new functionality supports instantaneous app load and content access while optimizing battery life, data plan usage, and/or CDN costs. Embodiments of the present invention also potentially integrate cloud processing capabilities to support the new OS functionality, increasing the power and capabilities of these new OS functions. When all components are taken together, the disclosed embodiments effectively transform the OS into a key component of an optimized CDN for the wireless last mile.

The present disclosure focuses on scenarios where the user device is connected to a network with a wireless link. This includes smartphones, smart TVs, wearables, mobile car devices and other devices using a mobile operating system such as Android or iOS. It also applies to other scenarios where the user device is connected to a network with a limited communication link (possibly not wireless) that suffers from content/app load latency problems, connection outage problems, and/or a variable cost/quality communication link.

2. System Description and Overview of OS Functionality

Figure 1:
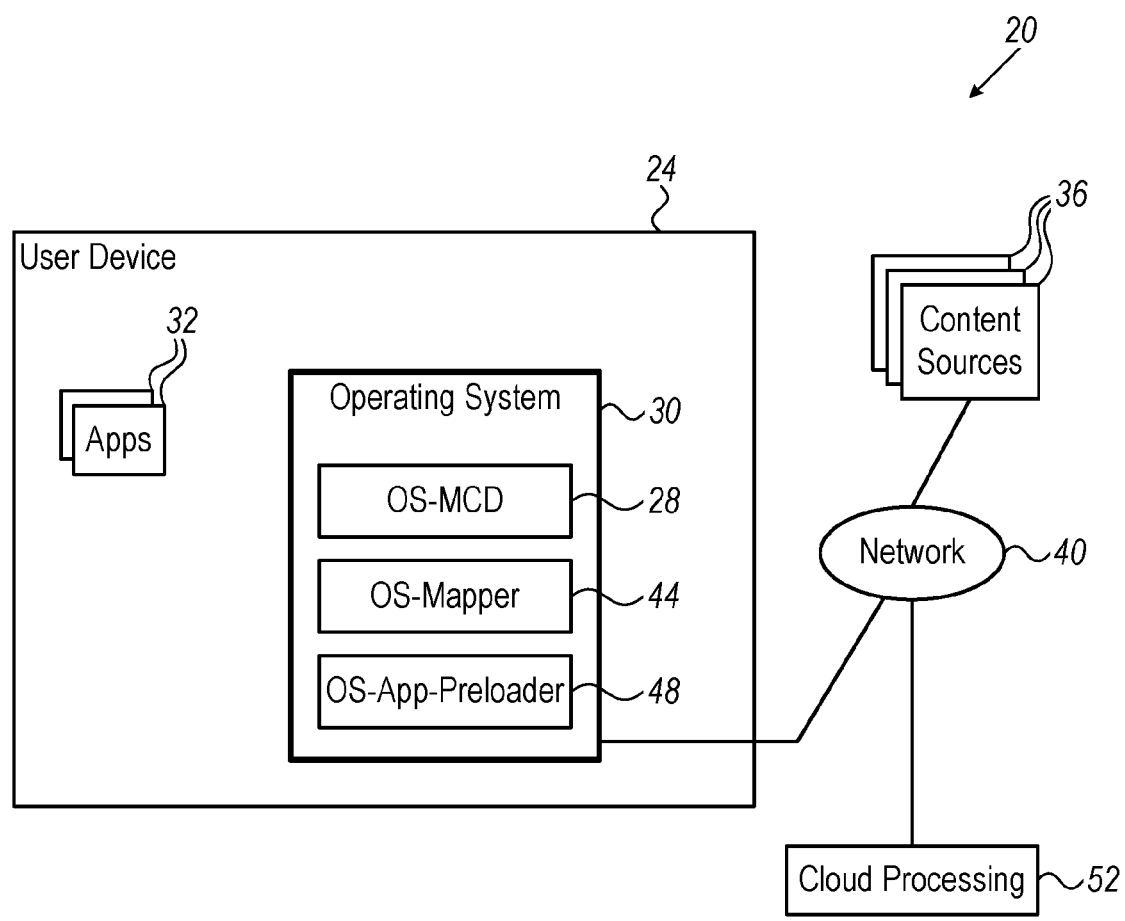
FIG. 1 is a block diagram that schematically illustrates a system for enhanced content access for a user device, in accordance with an embodiment of the present invention.

FIG. 1: Overview of a system 20 providing new enhanced functionality introduced to support enhanced mobile content access at a User Device 24.

Embodiments of the present invention introduce the three new modules to the Operating System (OS) 30 that are shown in FIG. 1.

1. OS Mobile Content Delivery module (OS-MCD) 28—This module provides functionality that supports prefetch of content to the user device that is coordinated across multiple apps 32 on the device. The content is prefetched from one or more (typically multiple) Content Sources over a network 40 in order to provide instant content access when the user requests it. The OS-MCD also provides a platform that supports enhanced prefetch functionality that may include adaptive machine learning algorithms to determine what content to prefetch and when to prefetch it.

2. OS-Mapper module 44—This module maps the device performance and status (i.e., context). The operating system has a large amount of performance and status information available to it regarding the device. Examples of performance might be related to the response latency or battery consumption associated with user actions. Examples of device status might be the charging status, the battery level, the type or quality of the network connection, the velocity of the device, and various sensor status. As described here the OS-Mapper creates a map of device performance and status and makes it available for a variety of potential clients and uses. For example, the data in the OS-Map can be used as inputs to fine-tune performance, e.g., by various apps or by the OS-MCD. The performance and device status values tracked by the OS-Mapper can also be broken down as a function of various device contexts, such as time, location, reception over Wi-Fi versus cellular, app usage, device sensor status, etc.

3. OS-App-Preloader module 48—This OS module exploits predictions of when an app will be launched (or in what device context) and initializes it and renders it ahead of time. This allows the app to launch instantly when the user engages it. The module makes an API available to the Apps that allows them to define how the OS is to preload the apps—with full user interface support, but potentially without impacting the app's viewing analytics calculations (e.g., statistics describing usage of the app, content viewed, and various advertising related transactions such as ads exposed to).

Also shown in FIG. 1 is a Cloud Processing unit 52, which may provide processing support for any of the three modules. This unit might be for example, a server connected over the network or a logical server available in the cloud. Note that the term cloud is used in this description to refer to any type of server side processing, and not to any one specific architecture. The Cloud Processing unit adds additional processing power to what is available on the User Device. As an example, the adaptive machine learning algorithms mentioned above might run on the Cloud Processing unit. In addition, by doing much of the processing in the cloud, we may minimize the amount of data that needs to be sent to the User Device. For example, only the content items that are good candidates for prefetch for the user might be identified to the user device. Similarly, various network information and information gleaned from other users ("crowd wisdom") that are used by the prefetch machine learning algorithms might never have to be passed to the User Device. Thus although in some embodiments the Cloud Processing unit is optional, it can be very helpful for realizing the full potential benefits from prefetch operation.

The combination of the new OS functionality and the integration of cloud processing capabilities with it leads to a new powerful content delivery platform which is optimized for the particular challenges of the wireless last mile.

The oval in the figure represents the network providing the communications connectivity between the various components in the figure. This network may comprise, for example, the Internet, a Local Area Network (LAN), a wireless network such as a cellular network or Wireless LAN (WLAN), or any other suitable network or combination of networks.

While in this disclosure, we cover all three new OS modules, it should be understood that there could be many cases where only one or two modules out of the three would be implemented while still providing many advantages and improvements to existing solutions.

In some embodiments we describe different modules as being part of the operating system. It should be understood that these modules might be provided by the operating system vendor, or might be added (in full or partially) by e.g., a device vendor adding its own software modules into the device (either as part of the operating system or outside the operating system). Thus many other combinations of implementing the functionality described here—inside or outside the OS, or by the OS vendor, device vendor, or some other party—are possible.

3 OS-Mobile Content Delivery (OS-MCD) Module

In this section we describe various embodiments of the new OS-Mobile Content Delivery (OS-MCD) module that runs as part of the operating system. This module supports basic prefetch capabilities and coordinated content access across multiple apps. It also supports a range of possible enhanced prefetch functionality that can be supported by integrating cloud processing capabilities with the new OS-based prefetch functionality.

3.1 Basic OS-MCD Functionality (In the figures below, some connections are drawn directly between system elements that in reality communicate via network 40. This representation is chosen for the sake of clarity, to show the data flow or logical interactions between system elements. The actual communication between the various system elements is performed over the network.)

FIG. 2: High-level block diagram illustrating basic OS-MCD functionality.

A high-level block diagram illustrating one basic embodiment of the OS-MCD functionality is shown in FIG. 2. The components shown in the figure support basic prefetch functionality, including determining (1) what content to prefetch, (2) when to prefetch the content, and (3) how to prefetch the content.

1. OS-MCD Agent 56—This agent runs as part of the operating system and supports basic prefetch capability at the User Device. It receives a fetch list containing the content items to be prefetched, and then prefetches and stores these items in Content Cache. Note that the use of the term "list" is not meant to restrict the structure or format of the fetch list (i.e., it does not exclude conveying the information in other formats, e.g., a graph format).

2. Content Cache 60—Prefetched content is stored in the Content Cache, which may or may not reside at the operating system level.

3. Prefetcher 64—The Prefetcher component of the OS-MCD Agent prefetches the desired content indicated in the fetch list from the corresponding Content Sources. At the heart of the Prefetcher is a prefetch function that downloads content from over the network. In one approach, the Prefetcher makes available an API 68 to the Apps on the User Device that enables them to provide the prefetch function and other necessary inputs that define how to prefetch content items from the corresponding Content Sources. For example, these inputs might be in the form of function callbacks (i.e. the Prefetcher calling a function in the App that fetches the content specified to the function as a parameter), security credentials, authentication keys, and others. The prefetch function and other inputs might enable handling a variety of content access challenges, including those related to specific (possibly password-protected) login procedures, encrypted app traffic, personalized app content (e.g., Facebook feed), and preventing prefetch access from affecting typical app analytics tracked by content providers (including app usage, page views, and potentially also ad related analytics, etc.). Thus any App registered for the OS-MCD service will provide the necessary content access functionality through this Prefetcher API. In some embodiments, the App or some other entity (e.g., in the cloud) might simply inform the Prefetcher through the API to use some default method for fetching content, e.g., standard HTTP get. (Each protocol might have its own defined default method.)

3.1. In some embodiments, the app might be passive and not supply code for prefetch. In this case, the Prefetcher might trigger a prefetch of an app as if a user had clicked on it. Thus execution of a prefetch would normally also cause undesired effects such as skewing analytics. Techniques to handle these scenarios are discussed in Sections 7.1 and 7.4.

4. MCD Configuration ("Config") 72—The MCD Config holds various configuration settings that are input to the OS-MCD Agent that determine (at least partially) prefetch policy, i.e., the rules and strategies that determine what to prefetch and at what context to pre-fetch it. These configuration settings might be accessed by a user through some user interface. For example, a graphical user interface can be provided to the user to input the settings that will determine what content is prefetched and when it is prefetched.

5. MCD Coordinator 76—This component provides a fetch list to the OS-MCD Agent that determines what will be prefetched and potentially at what context it will be prefetched. The context could be, for example, a time of day, a specific device status, a specific set of network conditions (e.g. type of network—3G, LTE or Wi-Fi), a specific serving cell ID, a MODEM channel condition (e.g., reception level better than a pre-specified threshold), and/or more. The fetch list is derived based on the list of content items to prefetch that have been assembled from one or more Content Sources. The MCD Coordinator coordinates the prefetch requests over multiple Content Sources which minimizes the awake time of the wireless modem at the User Device, and thus saves battery. For example, if prefetch is needed to support multiple Apps within a short time of one another, it is more power efficient to wake up the modem once for all the Apps and transfer all desired prefetch content in one shot, rather than to do this independently per App. Efficient coordinated data transfer techniques for prefetch are discussed further in Section 3.4.

One specific embodiment of the OS-MCD module described here would be for the Android operating system, where the prefetch function operates at the Android OS level. Another specific embodiment would be for the iOS operating system.

In some embodiments, some or all of the functionality of the MCD Coordinator might be implemented at the User Device, possibly in the OS itself. This would allow the calculation of prefetch policy to take into account the most up to date information available at the device (e.g., device sensor values, instantaneous network conditions experienced by the device, or other state information). If the MCD Coordinator at the User Device is not implemented in the OS, then the interface between the OS-MCD Agent and the MCD Coordinator might be implemented through an API supplied by the Agent to the MCD Coordinator, which can be used to supply the fetch list.

In some embodiments, some or all of the functionality of the MCD Coordinator might be implemented in the cloud. For example, the MCD Coordinator might make available an API to the various Content Sources so that they can each provide a candidate list of content items to prefetch (possibly along with internet addresses). This API might be provided, for example, by an OS-vendor, a handset manufacturer, the MCD Coordinator developer, or a third party. Additional examples of how content available at the various Content Sources can be identified and tracked for prefetch for the MCD Coordinator are described in Section 3.2.

In some embodiments a single MCD Coordinator implemented in the cloud can provide the fetch list for multiple OS-MCD Agents on multiple devices.

In some embodiments, a user configures the MCD Config on the User Device to specify which Apps should be supported. This information is then sent to the MCD Coordinator, which notifies the corresponding Content Sources to provide a list of content for prefetch. In additional embodiments, the Content Sources supply information on available content to the MCD Coordinator without taking into account which users are requesting prefetch support for their associated apps.

In one embodiment, the timing of the prefetch might be determined manually by the user. For example, a "Sync-Now" button/icon/widget might be displayed on the screen of the User Device, that when pressed by the user configures the MCD Configuration to request an immediate prefetch of all content in the fetch list. Such a Sync-Now feature might also be made available to the Apps to enable them to automatically generate a full or partial prefetch synchronization with the corresponding Content Source. The Sync-Now feature is discussed further in Section 3.7.

Additional settings providing more complex control of the timing of prefetch are possible, and are discussed further in Section 3.53.5.

In some embodiments, the inputs provided by the App through the Prefetcher API to prefetch content, possibly including a function callback, include the ability to detect the existence of a proxy filter which is modifying prefetched content before being received by the OS-MCD Agent. A proxy filter scenario might occur, for example, when the user device is connected to the internet through a captive network or captive portal, e.g., a Wi-Fi network in an airport, a hotel, or an Internet Café. In these cases, instead of providing the requested content, the captive network might provide a welcome log-on page. Detecting a proxy filter scenario may include identifying a known "anchor" content item at the Content Source that can be used to verify the validity of the content prefetch. Techniques to detect the existence of a proxy filter which is modifying prefetched content are discussed further in [12, 24].

In some embodiments, OS-MCD module might support prefetch of content through a device to device link (also referred to as a side-link) such as proposed in [17]. For example, the MCD Coordinator might analyze and identify the best prefetch source for the desired content, including nearby devices that may already contain the desired content in cache. In some cases, the User Device seeking prefetch content might not have a direct network connection, in which case the target prefetch content might be routed through a nearby helper device (via device to device link) which does have a network connection.

The basic OS-MCD functionality might be added to the operating system, for example, by the OS vendor or by a handset manufacturer.

3.1.1 Content Cache Access

There are various ways for an app's content access request to be serviced from the local Content Cache, including:

1. Using the OS's existing built-in network connection API, which has been extended to first check whether the content is available in Content Cache. In this case, the fetch of the content would take place at the network layer.

2. Using an OS cache layer API. In this case the app might first attempt to fetch the content from Content Cache. The response might be either the desired content or an indication that the content is not in cache (i.e., has not been prefetched). In this case, the app could then issue a request for content over the network. One example of how this might be implemented is to expand the built-in network connection API to support a "CACHE_ONLY" flag that causes the function to retrieve content from Content Cache (if available) and not over the network.

3. Using a fetch function from a third party HTTP library which the OS intercepts in order to add an access of the Content Cache. This might be a network layer function call which the OS intercepts in order to first check Content Cache; if the content has not been prefetched, then the original network layer function call is executed. This might also be a cache layer function call to fetch content from the app's cache which the OS intercepts; if the content is not found in the app's cache, then the OS can check the Content Cache.

If the access to Content Cache is implemented at the network layer, then the app might not know that the content was fetched from Content Cache. Alternatively, a flag could be returned which indicates that the content came from Content Cache. Furthermore, if the network access request is intercepted the OS might serve the content from Content Cache without creating any actual network connection. If the content is not available in Content Cache (i.e., has not been prefetched) then the network access could then be carried out based on the inputs provided by the app's original request.

It should be noted that when the OS-MCD Agent operates at the OS-level, it can intercept fetch requests even in the case that the traffic includes encryption and/or authentication (since it has access to outgoing data before encryption and to incoming data after authentication/decryption). Similarly, it can handle SSL or TLS content with or without certificate or public key pinning.

In some cases, the OS might respond to the intercepted fetch request by providing data that is partly from Content Cache and partly from over the network. For example, only a portion of a video clip may have been prefetched. In this case, a fetch request for the video clip might return both the portion locally available in the Content Cache and a subsequent portion available over the network.

One advantage of retrieving prefetched content at the cache layer is that these tasks are usually scheduled with a higher priority, leading to a faster response time. In addition, if the app's attempt to retrieve content from Content Cache is unsuccessful, the app still has the option to decide whether or not to subsequently fetch the content from over the network. For example, the app might only want the content if the content is already locally cached (where the cost of the content access in battery and data plan is minimal and access response is guaranteed to be fast).

In some embodiments, a single central cache could be used for prefetch content across multiple apps, e.g., possibly residing in the OS. Alternatively, each app's prefetched content might be cached in a separate cache.

3.1.2 Metadata

In some embodiments, metadata associated with the content can be used when setting prefetch policy and making prefetch decisions. In some such embodiments, the metadata might be provided by the Content Sources along with the identity (and location pointer) of the content to prefetch. This will allow more sophisticated filtering of the fetch list by the MCD Coordinator based on the MCD Configuration. For example, in some embodiments a "category" value can be included with the content item, such as "sports", "business", or "technology". A user might then configure the MCD, for example, to prefetch "sports" content for the New York Times App and "business" content for the CNN App.

Other examples of useful metadata that could be used in setting prefetch policy and in making prefetch decisions are:

1. Tags and keywords
2. Indicator of whether the content element is initially visible on the web page (as opposed to being visible only after scrolling). Similarly, a visibility "distance metric" might be provided to indicate how much scrolling must be done before a content element becomes visible. Additionally, the visibility distance metric might take into account other required user actions besides scrolling, such as additional clicks before the content item becomes visible. The use of a visibility indicator or distance metric is discussed more at length in [11].
3. The identities of parent content items or of children content items
4. Rating information (possibly broken down between mobile users and desktop users)
5. Network conditions under which a content item should be displayed (e.g., a high-quality image in good network conditions) and the identity of alternative content items that should be used under different conditions (e.g., a lower-quality image in poor conditions).
6. Time limits (relative or absolute) during which it is permissible to display a content item. For example, some content providers may have rights to use a particular video highlight clip for a short time only. The expiration time might be included in the list of content provided to the MCD Coordinator. This could be used to exclude the prefetch of content items that are set to expire within a short period of time, (or set to expire before the user is expected to request the item).
7. The identity of "linked" content items that are most likely required if a content item is accessed can also be listed. For example, if several web pages are required in order to completely fill out an on-line form, then the linkage between the corresponding content items should also be indicated in some way. In this way, for example, the MCD Coordinator can know that prefetching one of these "linked" content items might not be worthwhile unless all linked content items are prefetched. This might be particularly true if the user configured the OS-MCD to prepare for network outages, where only prefetched content will be available. Techniques for handling prefetch of linked content for network outage conditions are addressed in [4].
8. Digital Rights Management (DRM) information such as indicating who can consume the content and at what context (e.g. a certain video clip can only be consumed within two hours of its becoming available by the content provider).
9. Whether the item is expected to change significantly in the near future. If it is, this might reduce the priority of the prefetch.
10. The size of the content item
11. The type of the content item (e.g., text, image, video, feed, article, game)

In some embodiments, the metadata might be passed from the Content Source to the Adaptive MCD Subsystem through new or existing options for the HTTP header (or some other existing protocol format).

In all cases, MCD Config options might be provided to exploit the available metadata to enable more sophisticated filtering for determining what content should be prefetched and when it should be prefetched. In addition, the availability of this metadata can be exploited as input features to machine learning algorithms (discussed below) to better predict what content will be of interest to a user and when he will need it.

In the absence of such meta-data arriving from the content provider, other entities may extract the needed information and add it as meta-data as is explained in the sequel.

3.1.3 Prefetch Based on Device Context

There are many examples of data related to device context that might influence the decision on whether to prefetch content.

1. Day of week and/or time of day
2. Device location—e.g., based on GPS coordinates or serving cell ID. For example, you might be more likely to access certain content at work, at home, at the supermarket, or at the park.
3. Device sensor data such as device movement, velocity, orientation, screen status, light exposure, external temperature, background noise level, etc. For example, if sensor information indicates outdoor exposure to sunlight then content usually accessed outdoors would be more likely candidates for prefetch. As another example: if sensor data indicates that the device is in a dark room and not moving, this probably indicates that the user is sleeping and prefetch is unnecessary. An additional example: prefetch of certain content might be triggered if User Device movement is detected. (Additionally, the amount of time the device was not moving before movement begins might be taken into account. For example, prefetch might be triggered specifically in the case where the device begins to move after not moving for a couple of hours.) An additional example: if the device is moving at vehicle speed, then certain content (e.g., maps for a navigation app) might be triggered for prefetch. An additional example: prefetch of certain content might be triggered upon user activation of the User Device screen.
4. Battery level—A user is probably more likely to avoid opening apps if his battery level is very low, which means that there is less chance that prefetching content will be useful. Furthermore, there is less tolerance for wasting battery for false prefetch when the battery level is low. Thus the criterion to choose prefetch might become stricter as the battery level goes down.
5. Battery charging status—For example, if the battery level is low such that prefetch would normally be disabled, but the device is currently charging then prefetch operation might be enabled.
6. Wi-Fi connectivity—For example, certain content with large data download demands (e.g., video clips) might be more likely to be accessed when the network connection comes through Wi-Fi.
7. Alarm—For example, a user might want certain content to be prefetched shortly before his morning wakeup alarm goes off.
8. Device lock status—For example, if the phone is locked it might not pay to prefetch for certain apps. As another example, certain content might be chosen for prefetch when the user unlocks the device.
9. Visual indication that new content is available—In some cases a visual indication might be provided to the user that new content is available. This might even be an alert notification with a brief description indicating what the new content is related to (e.g., [18]). The display of the indicator to the user often increases the likelihood that the user will request access to the associated content—thereby triggering the prefetch of this content.

10. User activity—In some cases, prefetch might be blocked or stopped in the middle of execution if certain types of user activity are initiated. For example, if the overall level of user activity is very high, then prefetch operation might be blocked to avoid interfering with user activity.

11. Network conditions—The measured or estimated network conditions. This might be, for example, the network conditions over a period of time, or the instantaneous network conditions. This also might refer, for example, to the wireless link conditions or the network load and/or server load conditions.

In some embodiments of the present invention the apps and content to consider for prefetch, and the contexts in which to prefetch might be largely defined based on the settings in the MCD Config, possibly directly by the user. For example, the user might define prefetch based on time of day, location (including specifying "home" or "work" locations), alarm, device lock status, device movement, etc.

3.2 MCD Tracker

FIG. 3: High-level block diagram illustrating the use of an MCD Tracker 80 within the overall OS-MCD module.

In some embodiments an MCD Tracker 80 component might be introduced in order to track the contents of various Content Sources and potentially provide some indication of content freshness. An embodiment of this approach is illustrated in FIG. 3. The MCD Tracker might create a catalog of content items where the age of the content items are indicated in some way such as with a time stamp or version number, in order to keep track of which items have changed. Each time a new catalog is generated, it can be passed on to the MCD Coordinator and compared to the previous catalog (i.e., the time stamps/version numbers listed for each content item can be compared to determine which are out of date). The verification of prefetched content freshness is discussed more at length in [2, 25, 26].

Pointers for the various content items listed in the content catalog (e.g., internet location/address, URL, local pointer to cache) are typically also recorded in the catalog. In some cases content sources provide multiple versions of a content item in order to support different devices or device contexts. For example:

1. Different versions of an image or video might be desired depending on the screen size and/or resolution of the device display. For example, one set of images might be available for standard smart phone screens and another set available for tablets.

2. Different versions of an image or video might be desired depending on the device context. For example, one set of images might be available for when the device orientation is vertical, and another set for when it is horizontal.

3. Different versions of an image or video might be desired based on the current network link conditions. If a high speed connection is available, then a high resolution image or video might be preferred. If only a lower speed connection is available, then a lower resolution image or video would typically be preferred.

4. Different versions of an image or video might be available depending on the location of the device, in cases where content has geographic based restrictions associated with it.

These situations create a challenge for prefetch, since the correct versions of the content item needs to be prefetched. One approach would be to list all versions in the Catalog and allow the prefetch policy (set in the cloud or refined at the device) to prioritize the different versions (depending on the type of device and the likelihood of experiencing various device contexts). In some cases this necessitates prefetching multiple versions of the same content item. Efficient techniques for handling prefetch in these types of cases are discussed in [30].

In some embodiments, a single pointer (e.g., URL) might be recorded in the contents catalog to represent multiple versions of a content item. In this case, the device can use this pointer, but add device-specific and context-specific parameters to the content request to specify which version is desired (e.g., screen size, network speed, geographic location, device orientation). In other embodiments, the pointers are modified in the catalog by the device or by the Adaptive OS-MCD Subsystem (in the cloud) to include the required device-specific and context-specific parameters.

We note that the MCD Tracker can be implemented in the cloud or at the User Device (possibly in the OS itself). Implementing the MCD Tracker in the cloud has the advantage of enabling the Content Sources to provide the tracking information over the internet without burdening the wireless link with all of this traffic. In this way, the tracking information can be collected across multiple Content Sources and only the minimum information needed at the User Device (after filtering at the MCD Tracker and possibly even the MCD Coordinator) can be sent together in one shot to the User Device. In addition to filtering the information, coordinating the device updates across multiple Content Sources also provides benefits for network transfer efficiency and user device battery usage.

In some embodiments, the MCD Tracker computes freshness metrics which indicate how much a content item has changed relative to previous versions. It might then record these metrics in the content catalog that is passed on to the MCD Coordinator. The MCD Coordinator might use this information along with knowledge of the user's previously prefetched version to better form prefetch policy (e.g., to better rank/score the prefetch priority of different content items for a particular user). For example, if the changes are deemed to be insignificant relative to the version which has already been prefetched, the priority rank/score recorded in the prefetch policy might be very low—even though the likelihood of a subsequent access request is estimated to be very high. Alternatively, if the changes are very significant the content might receive a higher prefetch priority score even if the likelihood of access is lower. In some embodiments, the MCD Tracker (or MCD Coordinator) might even decide not to notify the user of an update if the modifications are determined to be sufficiently limited. In some embodiments, the freshness metrics might be separately recorded in the catalog along with a separate prefetch likelihood metric indicating the likelihood of the user requesting access to the content. The prefetch priority and final decision at the device on whether and when to prefetch might then be based on both the freshness metric (indicating how out of date the previously prefetched content is) and the likelihood metric (indicating the likelihood that the user will request access to the content). The freshness metric could also be used to determine whether to present prefetched content that is not completely up to date, as described in [2, 25, 26].

The implementation of the MCD Tracker in the cloud enables potential computationally intensive algorithms to compute freshness metrics. For example, freshness metrics can be computed based on all the text differences between two versions of an article. In addition, the freshness metrics can attempt to differentiate between actual content differences and when the differences are just due to the order or layout of presentation. For example, if the updated feed content of a publisher is identical to what has already been prefetched but the order of the articles presented are different, this might be detected as a relatively insignificant change which would be reflected in its freshness metric. Similarly, if the feed content has changed—but the changes are confined to sections that are not immediately visible when the feed is accessed (i.e., the changes would be visible only after scrolling) then the freshness metric might indicate that the update is minor. In some embodiments, image pixels can also be compared in order to better determine a freshness metric. For example, if the two images essentially display the same content but e.g., from a different angle, different color scheme rendering, different resolution, or different brightness, then the freshness metric might reflect that the update is not significant. Similarly various methods of comparing videos can be used to evaluate the freshness metric of a video clip. For example, we can compare pixels of MPEG anchor frames, we can compare a strongest subset of MPEG DCT coefficients for certain frames, or we can compare color histograms for certain frames. If a video update is found to be essentially a higher resolution version of a previously prefetched video clip, then the freshness metric might indicate that this difference is inconsequential.

In some embodiments, the User Device might present the locally cached requested content, (e.g., app feed), while in parallel checking whether it is sufficiently up to date with the content over the network [2, 25, 26, 27]. If it is not fresh, (or fresh "enough") then the OS-MCD Agent might notify the App through an OS API that the cache is not fresh, and provide several options to the app developer to choose from. For example, the options might be (1) do nothing, (2) re-render the and re-display the screen, showing the up-to-date content, (3) display a message to the user that allows the user to decide what to do, (4) show an icon with a time stamp for when the content is relevant. Alternatively the OS might implement the above options itself without passing the freshness status to the App through an API.

In additional embodiments, the User Device might verify freshness only if the most recent update was more than N minutes ago.

In some embodiments the OS-MCD module at the User Device includes an API that allows the OS to check the freshness of a content item by verifying the freshness of the catalog (or the catalog entry corresponding to the content item). For example, the user might click on an app and display the app feed from local cache. But in parallel, the user can verify that the catalog is up-to-date through the OS-based API that compares the catalog to the latest version of the catalog. Alternatively, the OS might check the freshness status only if that catalog has not been updated within the last N minutes.

There are a number of ways the MCD Tracker can track the content items at the Content Sources. One example is that a Content Tracker API 82 can be supplied by the MCD Tracker to the Content Sources. This API might be defined for implementation in the cloud (for example, by an OS-vendor, a handset manufacturer, the MCD Coordinator developer, or a third party). This API can define the interface for each content provider to provide updated details about its content—including, for example, content identity, internet address (or some other location pointer, link, or index), freshness metric or indication (relative to previous versions), and various useful metadata (examples given earlier). Using this approach, each time there is an update at the Content Source for one of the content items, the Content Source can notify the MCD Tracker, e.g., using the Content Tracker API. In this way, the MCD Tracker can build and maintain a global catalog of updated content across multiple Content Sources that can be passed on to the MCD Coordinator, in order for it to choose which items should be prefetched and when they should be prefetched.

The concept of the Content Source providing notifications of content changes to the prefetch system was referenced in [1].

In some embodiments, the MCD Tracker will do some filtering before creating the global catalog of content items. In this case, content items that are deemed unlikely to be relevant for prefetch (e.g., because they have been noted to be changing at a very fast rate) might be excluded from the global catalog. In some cases, the filtering operation at the MCD Tracker might be user-specific, and thus the resulting global catalog will also be user-specific.

In some embodiments, the Content Source will provide a list of all available content items and notify the MCD Tracker whenever there are updates. In other embodiments, the Content Source will do a certain amount of initial filtering. For example, content items that are changing very quickly might not be included in the list of content items supplied to the MCD Tracker. Similarly, content items with an exceedingly low rating might also be excluded. The Content Source might also filter its updates of the Content Items. For example, if an image is replaced with a slightly higher resolution image, the Content Source might not consider this update significant enough to warrant notifying the MCD Tracker of an update. Thus the Content Source might only provide ongoing tracking information for content items it deems important for prefetch.

In some embodiments, the Content Source might provide an indication of the prefetch priority that it estimates for some or all of the content items that it provides tracking updates for. For example, a content item with a fast-rising rating might be ranked with a higher prefetch priority. This might be done using a single ranking for a content item across all users, or it might be done conditionally per user, per group of users, or based on some user attribute, e.g., a higher prefetch priority ranking for a particular content item might be granted for tablet users and a lower one for handset users. As another example, the prefetch priority ranking can depend on whether the user is connected via Wi-Fi or a cellular connection. If the Content Source is able to track and predict individual user preferences, then individual prefetch priority rankings might even be specified for some or all individual users. The prefetch priority rankings provided by the Content Sources can be used by the MCD Coordinator (or at the User Device) to help determine which content items should be prefetched for each user and when they should be prefetched. In some embodiments the metrics provided by the Content Source might indicate the likelihood of the content being accessed, which can be used as inputs to determining prefetch priority at the MCD Coordinator or at the User Device.

In some embodiments, the Content Source might also provide recommendations as to when the content items should be prefetched. For example, the Content Source might rank the time urgency of prefetch between 1 and 5, with 5 indicating the highest level of time urgency. The Content Source might choose a higher urgency rating, for example, in the case where the user rating associated with the content item is growing at an extremely fast rate. Alternatively, the Content Source might provide a time within which it thinks the item should be prefetched. This time can be specified as an absolute value or as an offset from the time that the information was provided. Similar to the prefetch priority rankings, the timing recommendations can be provided by the Content Sources as a single recommendation per content item, or as a recommendation that is conditioned on the user identity, a user group, or based on some other user attribute.

In some embodiments, the MCD Tracker and the Content Tracker API might be defined by the OS Vendor (for implementation either in the cloud or at the user device, possibly as part of the OS). In some embodiments, the MCD tracker might be defined by a handset manufacturer—possibly to be implemented at the OS level on the user device.

An additional option for tracking might be for the App on the User Device to provide information regarding the content that is available at the associated Content Source to the OS-MCD Agent. This information might include content catalog updates and various metadata associated with the content. This information might be used to improve prefetch policy or prefetch decisions at the User Device and/or the MCD Coordinator.

In yet another embodiment, the MCD Tracker provides a software agent to the Content Source that can "crawl" the website and catalog the content items (e.g., [1]). This can be done, for example, by beginning with the feed of the app, recording all links that can be reached from the feed, then recording all links that can be further reached from these links, etc. This might rely on some minimal cooperation of the content provider, where e.g., the website might be organized in the format expected by the crawling agent being provided or the website might include particular configuration files expected by the crawling agent.

This approach of content tracking by crawling the website of a Content Source can in many cases also be done without the cooperation of the content provider. In this case, the burden of finding the content might be entirely on the MCD Tracker, which may need to try multiple approaches to tracing through the links of the website depending on the organizational format used by the Content Source.

Another approach to content tracking might be based on crowd wisdom techniques as proposed in [16]. The key components of this approach are:

1. Relying on the "crowd" of users accessing a Content Source to keep track of available content.

2. Any user that happens to access a new or updated content item reports this to a server.

3. The server records these user reports in a catalog of content items in order to keep track of the current contents of the Content Source.

4. This catalog can be sent to users to help them determine whether an accessed content item is new or updated (in which case it should be reported).

Using this approach, as soon as any single user experiences an out-of-date content occurrence with its catalog, all users can receive an updated catalog informing them of the content change.

A number of approaches of Content Tracking have been described here. It should be understood that in some embodiments multiple approaches may be used. For example, a Content Tracker API may be available at the MCD Tracker for Content Sources to provide content updates. This approach may, however, be augmented by additional crawling of the Content Source pages by the MCD Tracker in order to attempt to find items that the Content Source may have missed and not provided information for.

In some embodiments, the Content Source might also use the Content Tracker API to provide the inputs needed to fetch the actual content items. These inputs might be in the form of function callbacks, security credentials, authentication keys, and others. This can enable the MCD Tracker to actually fetch some of the content in order to analyze the content and define useful metadata. In one example, the text of many of the articles of a Content Source might be passed to the MCD Tracker. This text can then be analyzed to define various article metadata that can be useful for filtering the content and determining prefetch policy at the MCD Coordinator. In other words, instead of relying on the Content Source to supply critical metadata needed for the prefetch algorithms to run efficiently, the MCD tracker can compute some of this metadata itself. For example, the MCD Tracker can determine keywords, tags, and categories that describe the articles. These attributes can then be recorded in the global content catalog and passed to the MCD Coordinator. In this way, these attributes can be used to better determine what to prefetch for each user (and when to prefetch it)—either by conditioning prefetch on these attributes in the MCD Config, or by using these attributes in adaptive machine learning algorithms that automatically determine prefetch policy, as will be discussed more below. The ability to process the content to obtain critical metadata to be used by the MCD Coordinator is another advantage of implementing the MCD Tracker in the cloud. In various embodiments, the calculation of the metadata can be done at the MCD Tracker, the MCD Coordinator or in a separate unit.

In some embodiments, the delivery of content to the MCD Tracker is itself compressed in some efficient way. For example, the content of a person's Facebook feed might be transferred to the MCD Tracker by periodically sending differential updates (e.g., [1, 3]) from the Content Source. The feed can then be analyzed for metadata that might assist the filtering and adaptive machine learning algorithms.

In some embodiments, the metadata included by the MCD Tracker for the content items might include information to enable verifying that a proxy filter operating between the source of the prefetched content (e.g., Content Source) and the User Device is not modifying the prefetched content. These techniques are discussed more at length in [12, 24].

3.3 Enhanced OS-MCD Functionality

Figure 4:
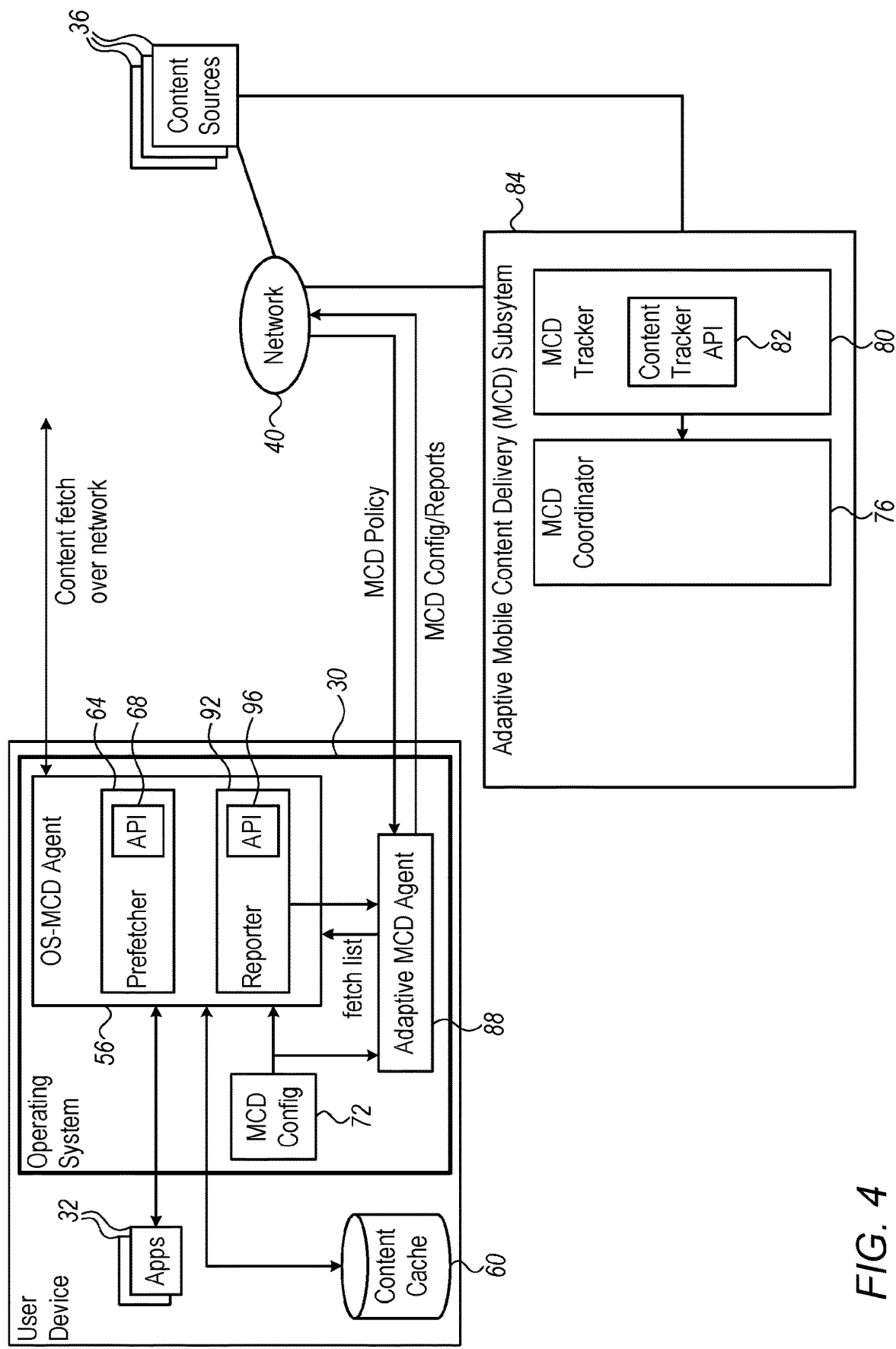
FIG. 4 is a block diagram that schematically illustrates an OS-MCD supported by cloud-based adaptive processing, in accordance with an embodiment of the present invention.

FIG. 4: High-level block diagram illustrating enhanced OS-MCD functionality, supported by adaptive processing in the cloud.

The full potential of the OS-based prefetch functionality can be realized when supported by sophisticated adaptive algorithms, e.g., machine learning algorithms, to better determine prefetch policy, e.g., to determine what to prefetch and in what context to pre-fetch it. The context could be, for example, a time of day, a location, a specific device status, a specific set of network conditions (e.g. type of network—3G, LTE or Wi-Fi), a specific serving cell ID, a MODEM channel condition (e.g., reception level better than a pre-specified threshold), and/or more. These adaptive algorithms are used to estimate metrics that predict the likelihood that a user will request particular content, and potentially when the content will be needed. These algorithms can also take into account the estimated benefits and costs from each content prefetch, including, for example:

The potential reduced latency of content access, taking into account the expected network access latency conditions at the time the content will be requested The potential data plan and battery usage waste if the prefetched content is never accessed The potential gain in cellular data plan usage if the content is prefetched when the User Device is connected to the internet through Wi-Fi The potential gain in battery life if the content is prefetched when the User Device is connected through a better wireless link An example embodiment of this approach is shown in FIG. 4 above, which includes the following components:

1. Adaptive Mobile Content Delivery (MCD) Subsystem 84: This subsystem can be implemented at a physical or logical server available over the network. In a typical embodiment, much of the Adaptive Machine Learning Algorithms are implemented at this subsystem. The various embodiments described above for the MCD Tracker can also be implemented at the Adaptive MCD Subsystem, including the use of the Content Tracking API for the Content Sources to supply content update information.

2. MCD Coordinator 76: This component is similar to the MCD Coordinator described in FIG. 3. It receives the global catalog of content items from the MCD Tracker. However, instead of outputting a fetch list to the User Device it might typically send a prefetch MCD policy. The MCD policy includes all relevant information gathered or produced by the MCD Tracker and MCD Coordinator in the cloud that should be sent to the User Device to enable a final prefetch decision that may be context-dependent. This information may include current and future predicted network conditions (possibly per user, per cell ID, or per location) as described in [6, 22, 23]. Thus, for example, certain content might only be prefetched when wireless link conditions are good enough. (The incorporation of network conditions in setting MCD policy is also discussed further in Section 3.10.) The user-specific prefetch likelihood metrics (e.g., metrics indicating the likelihood that the user will request access) for each content item can also be calculated and recorded in the user-specific MCD policy which is sent to the User Device. Additional information indicating when the content is likely to be requested can also be included in the MCD policy. This allows the final prefetch decision to be taken at the User Device, thus enabling the most up to date information at the User Device (e.g., sensor, network or other state information) to be taken into account. In some embodiments, the prefetch likelihood metrics are at least partly computed based on adaptive machine learning algorithms which estimate the likelihood that a user will request content (and possibly when he will request it).

3. Adaptive MCD Agent 88: This Agent at the User Device is an extension of the Adaptive MCD Subsystem implemented in the cloud. It receives the prefetch MCD policy which contains the results of the content tracking and prefetch policy calculations carried out at the Adaptive MCD Subsystem. Its main function is to provide the OS-MCD Agent with the final prefetch decisions through a fetch list, which indicates what content should be prefetched and when it should be prefetched. In some embodiments adaptive machine learning algorithms can also be implemented by the Adaptive MCD Agent at the User Device, in order to improve the prefetch decisions. In these embodiments, some of the inputs to the machine learning algorithms might include the most recent user activity or device state/sensor information. The settings in the MCD Config might also be taken into account by the Adaptive MCD Agent in determining the fetch list. In some embodiments, adaptive machine learning algorithms can be carried out at the Adaptive MCD Agent without (or with minimal) additional machine learning algorithms in the cloud.

4. Reporter 92: An optional Reporter component might be activated as part of the OS-MCD Agent functionality. The Reporter collects User Device-based information that can be used to better determine MCD policy. This might include things like user location, user interests, current and historical internet usage activity, current and historical device sensor information (such as velocity, exposure to light, external temperature, background noise-level, etc.), the identity of the apps that are currently installed on the device (and/or the identity of an app recently installed or uninstalled), and network conditions experienced by the user. The OS-MCD Agent makes all of this information available for sophisticated adaptive machine learning algorithms that can be used to set MCD policy. In some embodiments the Reporter collects user, device, and/or network information from generally available APIs or OS functions and makes it available to OS-MCD clients. The Reporter might also track and make available the changes to this information over time. In some embodiments, the Reporter processes this information in order to make it available in a form which is useful for the adaptive algorithms implemented at the Adaptive MCD Agent and the Adaptive MCD Sub system.

4.1. Reporter API 96: In some embodiments, the Reporter includes an API as shown in the figure that allows the apps to directly report user click data to the Reporter. In other words, each app might report what content was clicked on by the user and additional metadata associated with the content. Such metadata might include what type of content it is (e.g., feed, article, image, video). Another option might be for the user's internet usage activity across multiple apps to be provided as a service from the cloud (e.g., Google Analytics), where detailed website traffic statistics are calculated and made available.

4.2. Reporter Interceptor: In some embodiments, the apps might not actively supply information to the Reporter. Techniques to handle these scenarios based on an interceptor component that intercepts app traffic are proposed in Section 7.

In some embodiments, the MCD Coordinator also filters content items, so that only content items that are more likely candidates for prefetch are included in the prefetch MCD policy. For example, if a prefetch likelihood metric estimated by the adaptive machine learning algorithms at the MCD Coordinator is very low, the corresponding content item might not be included in the catalog of content items sent to the User Device as part of the MCD policy.

In some embodiments the MCD Coordinator might notify the Adaptive MCD Agent at the User Device if a significant change in the prefetch MCD policy is detected. A significant change might be the addition of a new content item that is considered a likely candidate for prefetch. It might also be a significant update in a content item that is already listed in the policy. Furthermore, it might also be a change in the likelihood metric or some other metric or metadata included in the policy that might affect prefetch priority. If such a change is detected, a prefetch notification (PN) can be sent to the User Device through a variety of notification methods, such as the popular Google Cloud Messaging (GCM)/Firebase Cloud Messaging (FCM) used for Android devices, and Apple Push Notification (APN) used for iOS devices.

In some embodiments, the adaptive machine learning algorithms used at the MCD Coordinator to calculate prefetch MCD policy also incorporate as inputs information received corresponding to other users ("crowd wisdom"). In this case, if a correlation in user behavior is detected between certain users, then reports related to all of these users can be used to better set prefetch MCD policy for each individual user.

In further embodiments, some users might not make certain information available to help calculate the prefetch MCD policy of other users. For example, a user might not report its internet usage activity to the cloud so that it can be used in the calculation there of prefetch MCD policy for any user. In some such cases, the information might not even be available for calculating the prefetch MCD policy of same said user. This might occur, for example, if the user does not give permission for reporting internet usage activity (or other user/device related information), possibly due to privacy concerns. In such embodiments, the calculation of the user's prefetch MCD policy might continue to take into account "crowd wisdom" based on the reports of other users. Alternatively, the use of other user reports in calculating prefetch policy might not be permitted unless the user enables similar such reports. Thus the user might be encouraged to allow reporting by being informed that this will enable access to similar other users reports when calculating prefetch policy (leading to improved prefetch performance).

In yet additional embodiments, a user that has disabled prefetch might continue to report its internet usage activity so that the prefetch MCD policy for other users can benefit from the crowd wisdom, despite the fact that prefetch MCD policy is not needed for said user with disabled prefetch. The effect of the adaptive machine learning algorithms might also be taken into account. For example, a user supported by advanced prefetch techniques based on adaptive machine learning is more likely to have low latency when requesting content. This might in turn significantly affect the user's content consumption pattern, especially for large content items such as video which often suffer from large latency. Thus the presence of these algorithms might be taken into account for each user as inputs to the machine learning. Furthermore, the success and efficiency of these algorithms for each user might also be considered. For example, if 90% of videos that are clicked begin to play without delay for a particular user, then the user will be much more likely to click on the video links than the user where only 10% of clicked videos are served from prefetch cache. Thus various prefetch performance metrics per user might also be taken into account by the adaptive machine learning algorithms.

Another feature which might be taken into account by the machine learning is whether prefetched content is marked as up to date in local cache or not. Contents (e.g., videos) that are visually marked to the user as up to date might have a much larger chance of being accessed since the user expectation is a fast latency-free response. Thus, the presence of this feature might also be taken into account for each user as additional inputs to the machine learning.

The Adaptive MCD Agent can request and receive from the MCD Coordinator an updated prefetch MCD policy. It can then decide whether to issue a prefetch request based on this policy and various other relevant factors about its current state (e.g., battery level, network connection quality, what content already resides in device cache, etc.). The prefetch decisions are passed on to the OS-MCD Agent through the fetch list.

In some embodiments, the decision on whether to prefetch content might take into account whether the associated app is currently loaded in the background or not. For example, if the app is already loaded in the background it might be particularly desirable to prefetch content that is needed for actively using the app (e.g., for the app's initial screen, such as the feed) in order to enable the instantaneous response possible for an already loaded app.

In some embodiments the Reporter sends its information to the Adaptive MCD Agent, which forwards it to the MCD Coordinator at the Adaptive MCD Subsystem. In other embodiments, the Reporter directly reports its collected information to the Adaptive MCD Subsystem. The specific types and formats of Reporter information that should be sent might be configured in a configuration file (e.g., saved and accessed by the Adaptive MCD Agent), along with the destination address for the reporting (e.g., address of the Adaptive MCD Subsystem). This configuration might also be defined or referenced by the MCD Config.

The Reporter might combine/compress historical internet usage activity across many apps to enable efficient reporting to the Adaptive MCD Subsystem. This information can be jointly used to better predict prefetch needs for each individual app. For example, a user that has recently accessed articles on a particular topic through the NY Times app may be assessed to be more likely to also access articles on this topic through the CNN app.

In some embodiments the functionality described for the OS-MCD Agent and the Adaptive MCD Agent can be split differently. For example, a single Agent can be used that includes the functionality of both agents.

3.3.1 OS-MCD Agent as a Platform for Enhanced Prefetch Functionality

Figure 5:
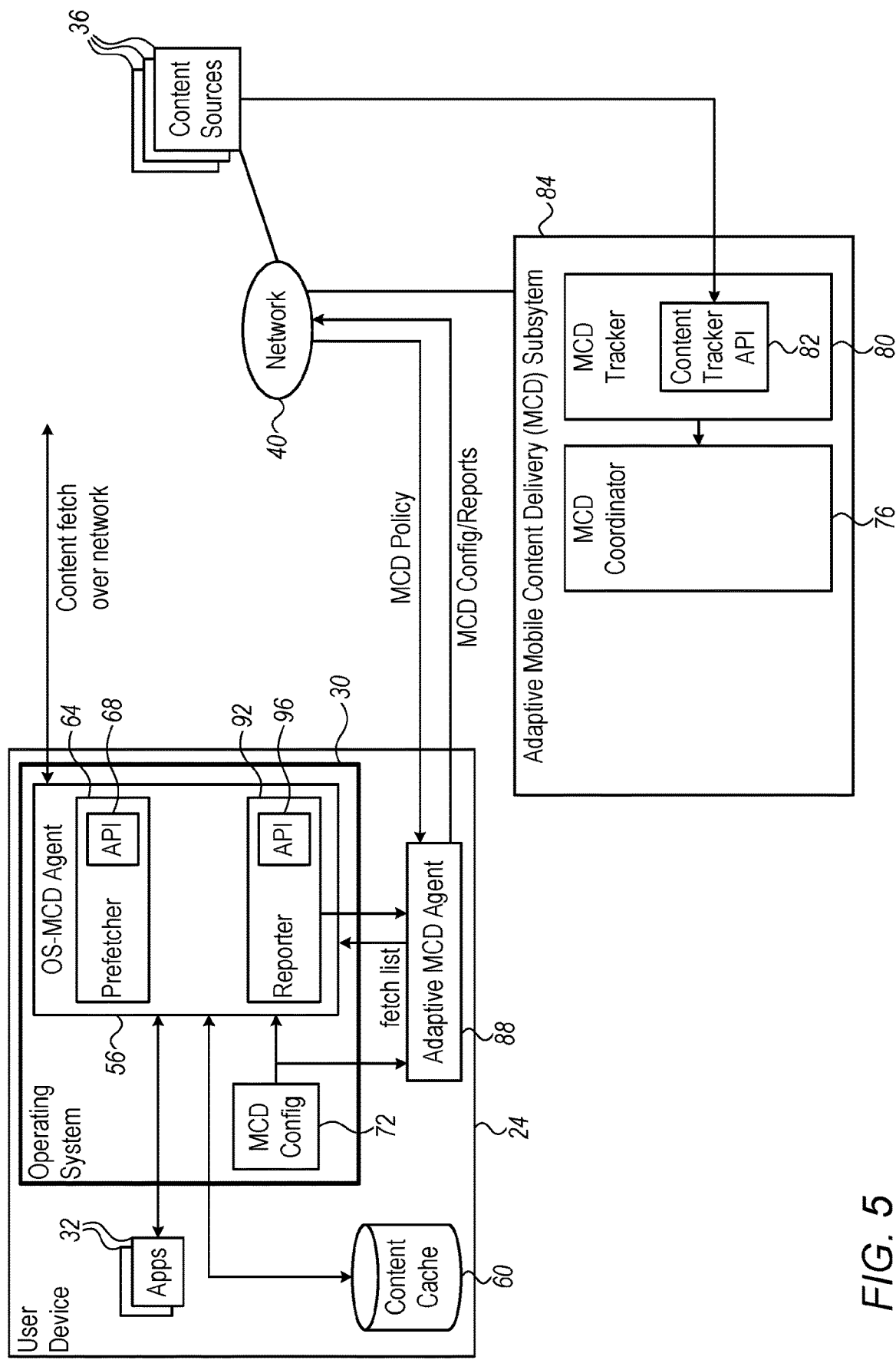
FIGS. 5 and 6 are block diagrams that schematically illustrate OS-MCD agents providing prefetch functions both inside and outside the OS, in accordance with embodiments of the present invention.

FIG. 5: High-level block diagram where the OS-MCD Agent provides basic prefetch functionality in the OS at the User Device, and also supports enhanced prefetch functionality implemented outside the OS.

In some embodiments, the OS-MCD Agent might be implemented in the operating system, while the Adaptive MCD Agent might be implemented outside the operating system on the User Device, e.g., as an app, as an SDK in an app, or as a proxy server. In this case, the OS-MCD Agent, which provides basic prefetch functionality, can serve as a platform to enable the implementation of a third party package to support enhanced prefetch functionality. This third party package might include both an Adaptive MCD Agent at the User Device and an Adaptive MCD Subsystem in the cloud, as illustrated in FIG. 5.

In the embodiment described in FIG. 5, the interface between the two agents might be implemented through one or more APIs. For example, the OS-MCD Agent might provide a Fetch List API (not shown) that enables the software agent running outside the OS to provide it a fetch list. The OS-MCD Agent might also make available various user/device reports relevant for prefetch to the Adaptive MCD Agent through a Reporter API. The MCD Config settings are also assumed to be available to the Adaptive MCD Agent. Thus, both the user/device reports and the MCD configuration can be used by the Adaptive MCD Agent in making the final prefetch decisions. In some embodiments the Adaptive MCD Agent might also forward the user/device reports and MCD Config settings to the MCD Coordinator at the Adaptive MCD Subsystem so that this information can be used in setting prefetch MCD policy.

In some embodiments the Reporter can be configured to also report user/device information directly to the Adaptive MCD Subsystem. This configuration might be done, for example, through the MCD Config, or through a configuration file saved by the Adaptive MCD Agent. The Reporter configuration might specify both the type and format of user/device reports that are provided, as well as the destination address for the reporting (e.g., address of the Adaptive MCD Subsystem).

Figure 6:
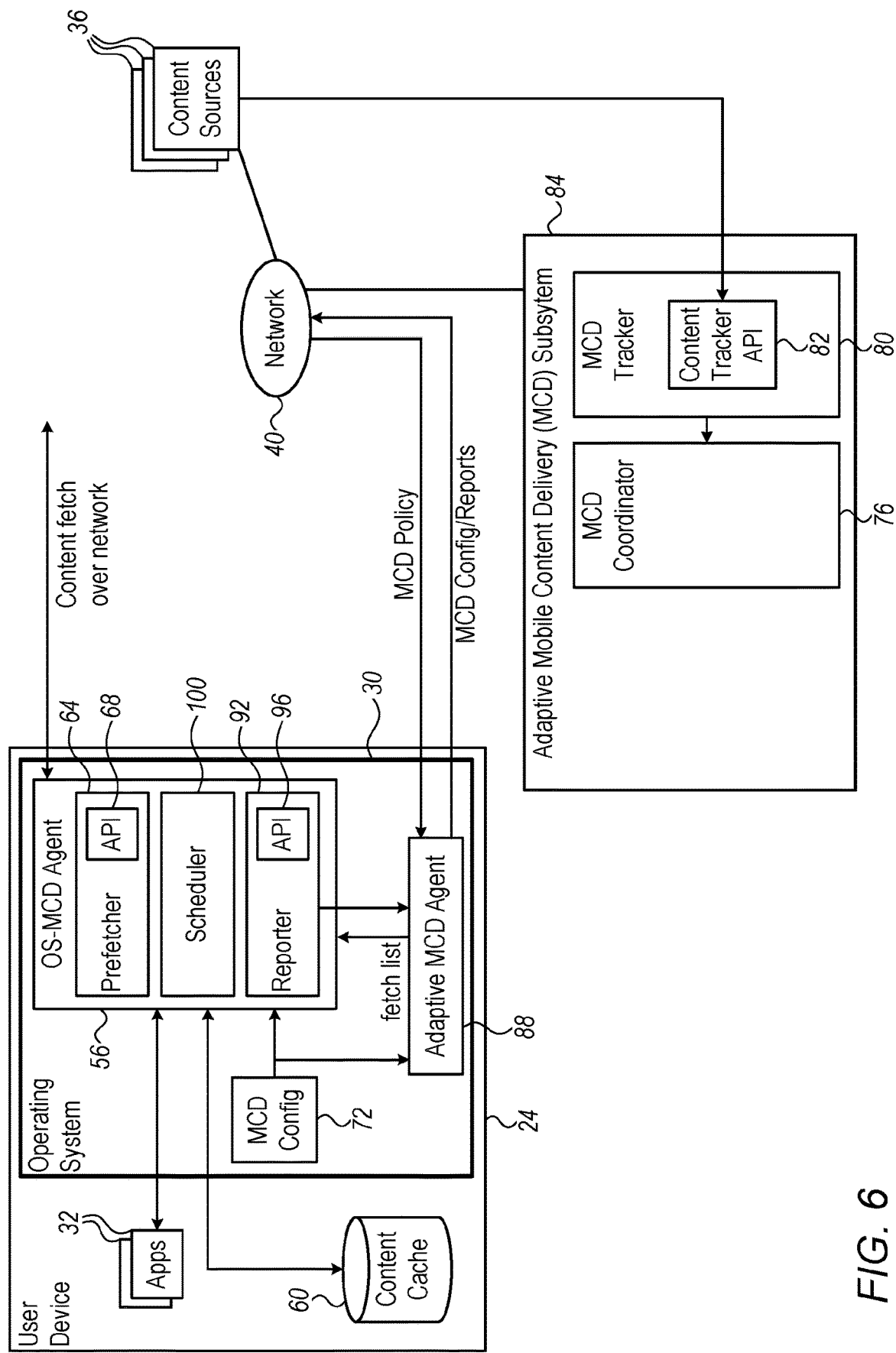

In some embodiments the fetch list passed to the OS-MCD Agent only includes a list of content items for prefetch, along with their addresses. In these embodiments, the timing of the prefetch might be determined partly based on when the fetch list is transferred to the OS-MCD Agent. The timing of the prefetch might also be determined through the MCD Config settings (e.g., by a user or an App). It might also be determined manually by a user, as in the Sync-Now feature discussed in Section 3.7. In other embodiments, the fetch list received by the OS-MCD Agent might also include various types of metadata, such as a prefetch priority ranking per content item, and/or a time window that the content is expected to be needed by. In this case, some of the functionality of the Adaptive MCD Agent might instead be implemented in the OS-MCD Agent, thus allowing the final prefetch decisions (e.g., what to prefetch and when to prefetch it) to be made by the OS-MCD Agent at the OS level. A block diagram illustrating this approach is shown in FIG. 6 where a Scheduler is also included in the OS-MCD Agent. In this embodiment, the fetch list received by the OS-MCD Agent is assumed to include enough metadata so that the final prefetch scheduling can be carried out at the OS-MCD Agent.

FIG. 6: High-level block diagram where the OS-MCD Agent provides basic prefetch functionality in the OS at the User Device, including making the final prefetch scheduling decisions, and also supports enhanced prefetch functionality implemented outside the OS. The fetch list passed to the OS-MCD Agent is assumed to contain sufficient metadata to support the final prefetch decision making at the OS-MCD Agent.

3.3.2 MCD Preprocessor

Figure 7:
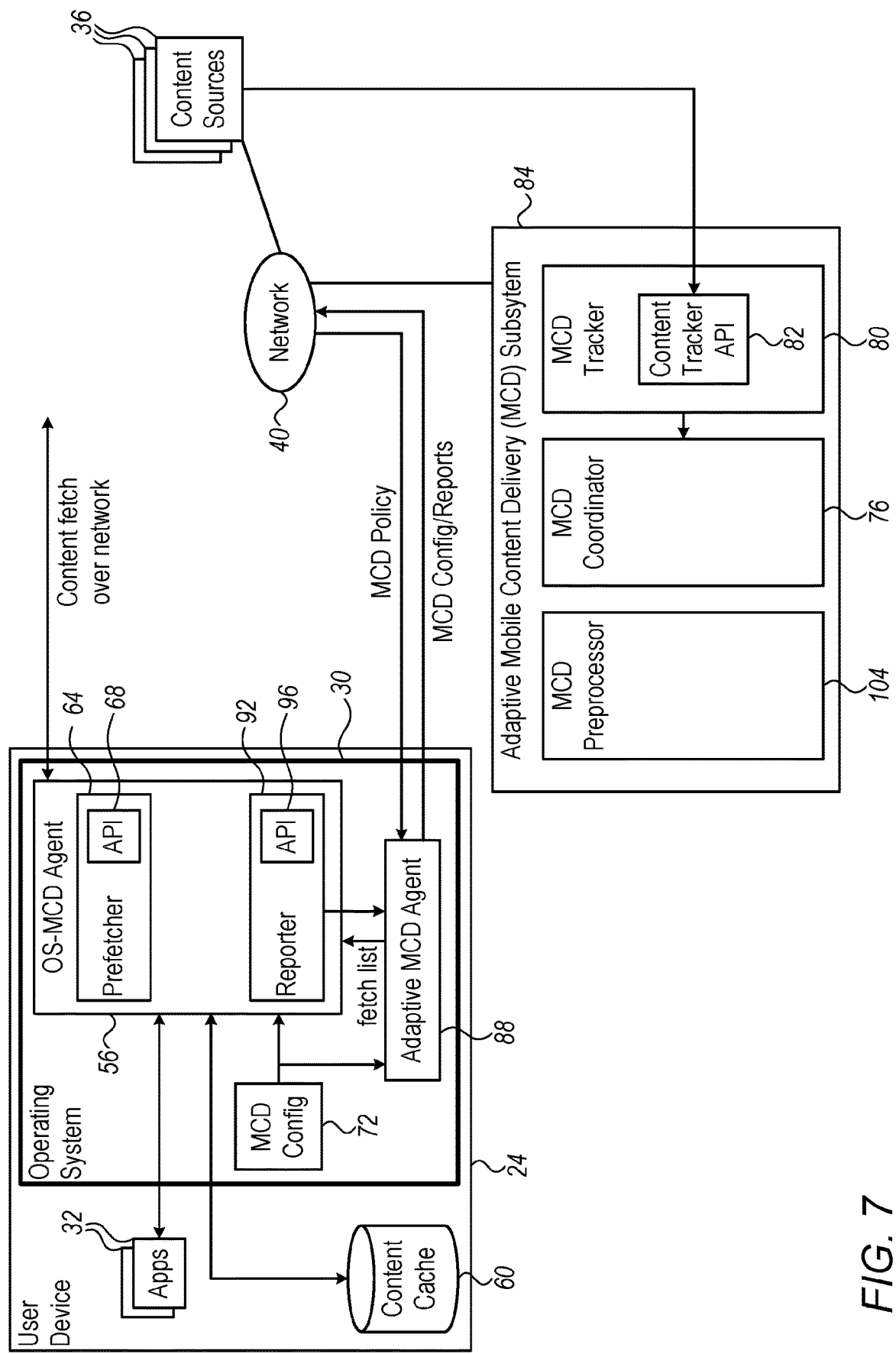
FIG. 7 is a block diagram that schematically illustrates an OS-MCD comprising a cloud-based MCD preprocessor, in accordance with an embodiment of the present invention.

FIG. 7: High-level block diagram illustrating enhanced OS-MCD functionality, including an MCD Preprocessor 104 in the cloud.

We have focused on the case where content is prefetched to the User Device from the Content Source. However, in some embodiments, it might be desirable to preprocess the content at the Adaptive MCD Subsystem in the cloud before prefetching the content to the User Device. This is illustrated in FIG. 7 where an MCD Preprocessor 104 is included at the Adaptive MCD Subsystem. The inputs needed to access a user's content from the Adaptive MCD Subsystem might be passed through the Content Tracker API (and then forwarded to the MCD Preprocessor). The identity of the party using the enhanced prefetch functionality and requiring permission to access content on behalf of the user might also be passed to the OS-MCD Agent, which can pass it to the Content Source (e.g., using a function callback made available by the App through the Prefetcher API).

A major function carried out at the MCD Preprocessor might be compressing a bundle of content, possibly across multiple Apps/Content Sources for efficient joint delivery to the User Device. The bundling of content enables more efficient compression techniques and more efficient transfer protocol usage (e.g., protocol overhead such as headers are a smaller percentage of the total data transfer). The bundling of content also enables more efficient modem usage at the User Device, which saves battery life. Efficient coordinated data transfer techniques for prefetch are discussed further in Section 3.4.

In some embodiments, the MCD Preprocessor might identify the changes of a content item from a previous version that has already been prefetched and make available an update that only includes these changes, i.e., an "update patch". This method of differentially updating content can be very efficient, particularly for content items that have frequent relatively small changes. This is often the case, for example, with an App's feed.

In some embodiments, the MCD Preprocessor might implement lossless compression techniques and in some embodiments it might implement lossy compression techniques. In an example of lossy compression, the MCD Preprocessor could reduce the resolution of an image or video clip that is made available for prefetch at the Adaptive MCD Subsystem. Another function which might be carried out at the MCD Preprocessor is computing a signature code for content items, such as a cyclic redundancy check (CRC) or hash value, so that Cached Content can be verified to be matched and up to date with the content currently available at the Content Source.

In some embodiments certain content items (e.g., differential updates) are sent directly in prefetch notifications (PNs) from the MCD Coordinator, as described in [3]. In this case, the MCD Preprocessor retrieves this content from over the network, prepares/formats it for transmission inside the PN, and forwards it to the MCD Coordinator to be included in the PN.

In some embodiments, the decision on which content should be preprocessed at the Adaptive MCD Subsystem is made by the MCD Coordinator and recorded in the prefetch MCD policy. This might be based on an assessment of how much compression/transfer efficiency can be achieved through preprocessing particular content. For example, the MCD Coordinator might request preprocessing for the feeds of several Apps, so that they can be differentially updated—possibly even together in one shot. The MCD policy is made available to the MCD Preprocessor, which then fetches the content that was identified for preprocessing.

Another factor which might be taken into account by the MCD Coordinator when determining which content to bundle/compress together for joint prefetch is the likelihood metrics of the content items. For example, urgently needed prefetch content might be bundled with other urgently needed prefetch content, and not content with very low access likelihood. In this way a likelihood metric can be given for the entire bundle, and the final prefetch decision can be made for the entire bundle.

Another factor which might be used to bundle/compress together certain content for joint prefetch is the type of network connection. For example, content elements that are designated for prefetch only through Wi-Fi might be bundled together, and separately from content elements that can be prefetched over cellular network connections.

When a decision is made at the User Device to prefetch content, the fact that certain content has been preprocessed and is available more efficiently from the Adaptive MCD Subsystem can be seen in the prefetch MCD policy transferred to the User Device. Thus the fetch list provided to the OS-MCD Agent can record the address of the Adaptive MCD Subsystem so that the Prefetcher can retrieve the preprocessed content.

In some embodiments, the delivery of content to the Adaptive MCD Subsystem is itself compressed in some efficient way. For example, the content of a person's Facebook feed might be transferred to the MCD Preprocessor by periodically sending differential updates from the Content Source.

In some embodiments, the various functionality described for the components of the Adaptive MCD Subsystem can be divided up differently. For example, in some embodiments the MCD Tracker and the MCD Preprocessor can be merged to be a single element.

In some embodiments, the preprocessing of the content can be done at least partly at the Content Source. Thus the software to implement bundling, compression, differential updates, and other preprocessing, might be implemented at the server or content delivery network (CDN) of the content provider. In this way, it is possible to have some, most, or all of the preprocessed content supplied for prefetch directly by the Content Source to the device. As an example of this approach, a differential update patch for an app's content (e.g., the feed configuration file or an article item) could be provided directly by the corresponding Content Source to the device. This update patch would contain the differences between the version currently cached at the device and the up-to-date version at the Content Source. In one such embodiment, the device prefetches (or fetches in real-time) a content item with an indication of the current version of the content (e.g., the feed configuration file or an article item) that is already cached at the device. This indication could be conveyed, for example, using an HTTP request header containing a version number, an etag hash value, a CRC value, or some other value that uniquely identifies the version of the content. The Content Source can then send a differential update patch for the content, instead of the entire content from scratch. Moreover, the Content Source might signal to the device whether the response is an update patch or a new copy of the entire content item, e.g, in the HTTP response header.

In a related embodiment, the preprocessing of the content is done at least partly at the Content Source and the Content Source provides the preprocessed content to the Content Tracker API available in the cloud (e.g., along with the content tracking updates). Thus although the preprocessed content is prepared at the Content Source, it would be prefetched to the device from the Adaptive MCD Subsystem in the cloud.

3.3.3 Cyber Security

Prefetch operation can also be used to enable stronger and more complex cyber security algorithms [1, 34]. This is based on the fact that prefetched content arrives at the device in advance of the predicted user access; this time flexibility provides the opportunity to handle cyber security algorithms without adding latency to the user experience. Thus advanced techniques such as sophisticated encryption, "sandboxing" (i.e., first opening or running content in a safe environment to check for suspicious activity), and searching for signature byte patterns (based on a known database of viruses) can be used on prefetched content without affecting user experience.

In some embodiments, an entity in the cloud such as the MCD Preprocessor might add additional levels of security or improve existing ones. In other embodiments, the MCD Preprocessor might first decrypt the content fetched from the content source, and then add its own more sophisticated encryption or other cyber security protection.

In some embodiments, a request to check the cyber security of content that the user is predicted to access in the future can be initiated in advance either by the device (e.g., the Prefetch Agent) or in the cloud (e.g., by the Adaptive MCD Subsystem). This "pre-check" operation can be issued independently, as part of a prefetch operation, or as part of a preload operation.

In some embodiments, content can be prefetched to the device in parallel to checking its cyber security in the cloud. In this case, access to the content at the device would only be permitted after the cyber security check has completed.

Additional details and embodiments for using prefetch techniques to improve cyber security is discussed in [34].

3.4 Coordinating Content Fetches Over Multiple Apps

The approach used today for fetching content to a user device is to handle each app separately. When a user clicks on an app or on a certain item inside the app, the relevant content to that app is fetched. This often leads to many relatively small independent data transfers during the course of the day. However, this approach is inefficient. One reason is the overhead associated with activating and deactivating the MODEM, and setting up and closing down a data transfer. Moreover, the very commonly used TCP/IP protocol and the HTTP protocol are also known to be highly inefficient for small data payloads. All of these inefficiencies leads to excessive energy consumption and poor utilization of scarce network resources. Some mobile Operating Systems (OS's) allow App developers to submit to the OS an approximate time ahead within which they would like content to be fetched to their apps, so that the OS can synchronize such future content fetch requests from multiple apps into a single content fetch event. However, in practice, most content requests are not scheduled in advance by apps. Thus, the overall gain from this approach is small.

Some embodiments of the present invention provide methods to improve the efficiency of content fetch to a user device based on coordinating the content fetch over multiple apps (discussed also in [40, 41]). The coordination can be done through a Fetch-Optimizer entity, e.g., as part of the OS-MCD module described here, implemented on a server in the cloud (e.g., in the OS-MCD Coordinator), or on the device itself, possibly in the operating system (OS). The Fetch-Optimizer defines which apps and which content fetches should be coordinated together based on optimizing the overall content transfer efficiency. Examples of optimization criteria that can be used are minimizing device power consumption (maximizing battery life), maximizing network utilization, minimizing user cost (e.g., in money or data plan), and reducing fetch latency experienced at the device.

The techniques described in this section apply generally to data transfer, including both the download case and the upload case (where the user device pushes data over the network). For purposes of illustration, and without loss of generality, we will focus the description here on the case of content download. Although the initial description will focus on the general fetch case, the techniques apply to the particular case of prefetch as well. There is in fact greater flexibility to apply the techniques described here to the prefetch case, because of the inherent time delay flexibility of prefetch. A discussion of the particular case of prefetch occurs later in this section.

3.4.1 Coordinated Scheduling for Content Fetch

Coordinated scheduling of content fetches over multiple apps can be used to consolidate data transfer to specific periods of time. This translates to much more efficient use of the MODEM, since the starting up and winding down of MODEM activity often involves significant power usage overhead. This improved MODEM efficiency translates to longer battery life, less heat generation and lower radiation levels all of which are highly important benefits for handset vendors.

The Fetch-Optimizer also might choose which apps and content should be scheduled together in order to best take advantage of efficient data transfer techniques, such as using multiple parallel TCP/IP connections at the same time (discussed below). The improved data transfer efficiency translates to better bandwidth utilization. It also results in decreased data transfer time—which translates to reduced MODEM activity time, and thus increased battery life.

A device transferring data from/to servers over the network has the option of opening multiple parallel TCP/IP connections and to transfer multiple content items at the same time and/or multiple segments of an item at the same time. We refer to said TCP/IP connections carrying out the data transfer as being active parallel TCP/IP connections. A TCP/IP connection that has finished transferring data but not yet been closed is referred to as an idle TCP/IP connection.

Typically each active TCP/IP connection will run using a separate processor thread. However, ultimately it depends on how the data transfer is implemented. In some scenarios the number of threads used might not be equal to the number of active parallel TCP/IP connections.

There are a number of advantages of using multiple active parallel TCP/IP connections:

1. Increased maximum TCP/IP BW: Servers often limit the maximum throughput available for a single TCP/IP connection. Using multiple parallel connections enables the total transfer to utilize the maximum total TCP/IP BW available.

2. Reduced impact of round trip latency: As usually implemented today, each subsequent HTTP request needs to wait until the previous request receives a response. This results in an inefficient use of the TCP/IP connection. However, if we use multiple TCP/IP connections at the same time in parallel, the HTTP requests on each can be staggered a bit in time such that the sum throughput over all TCP/IP connections always approaches the maximum TCP/IP throughput available at any point in time.

3. Reduced impact of lost packets/missed ACKs: When TCP/IP packet ACKs are not received back at the data transfer source (due to a lost packet or a missed ACK) the protocol retransmits the associated packets but also automatically substantially reduces the maximum TCP/IP throughput available for the connection. If the data transfer problem clears up, then the available throughput for the connection will increase over time, and eventually return to its maximum level again. In the case of a single TCP/IP connection (utilizing all the available TCP/IP BW), then the impact of these lost packets/missed ACKs will be substantial until the connection recovers. On the other hand, if multiple active parallel TCP/IP connections are used then (1) the throughput reduction for each individual connection will be smaller (as the allocated BW to each connection is smaller) and (2) when the throughput is reduced on one connection, the other connections can exploit the additional available BW (since the lost packets/missed ACKs will occur at different times on the different connections). Thus this will enable the total fetch transfer over all the connections to utilize the maximum total TCP/IP BW available.

4. Minimize the impact of TCP/IP Slow-Start: When using multiple TCP/IP connections the BW available for any of the individual connections is smaller. Therefore, it will take less time for any individual connection to reach its maximum BW—reducing the slow-start transient time. If all TCP/IP connections are running in parallel then the overall slow-start time will be smaller—thus minimizing the throughput impact of TCP/IP slow-start on the overall fetch transfer.

In general, there is an advantage to having all active TCP/IP connections begin and end their data transfer over all apps at approximately the same time. In this way, we avoid reassigning active TCP/IP connection resources to a new server, which would cause unnecessary slow-start events and reduce throughput.

In some embodiments, the Fetch-Optimizer chooses the apps and content to schedule together based on optimizing the gains available from using multiple TCP/IP connections. For example, the content is chosen from each app server for a coordinated fetch based on using the optimal number of active parallel TCP/IP connections that are available and having the transfer over each TCP/IP connection finish at approximately the same time. Since the optimal number of parallel TCP/IP connections and the estimated finish time may depend on the network conditions (data rate, error rates, round trip delay, etc.), these parameters may be estimated based on techniques described in [22, 23] or other techniques described below. Estimated fetch times might also take into account one or more of the following:

1. The number of content items designated for fetch by the Fetch-Optimizer for each app (or for each content source server).

2. The size of the content items designated for fetch by the Fetch-Optimizer for each app (or for each content source server).

3. Number of available parallel TCP/IP connections for each server.

4. The processing power and speed associated with each server.

5. Key network condition parameters such as the available data rate and its variability, the round trip delay and its variability, the expected packet loss rate and its variability, the expected packet error rate and its variability, and more.

We provide an example to illustrate the case where download times are estimated based only on content size. If the fetch data size for 3 (apps) servers is estimated to be 50, 100, and 200 MB and we have up to 21 active TCP/IP connections available, then we can divide up the connections between the 3 servers with 3, 6, and 12 connections, respectively. In this way, the fetch downloads over all 21 connections will be about the same size (and thus hopefully take approximately the same amount of time).

In some embodiments, the fetch speed associated with each individual server is directly tracked based on historical fetches, which are used to help predict future fetch download times per server.

In some cases sufficient inputs might not be available to reliably predict the download times for each server for each TCP/IP connections. Thus in some embodiments, the number of parallel TCP/IP connections assigned per server might be varied adaptively based on the observed download behavior during the current fetches, the current number of active and idle TCP/IP connections per server, and the remaining content to fetch. For example, if the size of each content item to download is not known, then the number of parallel TCP/IP connections assigned per server might be varied adaptively based at least in part on the number of current TCP/IP connections for each server and the number of content items left to download from each server. Moreover, the ratio of number of remaining content items to the number of current active connections might be used to determine where to assign an available TCP/IP connection. For example, if a first server has 3 content items remaining and 2 current active parallel connections and a second server has 6 content items remaining and 5 current active parallel connections, the available TCP/IP connection might be assigned to the first server (since $2/3 < 5/6$).

In some embodiments, if an active TCP/IP connection resource is available to be reassigned to another server (e.g., because data transfer with its associated server has completed) a server with an idle TCP/IP connection available will be prioritized. There is an advantage to activating an idle TCP/IP connection rather than opening up a new TCP/IP connection, because of the slow-start event caused whenever a new TCP/IP connection is opened. Thus in these embodiments, the Fetch-Optimizer will try to avoid opening new TCP/IP connections if there is an option to activate existing idle TCP/IP connections.

In some embodiments, the Fetch-Optimizer might prioritize the assignment of active TCP/IP resources over multiple apps (servers) in the following way:

1. As a first priority each server with content to be fetched to the user device should be given at least one active TCP/IP connection.

2. Any additional active TCP/IP resources should then be assigned to existing idle TCP/IP connections to servers with remaining content to fetch.

3. If there are no idle connections available for relevant servers (i.e., with content to fetch) then a new TCP/IP connection should be opened in a way that balances the transfer load between servers. In other words, the goal is to assign the new active TCP/IP connection in such a way as to enable all fetches from all servers to complete at approximately the same time (in order to minimize the need to open up new connections). Examples of how the Fetch-Optimizer might do this were described above, taking into account for each server: the estimated download time (e.g., based on content size, number of content items, server processing power/speed, and/or historical download times) and the number of current active TCP/IP connections.

The above priorities assume that latency constrains don't require certain servers to get priority for being assigned active TCP/IP connections over other servers. If latency constraints exist for certain apps/servers, then this too needs to be taken into account when assigning active TCP/IP resources.

In some embodiments, the Fetch-Optimizer chooses the apps and content to schedule together based on optimizing the gains available from multiple HTTP sessions over multiple parallel TCP/IP connections when implemented using multiple processor threads. More specifically, if we denote N_tc the number of parallel TCP/IP connections, N_ht the number of multiple HTTP sessions and N_th the number of processor threads, then the Fetch-Optimizer chooses the apps and content to schedule together based on optimizing N_tc, N_ht and N_th.

In some embodiments, the Fetch-Optimizer takes into account the current wireless link (channel) and network conditions when optimizing the assignment of active parallel TCP/IP connection resources per server, (and possibly the number of HTTP sessions per connection and the number of processor threads per server's connections). Said current link and network conditions could be estimated in a number of ways:

1. It could be measured by beginning an actual fetch, measuring key parameters based on the initial data transfer (e.g., data rate, round trip delay, packet loss rate, packet error rate, and more), and then using these measured parameters as an estimate of the network conditions for the rest of the data transfer. In general, the system may start from a certain estimate and measure the network along the data transfer and adapt the data transfer configuration per need (e.g. add more active parallel TCP/IP connections and processor threads if the actual network conditions are better than estimated, and vice versa).

2. The key network parameters measured over a previous data transfer could be used for the current one.

3. An average of past data transfers could be used. That is averaging many estimates of the form of #2 above. The averaging could be context dependent.

4. It could also be measured by generating dummy app/content access requests solely for the purpose of measuring the link quality and network conditions.

5. Network mapping techniques like those described in [22, 23]

In some embodiments, the priority given to the active fetch processes running over parallel TCP/IP connections is chosen so as not to degrade other more urgent processes running on the device.

In some embodiments the number of active parallel TCP/IP connections (and/or the number of processor threads) for the optimized fetch is dependent at least in part on the context at the user device. Examples of context that might affect the number of parallel connections chosen:

1. The process load: For example, if the OS is currently managing other processes of similar priority then we might reduce the number of parallel connections so as not to degrade these other process. Similarly, if the OS is predicted to be launching other processes of similar priority then we might reduce the number of parallel connections so as not to degrade these other processes.

2. Whether device screen is on or off: For example, if the device screen is off, this might signal the likelihood that the load on the processor is currently low and can support more parallel connections. Similar context indicators might be whether the device is locked or not and whether the user is currently interacting with the device.

3. Network connection load: For example, if an app not scheduled by the Fetch-Optimizer opens up a single thread to download a content item and the Fetch-Optimizer opens up 20 threads for its coordinated data transfer, then the Fetch-Optimizer might grab much more BW than the other download (depending also on the priorities).

In some embodiments, the number of parallel TCP/IP connections and processor threads are varied adaptively based on changes in device contexts (either current or predicted). For example, if urgent network download demands will soon be needed, then the number of TCP/IP active parallel connections available to the Fetch-Optimizer might be reduced.

Although the present description has focused on TCP/IP and HTTP, similar techniques can be implemented using an alternative communication protocol and/or an alternative application protocol.

3.4.2 Coordinated Scheduling Using an Intermediate Server

In some embodiments, coordinate scheduling might take place by way of an intermediate server. This server retrieves the contents from multiple app servers so that the coordinated fetch can be carried out from a single server. This allows the Fetch-Optimizer to more easily divide up all the content over the utilized parallel TCP/IP connections in such a way as to optimize the transfer efficiency, e.g., so that each active parallel TCP/IP connection completes its data transfer at approximately the same time.

Using an intermediate server also enables the Fetch-Optimizer to better optimize the number of HTTP sessions per TCP/IP connection. This might include determining which content items to bundle together at a single URL in order to reduce the number of HTTP requests (potentially reducing protocol overhead).

In addition, this approach might enable the Fetch-Optimizer to coordinate the fetches to take better advantage of HTTP pipelining, which is a feature where several HTTP requests can be sent over a single TCP/IP connection without waiting for the corresponding responses. This enables better utilization of the TCP/IP connection. Using this approach over a large coordinated fetch could reduce fetch time. It also might lead to fewer parallel TCP/IP connections necessary to realize the full available BW.

3.4.3 Opportunistic Coordinated Scheduling Based on MODEM

Embodiments of the present invention utilize the opportunity that the MODEM is active due to a data transfer for one app, to fetch/push content for at least one other app. This translates to much more efficient use of the MODEM, since the starting up and winding down of MODEM activity often involves significant power usage overhead. This improved MODEM efficiency translates to longer battery life, less heat generation and lower radiation levels all of which are highly important benefits for handset vendors. Using this approach also does not require scheduling on the part of the app developers. Moreover, it allows the opportunistic coordination to be applied to ad-hoc data transfer events that commonly take place at the user device. Two example embodiments are:

1. The device receives a message through a messaging app (e.g., WhatsApp), which causes the MODEM to be active. Therefore, an update is scheduled opportunistically for a social media app (e.g., Facebook).
2. The device receives an email through an email app (e.g., Gmail), which causes the MODEM to be active. Therefore, an upload of photos to the cloud for a photo-sharing app (e.g., Instagram).

Note that this approach often also imply much more efficient usage of network resources. For example, each session of data transfer to or from the mobile device involves using the radio access channels to set-up the data transfer. With the current approach, one such data transfer set-up can sometimes be used instead of multiple ones. Moreover, the data transfer itself may be more efficient as is now further explained below.

In further embodiments, the amount of the data transfer currently expected for the MODEM is also taken into account when performing opportunistic fetch coordination. For example, if the current data transfer is small and inefficient then this is an opportunity to add sufficient content fetch to maximally exploit the full bandwidth (BW) available (thus optimizing MODEM time per unit data or power consumption per unit data), as well as optimizing the bandwidth utilization.

The opportunistic coordinated scheduling based on MODEM activity described here can be combined with the other efficient data transfer techniques described here, such as using multiple parallel TCP/IP connections (see Sec. 3.4.1) and using preprocessing techniques (see Secs. 3.3.2 and 3.4.5). By optimizing the BW utilization, these techniques also reduce overall MODEM activity time which translates to reduced power consumption (longer battery life).

In an example, updates for a social media app (e.g., Facebook) might be scheduled whenever a message is received through a messaging app (e.g., WhatsApp), due to the fact that the amount of combined data transfer is usually relatively efficient. However, if it is known at the device that the message includes a video attachment (thus probably translating to relatively efficient data transfer by itself), then the decision might be to not update the social media app. On the other hand, if the social media app has not been updated for a while, then the decision might be to take the opportunity to update it anyway, since at least the MODEM is already active.

In some embodiments, the size of the data transfer might not be explicitly known at the device. In this case, the expected size of the data transfer might be estimated. This might be based, for example, on the average size of a data transfer for a particular app. It might also be based on the number of content items to be transferred.

Note that while the description here focuses on MODEM activity related to apps, it applies also to any other data transfer activity. For example, any MODEM activity that arises from a user's browser activity can be treated as an opportunity for an opportunistic coordinated fetch.

3.4.4 Other Factors to Consider in Opportunistic Coordinated Fetch

In addition to MODEM activity, other factors might be taken into account in deciding when to opportunistically carry out a coordinated fetch, including network conditions and the type of network connection.

In some embodiments, if the network conditions and/or network connection is extremely favorable for content transfer, then a decision to carry out a coordinated fetch opportunistically might be taken. In other embodiments, the opportunistic coordinated fetch is only carried out if the MODEM is active.

3.4.4.1 Network Conditions

The scheduling of the coordinated fetch might be based on when good network conditions (including wireless link) are available. The amount of battery usage for a content fetch to a user device depends significantly on the quality of the wireless link. For example, a strong cellular connection might support a higher data rate, which means that a download will complete faster, thus minimizing the amount of time the MODEM needs to be in use. Similarly, a strong cellular connection often translates to reduced uplink transmit power (e.g., such as needed for downlink Ack/Naks that are transmitted on the uplink). Another advantage of choosing good network conditions is that the overall network data transfer resources will be utilized more efficiently.

In some embodiments, the link quality achieved during a network access (e.g., an app content fetch) is measured and this information is used to coordinate the fetch scheduling for other apps. For example, if the download speed (data rate) achieved during network access of an app is measured to be high, this might trigger fetch for other apps. Alternatively, if the download speed is low, this might trigger a delay in fetch activity for other apps. Additional methods of monitoring wireless link conditions were discussed earlier and in [22, 23].

A typical user today receives several tens of notifications per day; thus in one embodiment of this invention these notifications are used to sample and monitor the network conditions, and when the conditions are good enough a coordinated fetch is scheduled.

In measuring link quality, in some cases we might measure absolute link quality using some metric (e.g., download speed) and compare to a threshold. In other cases, we might compare the relative link quality currently available to what is expected to be available within some upcoming period of time. For example, if the link quality is currently good, but expected to be even better within the hour, the scheduling of the coordinated fetch might be delayed (until better network conditions are available). Another example: if the link quality is currently poor, but is expected to be even worse within the next upcoming period of time, the coordinated fetch might be triggered now.

In some embodiments, both the MODEM activity state and the network data transfer conditions can be taken into account. For example, if the wireless link conditions are currently average, the coordinated transfer might be scheduled only if the MODEM has already been activated for some other reason.

It should be noted that even a short amount of time with a strong wireless link (e.g., cellular connection) at various points during the day can translate to valuable opportunities for substantial fetch activity. This is particularly true for prefetch operation e.g., [1], where content is fetched in advance to the user device based on what the user is predicted to access in the future, and not based directly on current user action. The inherent time flexibility available in prefetch (since the content is not yet being accessed) leads to enhanced ability to exploit the availability of a strong wireless connection opportunistically. In some embodiments, any use of the wireless (e.g., cellular) MODEM is notified to the fetch/prefetch software agent at the device along with the detected link quality, in order to provide an opportunity to the software agent to schedule fetch/prefetch opportunistically.

We also note that other aspects of the network conditions can be taken into account in addition to the quality of the wireless link, such as network load, backhaul loading, server load, round trip delay, packet loss rate, packet error rate, and other factors. Various methods to monitor network conditions were discussed earlier and in [22, 23].

3.4.4.2 Network Type

The scheduling of the coordinated fetch might also be based opportunistically on the type of network connection that is available. For example, content fetch over Wi-Fi might be emphasized since this typically incurs less power consumption, does not affect the user data plan, and does not use up valuable cellular network resources.

In some embodiments, periods of good Wi-Fi connectivity are detected and exploited to schedule the coordinated fetch. In further embodiments, a coordinated fetch might be scheduled based on when a good Wi-Fi connection is expected to be available.

It should be noted that even a short amount of time of Wi-Fi availability at various points during the day can translate to valuable opportunities for substantial fetch activity. This is particularly true for prefetch operation where the inherent time flexibility available (since the content is not yet being accessed) leads to enhanced ability to exploit Wi-Fi availability opportunistically.

There are various ways that Wi-Fi connectivity (or some other preferred network type) can be detected. For example:

1. In some embodiments, the Wi-Fi detector consists of a software agent (e.g., a prefetch software agent, possibly part of the OS) which periodically checks the network connection type, e.g., once every N minutes.

2. In some embodiments, the fetch/prefetch software agent running on the device might register for an operating system service that detects when there is a change in network connectivity type (and notifies this to the registered software agent). Such a notification can then lead to a check of what new network connection type is currently in place.

The opportunistic scheduling of data over Wi-Fi can also take advantage of MODEM activity, as discussed earlier. Thus any time Wi-Fi MODEM activity is detected, an opportunistic data transfer can be coordinated (e.g., for prefetch). In particular, when a device switches to a Wi-Fi network connection, the communication between the device and the Wi-Fi network needed to establish the connection can be exploited opportunistically for fetch/prefetch.

Although the discussion here regarding opportunistic fetching based on network type has focused on Wi-Fi, this technique applies to any other preferred network type. In some embodiments, the data transfer cost of the cellular network might also be taken into account (e.g., whether or not the network connection is "roaming"). Thus if the data transfer cost is currently low, the coordinated fetch might be scheduled. Similarly, if a lower cost cellular connection (e.g., "non-roaming") is expected to be available the scheduling of the coordinated fetch might be delayed. Methods of estimating cellular network cost are described in [35].

Opportunistic scheduling of fetch might also be carried out if an expected future network type is less favorable for the data transfer than the current network type. For example, if a user is predicted to have a high likelihood of being served by a roaming network during an upcoming period of time, then the scheduling of fetch activity might be opportunistically increased when a non-roaming (i.e., less costly) network is currently available. Similarly, if a user is predicted to have a high likelihood of being served by a cellular network during an upcoming period of time, then the scheduling of fetch activity might be opportunistically increased when a Wi-Fi network is currently available. In another example, if a user is predicted to have a high likelihood of being in network outage during an upcoming period of time, then the scheduling of fetch activity might be opportunistically increased when a good network connection is currently available.

3.4.5 Coordinated Preprocessing for Content Fetch

In some embodiments, an intermediate server is used to collect content for fetch over multiple apps in order to enable the coordinated fetch to be jointly preprocessed at the server (e.g., by the Fetch-Optimizer or the OS-MCD Preprocessor) such that the overall data transfer efficiency improves. In this case, content from multiple URLs, apps, and/or Content Sources are bundled (e.g., zipped) into a single content item in some way (typically located at a single URL). Examples of such types of preprocessing are:

1. Compression—The bundling of multiple content items together enables more efficient compression, since compression techniques typically improve their performance as the data size increases. This reduces the total size of the data transfer which translates to reduced MODEM power consumption and better BW utilization.

2. Coding—The bundling of content items into larger downloads can enable the use of larger frames at the physical layer. This can translate to a more efficient use of error correcting codes (such as Turbo Codes), leading to reduced transfer time and increased BW utilization.

3. Protocol Overhead Reduction—The bundling of content items into a smaller number of larger transfer requests can lead to a more efficient use of the transfer protocols—including, for example, a reduction of the number of transfer requests (e.g., HTTP requests) and a reduction in protocol header overhead. This is a form of Front End Optimization (FEO).

a. We note that bundling may also reduce the number of TCP/IP connections since the server is not required to honor the "persistent" HTTP request parameter that the device typically uses when it is scheduling multiple HTTP requests together.

4. Executing Java Scripts in Advance: If content contains java scripts, then these java scripts can be executed in advance before the content is requested and fetched by the user (another form of FEO). For example, if a java script references additional content, then when it is executed in advance the reference content can be identified and bundled with the rest of the content before it is transferred to the device. This too enables consolidation of downloads in time and into larger bundles—both of which can translate to improved transfer efficiency.

5. Other Forms of FEO: Since the coordinated content resides on a single server, other forms of FEO can be better exploited at the server.

The choice of which apps/content to bundle together can be optimized at the preprocessing server, e.g., by the Fetch-Optimizer or OS-MCD-Preprocessor. In some embodiments, this might take place dynamically based on the content items that a particular user is currently requesting or that the user is expected to request. In other embodiments, a bundle might be prepared for multiple users to fetch, based on the number of users likely to need all or most of the items in the bundled content.

When multiple content items are bundled together into a single fetch the HTTP response header parameters for each individual content item will no longer be sent to the requesting client device. Instead, the HTTP response header will correspond to the single bundled content item. Examples of important HTTP response header parameters are the Last Modified Dates and the Etag values associated with each content item, (which allow the device to do conditional fetches for each individual content item). Therefore, in some embodiments the HTTP response header values for each content item are included in the bundled content item and fetched to the user device along with the content items. These header values can then be processed and saved at the user device.

We note that in some embodiments the preprocessed bundled content can also exploit the coordinated scheduling techniques described above (including the opportunistic scheduling techniques).

Additional embodiments based on preprocessing content are discussed in Sec. 3.3.2.

3.4.6 Identifying Content for Coordinated Fetch

There are various ways the apps and content items can be selected (e.g., by the Fetch-Optimizer) for the coordinated data transfer techniques described here. Example embodiments are given below.

In some embodiments, some of the content items to fetch are based on apps or content that are currently being accessed or will soon be accessed. For example, if a webpage is opened in a browser, the fetch coordination might be over the content needed for this webpage and the content referenced by a link found on the webpage that resides on another server.

In some embodiments, the selection might be based on identifying various background download activities that take place regularly over multiple apps. In that case, these download activities can be coordinated in accordance with the techniques described in the present disclosure.

In some embodiments, the user configures the coordinated fetch through a user interface. Examples settings might be:

1. The apps to consider.
2. Which apps to coordinate together.
3. What type of content to consider (e.g., video, feed, articles, images)
4. Limits on the amount of coordinated fetch permitted.
5. Key words, content tags or categories, etc.
6. Limitations based on network type (e.g., Wi-Fi, cellular) and network conditions.

In some embodiments, the apps and content to consider for coordinated fetch might be based at least partly on machine learning. In this case, various device, user, and other factors can be analyzed in order to predict what apps and what content should be coordinated together.

The machine learning might take place in the cloud based on reports from many users (i.e., crowd wisdom). In this case, reports from multiple users might be used to better determine content/app coordination for each individual user. An example of this might be predicting data transfer activities for certain apps (e.g., email apps, messaging apps, and social media apps) based on data from multiple users, in order to better take advantage of the coordination techniques described here for each user.

The machine learning also might take place partially or entirely at the user device.

In some embodiments, the machine learning reports from multiple users might also be used to bundle certain content items together that are often needed by multiple users.

3.4.7 Prefetch

In some embodiments, at least some of the content items that are being coordinated are for content prefetch, where content is fetched in advance to the user device based on what the user is predicted to access in the future, and not based directly on current user action.

The coordinated content fetch techniques described here offer great potential for prefetch because of the time flexibility inherent in prefetching. Thus coordinating prefetch based on optimally exploiting the techniques described here can offer large improvement in prefetch transfer efficiency, resulting in gains in e.g., power consumption, latency reduction, network utilization, and transfer cost. For example, the time flexibility inherent in prefetch enables:

1. Flexibility in coordinating over more apps and content, including both scheduling and preprocessing.
2. Flexibility in choosing the best times and other device contexts to transfer the coordinated content, such as choosing good wireless link conditions, Wi-Fi connections, cheaper cellular connections, and times when the MODEM is already active (and possibly being underutilized with small inefficient data transfers).

Thus the optimization in prefetch coordination can be done over the apps, the content items, and the device contexts in order to best exploit the techniques described here.

When bundling multiple prefetch content items together (under a single URL) additional factors might be taken into account based on the prefetch policy, e.g., likelihood of user access, urgency in time, or policy restrictions (such as if all videos must be prefetched over Wi-Fi connections). Preferably, content items with similar policy characteristics should be bundled together (as was discussed in Sec. 3.3.2).

In some embodiments, the amount and identity of the prefetch content to be coordinated varies opportunistically based on MODEM activity and other data transfer conditions (e.g., wireless link conditions, availability of Wi-Fi). The better the transfer conditions the more content items might be designated for opportunistic prefetch coordination.

In some embodiments, a prefetch policy is sent to the device with information regarding the content available for prefetch to enable the device to choose what to prefetch and when to prefetch it. This policy might include likelihood metrics that indicate how likely the user is to request access for each content item. In some embodiments, the criteria used to make prefetch decisions might change based on MODEM activity. For example, assuming thresholds T1>T2>T3:

1. If the MODEM is inactive a decision to prefetch a content item might be taken only if its likelihood metric is above threshold T1. For example, if an app is accessed every day by the user immediately in the morning when he wakes up, then at some point during the night while he sleeps a decision might be taken to prefetch its content despite the MODEM being inactive.

2. If the MODEM is active a decision to prefetch a content item might be taken only if its likelihood metric is above threshold T2 (lower than T1). For example, if the MODEM is already active, then a decision might be taken to prefetch a minimal amount of additional content items needed to support the launch of a second app that is only sometimes accessed when the user wakes up.

3. If the MODEM is active and currently being underutilized due to a small and inefficient content transfer, a decision to prefetch a content item might be taken only if its likelihood metric is above threshold T3 (lower than T2). For example, if the MODEM is already active and can support adding an additional feed image with almost no cost to battery life, then the decision might be taken to prefetch an additional feed image that is not immediately needed for app launch (i.e., it is not immediately visible on the screen without scrolling and thus has a relatively high "distance-from-visibility" metric [11]).

Similarly, the wireless link, network conditions, and network connection type might also play a role in lowering the threshold for deciding to prefetch a content item. Thus, for example, if the MODEM is already active and a strong Wi-Fi connection is available prefetch might be executed for content items with even lower likelihood metrics.

In some embodiments, even in the case where content items have different likelihood metrics, the timing of their prefetch might be coordinated opportunistically based on MODEM activity, wireless link and network conditions, and network connection type. As already mentioned, the potential of this approach for prefetch is particularly high since there is inherent timing flexibility in prefetching content that is not immediately needed.

In some embodiments, content is only prefetched opportunistically, i.e., when the MODEM is active. Thus the cached content might not be fresh when the user requests access. In this case, the cached content can be shown to the user with a time stamp indicating how fresh it is. Moreover, the freshness of the cached content might be checked in parallel by comparing to the content at the server over the network. This check might be in the form of a conditional fetch (e.g., using HTTP response header Etag or if-modified-since values), where if the content is fresh no fetch takes place, but if the content is not fresh then the updated content is fetched. The actual fetch might also be a differential fetch, where only the changes to the content is fetched (i.e., a prefetch content "patch"). In some embodiments, this freshness check (or conditional fetch) is only carried out if the last update received by the device was more than N minutes ago. Thus, if the update occurred more recently then just present the cached content as is.

In some embodiments, it might be preferred to schedule content prefetch (or fetch) opportunistically, e.g., based on MODEM activity and/or data transfer conditions. In these embodiments, however, various additional conditions might be taken into account in order to determine whether the content should be transferred non-opportunistically. For example:

1. If the elapsed time since the last prefetch update is greater than N minutes, then the device might prefetch the content non-opportunistically (e.g., conditionally where freshness is checked before a fetch is carried out).

2. If the estimated importance of the content to the user is very high (e.g., the user is very likely to request access) then the device might prefetch the content non-opportunistically.

3. If the predicted time that the user will request access is less than N minutes, then the device might prefetch the content non-opportunistically.

4. If an opportunistic content transfer is predicted to be available only after N minutes from now, then the device might prefetch the content non-opportunistically.

5. If the user unlocks the device (indicating that content will probably be accessed) then the device might prefetch the content non-opportunistically. Many other device contexts and special events might also be used to trigger a non-opportunistic content prefetch, including: a user launch/use of an app might trigger non-opportunistic content prefetch either for the launched app, or for another app (e.g., whose usage might be correlated in some way with the launched app).

The above conditions might also be used in combination. For example, a non-opportunistic content prefetch might take place only if the user has unlocked the phone and the last prefetch update was greater than N minutes ago.

In some embodiments, although content is only prefetched when the MODEM is active, the prefetch policy might be fetched even when the MODEM is not active (including a catalog of the available content items that includes information that enables the freshness of the cached content to be determined at the device). Note that this fetch might be a differential fetch, where only changes to the prefetch policy/contents catalog are transferred to the device. This fetch might also be taken only in response to certain device contexts, e.g., the user unlocks the phone. If the prefetch policy is not up-to-date at the device, then options include (1) show the cached content along with a time stamp indicating freshness (2) show the cached content and conditionally fetch content updates (3) show the cached content only if the cache directives indicate that the cache validity has not yet expired [27].

In some embodiments, the server that makes prefetch policy available to the user device notifies the user device of important updates through a prefetch notification (e.g., using Google Cloud Messaging (GCM)/Firebase Cloud Messaging (FCM) for Android devices, and Apple Push Notification (APN) for iOS devices). In other words, if the update is important enough, the server might inform the device so that it won't delay the prefetch (e.g., until the MODEM is active, until the user unlocks the device, etc.). In further embodiments, the prefetch notification might include within it the prefetch policy (differential) update or a content (differential) update [3].

We note that the opportunistic coordination techniques described here enhance the prefetch guaranteed mode operation described in [1] since they reduce the number of prefetch notifications and prefetch policy updates that need to be sent during times that are less opportune.

We note that in the embodiments described here, if a content update is prefetched for an app that has been preloaded in the background (see Sec. 5) in a way that affects the app rendering, then a refresh might be executed for this app (with the app re-rendered).

We also note that the opportunistic and/or coordinated data transfer techniques described here can also be applied to DNS prefetch (discussed in Sec. 3.123.12).

3.4.8 Coordination Over a Single App

In some embodiments, an opportunistic coordinated content fetch might take place over a single app (server). For example:
1. The coordination might take place over several background fetch activities that an app is detected to perform during the course of a day.
2. The coordination might take place over multiple content items that are candidates for prefetch. For example, if the user of an app is predicted to watch a particular video and read a particular article at work during the course of the day, then both fetches might be scheduled together in the morning when the MODEM is active and/or a Wi-Fi connection is still available.

In these cases, the coordination takes place over multiple potentially independent data transfer sessions, and thus the techniques and benefits described here are applicable.

3.4.9 Additional Embodiments

In some embodiments, a coordination policy can be formulated (in the cloud and/or at the device) and sent to a content source in order for various content items to be bundled together for a subsequent fetch by one or more users.

In some embodiments, the coordination policy can be sent to an intermediate server so that it can retrieve the contents to be coordinated from multiple app servers so that the coordinated fetch can be carried out from a single server.

In some embodiments, the coordinated contents residing on a server are split up over multiple servers in such a way as to maximize the transfer gains from server diversity. Thus even if some servers are having data transfer problems, in most cases the other servers will still be available to fetch content. Similarly, the same content might be placed on multiple servers in order to further benefit from server diversity.

In some embodiments, a coordination policy is formulated in the cloud and sent to the user device, in order to determine which content items should be requested together, for which apps, when they should be requested, what bundled content items are available, and/or where these can all be fetched from.

In some embodiments, an app's request for the MODEM to be activated might be overridden based on conditions at the device. Examples where this might be applied are:

1. Content has already been fetched
2. Network connection is costly or inefficient
3. Battery level of the device is low In these embodiments, the intention is to maximize the coordination of MODEM activation and fetch actions, instead of allowing each app to activate the MODEM in an uncoordinated ad-hoc way. This essentially decouples user actions from MODEM operation for certain conditions. Thus at least some of the content related user actions will not trigger network connectivity. Instead some content would be served from internal device memory. This content might be old content fetched in the past (possibly somewhat out of date) or it might be prefetched content fetched ahead of time.

In some embodiments, the functionality described here can be split up over multiple components. In additional embodiments, some of the functionality can be implemented on a server in the cloud and some can be implemented at the User Device, possibly in the OS.

3.5 MCD Config

The MCD Config is an optional block. It can hold configuration parameters which controls the prefetch operation of the OS-MCD Agent, Adaptive MCD Agent, and the Adaptive MCD Subsystem. In some embodiments a user interface can be provided to allow the user to manually configure these parameters. This can be done, for example, through a graphical user interface (GUI), or an interactive bot/chatbot. In some cases, the Apps might be able to directly access and adjust configuration parameters in the MCD Config. Furthermore, in some cases the OS-MCD Agent and/or the Adaptive MCD Agent might themselves be able to access and adjust parameters in the MCD Config, in order to improve prefetch operation.

A number of different criteria can be used to optimize prefetch operation, such as:
1. User QoE (Quality of Experience)—e.g., content access latency, video playback delay, etc.
2. Battery life
3. Data plan cost
4. Monetary cost to user
5. CDN cost to the content provider
6. Network/operator load balancing
7. Freshness (how up to date the displayed content is)
8. Device temperature
9. Flash memory endurance In some embodiments, which of these criteria to emphasize can be indicated in the MCD Config. An importance ranking might even be given to each of these criteria. Thus if the User QoE is ranked much higher in importance than data plan cost and battery life, this might lead to a very aggressive prefetch policy that minimizes content access latency but causes significant content prefetch that is not eventually accessed. As another example, if the CDN cost to the content provider is weighted as a critical factor to take into account, this might lead to reduced prefetch attempts, even if it means a higher percentage of prefetch cache misses. On the other hand, if a low-cost CDN is available for prefetching (e.g., [13]) then the system may try to maximize the number of prefetched content elements (e.g., with high access likelihood metrics) in order to reduce overall content delivery costs. In yet another example, if both the data plan cost and user QoE are weighted as critical factors, the prefetch strategy might emphasize an aggressive prefetch policy during periods of Wi-Fi connectivity. In yet another example, if the monetary cost to the user is not weighted to be a critical factor, but the user QoE is a critical factor, then this might lead to aggressive prefetch even during network roaming (where data transfer is typically expensive for the user). On the other hand, if both the monetary cost and the user QoE are both weighted as critical factors then this might lead to an aggressive prefetch policy when the user is not roaming if roaming connections are predicted to be likely later on.

Different modes of operation can be configured through the MCD Config.

1. A mode which enables the Sync-Now feature discussed in Section 3.7.
2. An automatic mode based on adaptive machine learning, where prefetch operation is automatically optimized
3. A mode based on adaptive machine learning where suggestions are given to the user to manually adjust the MCD Config settings to improve prefetch performance.
4. Allowing certain Apps to automatically make adjustments to the MCD Config
5. Allowing the Adaptive MCD Agent to automatically make adjustments to the MCD Config based on prefetch performance indicator feedback.
6. A mode that enables operation during network outage (or poor network conditions).
7. A mode that allows the user to directly indicate what content should be prefetched, when it should be prefetched, and in what device contexts. Examples of these settings are discussed further below.

The details of the prefetch strategy followed might be impacted based on the prefetch mode of operation chosen. For example, in the case of operation during network outage, the goal is not to simply speed up the content access of individual content items, but rather to prefetch all content needed to support the access of content when no network connection is available. Thus for normal prefetch operation it might be sufficient to prefetch ahead of time the first page of a multi-page online form, or the first section of a video clip. Then when this content is accessed, we can follow up (e.g., with "just-in-time" (JIT) prefetch) and retrieve the subsequent supporting content. However, prefetch operation for "network outage mode" would require the delivery of all pages of the online form or the entire video clip in order to truly be useful.

Additional challenges of handling prefetch for network outage conditions are discussed in [14, 15]. The handling of prefetch of interactive content for network outage conditions are addressed in [4]. The challenges of handling prefetch for ecommerce applications for network outage conditions (or poor network conditions) are addressed in [5].

The MCD Config might also include settings to influence what is prefetched. Examples of this are 1. Specifying which Apps should be prefetched for
2. Specifying preferences based on content categories, topics, tags, or keywords
3. Specifying preferences based on type of content (e.g., video, articles, audio, feed, movies, virtual reality, etc.)
4. Specifying preferences based on content size. For example, the amount of prefetch might be limited to a certain absolute size, or it might be limited to a certain percentage of non-prefetch content traffic. As another example, the amount of prefetch permitted might be limited in some way relative to the total cache size defined for prefetch (which might also be a setting available in the MCD Config). As another example, prefetch preferences might be specified based on the size of the individual content item (file size, image size, etc).
5. Enabling the use of adaptive machine learning algorithms to determine what to prefetch In some cases, if adaptive machine learning algorithms are enabled the configured preferences in the MCD Config might be overridden. In other cases, the adaptive machine learning algorithms might receive the configured preferences as additional inputs to be taken into account when generating prefetch policy and making the final prefetch decisions.

The MCD Config might also include settings to influence the prefetch timing. Examples of this are 1. Times of day/week that prefetch should be prioritized—During these times a user might be guaranteed ongoing notifications of updated content, as described in [1].
2. Times of day/week that content should be prefetched and synchronized with the Content Source. This can be a relative time (e.g., within 1 hour from now), a specific time (10 pm at night), or a specified time window (e.g., between 8 am and 8:30 am each day).
3. Update rate—This might, for example, specify how many times per day certain prefetched content should be updated and synchronized with the Content Source. The update rate might also indicate an average or approximate prefetch timing where the actual prefetch timing is flexible in order to allow optimization. For example, we might define a target of 1 update every 3 hours, with the actual time between updates allowed to vary between 30 and 120 minutes. This flexibility allows the OS-MCD module to choose the best times to transfer data, e.g., during Wi-Fi or strong cellular connections.
4. Enabling the use of adaptive machine learning algorithms to determine when to prefetch the content
5. JIT Prefetch—Various settings might control how much to rely on "just-in-time" prefetch techniques. In these techniques content is typically prefetched in response to current user app activity shortly before the user might want access to the content. For example, the settings might indicate that video is prefetched only when the webpage with the link to the video is currently being accessed by the user.

In some cases, prefetch operation (including prefetch timing) might also be conditioned on certain events or context. For example:

1. Prefetch might be configured to be triggered based on the setting of an alarm clock. For example, a user might indicate that prefetch be carried out according to the MCD Config preferences before his alarm goes off in the morning. Thus a user might specify that he should prefetch all "business" related articles from the NY Times that are available when his alarm goes off in the morning.
2. Prefetch for certain apps or content types might be conditioned on whether the wireless link is based on Wi-Fi. Alternatively, prefetch might be conditioned on whether the cellular link is strong or weak.
3. Prefetch preferences might be conditioned based on location of the User Device
4. Prefetch preferences might be conditioned based on device sensor state (e.g., device movement, velocity, orientation, light exposure, etc.)
5. Prefetch preference might be conditioned on battery level or charging state.
6. Prefetch preference might be conditioned based on QoE. For example, if the QoE is below a certain threshold then this might trigger an aggressive prefetch policy.
7. Prefetch preference might be conditioned based on battery consumption conditions. For example, if the MODEM power consumption is currently low (e.g., below some threshold—thus indicating good wireless link transfer conditions) then this might trigger an aggressive prefetch policy.

The above list provides examples where prefetch preference/policy might be conditioned on various conditions or context that the user or device is currently experiencing. However, similar conditioning can be done based on a predicted condition or context that is expected to occur in the future. For example, an aggressive prefetch policy might be triggered if the user is predicted to soon have a weak cellular link, poor QoE, or high MODEM power consumption conditions (e.g., based on the location that he is predicted to be in).

In some embodiments, the MCD Config might offer various combinations of configuration options. For example, many of the above configuration options might be set the same for all Apps, or might be set differently for different Apps. As another example, the user might specify prefetch of video only with a Wi-Fi network connection. As another example, the user might define an update rate of 2 hours with cellular network connections and 30 minutes for Wi-Fi network connections.

3.5.1 Example MCD Config User Menu

One example embodiment of a user interface menu that might be used to fully or partially define the MCD Config settings is shown in this section. In some embodiments, all of these settings might be triggered when the user presses an on-screen icon/widget—such as for the Sync-Content and Sync-Now features discussed in Sections 3.6 and 3.7, respectively.

1. When to prefetch
1.1. Now
1.2. Within N hours
1.3. Adaptive Aggressive (this option uses adaptive algorithms that tailor prefetch policy according to user activity, and ensure that the prefetched content is nearly always up-to-date)
1.4. Adaptive Non-Aggressive
1.4.1. For example: update approximately once every N minutes, where N>5 but N<90. (This flexibility allows us to optimize the cost/benefit tradeoff from prefetch).
1.5. At specific days and times, e.g., Monday-Friday at 8 am
2. How to prefetch
2.1. Wi-Fi only
2.2. Wi-Fi and Cellular
2.2.1. Cellular is limited to X Mbytes/Month
3. What to prefetch
3.1. Which Apps
3.2. What content per app:
3.2.1. Ultra-light (feed text only)
3.2.2. Light (feed plus visible images)
3.2.3. Medium (feed+all articles text+selected articles images based on machine learning)
3.2.4. High (same as Medium, but also with videos based on machine learning)
3.2.5. All
3.2.5.1. All first N articles (i.e., all feed text & images, all N articles with images & videos)
3.2.5.2. All articles (including all images and video)
4. Where to prefetch
4.1. Everywhere
4.2. Everywhere but not while roaming
4.3. Only near places with known poor coverage
4.4. Only when close to a subway or airport or other location (e.g., home, office)
5. Optimization Criterion
5.1. Quality of experience (e.g., latency, speed of responsiveness)
5.2. Battery consumption
5.3. Data Plan

3.6 Sync-Content Feature

In some embodiments, a Sync-Content feature is available to the user that provides interactive user-access to prefetch settings. This feature might be engaged by e.g., a button, icon, or widget displayed on the screen of the User Device, or it might be voice-activated, i.e., triggered by a voice command from the user. Engaging this feature might simply mean that a GUI is invoked that provides access to the settings described above for the MCD Config. In some embodiments, however, a subset of the full set of parameters defined in the MCD Config might be made available when the Sync-Content feature is invoked.

In some embodiments, the prefetch settings made available interactively through the Sync-Content feature is saved separately from the permanent settings recorded in the MCD Config. This would allow the user to temporarily override the MCD Config to impact prefetch behavior based on current information available to the user. For example, while adaptive machine learning algorithms might be enabled in the MCD Config that determines general prefetch behavior, full synchronization of all articles (or e.g., all articles related to a particular topic) for certain apps might be defined specifically for the Sync-Content feature. In this way, a user who knows e.g., that he will have a Wi-Fi connection available between 8:00 and 8:30 pm tonight, can specify an aggressive prefetch synchronization for this time window.

Another common use for the Sync-Content feature might be for a user that knows that he is scheduled to take a plane trip in 4 hours. Such a user might engage the Sync-Content feature (with aggressive prefetch settings) beforehand with a specified time window of 4 hours in order to ensure continued content access during the upcoming network outage.

The various settings discussed for the MCD Config in Section 3.5 are examples of settings that might be relevant for the Sync-Content feature. In particular, this includes:

1. The identity of the apps to synchronize.
2. Various settings to determine what content to synchronize, e.g., headlines only, all of the articles with or without images, full or partial videos, all content estimated (e.g., by machine learning) to be of interest to me, only sports articles, etc.
3. Various settings to determine in what context to synchronize, e.g., only when the network connection is Wi-Fi, only when the cellular network connection is strong, etc.
4. Various settings directly indicating the timing of synchronization, e.g., a time window from the trigger of Sync-Content that prefetch must be carried out over, a time of day that synchronization should be carried out at (or approximately at), etc. Another example might be the user defining an average update rate, e.g., where synchronization should be carried out approximately once every 2 hours, but the exact time is chosen based on optimizing the gain/cost prefetch tradeoff.
5. Various settings limiting the amount of synchronized content, e.g., based on a maximum absolute amount in Mbytes, or based on a maximum amount that is relative to the user's amount of non-prefetch content transfer, or based on the size of total prefetch cache, etc.

Combinations of these settings are also possible. For example, the user might specify prefetch of video only with a Wi-Fi network connection. As another example, the user might define a Sync-Content update rate of 2 hours with cellular network connections and 30 minutes for Wi-Fi network connections. Many other Sync-Content settings are possible including other settings discussed for the MCD Config in Section 3.5.

As part of the implementation of the Sync-Content feature, a specific display icon might be added for apps/content on the screen that allows the user to easily distinguish which content is immediately available for consumption, in order to minimize events where the user clicks on content that was not prefetched.

3.7 Sync-Now Feature

In some embodiments, a Sync-Now feature is made available to the user in order to allow the immediate invoking of prefetch according to defined prefetch settings. This feature might be engaged by a button, icon, or widget displayed on the screen of the User Device, or it might be voice-activated, i.e., triggered by a voice command from the user.

In some embodiments, the settings used to define the Sync-Now feature might be based on the settings in the MCD Config. Thus for example, engaging the Sync-Now feature might trigger an immediate full or partial synchronization of content for the apps defined in the MCD Config, according to the content preferences defined there. As another example, the immediate synchronization triggered might choose the prefetch content based on adaptive machine learning algorithms, if this feature is enabled in the MCD Config.

In some embodiments, the configuration settings for the Sync-Now feature are saved separately from the MCD Config. Thus a subset of the MCD Config settings might be available to be defined specifically for the Sync-Now feature. For example, while adaptive machine learning algorithms might be enabled in the MCD Config that determines general prefetch behavior, full synchronization of all articles (or e.g., all articles related to a particular topic) for certain apps might be defined specifically for the Sync-Now feature. In this way, a user can take advantage of a current attractive data transfer condition (e.g., a Wi-Fi connection) by immediately invoking an aggressive prefetch synchronization.

Another common use for the Sync-Now feature might be for a user that knows that he is entering an area of insufficient network coverage (e.g., an underground subway or a plane soon to take off). A user might engage the Sync-Now feature (with aggressive prefetch settings) beforehand in order to ensure continued content access during network outage.

The various settings discussed in Section 3.5 for the MCD Config are examples of settings that might be relevant for the Sync-Now feature. In particular, this might include:
1. The identity of the apps to synchronize.
2. Various settings to determine what content to synchronize, e.g., headlines only, all of the articles with or without images, full or partial videos, all content estimated (e.g., by machine learning) to be of interest to me, only sports articles, etc.
3. Various settings limiting the amount of synchronized content, e.g., based on a maximum absolute amount in Mbytes, or based on a maximum amount that is relative to the user's amount of non-prefetch content transfer, or based on the size of total prefetch cache, etc.
4. Settings to enable machine learning algorithms to determine some or all of the prefetch behavior (e.g., which apps to synchronize, which content categories to synchronize).
5. Settings that restrict prefetch behavior according to the type of content. For example, videos might only be affected by Sync-Now if a Wi-Fi connection currently exists.

As part of the implementation of the Sync-Now feature, a specific display icon might be added for apps/content on the screen that allows the user to easily distinguish which content is immediately available for consumption, in order to minimize events where the user clicks on content that was not prefetched.

In some embodiments, the OS-MCD module might also offer suggestions directly to the user on how to improve the Sync-Now feature in the future. For example, it might suggest increasing the prefetch limits, increasing the prefetch cache size, expanding the type of content that can be prefetched with a cellular connection for certain apps, etc.

In some embodiments, the triggering of the Sync-Now feature might optionally cause certain apps to also preload, e.g., load in the background. Various preloading options are discussed in Section 5. This option might also be selectively enabled for certain apps in the configuration settings.

3.8 Continuous Updating

In some embodiments, certain app content might be identified for continuous updating. This is an attractive approach for content that is often accessed but doesn't require too much bandwidth to keep the prefetch updated. In some cases, this approach might be supported by using "just-in-time" (JIT) prefetch techniques for some of the related content. Example embodiments include the following cases:
1. The text of an App's feed might be prefetched continuously, with the images fetched when the user enters the feed.
2. The text of an App's feed might be prefetched continuously, along with the first few images at the top of the feed (including the visible images), with the remaining images fetched when the user enters the feed.
3. The text of all articles might be prefetched continuously with the images fetched when the user enters the article (or possibly when the user enters a related article or even when the user enters the app).

These approaches might also be combined with restricting prefetch of particularly large content items to Wi-Fi network connections. For example, videos or virtual reality games might be prefetched only during Wi-Fi connections. In another example, certain videos with high consumption likelihood might be prefetched only when the user enters the associated article (i.e., JIT).

Note that there are various ways to implement continuous prefetch. One approach would be to update the prefetched content whenever there is a change in content at the Content Source. A more efficient approach might be to specify a minimum update period where content status is checked for updates every N minutes. The use of Guaranteed Mode prefetch described in [1] provides a method of ensuring that the device is kept apprised of any content changes at the Content Source.

3.9 MCD Performance

Figure 8:
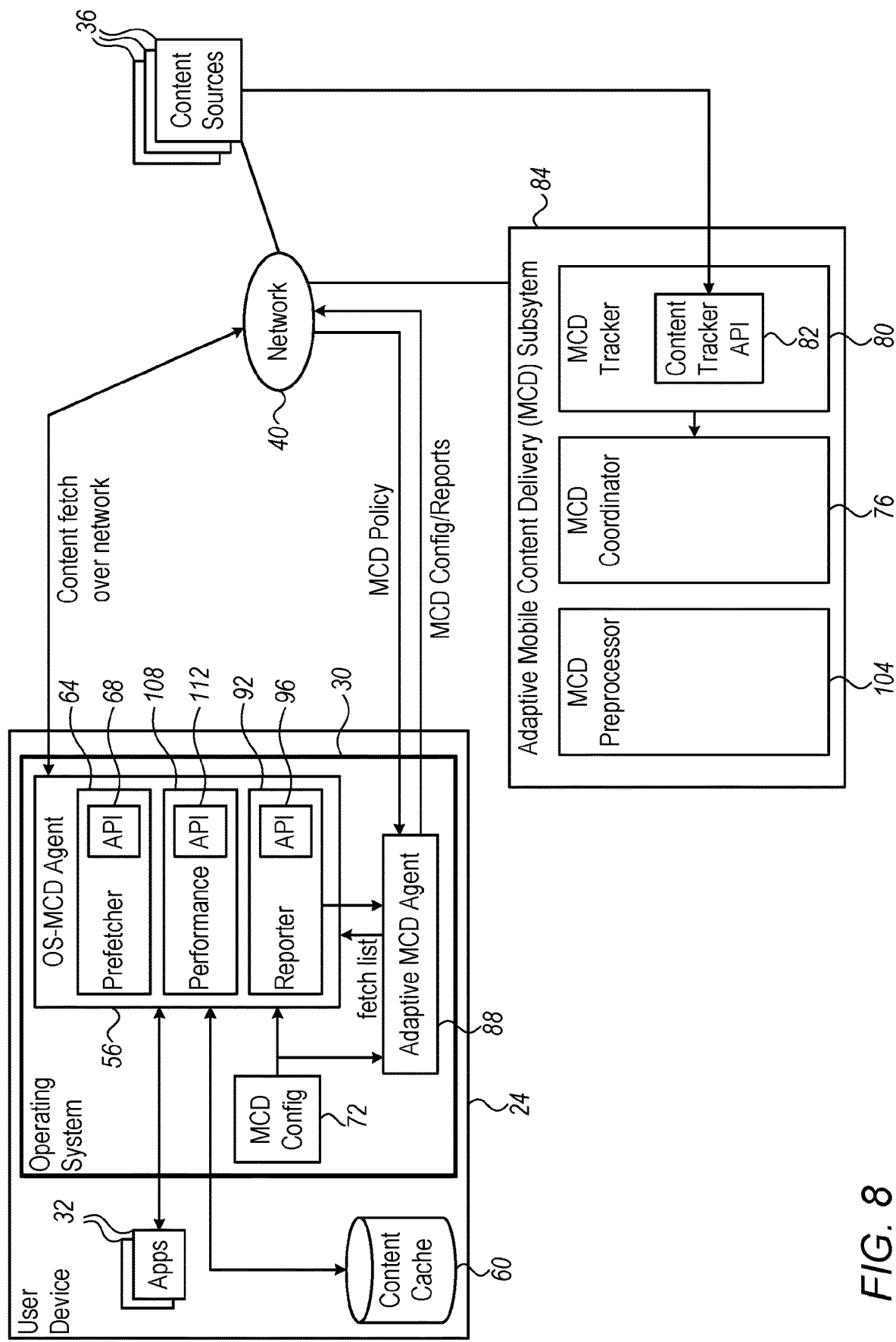
FIG. 8 is a block diagram that schematically illustrates an OS-MCD comprising a Performance module for providing prefetch performance, in accordance with an embodiment of the present invention.

FIG. 8 shows a high-level block diagram illustrating enhanced OS-MCD functionality, including a Performance component 108 that provides prefetch performance.

In some embodiments the OS-MCD Agent can also calculate key performance indicators (KPI) indicating the benefits and costs that derive from the prefetch activity, as well as the general efficiency of the prefetch operation. FIG. 8 includes such a Performance component 108 as part of the OS-MCD Agent in accordance with these embodiments. Examples of metrics that might be provided:

- Reduction in content access latency—This can be an average across many content items, or some other statistical measure.
- Effect on battery consumption—In some cases, prefetch might reduce battery usage if the content is prefetched to the User Device during a time when a better wireless link is available. In other cases, prefetch might cause increased battery consumption if the prefetched content is never used.
- Increased data consumption—Prefetched content that is not eventually accessed leads to increased data plan consumption.
- Content freshness experienced—In some embodiments, an overall measure of how up to date (or out of date) the prefetched content has been when displayed to the user might be useful.
- Percentage of prefetched content items that are eventually accessed. This can also be provided in terms of a percentage of total prefetched content size.
- Percentage of all content access requests that are being satisfied by prefetched content. This can also be provided in terms of a percentage of total accessed content size.
- Amount of time the user spends in an app.
- Amount of items the user consumes per app.
- Amount of ads the user is exposed to per app.

In some embodiments, these metrics might be broken down per App, per type of content (e.g., feed, articles, images, video), per day of week, per time of day, or in some other way. For all metrics, different types of statistics can be reported—such as an average value, a median value, or a probability distribution.

In some embodiments, these metrics are displayed to the user which may help the user better configure the MCD Config. For example, if the metrics are available per App, then the user might decide to disable prefetch for Apps where costs appear to outweigh benefits, while leaving prefetch enabled for other Apps.

As one specific example, the Performance module might report that prefetch has saved an average of 3 seconds from content access latency for the CNN app, while costing only 5 MB extra on the data plan and 1% on the battery life (e.g., averaged over a week); on the other hand, it might report that prefetch has saved only 0.1 seconds on average for the NY Times app, while increasing data plan costs by 100 MB and reducing battery life by 5%. In this case, the user might disable prefetch for the NY Times app, or alternatively fine tune the prefetch settings in the MCD Config to improve its performance.

These metrics can also be made available to the Adaptive MCD Agent (e.g., through a Performance API 112) or to some other entity in order to help refine the prefetch decisions. For example, the Adaptive MCD Agent might adjust the settings of the MCD Config based on the feedback of these performance metrics. As another example, these metrics might be provided as inputs to the machine learning algorithms executed at the device or at the Adaptive MCD Subsystem in order to help them refine their parameters and improve the resulting prefetch performance.

In some embodiments, these metrics can be provided to the Apps, which might automatically adjust the MCD Config parameters to improve performance. For example, an App that is notified by the Performance component that prefetch costs outweigh the benefits might automatically disable prefetch for itself.

3.10 NetStats-API

Figure 9:
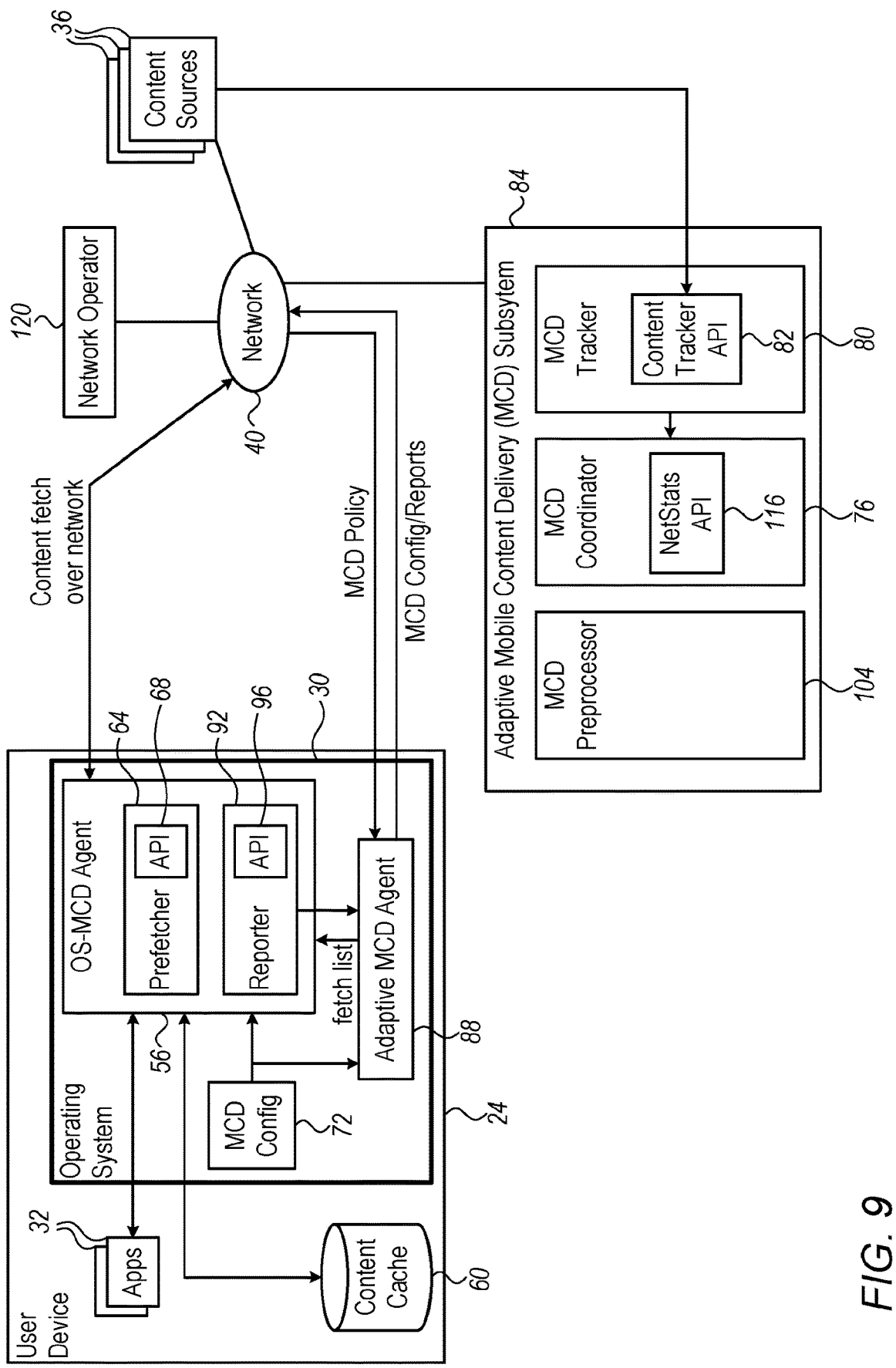
FIG. 9 is a block diagram that schematically illustrates an OS-MCD that provides an Application Programming Interface (API) for receiving network conditions reports directly from network operators, in accordance with an embodiment of the present invention.

FIG. 9: High-level block diagram illustrating enhanced OS-MCD functionality, including a NetStats API 116 that enables reports on network conditions to be provided directly by network operators.

The network conditions can be critical inputs for determining prefetch policy. Some of the network conditions can be taken into account based on Reporter reports from the User Devices in the network. However, in some cases the network operator or its infrastructure vendor may be able to directly provide much of the needed information. This might also reduce the amount of information that needs to be reported on the wireless uplink from the User Devices. An operator might also more easily be able to provide the network information in useful ways, such as broken down per cell ID.

FIG. 9 provides a high-level block diagram where a NetStats API 116 is included at the MCD Coordinator in the cloud to enable a network operator system 120 to provide useful information regarding network conditions that can be used in setting prefetch MCD policy. The NetStats API might be implemented, for example, by the OS vendor, handset manufacturer, Adaptive MCD Subsystem developer, or a third party.

Examples of network performance metrics that might be provided are data rates, connection setup latency, connection drops, wireless network load, backhaul load, network server congestion metrics, and others.

Additional metrics describing the network conditions might also be reported such as device-measured downlink metrics that are reported to the network: e.g., RSSI, SNR, SINR, CQI, RSCP, RSRQ, and CPICH Ec/Io. Uplink measurements carried out at the base station, such as SNR, might also be reported by the operator. Various other network features might also be reported such as network type, Wi-Fi availability and cost, wireless standard release and features supported, and others.

Network performance can be defined in different statistical ways, such as average values, median values, standard deviation, and as a distribution over the users.

Network performance might be broken down and reported in different ways, including by cell ID, by location, by time of day/week, etc. In some embodiments, network performance or network conditions might even be reported for specific users by the operator. For example, each cellular User Device typically reports various link quality metrics such as RSSI to the base station. Thus the operator could supply these reports to the NetStats API per user. In these embodiments, a user might be identified based on an operating system ID (e.g., Android ID), a device ID (e.g., the International Mobile Equipment Identity or IMEI), or some other ID.

Additional ways that information mapping the performance and conditions of the network can be relevant for prefetch are described in [6, 22, 23].

In some embodiments, in addition to offering statistical information over the cell users, the operator might supply user-specific performance metrics and link condition measures. This would facilitate the optimization of prefetch policy for particular users.

The network information can be used by the MCD Coordinator to set prefetch MCD policy. It might also be passed to the Adaptive MCD Agent at the User Device for use in making the final prefetch decisions.

The NetStats API can be accessed and used by an operator or by any other entity that maps the network performance and conditions and can provide this information. For example, hot spot operators (such as for hotel Wi-Fi or airport Wi-Fi), can provide information regarding their networks.

In some embodiments the operator can directly influence prefetch policy by varying content delivery costs at different times of the day and at different locations. For example, the operator can lower prefetch cost during times of the day that excess capacity is available. Thus during the night prefetched content might not count against the user's data plan consumption at all. The data cost (e.g., per byte) for different times and/or locations could be reported by the operator to the MCD Coordinator through the NetStats API. In this way the operator can influence prefetch policy in a way that improves traffic load balance across the network.

In some embodiments, the NetStats API might instead (or additionally) provide information to the operators. For example, the operator might receive information indicating the particular areas where prefetch is not able to provide sufficient quality of user experience. In this way the operator might be able to focus network coverage improvements to those areas.

3.11 Multicast-API

Figure 10:
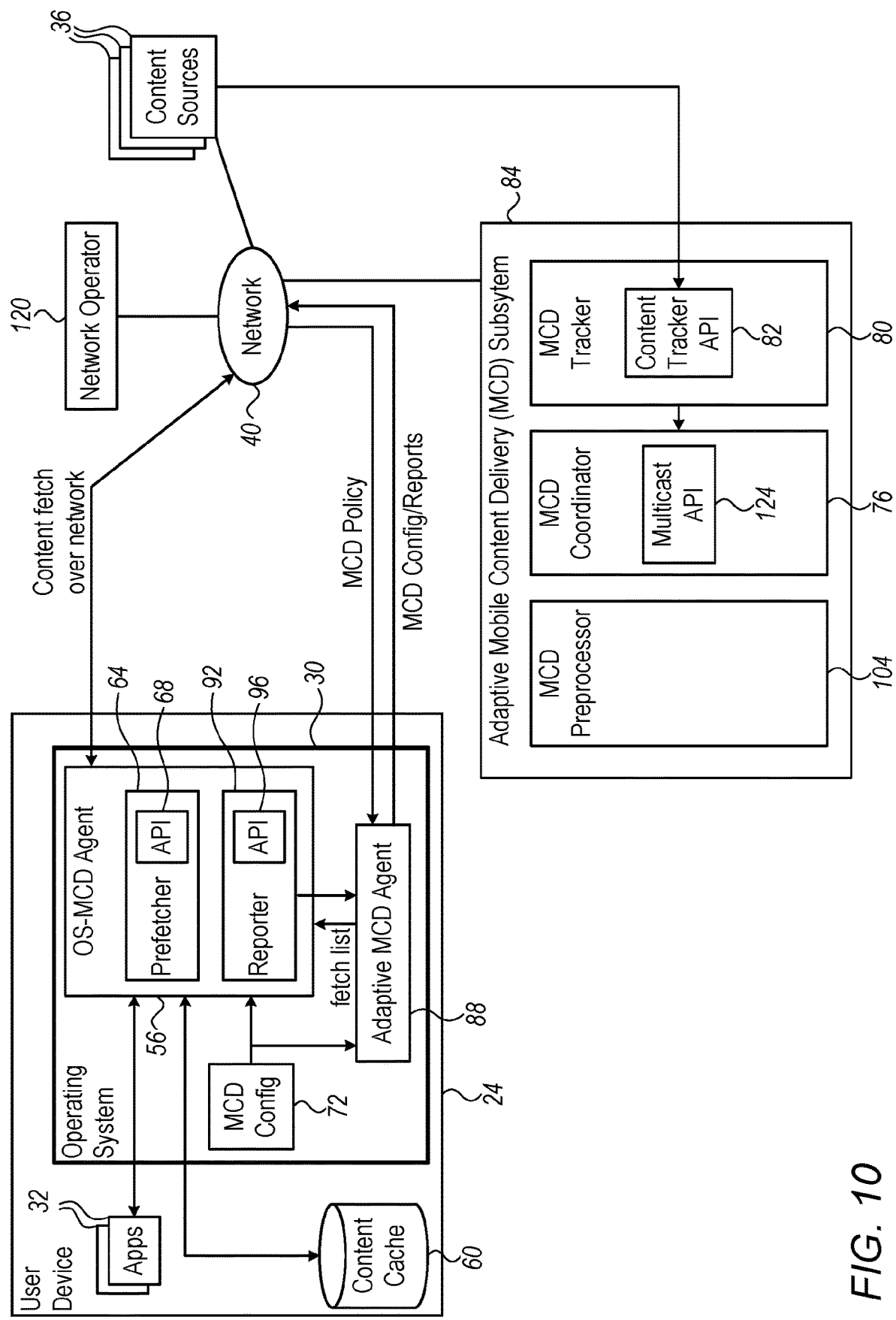
FIG. 10 is a block diagram that schematically illustrates an OS-MCD comprising a multicast API, in accordance with an embodiment of the present invention.

FIG. 10: High-level block diagram illustrating enhanced OS-MCD functionality, including a Multicast API 124 that enables network operators to provide multicast/broadcast resources for prefetch.

In some embodiments, it might be desirable for the wireless operator to deliver the same prefetched content to multiple users at one time (i.e., using the same wireless transmission resources). This can be done by either broadcasting the prefetched content to all users or using a multicast channel to transmit the content to multiple users. In either case, this makes the delivery of the content to the users much more bandwidth efficient: instead of sending the same content to multiple users over wireless point-to-point connections, we send the content once over a single wireless point-to-multipoint connection. These embodiments are supported by the high-level block diagram shown in FIG. 10. A Multicast API is defined at the MCD Coordinator that enables network operator system 120 to interact with the Adaptive MCD Subsystem in support of broadcast/multicast of prefetch content.

In some embodiments the network operator defines the available multicast resources that are available per cell ID. This can be done, for example, based on the amount of resources that the MCD Coordinator estimates to be needed per cell ID. Thus the needed resources can be assessed as part of the calculation of MCD policy, and can be passed to the network operator through the Multicast API. For example, if 3 or more users being served by a particular cell ID are all estimated to have high prefetch likelihood for a particular movie, then the MCD Coordinator might ask the operator for multicast resources on their serving cell in order to prefetch the movie simultaneously to all 3 users.

Once the operator confirms the availability of certain multicast resources, the MCD Coordinator can specify in prefetch MCD policy which content will be available over which multicast resources (including cell ID), and at what time. We refer to this portion of the MCD policy as the prefetch multicast policy. This policy is passed on to the User Devices, which would use the information to determine what content is available for prefetch through multicast resources. If many users are interested in the same content item, this approach can avoid many unnecessary transmissions by servicing all users in one shot.

The multicast/broadcast resources reserved for prefetch can be thought of as "prefetch channels" similar to broadcast channels that are used by various content providers today.

In order to set prefetch multicast policy at the MCD Coordinator, knowledge of where the users are located (e.g., the cell IDs of the base stations serving the users) needs to be known at the MCD Coordinator. This knowledge can be gleaned from the reports made available by the Reporters at the User Devices, or it can be obtained directly from the network operators through the NetStats API described in Section 3.10 (or through the Multicast API). This user location information is critical for scheduling multicast/broadcast in order to identify which users are being served by the same cell. The operator might also provide additional inputs to support the setting of prefetch multicast policy at the MCD Coordinator.

In some embodiments, the MCD Coordinator might also take into account estimated future user location that is predicted, e.g., through machine learning algorithms. Thus certain content might be scheduled for prefetch broadcast/multicast at a particular cell if multiple users that are predicted to want the content will be at the cell location at the scheduled time.

In some embodiments, the MCD Coordinator might define multiple times of day that popular content is multicast/broadcast over a particular prefetch channel. Alternatively, the MCD Coordinator might define a periodic transmission of certain content. For example, the feed of an App might be broadcast from scratch every 15 minutes, with differential updates broadcast every 5 minutes. An advantage of this mode of operation, is that it avoids the need to notify the User Device when updates are available. Thus in the above example, we can save the overhead involved in sending prefetch notifications to the User Device whenever App feed modifications occur.

The prefetch multicast policy is defined by the MCD Coordinator as part of the prefetch MCD policy. This includes what content items to transmit over multicast/broadcast "prefetch channels" and when to transmit it.

The calculation of prefetch policy might take into account the additional battery consumption at the user device that may occur if broadcast/multicast resources are used to prefetch content to the device instead of a dedicated channel. The additional battery consumption may occur because broadcast/multicast transmissions are often less efficient per user than dedicated transmissions that are optimized for each individual user (i.e., for the transmission link conditions of each individual user). Thus, for example, in many cases a dedicated transmission might enable a user to achieve a higher transfer rate, which may translate to a shorter modem usage time and less power consumption.

In some embodiments, the Adaptive MCD Subsystem can fetch the content designated for multicast prefetch and directly coordinate the simultaneous prefetch to multiple users using the specified multicast resources. The advantage of this approach is that the content can be preprocessed (e.g., bundled with other content and compressed) for efficient transmission. In other embodiments, the content can be multicast/broadcast from the Content Sources. In this case, the multicast prefetch policy information can be sent to the Content Source in order to define what content should be multicast/broadcast, when it should be transmitted, and using which multicast resources. The multicast prefetch policy is also sent to the User Device along with the rest of the prefetch MCD policy, thus enabling the User Devices to know how to access the multicast prefetched content. If a particular user's prefetch likelihood metric is very low for the broadcasted content, then this user will most likely ignore the broadcast.

The prefetch multicast/broadcast resources over all cell IDs can be coordinated by the MCD Coordinator jointly over multiple Apps/Content Sources. Thus the most popular content at each cell ID can be chosen for prefetch multicast/broadcast. This allows the most optimal use of prefetch multicast/broadcast resources.

It should be noted that in some cases the content chosen for prefetch over multicast/broadcast resources might not necessarily be the most popular over the entire network. For example, if many users at a sporting event all want to see the same video clip, then it might make sense to reserve prefetch multicast/broadcast resources for these clips at the cell ID(s) servicing that area, even if elsewhere in the network other content items are more popular.

In some embodiments the decision to broadcast certain content for prefetch is made by the Content Source and reported to the MCD Coordinator so that it can include the necessary content access information in the prefetch MCD policy. In some embodiments, the Content Source notifies the App on the User Device what content will be available on broadcast resources and when. The decision can then be made at the User Device to prefetch the broadcast content (either by the App or by the OS-MCD Agent).

In some embodiments the Content Source might decide to broadcast/multicast certain prefetch content based on the current rating it observes. It might also take into account the fact that the rating of certain content is rising quickly (e.g., a video clip "going viral"). The feed of an App is generally very highly rated and might always be designated for prefetch broadcast, or at least perhaps the portion of the feed which is immediately available without too much scrolling.

In some embodiments the prefetch multicast policy might be set by the operator based on inputs it receives through the Multicast API. This might even be the more typical case, since the operator generally benefits the most from multicast/broadcast techniques. For example, the MCD Coordinator might provide the operator with the prefetch policy for each user, including likelihood metrics for each content item. The operator might then analyze the prefetch MCD policy together with knowledge of the location of the users within its network, and determine which content items should be multicast/broadcast for prefetch, for which users, and when it should occur. In some embodiments the prefetch policy passed to the operator further includes predictions on where the users will be in the future so that the operator can take this into account when setting prefetch multicast policy and scheduling the multicast/broadcast prefetch transmissions.

In some embodiments the Adaptive MCD Subsystem calculates a recommended prefetch multicast policy as part of the MCD policy that it passes on to the network operator (e.g., through the Multicast API) but the final prefetch multicast scheduling decisions might be made by the operator. In these embodiments, it might not be necessary for the Adaptive MCD Subsystem to request prefetch multicast/broadcast resources from the network operator. The network operator might then inform the Adaptive MCD Subsystem, e.g., the MCD Coordinator, of the final prefetch multicast schedule.

In some embodiments, the operator might decide to use multicast resources for prefetch in an ad hoc way. For example, if the operator observes that a number of users in a particular cell are supposed to receive the same content at approximately the same time, it may align the transmissions and send them to the targeted users in one shot using multicast resources. Furthermore, the operator might use knowledge of the latency sensitivity of individual transmissions to determine how much flexibility there is in aligning the transmissions. For example, prefetch transmissions are generally insensitive to a reasonable amount of latency. Therefore, the operator might identify which transmissions are for prefetch or which transmissions are delay insensitive, and delay these transmissions with the content saved in cache (e.g., at the base station) in order to opportunistically search for cases where multiple users are requesting the content so that the transmissions can be sent to all said users in one shot over multicast resources.

In some embodiments, the prefetch multicast/broadcast schedule can be recorded in the prefetch MCD policy and sent to the User Devices by the Adaptive MCD Subsystem. In other embodiments, the network operator can notify the User Devices of the prefetch multicast/broadcast schedule.

In some embodiments, some or all of the Adaptive MCD Subsystem functionality described here can be implemented at the network operator so that the operator also influences the setting of prefetch MCD policy.

In some embodiments, as part of the preprocessing of content for prefetch, a particular content item may be partitioned into a common part (images appearing on the feed of many users) and a user-specific part (e.g., an XML or JSON file describing a personalized user feed), similar to the proposal in [1]. The common parts can then be grouped together and transmitted to multiple users using the prefetch multicast resources. The user-specific parts can be prefetched in the conventional way (not using multicast resources).

An example of a multicast/broadcast channel may comprise the evolved Multimedia Broadcast Multicast Service (eMBMS) channel of the Long-Term Evolution cellular standard.

3.11.1 MBMS & Prefetch Notifications

In some embodiments, a multicast/broadcast channel might be used to inform users about new or updated content available at content sources, and/or changes to prefetch policy related to said content. Since any changes related to content item candidates for prefetch typically is relevant for multiple users, an efficient way to notify the users would be transmit the notifications for multiple users in one shot using multicast/broadcast channel resources. Thus, in general, some or all of the content typically sent in prefetch notifications might be sent using multicast/broadcast channels. This might include the notification itself that updates are available; it might also include data that might be sent inside a prefetch notification—such as updates to the contents catalog/prefetch policy and possibly incremental updates for certain content items (e.g., small updates for fast changing content like the app's feed) [3].

3.12 DNS Prefetch

DNS resolution is needed at the device in order for it to fetch/prefetch a content item. Thus the device will typically query the DNS server for the needed DNS information at the time of fetch (i.e., the IP addresses of the servers holding the desired content). However, the DNS information is typically small and may result in an inefficient data transfer (as discussed in Sec. 3.4). In addition, the DNS query is sometimes time consuming and causes a significant increase in MODEM activity time at the time of fetch. All of this leads to a waste of power and network resources.

Embodiments of the present invention support the prefetch of the DNS information ahead of the fetch/prefetch of content (e.g., supported by the Prefetch Agent in the OS at the user device):

1. In one approach, the prefetch of DNS information depends on the likelihood that the user will access the content that the DNS information is needed for. Thus, if a likelihood metric is above some threshold T1 (used for DNS prefetch) but below the threshold T2 that would trigger the actual content prefetch, then the DNS information would be prefetched to the device, despite the fact that a decision to prefetch/fetch the content has not yet been taken.

2. In a related approach, a particular needed DNS information is transferred ahead of time opportunistically to the device and/or in a way that is coordinated with other data transfers (including the DNS information transfer of other content/apps) even in a case that a decision to prefetch/fetch the associated content has already been taken. Using this approach allows the device to receive the DNS information separately, in a way that is optimized for DNS data transfer, and the content separately, in a way that is optimized for the content data transfer. Efficient coordinated data transfer techniques are discussed in Sec. 3.4.

Using these approaches, the DNS information may be both transferred to the device efficiently and immediately available for access at the time of the subsequent fetch/prefetch.

In some embodiments, the DNS information needed at the device (over multiple contents and apps, i.e., multiple content sources) is gathered by a server over the network in the cloud (e.g., by the MCD Coordinator) and sent using efficient opportunistic and coordinated data transfer techniques to the user device. This might include the MCD Coordinator recording the relevant IP addresses in the contents catalog/prefetch policy that is sent to the user device. The MCD Coordinator might take into account the likelihood metrics in order to predict which content is most likely to be prefetched/fetched to the user device. In other words, the DNS information might only be retrieved and recorded in the catalog for content that is likely to be accessed by the device. Alternatively, the device might indicate to the server which content items it should do DNS prefetch for (e.g., which content items it is likely to prefetch/fetch).

In some embodiments, the DNS information is prefetched at least partly directly by the device. In other words, the device directly issues DNS queries to a DNS server to obtain the DNS information it thinks it will need in the future. Here too, the DNS queries can be done in an opportunistic and/or coordinated way with other data transfers, including the transfer of DNS information for multiple content sources.

In some cases, the response to a DNS query will contain more than one IP address. This might occur for example, in systems that attempt to load balance by offering multiple possible servers to download content from (and where the actual download might then be selected randomly from the list of IP address responses). In these cases, the responses might be added to the contents catalog and sent on to the user device, which keeps track of these "equivalent links" (e.g., using techniques described in [32]). As a result, if the server of the selected address is not available, then the device can try another address in the list (i.e., failure recovery). Alternatively, the server can select one address for each content item (e.g., randomly) to record in the user's catalog, such that the different addresses are distributed among the different users. In this latter approach, however, we lose the failure recovery functionality.

In some cases, the DNS response might change with time. In this case, the prefetch server might continue to check the DNS response over time and report any significant changes to the devices. Thus in this approach, the device essentially tracks the DNS response of various content sources and updates the device in a way that is similar to content tracking for content prefetch at the device.

In some cases, the DNS response might change with location (either physical location or logical location within the network) or with other device properties. In these cases, the prefetch server might contact a server in the same general location (and/or with similar properties) as the user device to issue the DNS queries in order to increase the chances of receiving a DNS response corresponding to the best contents server for the device. Here too, the changes can be tracked over time.

3.13 Advertising Support

A critical part of mobile content delivery is support for advertising. If content is prefetched to the User Device without the supporting ads then in some cases the content display will be delayed anyway while the ad is fetched in real time or the ad will not be (at least initially) displayed. Neither of these results may be desirable. Embodiments of the present invention support prefetch for ads along with the content, including real-time advertisement. See also [7-10].

Note, however, that in many cases ads are downloaded asynchronously, which does not hold up the initial content display. In addition, some of the ads being fetched might not correspond to the initial visible part of the screen display. In these cases, a valid approach might be to prefetch the content without prefetching the associated ads.

Ads that are generated in advance can be prefetched in the same way that the corresponding content is prefetched. The ads can simply be tracked by the MCD Tracker as additional content items. The fact that it is an ad, however, might be included as metadata in the content catalog generated by the MCD Tracker.

Ads that are generated in a personalized way can be handled similarly to other personalized content. For example, the updates supplied by the Content Source through the Content Tracker API can include information about ads.

In some cases, ads are not generated in advance, but rather are generated in real-time when the user actually accesses the content. These real-time ads are generated by ad brokers available over the network based on bidding that takes place in real-time between advertisers. This bidding can take into account the identity of the user and various time-varying context-related parameters, such as time-of-day or recent user internet activity. In this case the ads cannot simply be prefetched in advance, since the ads are not known in advance.

One solution to the real-time ad prefetch challenge was described in [7-8]. In this case, the most popular ads are prefetched in advance so that the ads most likely needed are already available at the device. Then at the time of content access the identity of the required ad is generated by the Ad Broker over the network (based on real-time bidding). This approach avoids the latency caused by the actual transfer of the ad to the User Device at the time of content access. However, the disadvantage is that the availability of the ad is still dependent on the real-time generation of the winning ad ID at the Ad Broker over the network. Thus ad display is still dependent on the network connection, and it will include the latency involved in generating and transferring the winning ad ID to the User Device.

Another solution to the real-time ad prefetch challenge (similar to the proposal described in [9]) is for the bidding to take place at the User Device. In this case, the most popular ads are prefetched in advance so that the ads most likely needed are already available at the device. Then at the time of content access the real-time ad is generated from bidding that takes place locally at the device. This effectively transfers much of the functionality of the Ad Broker to the User Device, thus avoiding the real-time network access needed to identify a winning ad.

Another solution (similar to that proposed in [10]) is to periodically regenerate the winning ad identity. In some embodiments this can be carried out from the User Device. In other words, the App provides the necessary inputs (possibly including a function callback) to generate a real-time ad for a user through the Prefetcher API for all prefetched content stored at the User Device. Then the Prefetcher can periodically check whether the identity of the winning real-time ad has changed. In this way, the identity of real-time ads for all prefetched content is kept up to date at the User Device.

In other embodiments the periodic checking of the identity of the winning real-time ad can be done over the network, for example at the Adaptive MCD Subsystem. In some embodiments, the Content Source might periodically check the identity of the winning real-time ads for each user and provide updates to the MCD Tracker whenever changes occur. In other embodiments, the Content Source might provide the inputs needed (possibly including a function callback) to generate a real-time ad for a user through the Content Tracker API of the MCD Tracker. Then the MCD Tracker or MCD Coordinator might periodically check and update the identities of the winning real-time ads for all content that are candidates for prefetch.

The generation of real-time ads for a particular user might depend on various user or device state information available from the User Device. Therefore, in some embodiments this information is passed through the Reporter at the OS-MCD Agent to the Adaptive MCD Agent and Subsystem. If the real-time ad is periodically generated at the Content Source, then the required user/device state information might be passed to it through the Adaptive MCD Subsystem or through the App on the device.

Each time a new real-time ad identity is generated for content, the user-specific MCD policy is updated. This may also lead to a prefetch notification being sent to the user indicating that a content change has taken place. The User Device might then request the new MCD policy and update the prefetched content to point to the correct ad. If the new real-time ad has not yet been prefetched to the phone, then the Prefetcher can then prefetch the new ad and store it in Content Cache.

In some embodiments the MCD Coordinator attempts to evaluate which ads are most likely relevant for each user. These ads will have higher prefetch likelihood metrics in the MCD policy, and are more likely to be prefetched to the User Device. This evaluation can be partly based on past ad generation history for the user or for other users including those that are identified as being similar to the user. The MCD Coordinator might also rank the likelihood metrics of ads for each user based on the content that have the highest likelihood metrics for that user. For example, certain content might be highly correlated with 3 or 4 possible ads. If this content has high likelihood metrics, then these correlated 3-4 ads should also receive high likelihood metrics.

In some embodiments, an Ad Broker can directly provide information on popular ads to the MCD Tracker through the Content Tracker API. The MCD Tracker could also crawl the Ad Broker to find new ads that are candidates for prefetch.

The prefetch of ads must avoid affecting the ad analytics calculations. Thus if an ad is prefetched it should not be counted as having been viewed unless and until this actually occurs. Similarly, if a real-time ad identity is generated by bidding to support prefetched content—it should not be counted as having been viewed unless and until this actually occurs. In some cases, the ability to prefetch an ad or generate a real-time ad identity without affecting ad analytics can be enabled by an App at the User Device by providing the necessary inputs including possibly a function callback through the Prefetcher API. Alternatively, these inputs can be provided to the Adaptive MCD Subsystem through the Content Tracker API (e.g., by the Content Sources). In other cases, additional steps must be taken to prevent the generation of an ad from automatically being counted as having been served.

Various additional approaches to preventing the skewing of ad (and other data) analytics are described in Section 5.8 in the context of the OS-App-Preloader module (where some of these approaches can be applied to handling analytics in the context of the OS-MCD module as well). Techniques to prevent the skewing of analytics when the apps are passive and don't actively provide prefetch code (that preserves analytics calculations) are discussed in Section 7.4.

It should be noted that ads that are popular (at a particular time and location) are excellent candidates to be prefetched using multicast/broadcast resources. In this case, an ad can be broadcast once at a particular cell and be used by many users, and possibly even multiple times. This is particularly helpful for popular ads that include high quality video, which are large and thus might significantly impact network operator capacity and content provider CDN costs.

3.14 Additional OS-MCD Variations

The present description has described the functionality supported by the proposed OS-MCD module. Various embodiments were described in FIG. 2 through FIG. 10. It should be noted that many additional ways are possible to break up this functionality across the different components. For example, in some embodiments, the OS-MCD module might be implemented entirely outside the OS, with some of it implemented outside the device over the network. The specific partitions between functionality implemented in the device itself and functionality implemented outside the device (e.g., in the cloud) described here for the proposed embodiments represent only some such possible partitions.

3.15 Opportunistic Content Tracking

Practical prefetch operation requires various data to be transferred between the user device and the network in order to enable content tracking at the device. This data is referred to here as control information, content tracking information, or content tracking updates. Examples of such data are:

1. Information indicating what content is available for prefetch from content sources in the cloud (i.e., over the network) and whether there are any updates for content items that have already been prefetched (i.e., indicating the "freshness" of content items cached at the user device). This information can be said to be part of a "contents catalog" (e.g., discussed earlier and in [1]).

2. Device requests for content tracking information updates might be sent to the cloud.

3. User reports might be sent to the cloud to provide information for machine learning algorithms to calculate likelihood metrics that indicate the probability of the user accessing each content item, (e.g., discussed earlier and in [1]).

4. Content likelihood metrics and other content metadata (such as key words, tags, or category) might be sent to the device from a server in the cloud, in order to improve the decisions on which content to select for prefetch. This information can be said to be part of the "prefetch policy" (e.g., discussed earlier and in [1]).

Thus efficient prefetch operation requires many data transfers between the user device and the cloud in order to properly track the available content for the device. This information is generally relatively small in size and thus should theoretically not significantly impact device battery life or network operation. Unfortunately small data transfers are relatively inefficient, as was discussed in Sec. 3.4, which leads to excessive energy consumption and poor utilization of scarce network resources.

Note that the focus of the description in this disclosure is content tracking for prefetch operation. However, embodiments of the present invention can also be applied to other applications which require content tracking. For example, it was proposed in [43] to display various types of content metadata at the device for content links available to the user, in order to assist the user is choosing which links to access. Thus this content metadata can be transferred to the device before the actual content is fetched using the techniques described here.

Embodiments of the present invention utilize the opportunity that the MODEM is active due to a data transfer for an app, to fetch/push content to support content tracking at the device potentially of other apps (discussed also in [42]). Thus the opportunistic fetch techniques based on MODEM activity described above in Sec. 3.4 can be applied to content tracking.

In an example embodiment of the present invention, if the device receives a message through a messaging app (e.g., WhatsApp) which causes the MODEM to be active, this opportunity is then used to transfer content tracking information between the cloud and the device. Said content tracking information could, for example, indicate that the user's Facebook feed page has updates available.

Another advantage of this approach is that it enables the content tracking information to be sent in a bandwidth (BW) efficient way, making it highly attractive for network operators. The reason is that when a large amount of data is scheduled for transfer together various efficient data transfer techniques can be used, such as (1) using multiple active parallel TCP/IP connections, and (2) coordinated preprocessing techniques. Furthermore, each data transfer session involves a lengthy and costly process of call set-up; with the proposed approach, however, such sessions may be combined thus reducing this call set-up related overhead. Moreover, by optimizing the BW efficiency of the content tracking data transfers, these techniques also reduce overall MODEM activity time which translates to reduced power consumption (longer battery life). Thus by appending the data transfers related to content tracking to another data transfer, the incremental cost (in network resources and battery life) can often be negligible. These techniques were described in greater detail above in Sec. 3.4.

Note that while this description focuses on MODEM activity related to apps, it applies also to MODEM activity due to any data transfer, including due to browser-based apps.

In addition to MODEM activity, other factors might be taken into account in deciding when to opportunistically transfer content tracking information, including network conditions and the type of network connection. Additional details regarding the opportunistic transfer of data based on network conditions and/or network connection type were discussed in Sec. 3.4.

3.15.1 Opportunistic Content Tracking Initiated at the Device

In some embodiments, opportunistic content tracking actions are initiated at the device in response to MODEM activity or in response to other favorable transfer conditions (e.g., favorable network conditions or network connection type). Examples of such actions are given below:

1. Content Tracking Information Updates: The device might request updated content tracking information from a server in the cloud. For example, if the current state at the device is favorable for prefetch (e.g., a Wi-Fi connection is available) or if the user is expected to soon need content, then the device might request a content tracking information update from the server managing prefetch in the cloud. The server might respond with the update, possibly by only sending the changes to the content tracking information, i.e., a differential update (in order to reduce the size of the data transfer) [3]. Embodiments of the present invention opportunistically coordinate these content tracking updates requested by the device (along with the server response) with MODEM activity and/or other favorable data transfer conditions.

2. Crowd Wisdom Content Tracking Reports: In some embodiments, each device might report a content item update in an ad hoc way whenever a user happens to access it. This is a form of content tracking based on crowd wisdom [16]. In this way, as soon as any user accesses a content item (or an updated content item) it will be known to the prefetch system for all other users. This approach reduces (or even eliminates) the need for comprehensively and continuously crawling content at each content sources to check for updates. Embodiments of the present invention exploit MODEM activity and/or other favorable data transfer conditions to send these content tracking reports to the cloud.

3. Device-Based Content Tracking: In some embodiments, content tracking might be based on emulating app and content link clicks at the user device. For example, an emulated click on an app might fetch an app's feed in the background (or conditionally fetch only if the feed has changed, e.g., using Etags or "Last-Modified-Dates"), thus enabling the device to check for new or updated content. Similarly, a click might be emulated on an article reference, an image, a video, or other types of content. This approach reduces (or even eliminates) the need for comprehensively and continuously crawling content at each content sources to check for updates. Embodiments of the present invention exploit MODEM activity and/or other favorable data transfer conditions to emulate the device clicks for content tracking.

4. User Reports for Content Prefetch Policy: A typical approach for setting prefetch policy is based on using machine learning algorithms in the cloud based on information reported from the various users. Said information might include the user's app and content usage history and other user, device, or network related information. Embodiments of the present invention exploit MODEM activity and/or other favorable data transfer conditions to send these user reports to the cloud.

In all of the above cases, the ability of the device to opportunistically coordinate the data transfers related to content tracking with MODEM activity and/or other favorable data transfer conditions leads to reduced power consumption and better utilization of network resources.

3.15.2 Opportunistic Content Tracking Initiated at the Server

In some embodiments, opportunistic content tracking actions are initiated at the server in response to device MODEM activity or in response to other favorable transfer conditions (e.g., favorable network conditions or network connection type).

For example, the server might decide to opportunistically push the content tracking information to the device even without a request for an update from the device. This might occur when the server is transferring data to/from the device for some other reason, and therefore knows that the device MODEM is active. It also might occur if the server receives a notification that the device's MODEM is currently active from (1) the device, (2) a content source that is currently transferring data to/from the device, and/or (3) a notification server that is currently sending notifications to the device (e.g., Google Cloud Messaging (GCM)/Firebase Cloud Messaging (FCM) used for Android devices, and Apple Push Notification (APN) used for iOS devices).

In some embodiments, the notification about MODEM activity might be an estimate of when the MODEM will be active in the future. In some embodiments, the notification about MODEM activity might include an indication of the size of the data transfer, or the amount of time the MODEM is expected to remain active.

In some embodiments, network conditions and the type of network connection might also be taken into account in addition to MODEM activity when the server decides whether to opportunistically push content tracking information with a request for an update from the device. In some embodiments, if data transfer conditions are favorable enough, the server might push content tracking information even if the MODEM is inactive.

In some embodiments, the server opportunistically pushes actual content along with content tracking information without a request from the device. In some cases, this content might be a differential update of content that was previously prefetched to the device, i.e., only the changes are sent. In further embodiments, the server might opportunistically push content as described here, without content tracking information.

3.15.3 Opportunistic Content Tracking with Prefetch Guaranteed Mode

In some embodiments, a guaranteed mode of prefetch operation [1] might be specified for certain times of the day/week (e.g., times when the user is predicted to request content access). During these times content sources are continuously tracked for content changes and the user is notified if and when changes occur (possibly only if the content updates are assessed to be of interest to the user). In this way the content tracking information stays up-to-date at the user device. Thus the freshness of the prefetched content cached at the device is known. This enables the device to request content updates in a timely manner. It also enables the device to ignore the cache directives issued in the HTTP response headers during fetch/prefetch; if the content is still fresh, the cached content can be used even after the content cache validity has expired [27].

Note that content tracking update notifications can be sent through a variety of notification methods, such as the popular Google Cloud Messaging (GCM)\Firebase Cloud Messaging (FCM) used for Android devices, and Apple Push Notification (APN) used for iOS devices.

The opportunistic content tracking data transfers proposed by some disclosed embodiments can be incorporated into the implementation of prefetch guaranteed mode. In this approach, when a relevant change is detected in the content tracking information:

1. In one example embodiment, if N minutes have passed since the last opportunistic content tracking update request from the device, then a content tracking update notification is immediately sent to the device non-opportunistically.

2. In another example embodiment, if N minutes have passed since the content update has been detected but the device has not requested a content tracking update, then a content tracking update notification is immediately sent to the device non-opportunistically.

In some embodiments, the estimated importance of the content change to the user could also be used to determine when to send a guaranteed mode content update notification non-opportunistically, (i.e., to determine how much time can be allowed to elapse when a change is detected before sending a notification of the change). For example, the number of minutes allowed to elapse before sending an update notification might depend on the likelihood metrics associated with the content that has changed.

In some embodiments, an estimated time that the user will request access of the content could also be used to determine when to send a guaranteed mode content update notification non-opportunistically, (i.e., to determine how much time can be allowed to elapse when a change is detected before sending a notification of the change).

In some embodiments, a predicted time when the next opportunistic content update might be requested/provided could also be used to determine when to send a guaranteed mode content update notification non-opportunistically, (i.e., to determine how much time can be allowed to elapse when a change is detected before sending a notification of the change). For example, if the content is not expected to be accessed until the afternoon, and it is considered very likely that an opportunistic content tracking update will take place before this, then the server might delay sending a content tracking update notification to the device. On the other hand, if a user accesses an app every day immediately in the morning when he wakes up, then shortly before he is expected to wake up the server should send a content tracking update notification to the device (if necessary), despite the MODEM being inactive.

The incorporation of opportunistic content tracking updates as part of prefetch guaranteed mode enables a significant reduction in the number of more costly non-opportunistic updates.

Another advantage of coordinating the content tracking update notifications with MODEM activity (and/or other favorable data transfer conditions) is that the rest of the prefetch update process can be immediately applied while the MODEM is still active, including the device request for a content tracking update and the content prefetch itself.

In some embodiments, we might also define a best-effort mode of prefetch operation [1], where the content tracking information is kept up-to-date at the device only as available resources permit. In this mode, if a content tracking update has been received recently then it can be relied upon (and the content can be considered valid irrespective of its HTTP header expiration directive). However, if a content tracking update was not received within a sufficiently recent amount of time, then the content freshness cannot be assumed, and instead we need to fall back to the specified HTTP cache directives.

The opportunistic content tracking data transfers proposed by some embodiments of the present invention can also be incorporated into the implementation of prefetch best-effort mode. Since the data transfers are so much more efficient (in power consumption and network resource utilization) then opportunistic best-effort updates can be sent more frequently.

In general, the techniques described above for guaranteed mode, can also be applied to best-effort mode. Thus a decision to send a best effort content tracking update might also depend on the time elapsed since the last content tracking update to the device, the time elapsed since an actual content update was detected, the relative importance of the update to the user, the predicted time the user will request access, and/or the predicted time an opportunistic content tracking update will be available.

In some embodiments, content tracking updates are only transferred opportunistically, i.e., when the MODEM is active. Thus the freshness of cached content might not be known at the device when the user requests access. In this case, the cached content can be shown to the user with a time stamp indicating how fresh it is [2, 25, 26]. Moreover, the freshness of the cached content might be checked in parallel by comparing to the content at the server over the network. This check might be in the form of a conditional fetch (e.g., using HTTP response header Etag or if-modified-since values), where if the content is fresh no fetch takes place, but if the content is not fresh then the updated content is fetched. The actual fetch might also be a differential fetch, where only the changes to the content are fetched (i.e., a prefetch content "patch"). In some embodiments, this freshness check (or conditional fetch) is only carried out if the last update received by the device was more than N minutes ago. Thus, if the update occurred more recently then the cached content is just presented as is.

In yet additional embodiments, a content tracking notification might be sent non-opportunistically (e.g., guaranteed mode or best effort mode notifications) based on a device context which indicates that the user might soon request content. Such a device context could be the device being unlocked by the user. In this approach, the content tracking information is sent as often as possible opportunistically (and thus very efficiently), but if the likelihood of a need for an update is great enough, then it might be sent non-opportunistically. Another examples of device context that might trigger a non-opportunistic content tracking update is the user triggering an app, which might indicate the need to update content tracking information for that app, or for another app which is often used by the user in connection with the first triggered app. Many other such device contexts and special events can be used to trigger a content tracking update non-opportunistically.

In a related embodiment, if said device contexts and special events referred to above occur within N minutes of a previous content tracking update, then a new content tracking update might not be triggered.

In general, if the content tracking information cannot be assumed to be up-to-date (and thus the freshness of the cached content is in doubt), then it might be shown to the user with a time stamp, symbol, or icon indicating how fresh it is (i.e., when it was last updated or verified at the device), as discussed above and in [2, 25, 26]. Alternatively, as also explained above, the system may utilize the http headers and present only cached content elements whose http headers indicate they are valid, and fetch all other content elements from the network.

3.15.4 DNS Prefetch

DNS resolution is needed at the device in order for it to fetch/prefetch a content item. Thus the device will typically query the DNS server for the needed DNS information at the time of fetch (i.e., the IP addresses of the servers holding the desired content). However, the DNS information is typically small and may result in an inefficient data transfer (as discussed above). In addition, the DNS query is sometimes time consuming and causes a significant increase in MODEM activity time at the time of fetch. All of this leads to a waste of power and network resources.

In some embodiments of the present invention the opportunistic content tracking techniques described here includes the needed DNS information for fetching/prefetching the content items.

Additional details regarding DNS prefetch are discussed above in Sec. 3.12.

4 OS-Mapper Module

The OS-MCD Module discussed in Section 3 illustrates the potential importance of tracking detailed knowledge of device behavior. For example, if the device is known to be in Wi-Fi at certain times of the day, then the OS-MCD Agent may concentrate prefetch during these times. Similarly, if battery usage is known to be high when the device is at certain locations (e.g., because of high MODEM power consumption due to poor wireless network coverage), then the OS-MCD Agent may avoid prefetch when the user is at these locations. Thus the Reporter component of the OS-MCD Agent was described as collecting this type of device information available to the OS which may be relevant for prefetch operation.

There are many other examples, where tracking the device performance and context would be valuable. One example of this is providing information to App developers. If a known set of device information was tracked and made available by the operating system, then app developers could take advantage of this to obtain feedback regarding the app's performance. For example, if a navigation app knows that its feed load latency is very large, then it might enable the operation of an App-Preloader as discussed further in Section 5. Alternatively, it might fine-tune the app's configuration parameters (e.g., affecting display behavior) in order to improve load latency performance. As another example, if a particular app's performance is generally very bad when using a cellular connection, the app might warn the user that performance will likely be poor due to the current cellular connection.

Embodiments of the present invention provide a new OS-based module—OS-Mapper 44 (FIG. 1)—that maps the device performance and contexts (i.e., status, events, and conditions related to the device). The operating system has a large amount of performance and context information available to it regarding the device. Examples of performance might be related to the response latency or battery consumption associated with user actions. Examples of device context might be the charging status, the battery level, the type or quality of the network connection, and the velocity of the device. As described below the OS-Mapper creates a map of device performance and context and makes it available for a variety of potential clients and uses. The OS-Mapper module can be implemented in the OS by e.g., an OS vendor or a handset manufacturer.

4.1 Basic OS-Mapper Functionality

Figure 11:
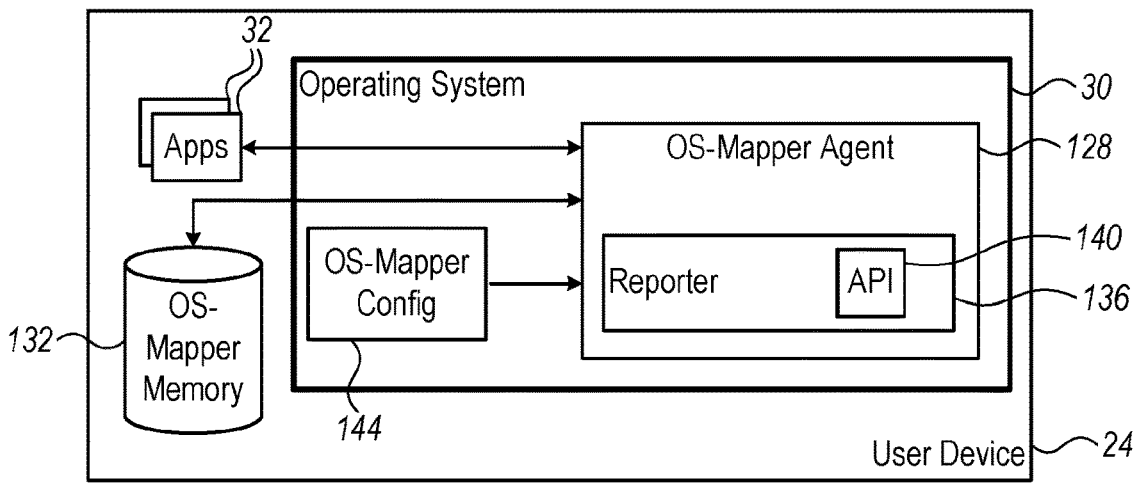
FIG. 11 is a block diagram that schematically illustrates an OS-Mapper, in accordance with an embodiment of the present invention.

FIG. 11: A high-level diagram illustrating basic functionality of OS-Mapper 44 (shown in FIG. 1).

A high-level block diagram illustrating one basic embodiment of the OS-Mapper functionality is shown in FIG. 11. The components shown in the figure support basic OS-Mapper functionality, including creating an OS-map describing device performance and context as a function of time, location, and possibly other device contexts.

1. OS-Mapper Agent 128—This Agent is a software component that runs within the OS and supports basic OS-Mapper functionality at the User Device. It collects information available to the operating system that describes device performance and device context as a function of time, location, and possibly other device context. It records this information in an OS-Map, which is saved in the OS-Mapper Memory. As new relevant device information becomes available it updates the OS-Map.

2. OS-Mapper Memory 132—The OS-Map containing the device performance and context information is saved in the OS-Mapper Memory. This memory may or may not reside at the operating system level. In some embodiments, it might even be located in the cloud and not on the device.

3. Reporter 136—This component of the OS-Mapper Agent makes available the information recorded in the OS-Map to OS-Mapper clients. In the embodiment described in FIG. 11, the Reporter makes available OS-Map information to clients outside the operating system through an API 140, such as to the Apps running on the device. Some of the information stored in the OS-Map might be made available to all apps, and some might be restricted to certain apps (or a single app). For example, certain information associated with an app, might only be accessible by the app itself. Another reporting option might be to provide app performance metrics stored in the OS-Map to app developers (e.g., through reports to Google Play Developer Console). In yet another option, the Reporter may simply provide a function to the operating system that enables the OS to obtain sophisticated device performance and context information.

4. OS-Mapper Configuration 144—The OS-Map is created according to the OS-Mapper configuration that is input to the OS-Mapper Agent. This configuration can be based on default settings e.g., supplied by the OS vendor. Alternatively, it can be at least partly provided by a user through some user interface. For example, a graphical user interface (GUI) can be provided to the user to input the settings that will determine the properties of the OS-Map. These user settings might impact what data is collected and stored in the map, but in particular would influence what data is displayed to the user based on the map. In some embodiments, the OS-Mapper Config settings might also be changed directly by another app or software component such as the OS-MCD module described in Section 3.

Various types of metrics related to response delay time to user actions might be recorded in the OS-Map. For example, an app load latency might be defined as the time from when the user clicks on the app to launch it until the app's initial (e.g., feed) screen is fully rendered. Another app load latency metric might be defined as the time from when the user clicks on the app to launch it until the app's initial screen begins to render. Other options might be defining an app load latency metric based on the rendering of a certain percentage of the initial screen, e.g., 50%, (possibly excluding certain types of content items such as real-time ads).

Similar latency metrics can be defined for other types of responses. For example, different types of latency metrics can be defined for different types of content load.

Feed load—A feed load latency metric might be defined as the time between the user clicking on a feed link (e.g., "Home") and the resulting feed screen being fully rendered (or partially rendered in some defined way). Alternatively, the latency metric might also take into account the time it takes for off-screen content items (e.g., with small distance from visibility metrics [11]) to become fully available.

Article load—A content load latency metric might be defined as the time between the user clicking on an article content element and the resulting screen being fully rendered. Alternatively, we might only consider when the rendering of synchronous elements has completed. Other examples for a browser app might be to define the latency relative to when the webpage has completely loaded, or when the DOMContentLoaded event is triggered.

Image load—An image load latency metric might be defined as the time between the user clicking on a link to an image and when the image is fully rendered on the device screen. Similar metrics can be defined based on when the image begins to render or when a certain percentage of the image has been rendered.

Video load—A video load latency metric might be defined as the time between the user clicking on a link to a video and when the video begins to play. Alternatively, in order to take into account the initial stalling/buffering that is common to video play, the latency metric might be defined relative to completing a certain initial portion of the video clip (e.g., a certain number of seconds or frames). In yet another example, a latency metric might be the total stall time the user experiences while watching the video.

A similar set of metrics can be defined for battery consumption at the device. For example, a battery consumption amount can be associated with the use of a particular app, or with certain types of app activities. Thus a battery consumption metric for an app's launch might be defined as the percentage of battery that is used when launching an app. A separate battery consumption metric might be defined for app usage. In some embodiments, different metrics might even be defined for different modes of app usage. For example, a battery consumption metric might be defined for a navigation app (e.g., Waze) separately for when the screen display is enabled and when it is not enabled.

In some embodiments, the exact definition of the performance metric can be left for the App developer. In this case the OS-Mapper Agent might provide an API to the App to measure the metric. For example, the App can provide the start time (e.g., when the user first clicks on the app icon) and the stop time (e.g., when the webpage is fully loaded) to a latency calculator which would define the load latency. This can similarly be done for other metrics such as battery consumption. In this way, each app developer can define the performance metrics for app load, image load, article, load, and video load.

In addition to storing the performance metrics as a function of the device contexts, the OS-Map might also track the occurrences of various contexts themselves. Thus for example, the OS-Map might contain information regarding when and/or where network outages occur, device temperature, sensor status, when the user charges the phone, battery level, etc.

Examples of device contexts that might be tracked in the OS-Map or that performance metrics might be conditioned on in the OS-Map include:

1. Time
2. App usage—as described above, performance can be broken down per app or per app mode/activity/window.
3. Geographic location—e.g., based on GPS coordinates measured by the device or based on serving cell identity
4. Serving cell or wireless LAN identity—For example, a cellular base station can be identified based on a Mobile Network Code (MNC), Mobile Country Code (MCC), Location Area Code (LAC) and Cell ID. As another example, a Wi-Fi Access Point can be identified by Wi-Fi SSID.
5. Source of the content—This might be a particular content provider (e.g., publisher), internet domain, content delivery network (CDN), server, or webpage.
6. Network Source—This might be a particular router or gateway.
7. Battery level—the current battery level of the device
8. Charging status—whether the device is currently charging or not
9. Wireless link type—whether the device is connected by Wi-Fi or Cellular
10. Wireless link quality—the quality of the wireless link. This can be based on measurements such as Received Signal Strength Indication (RSSI), Signal-to-Noise Ratio (SNR), Signal-to-Interference-and-Noise Ratio (SINR), Channel Quality Indicator (CQI), Reference Signal Received Power (RSRP), Received Signal Code Power (RSCP), Reference Signal Received Quality (RSRQ) and/or Common Pilot Channel (CPICH) Ec/Io.
11. Uplink transmit power level—this is highly correlated with battery consumption
12. Cellular (e.g., LTE) transmit timing advance—This is the amount of time the uplink subframe is transmitted in advance of the arrival of the downlink subframe at the terminal in order to ensure that the downlink and uplink subframes are synchronized at the base station. This value is an indicator for how far the terminal is from the base station—which is indicative of how much uplink transmit power is needed (and thus is correlated with battery consumption).
13. Wireless network technology—This might include the radio access technology (RAT), such as 2G, 3G, 4G, and Wi-Fi (e.g., 802.11a, 802.11b, 802.11g, 802.11n). It also might include the Wireless standard release, features supported, carrier frequency, and frequency bandwidth available.
14. Network coverage problems—This might include events involving sudden but temporary dips in quality, spikes in performance metrics such as latency and battery consumption, and complete network outage.
15. Device temperature
16. Device sensor status—This might include measure of device movement, velocity, orientation, screen status, light exposure, external temperature, background noise level, etc.
17. Peripheral status—This might include, for example, whether headphones are connected.
18. OS configuration—This might be, for example, whether a password has been defined for app access—which might impact latency metrics.
19. OS Type and OS Version In some embodiments, the context information tracked in the OS-Map might be conditioned on other context information. For example, the device temperature information might be broken down as a function of which app is being used, whether the screen is active, the link RSSI level, the wireless link type, etc.

In some embodiments, the performance metrics and device contexts might be stored in the OS-Map in a statistical format—such as using an average value, standard deviation, or probability (or likelihood) indicator. Examples include: an average RSSI level might be saved as a function of serving cell ID; the probability of the user charging his phone might be saved as a function of time; the likelihood of the user connecting to Wi-Fi might be rated as a function of GPS coordinates.

In some embodiments, the performance metrics such as latency and battery consumption might be measured based on actual user actions and real data transfers. In additional embodiments the OS-Mapper might also trigger dummy user actions and dummy data transfers which are carried out in order to measure current performance. For example, an app load might be triggered in the background without any user action in order to measure current app load latency.

The OS-Mapper Agent stores the occurrences and statistics of the device contexts/events and performance metrics in the OS-Map. This data can then be made available for client applications as inputs for sophisticated adaptive processing. For example, the OS-Map might pass the recent network connection history (e.g., as a function of time, place, and perhaps other device contexts) to a prefetch module, such as the OS-MCD module discussed in Section 3. Thus the data collected in the OS-Map might be feature inputs to machine learning algorithms that determine prefetch policy. As another example, the OS-Map might pass historical usage information for a particular app to the App-Preloader, discussed further in Section 5.

Other performance metrics recorded in the OS-Map might relate to costs associated with device usage. Examples might include: the cost per byte of a data transfer, the cost per minute of an online service, the data plan cost, and others. These costs might be made known to the OS-Mapper Agent by the network operator, possibly inputted manually by the user, or in some other way.

4.2 Enhanced OS-Mapper Functionality

Figure 12:
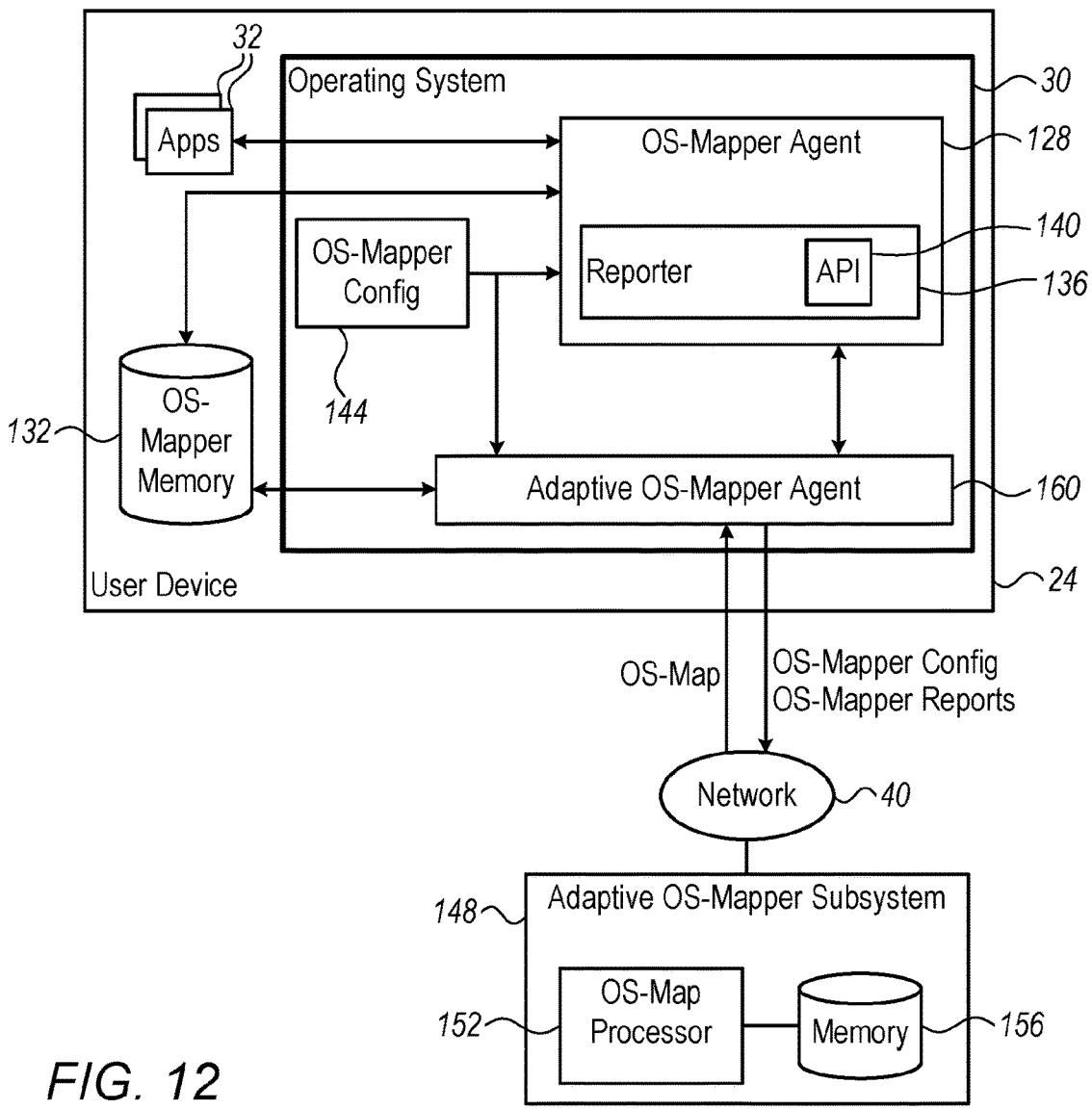
FIG. 12 is a block diagram that schematically illustrates an OS-Mapper supported by cloud-based adaptive processing, in accordance with an embodiment of the present invention.

FIG. 12: High-level block diagram illustrating enhanced OS-Mapper functionality, supported by adaptive processing in the cloud.

The full potential of the OS-Mapper functionality can be realized when supported by sophisticated adaptive algorithms, e.g., machine learning algorithms. These machine learning algorithms can be used, for example, to estimate the likelihood of an event occurring, when it might occur, and for what device contexts it might occur. As another example, these algorithms might be used to predict the likely performance of an app, as a function of time and/or device context. An example embodiment of this approach is shown in FIG. 12 above, which includes the following components:

1. Adaptive OS-Mapper Subsystem 148: This subsystem can be implemented at a physical or logical server available over the network. In a typical embodiment, all or much of the Adaptive Machine Learning Algorithms are implemented at this subsystem.

2. OS-Map Processor 152: This component receives the OS-Mapper configuration settings and reports from the devices and processes the data in order to predict device performance, costs, and contexts, and stores the results in an OS-Map.

3. Memory 156: The OS-Map might be stored in Memory at the Adaptive OS-Mapper Subsystem.

4. Adaptive OS-Mapper Agent 160: This Agent at the User Device is an extension of the Adaptive OS-Mapper Subsystem implemented in the cloud. It might receive OS-Mapper reports from the Reporter and forward this on to the Adaptive OS-Mapper Subsystem (along with the OS-Mapper Config settings) in order to calculate an OS-Map. The OS-Map is then sent to the Adaptive OS-Mapper Agent at the device and stored in OS-Mapper Memory—which can be accessed by the Reporter, as discussed above. In some embodiments adaptive machine learning algorithms can also be implemented by the Adaptive OS-Mapper Agent at the User Device, in order to refine the OS-Map. In these embodiments, some of the inputs to the machine learning algorithms might include the most recent user activity or device state/sensor information. The OS-Mapper Config settings might also be taken into account by the Adaptive OS-Mapper Agent in refining the OS-Map. In some embodiments, adaptive machine learning algorithms can be carried out at the Adaptive OS-Mapper Agent without (or with minimal) additional machine learning algorithms in the cloud. In some of these embodiments the Adaptive OS-Mapper Agent may function without any cloud Subsystem. In some embodiments the OS-Mapper Agent and the Adaptive OS-Mapper Agent might be merged into a single Agent supporting their respective functionalities.

The oval in the figure represents the network providing the communications connectivity between the various components in the figure. This network may comprise, for example, the Internet, a Local Area Network (LAN), a wireless network such as a cellular network or Wireless LAN (WLAN), or any other suitable network or combination of networks.

The Adaptive OS-Mapper Subsystem is optional, and it adds additional processing power to what is available on the User Device. For example, adaptive machine learning algorithms might run on the Adaptive OS-Mapper Subsystem in order to create the OS-Map. In addition, the processing that takes place at the Adaptive OS-Mapper Subsystem can take into account information gleaned from other users (e.g., "crowd wisdom"). Thus each user can benefit from data reported from other users—either implicitly through machine learning algorithms (e.g., that exploit underlying correlations between user data) or explicitly based on some common attribute (such as nearby locations).

In some embodiments, in addition to predicting performance metrics, cost metrics, and device contexts, the OS-Mapper might directly help make decisions for specific applications. For example, in some embodiments the OS-Map calculated at the Adaptive OS-Mapper Subsystem might include likelihood metrics indicating the likelihood of a user requesting access for particular content elements (and when this might occur). In this case, the Reporter at the OS-Mapper Agent in the OS at the User Device might include as a subset much of the information gathered by the Reporter at the OS-MCD Agent (as part of the OS-MCD module) discussed in Section 3. Thus in some embodiments, the OS-Mapper module described here might effectively replace (or be merged with) much of the functionality described for the OS-MCD module, particularly the functionality described by the Adaptive MCD Agent and the Adaptive MCD Subsystem.

In some embodiments the predicted outputs of the OS-Mapper machine learning algorithms are used as additional feature inputs to machine learning algorithms in support of other applications. For example, if the predicted Wi-Fi availability during the upcoming 24 hours that is estimated by the OS-Mapper might be used as a feature input to the OS-MCD machine learning algorithms discussed in Section 3.

Additional example use cases for the OS-Mapper are discussed in the sequel.

In some embodiments the Reporter collects user, device, and/or network information from generally available APIs or OS functions and makes it available to OS-Mapper clients. The Reporter might also track and make available the changes to this information over time. In some embodiments, the Reporter processes this information in order to make it available in a form which is useful for the adaptive algorithms implemented at the Adaptive OS-Mapper Agent and the Adaptive OS-Mapper Subsystem.

In some embodiments the Reporter sends its information to the Adaptive OS-Mapper Agent, which forwards it to the Adaptive OS-Mapper Subsystem. In other embodiments, the Reporter directly reports its collected information to the Adaptive OS-Mapper Subsystem. The specific types and formats of Reporter information that should be sent might be configured in a configuration file (e.g., saved and accessed by the Adaptive OS-Mapper Agent), along with the destination address for the reporting (e.g., address of the Adaptive OS-Mapper Subsystem). This configuration might also be defined or referenced by the OS-Mapper Config.

The Reporter might combine/compress historical app/content usage activity and performance across many apps along with device context tracking information to enable efficient reporting to the Adaptive OS-Mapper Subsystem. This information can be jointly used to better predict things for individual applications. For example, if one app typically has large latency metrics at a particular location, then the processing at the OS-Mapper Subsystem might predict latency problems for another app when the user approaches this location, despite the fact that the user has never accessed the app there before.

In some embodiments the Adaptive OS-Mapper Subsystem might notify the Adaptive OS-Mapper Agent at the User Device if a significant change in the OS-Map is detected. The notification might be sent through a variety of notification methods, such as the popular Google Cloud Messaging (GCM)\Firebase Cloud Messaging (FCM) used for Android devices, and Apple Push Notification (APN) used for iOS devices.

In some embodiments, the Adaptive OS-Mapper Agent can request from the Adaptive OS-Mapper Subsystem an updated OS-Map. In other embodiments, the Adaptive OS-Mapper Subsystem might push the OS-Map to the device without a request. In some embodiments, the transmission of the OS-Map might occur directly in the same notification sent to inform the device of the OS-Map update.

In some embodiments, an update of the OS-Map is sent differentially to the device. In other words, a patch to update the OS-Map is sent which only (or mainly) contains the changes to the OS-Map. Using differential updates also increases the likelihood that the updates will be small enough to fit inside the update notifications themselves.

4.3 Enhanced OS-Mapper Platform

Figure 13:
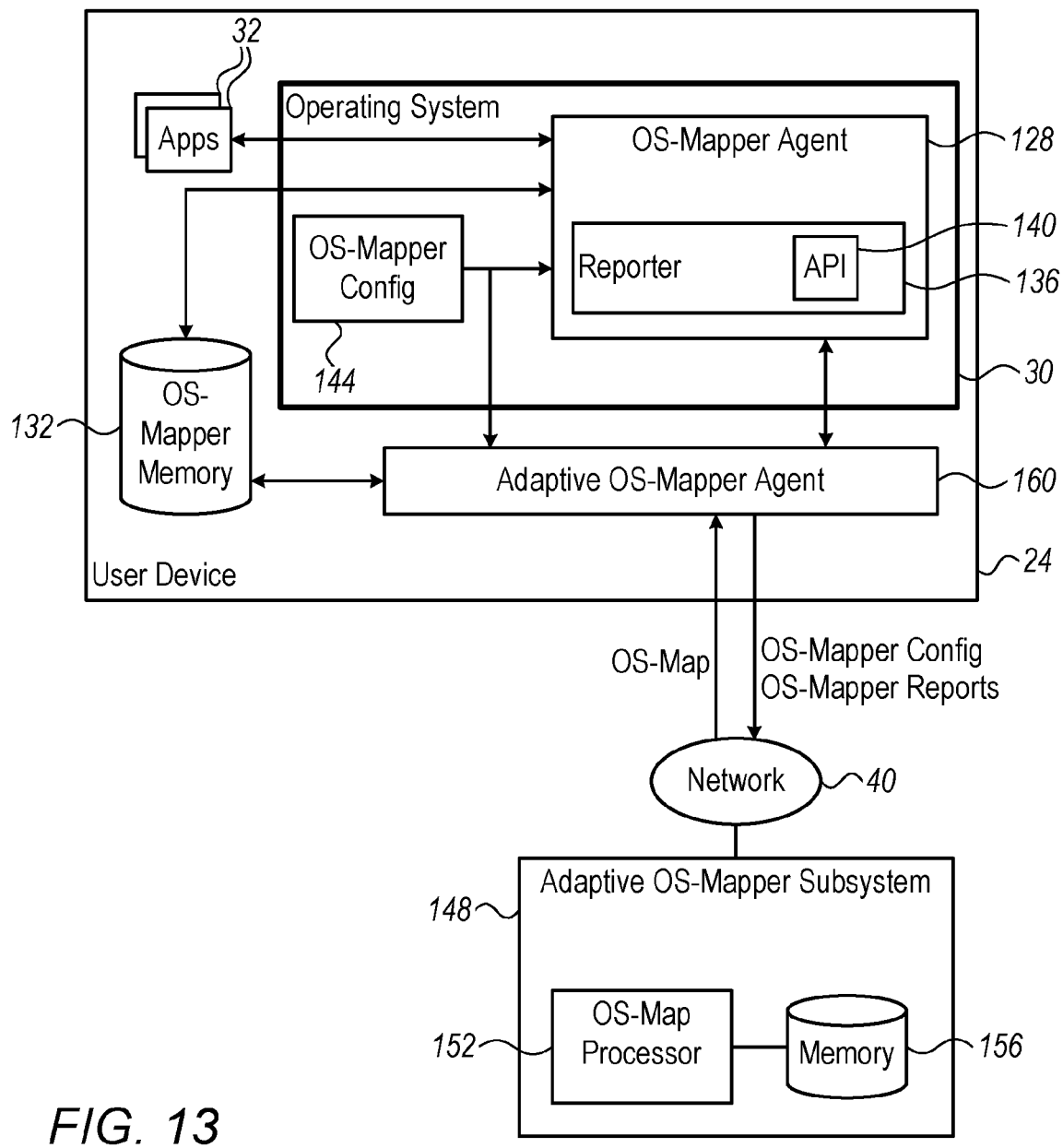
FIG. 13 is a block diagram that schematically illustrates an OS-Mapper providing OS-Mapper functions both inside and outside the OS, in accordance with an embodiment of the present invention.

FIG. 13: High-level block diagram where the OS-Mapper Agent provides basic OS-Mapper functionality in the OS at the User Device, and also supports enhanced OS-Mapper functionality implemented outside the OS.

In some embodiments, the OS-Mapper Agent might be implemented as part of the OS, while the Adaptive OS-Mapper Agent might be implemented outside the operating system on the User Device, e.g., as an app or as an SDK in an app. In this case, the OS-Mapper Agent, which provides basic OS-Mapper functionality, can serve as a platform to enable the implementation of a third party package to support enhanced OS-Mapper functionality. This third party package might include both an Adaptive OS-Mapper Agent at the User Device and an Adaptive OS-Mapper Subsystem in the cloud, as illustrated in FIG. 13.

In the embodiment described in FIG. 13, the interface between the two agents might be implemented through one or more APIs. For example, the OS-Mapper Agent might provide an OS-Map API (not shown) that enables the software agent running outside the OS to provide it an OS-Map. The Reporter API might be used to provide user/device reports to the Adaptive OS-Mapper Agent (and also possibly directly to the Adaptive OS-Mapper Subsystem) that are needed for creating the OS-Map. The Reporter API can also be used, as already described, to provide access to the data stored in the OS-Map for various clients (e.g., Apps) on the user device.

4.4 OS-Mapper Config

The OS-Mapper Config is an optional block. It can hold configuration parameters that control the format and content of the OS-Map. Thus it might configure the operation of the OS-Mapper Agent, Adaptive OS-Mapper Agent, and Adaptive OS-Mapper Subsystem. In some embodiments a user interface can be provided to allow the user to manually configure these settings. This can be done, for example, through a graphical user interface (GUI), or an interactive bot/chatbot. In some cases, the Apps might be able to directly access and adjust configuration settings in the OS-Mapper Config.

Examples of configuration settings that can be recorded in the OS-Mapper Config are:

1. Apps—The identity of the apps which are to be tracked in the OS-Map.
2. Times—The times of day or days of week that should be tracked in the OS-Map.
3. Guaranteed Mode—The times of day that OS-Mapper operation should be prioritized. During these times a user might be guaranteed ongoing notifications of OS-Map updates, or the ongoing updates themselves. This is similar to the prefetch Guaranteed Mode described in [1].
4. Update Rate—The tracking update rate for different data being tracked by the OS-Mapper.
5. Output Granularity—The granularity of the performance metrics and device context information that is made available in the OS-Map. For example, the OS-Map may contain a separate likelihood metric value indicating the probability of a user charging his device for every e.g., 15 minute interval.
6. Contexts to track—The identity of which device contexts to track in the OS-Map can be specified, including events, occurrences, and states relating to the device, the user, the network, or the environment. Examples of contexts that might be tracked were discussed above.
7. Conditioning—The performance and context information being tracked might also be conditioned on certain other device contexts (e.g., being connected via Wi-Fi). The conditioning to use for the device data being tracked might be specified in the OS-Mapper Config.
8. Use Cases—In some embodiments, specific use cases (discussed more in the sequel) might also be enabled through the OS-Mapper Config. For example, if support for prefetch operation is enabled then the OS-Mapper Config might make available much of the MCD Config settings discussed for the OS-MCD module in Section 3.
9. Machine Learning—The use of adaptive machine learning algorithms (supported by the Adaptive OS-Mapper Agent and Adaptive OS-Mapper Subsystem) might be enabled in the OS-Mapper Config.
10. Permissions—For example, the OS-Mapper Config might grant certain apps permission to directly access the OS-Map data and to even directly change configuration settings in the OS-Mapper Config.

In some embodiments, the OS-Mapper Config might offer various combinations of configuration options. For example, some configuration options might be set the same for all Apps, and some might be set differently for different Apps (e.g., whether or not to make use of machine learning).

4.5 OS-Mapper Use Cases

There are many potential use cases for the OS-Mapper. One example is to use the OS-Mapper to supply data that can be used to help predict prefetch policy, e.g., by the OS-MCD module discussed in Section 3. For example, the OS-Map may contain data describing various information related to current and future device performance and status that might be relevant for prefetch policy. This might include, for example, the likelihood of a Wi-Fi connection, the likelihood of a strong/weak cellular connection, the likelihood of the user being served by an expensive roaming network, the charging times, battery consumption and battery level, latency performance metrics, etc. All or this data might be made available through the OS-Map to the OS-MCD module to improve its prefetch decisions.

In some embodiments, the OS-Mapper module might even replace much of the functionality described in Section 3 for the Adaptive OS-MCD Agent and Subsystem in preparing the prefetch policy. In this case much of the key information available in the prefetch policy (e.g., consumption likelihood metrics) might be included in the OS-Map, which can be provided to the OS-MCD module in order for it to make a final decision on what to prefetch and in what context (e.g., when) to prefetch it.

In some embodiments the clients of the OS-Map might only be entities that also reside in the OS (such as the OS-MCD Agent). In this case access to the OS-Map can be provided by the Reporter through a function available to the OS. In other embodiments the Reporter uses an API to provide access to the OS-Map to clients residing outside of the operating system.

In some embodiments the OS-Mapper uses the data in the OS-Map in order to provide the user with current or future device performance or context. For example, the OS-Mapper might report to the user the likely predicted times during the day that Wi-Fi will be available. Alternatively, it might report latency and battery performance for each app as a function of time or place so that the user can assess which apps are exhibiting performance challenges, and when/where these problems might occur.

In some embodiments, the OS-Mapper provides access to the OS-Map in order to provide current and future expected performance ratings to the user. Thus a user might see that in one hour the battery consumption rating is expected to go down (e.g., due to the predicted loss of a Wi-Fi connection)—indicating high battery consumption. In this case the user might try to download the video now, despite not intending to watch it until later in the day.

In some embodiments, the OS-Mapper might provide recommendations to the user. For example, it might suggest the best times of day to watch a video in order to maximize video quality or minimize power consumption. As another example, it might estimate that the user will run out of battery well before he usually charges the device—which might lead to a warning to a user. For example, a user that is playing an online game could be warned that he might run out of battery by a certain time if he continues to play the online game. In other embodiments, the OS-Mapper might simply make the OS-Map available to apps that make such recommendations and warnings to the user.

In some embodiments the Apps can themselves directly access at least some of the information available in the OS-Map. Thus the App developers might take advantage of the availability of this information in order to automatically optimize performance by fine-tuning the App configuration parameters. Alternatively, recommendations can be provided to the user for how to change an apps configuration in order to improve performance.

In some embodiments, background data transfer applications can use the OS-Map to schedule the data transfers during specific times, such as when MODEM battery consumption will be low or a Wi-Fi connection is available. In some cases, the data transfer might be conditioned on device status or context, such as Wi-Fi availability, charging status, etc. Examples of data transfer applications include: cloud backup, social network updates, navigation app updates of traffic or road information, crowd sourcing uplink reports (e.g., a Waze user reporting a traffic accident), messaging downloads (such as WhatsApp text or images), email downloads, and photo/video/music sharing or archiving applications.

In some embodiments, the OS-Mapper Reporters on the User Devices can send reports to the Network Mapper described in [6, 22, 23]. This would enable the network mapper to better map network performance that can be used to improve various communication applications, including prefetch. In some embodiments both an OS-Map and a network map (as described in [6, 22, 23]) can be jointly used to improve communication performance. This might require indicating how much to weight benefits/costs for an individual user versus the benefits/costs for the overall network.

In some embodiments the OS-Map can be used to improve video streaming. In one example, if the OS-Map indicates that the current Wi-Fi connection will soon no longer be available, it might increase the streaming rate in order to build up more video in its buffer. The idea here would be to download more of the video during the most advantageous download times, as described in [6, 22, 23]. In another example, if the OS-Map predicts that the link quality will soon become unstable (e.g., based on location), then the video streamer might automatically reduce the resolution of the video beforehand, in order to avoid stalling.

In another embodiment, the data provided by the OS-Map can be used to help predict network outages. Thus the information provided by the OS-Mapper might be provided to the systems described in [14-15] that enable continued content access during network outages—in order to help predict when the network outage will occur so that action can be taken to prepare for it (e.g., prefetch). Alternatively, the OS-Mapper might directly provide actual network outage predictions to the systems described in [14-15].

In some embodiments, the data provided by the OS-Mapper Agent can be used to help predict when an app will be launched on the device. This data might be provided to enable app preloading in order to eliminate app load latency, such as is carried out by the OS-App-Preloader discussed in Section 5. Thus the functionality described for the OS-App-Preloader might overlap significantly with some embodiments of the OS-Mapper functionality.

In some embodiments the OS-Mapper uses the tracking of device location to learn common device routes and store them in the OS-Map so that it can recognize these routes and better predict future location. For example, if the OS-Mapper recognizes that the current device route matches the route to the nearest supermarket it will be better able to predict the coverage hole that is always encountered on this route well in advance, and to take action to prepare for it (e.g., prefetch). As another example, if the OS-Map predicts your destination to be the supermarket, it might prefetch content to support the user's "supermarket" app, and/or possibly preload it.

Figure 14:
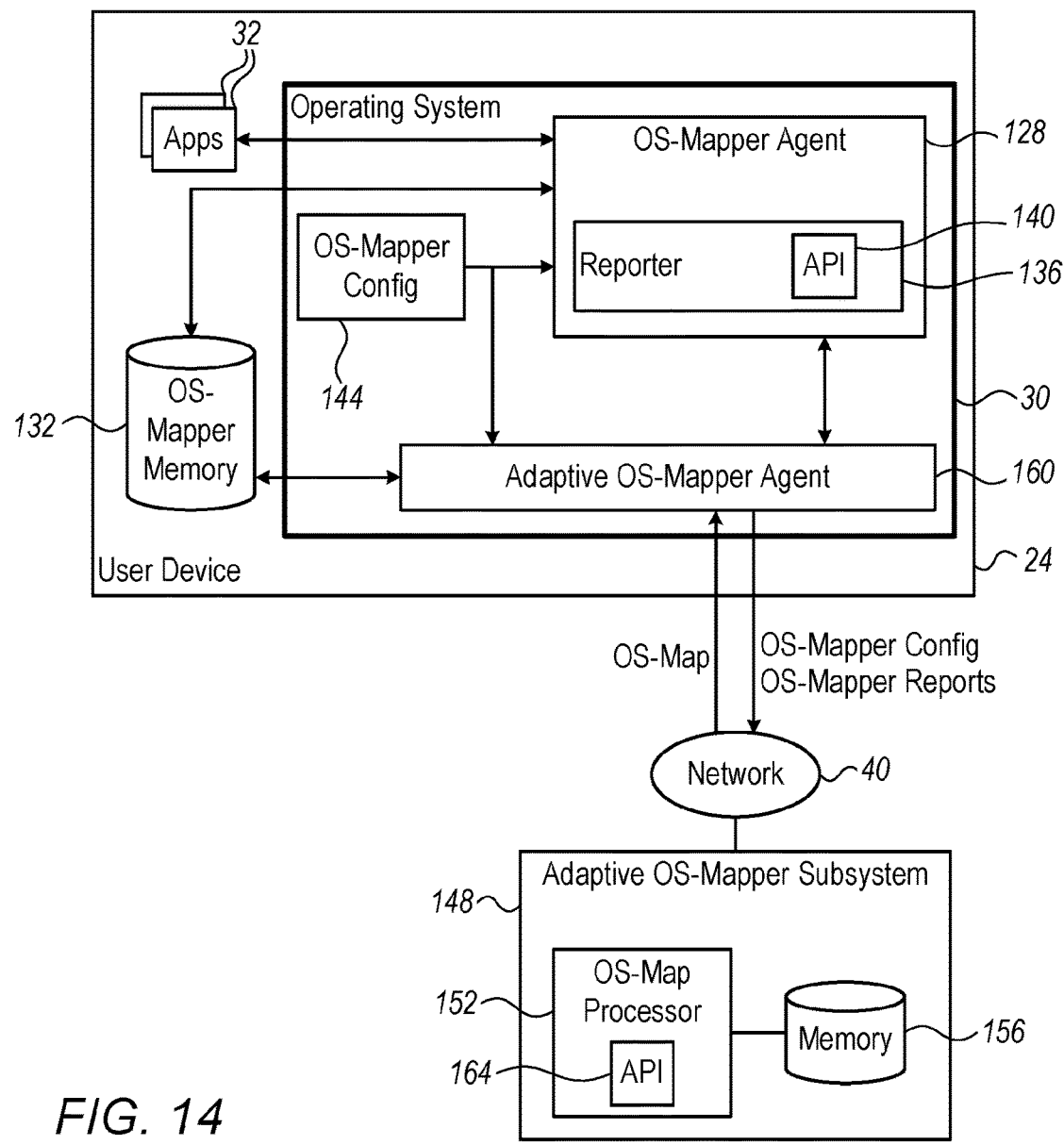
FIG. 14 is a block diagram that schematically illustrates the use of cloud-based API in an OS-Mapper, in accordance with an embodiment of the present invention.

In some embodiments, the data contained in the OS-Map for a particular user or group of users is made available to network clients at the Adaptive OS-Mapper Subsystem. Thus the OS-Map Processor can make available an API that provides access to the OS-Map, as shown in FIG. 14. In this case, for example, network operators, OS vendors, handset manufacturers, or content providers can directly obtain the device performance and context information recorded in the OS-Map through this network-based API.

FIG. 14: High-level block diagram illustrating the use of a cloud API 164 within the overall OS-Mapper module in order to provide network access to the OS-Maps of the User Devices.

4.6 Additional OS-Mapper Variations

The present description has described the functionality supported by the proposed OS-Mapper module. Various embodiments were described in FIG. 11 through FIG. 14. It should be noted that many additional ways are possible to break up this functionality across the different components. For example, in some embodiments, the OS-Mapper might be implemented entirely outside the OS, with some of it implemented outside the device over the network. The specific partitions between functionality implemented in the device itself and functionality implemented outside the device (e.g., in the cloud) described here for the disclosed embodiments represent only some such possible partitions.

5 OS-App-Preloader Module

The process of loading an app involves various tasks that take time. Some of this delay is due to the time it takes to access the content associated with the app's initial screen (e.g., the feed) from the content source over the network. This delay can be eliminated by the prefetch functionality supported by the OS-MCD Agent described in Section 3. However, there are other significant sources of delay, such as OS process initializations, app memory and code initializations, and rendering the display. These tasks often translate to significant app load delay even when the content is already locally available at the device, which degrades the user experience.

Embodiments of the present invention provide a new OS-based module—an OS-App-Preloader (48 in FIG. 1)—that predicts at which context an app might be accessed by a user and preloads the app beforehand, so that a request to launch the app will execute without delay.

The preloading of an app might include some or all of the initial tasks that must be performed before the app is ready to be used. This can include, for example:

1. Initializing the OS process that will be associated with the app's instance
2. Loading the app code into RAM from memory possibly including some application data
3. Running some initial components of the code, e.g. the code associated with the Android Application class, the initialization steps of the app (some or all).
4. Running prefetch for at least some of the content needed for the app launch (e.g., at least the content associated with the initial visible display).
5. Running pre-render where components associated with the visual display are pre-rendered and possibly created in the background (but not displayed).

An additional step that might be executed as part of preloading of an app might be to actually display in some way the app (or a portion thereof) to the user (i.e., before he actually clicks on the app). However, implementing this step has the potential to interfere with the user's activities, and should therefore only be carried out with great caution. Thus we focus here on the 5 steps above.

Note that Step 3 above can be further subdivided into two types:

a) Running generic initialization code which does not include executing any activities (e.g., the Android Application class associated with an app). This can be triggered by the OS-App Preloader module generically without any customized code based on the specific app.

b) Running some of the activities associated with the app. This typically needs customized code based on the specific app to be triggered.

Note also that Step 4 above can also be further subdivided into two types:

a) Prefetching the domain name resolution for links of at least some of the content needed for app launch (without actual prefetching the content). This is discussed further in Sec. 5.7.

b) Prefetching the actual content needed for the app.

Note further that the focus of the initial discussion here is on preloading an app (or part of an app) in order to eliminate latency from the app launch. However, similar preload steps and techniques described here apply also to preloading in-app content, such as articles and/or videos. Obviously, implementing all the above steps ahead of time would provide the fastest possible load time. In some cases, a large improvement may be achieved by implementing only some of these steps. The overall latency breakdown is application dependent and device dependent. For example, very large applications executed on devices with slow flash memory may be mainly constrained by Step #2 above (the time it takes to load the app from the flash memory to the RAM). In such cases, it might be preferable to limit the app preload to implementing only Step 2. In other cases, all five steps may be needed to get a significant improvement. In this disclosure, we cover all the variety of options in implementing some or all of these steps. Also, for some apps not all steps may be relevant. For example, the pre-launch of a dialing app does not involve any content pre-fetch. The specific implementation of the above steps can vary greatly and below we discuss a few possible embodiments. For example, Steps 1 & 2 (and 3a) can be straightforwardly implemented by the OS without any special API to be used by the App developer. The other steps are trickier and an API can simplify things (but is not a must). These issues are further discussed below.

The frequency of performing each of these steps may differ. In addition to preloading an app, the OS-App-Preloader module can also refresh an already loaded app in the background when necessary so that the app remains ready to be launched without delay. In this respect, Steps 1, 2 and 3 above would be performed once (when the app was loaded) while Steps 4 & 5 would be performed many times (each time a refresh is needed, e.g., each time there is a new content in the visible part of the feed).

A key element of the app preload defined here is the fact that the preload does not impact the app's data analytics (include ad analytics). Content providers typically calculate various analytics that track app and content usage, including how much each user utilizes the app, what content links the user chooses and which links he does not choose, what content the user is exposed to and spends time viewing (or doesn't spend time viewing), what ads the user is exposed to and actively responds to (or doesn't respond to), etc. It is thus important that the background preload of an app, which the user may not even be aware of, is not confused with a full launch of the app in order to preserve the integrity of the app's data (including ads) analytics calculations. Note that some of the above steps are more prone to impact the app's analytics than others. For example, Steps 1 & 2 typically have no effect on the analytics, and can thus be performed without any special measures. Steps 3, 4 and 5 sometimes affect the app analytics and must therefore be handled with care. The case of ad analytics can be particularly challenging since today in many cases simply asking the server for the ads to display can cause the ad to be counted as having been served. Similar challenges might also occur in some cases involving the user interface (UI). For example, if each time a user accesses an app the number of "new items" is reported (i.e., new items available since the last user access) then simply requesting an app preload might reset the "new items" counter.

In many embodiments, the app preload takes place in the background and does not affect the device display. Thus the user might continue to use the device for other tasks without being aware of the app preload taking place at the same time.

It should be emphasized that the app preload techniques disclosed herein are not necessarily connected to network access, which is often assumed to be the bottleneck. In many cases, all the content that is needed from the network already resides in the device—possibly, but not necessarily, as a result of prefetch. In some cases, even if the content is not yet locally available and a network fetch is necessary—it still might be desirable to carry out some of the preload steps listed above (even without prefetching the content) in order to save at least part of the app launch delay. Furthermore, there might be cases where network access of the necessary content is very fast and does not affect the user experience as much as the other steps involved in launching the app.

In some embodiments, the OS-App-Preloader Agent keeps track of the preload status, i.e., which preload steps have been carried out and don't need to be repeated and which steps have not yet been carried out. Then when the user accesses the app (or when a refresh is triggered) the OS-App-Preloader Agent can execute the steps that have not been carried out (based on the tracked preload status of the app).

In further embodiments, preloading an app to RAM includes tracking the app content and user interface status so that a subsequent user app launch request will properly execute any required content and user interface updates that are necessary.

The OS-App-Preloader module can be implemented in the OS by e.g., an OS vendor or a handset manufacturer. One specific embodiment of the OS-App-Preloader module described here would be for the Android operating system. Another specific embodiment would be for the iOS operating system.

There are a variety of applications where an app preloader could be used to enhance the user experience, such as a simple dialing app, a messaging app, a news app, a social network app and more. All can benefit from the preload functionality.

5.1 Basic OS-App-Preloader Functionality

Figure 15:
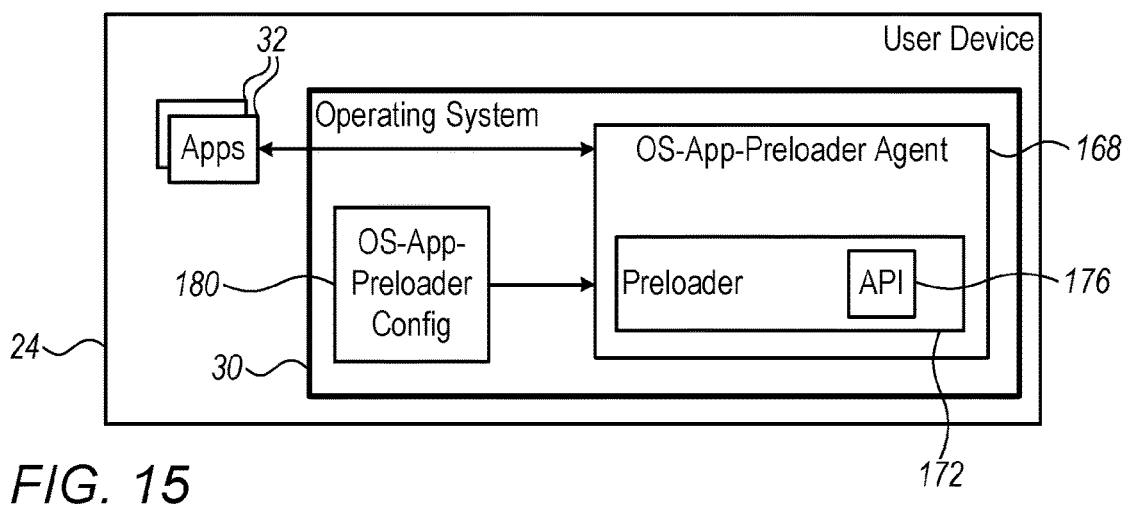
FIG. 15 is a block diagram that schematically illustrates an OS-Application-Preloader, in accordance with an embodiment of the present invention.

FIG. 15: A high-level diagram illustrating basic functionality of an OS-App-Preloader.

A high-level block diagram illustrating one basic embodiment of the OS-App-Preloader functionality is shown in FIG. 15. The components shown in the figure support basic OS-App-Preloader functionality, including determining which apps to preload and in what device context (e.g., when) to preload them.

1. OS-App-Preloader Agent 168—This Agent is a software component that runs within the OS and supports basic OS-App-Preloader functionality at the User Device. It creates a preload list which defines which apps to preload and in what context (e.g., when) to preload them. Note that the use of the term list is not meant to restrict the structure or format of the preload list (e.g., it does not exclude conveying the information in a graph format).

2. Preloader 172—The Preloader portion of the OS-App-Preloader Agent carries out the preload of the apps based on the preload list prepared by the OS-App-Preloader Agent. It provides an API 176 to the Apps so that they can provide the necessary code to carry out the minimal steps needed to support instantaneous app launch. This includes being able to differentiate between an app launch and preload, such as making sure the preload does not impact the data analytics calculations (including ad analytics).

3. OS-App-Preloader Configuration 180—The operation of the OS-App-Preloader is configured according to the settings in the OS-App-Preloader Config. These settings can be based partly on default settings supplied by the OS vendor or handset manufacturer. Alternatively, it can be at least partly provided by a user through some user interface. For example, a graphical user interface can be provided to the user to input the settings. In some embodiments the preload list prepared by the OS-App-Preloader Agent is based at least partially on the OS-App-Preloader Config settings.

As already mentioned, one of the steps that might be included in a preload operation is to pre-render the content display. In this case, components associated with the visual display are loaded and the visual interface is created in the background (but not displayed).

One approach to creating the visual display in the background is to enable the building of the visual display for the app while it runs in the background. Then when the user accesses the app, it can be immediately moved along with the ready display to the foreground. An alternative approach would be to direct the rendering results to a virtual display. In the latter approach, when the user accesses the app, the virtual display would be transferred to the actual display without delay. In either case, the OS-based Preloader ensures the display is kept in the background—that is, the code provided by the app developer (through the API) to accomplish pre-render would in general be the same as the code for rendering the display in the foreground (with some exceptions discussed below).

The pre-render step might include prefetching all necessary content related to the display. Alternatively certain content might not be prefetched and might simply be represented by a place-holder image on the screen [36].

In some embodiments, multiple pre-rendered displays can be maintained in the background so that the user can instantaneously switch back and forth between apps/screens.

A preload (and refresh) operation should generally be carried out in a way that differentiates it from a regular launch operation in a number of ways:

1. The data analytics calculations should not be affected, including both app usage analytics, content usage analytics, advertising analytics.

2. It should avoid generating ad impressions in the case that this automatically causes the ad to be counted as having been served.

3. It should avoid skewing what is presented to the user (UI effects), such as affecting the number of "new items" reported to the user (since last access).

4. It should avoid running repetitive code, such as java scripts that fetch new data and update the UI every few seconds.

5. It should preferably take place in the background without any user action and without interfering with user activity (visually or otherwise), other than perhaps adding an additional minimal load on the CPU which does not degrade the user experience.

6. It should preferably take place without impacting the "Recent Apps" list that indicates which apps have recently been accessed by the user.

7. If the OS maintains an activity stack, then the loading (and refreshing) of the app should preferably take place in a way that preserves the order of the windows in the activity stack.

8. The LRU (Least Recently Used) metrics saved by the OS per process should preferably also not be affected.

Thus the code supplied by the apps to preload (or refresh) should ensure that the above conditions are implemented.

In some embodiments, the app might be passive and not supply code for preload through the Preloader API. Techniques to handle this case are described in Sections 7.3 and 7.4.

In some embodiments, pre-render functionality might be added at the OS level for a supported web page display package, such as Webview. In other embodiments, pre-render functionality might be added through a third party library.

There are many examples of data related to device context that might influence the decision on whether to preload (or refresh) an app (including prefetching content for the app)

1. Day of week or time of day

2. Device location—e.g., based on GPS coordinates or serving cell ID. For example, you might be more likely to use certain apps at work, at home, at the supermarket, or at the park.

3. Device sensor data such as device movement, velocity, orientation, screen status, light exposure, external temperature, background noise level, etc. For example, if sensor information indicates outside exposure to sunlight then apps used outdoors would be more likely candidates for preload. As another example: if sensor data indicates that the device is in a dark room and not moving, this probably indicates that the user is sleeping and app preload is unnecessary. An additional example: preload of certain apps might be triggered if User Device movement is detected. (Additionally, the amount of time the device was not moving before movement begins might be taken into account. For example, preload might be triggered specifically in the case where the device begins to move after not moving for a couple of hours.) An additional example: if the device is moving at vehicle speed, then certain apps (e.g., a navigation app) might be triggered for preload. An additional example: preload of certain apps might be triggered upon user activation of the User Device screen.

4. Battery level—A user is probably more likely to avoid opening apps if his battery level is very low, which means that there is less chance that preloading an app will be useful. Furthermore, there is less tolerance for wasting battery for false preloads when the battery level is low. Thus the criterion to choose preload might become stricter as the battery level goes down.

5. Battery charging status—For example, if the battery level is low such that preload would normally be disabled, but the device is currently charging then preload operation might be enabled.

6. RAM usage—If the device RAM is already full of high priority running processes (e.g., loaded apps that the user is currently using or has recently used) then the conditions to trigger preload might become stricter. In other words, only apps that are estimated to have a high enough preload priority might be preloaded if it means that other background processes with relatively high priority might be forced to close to make room for the preloaded app.

7. Type of network connectivity—For example, certain apps with large data download demands (e.g., a video streamer) might be more likely to be utilized if the user knows that his network connection comes through Wi-Fi. Another example: a user might be more apt to use certain apps requiring heavy content download when connected to a low-power pico-cell hot spot. Another example: a user might be more apt to use certain apps when connected to better performing cellular 4G LTE networks (as opposed to cellular 3G networks). This could also be extended to the quality of the network connection (e.g., the available download speed). For example, a user with a low data-rate cellular connection might be unlikely to stream videos, and thus the decision might be to not preload a video. On the other hand, if a high data-rate cellular connection is available, then the decision might be to preload a video.

8. Alarm—For example, a user might want certain apps to preload shortly before his morning wakeup alarm goes off.

9. Device lock status—For example, if the phone is locked it might not pay to preload certain apps. As another example, certain apps might be chosen for preload when the user unlocks the device. Another example: the decision to preload might depend on how recently the screen was locked or activated.

10. Arrival of new app data from over the network—In some cases the arrival of new data might indicate that the user is expecting the new data and is likely to open the app. For example, a user might subscribe to an app that provides live sports score updates. The arrival of an update would indicate that there is an ongoing game and that the user is likely to check the score at some point. In this case it might make sense to preload the app. In some cases the arrival of new data is visually indicated to the user—making it even more likely that the user will open the app. For example, if the user's messaging app (e.g., WhatsApp) or email app (e.g., Outlook) indicate the arrival of a new message, then there is a very good chance the user will open the app soon after the message arrives. In this case, it might make sense to trigger a preload of the app soon after the message arrives.

11. The arrival of a notification at the device—If an app sends a notification to the user, this typically increases the likelihood of the user accessing the app—particularly if the user is alerted to the notification (e.g., visually, through vibrating, or by beep or other sound). For example, if a news app sends a breaking news alert, the likelihood that the user will open the news app typically increases. In addition, just the fact that the user has enabled alerts for an app on his device can be used as an additional indication that the user is more likely to access the app. In some cases, even when the user has not enabled alerts on the device, the mere arrival of a notification (e.g., breaking news) might indicate the occurrence of an important event that will eventually cause the user to launch the app.

12. Current events—This includes events such as breaking news or sporting events.

13. App version—The OS-App-Preloader module might support preload functionality only for certain versions of an app.

14. User activity—In some cases, preload might be blocked or stopped in the middle of execution if certain types of user activity are initiated. For example, if the overall level of user activity is very high, then preload operation might be blocked to avoid interfering with user activity. In general, such a decision to block preload might be based on the resources needed to support the user's current activities (e.g., current running app or apps) along with the resources estimated to be used in a potential app preload.

15. App launch—In some cases, the preload of an app might be triggered when another app is launched (or accessed) by the user. For example, if the user usually checks Facebook for updates after checking gmail, then the launch or access of gmail might trigger the preload of the Facebook app.

16. User's usage history of the app

17. Other users' usage history of the app, including current usage. This might include identifying other users that have similar app access behavior to the user for whom the likelihood metrics are being estimated.

18. Amount of new or updated content at the Content Source—For example, if a significant amount of content has been added or changed at the Content Source in a short period of time, this might indicate the occurrence of important events—thus potentially increasing the likelihood that the user will access the app. Alternatively, the amount of new or updated content might be measured since the last time the user accessed the app.

19. A prior request by the user to kill the app—If a user attempts to kill an app, e.g., by swiping off the app from the Recent Tasks list, then this might be used as an indication that the user is less likely to access the app. In some embodiments, however, if the likelihood of user access is sufficiently high based on other factors, then the app might be preloaded even though the user has recently attempted to kill the app. In further such embodiments, a user's attempt to kill an app might even directly result in the app being preloaded in the background, without ever being killed.

In various embodiments, these and possibly other factors are used as input features to a machine learning algorithm in order to estimate the likelihood that the user will access an app (and possibly when he will access it). This is discussed more in the sequel (e.g., Sec. 5.3). These likelihood metrics can be used to help make prefetch, preload, and/or app refresh decisions.

In some embodiments of the present invention the apps to consider for preload, and the contexts in which to preload them might be largely defined based on the settings in the OS-App-Preloader Config, possibly directly by the user. For example, the user might define preload based on time of day, day of week, location (including specifying "home" or "work" locations), alarm, device lock status, device movement, etc. In other embodiments, the OS-App-Preloader Agent might also collect app usage data and carry out a certain amount of basic data processing in order to help determine the preload decisions listed in the preload list passed to the Preloader. For example, if a user opens the navigation app Waze every workday between 8:00 and 8:30 am, then the OS-App-Preloader might automatically add Waze to the preload list for preload at 8:00 am between Monday and Friday. Note that in some embodiments, the app usage data collected by the OS-App-Preloader Agent might come from the OS-Mapper discussed in Section 4.

In some embodiments, several apps might be preloaded (or refreshed) simultaneously, for example, by loading them all in the background. In some embodiments the app might need to provide multiple preload options for a single app. For example, for some apps an interstitial ad (full screen ad) is launched when the app is invoked by the user. Then when the user closes the interstitial ad, the app content is loaded. Such an app might need to provide the Preloader with both code that preloads the app interstitial ad (without affecting ad analytics, if possible) and code that preloads the app content (without affecting app content analytics). In this case, the OS also should keep track of the status of the preload and the fact that the ad has not yet been displayed. Then when the user accesses the app, the ad should be displayed and the proper ad analytics should then be generated.

Another example of when multiple preload options might be needed for a single app is when the app can be loaded in different contexts (i.e., with different entry points). If an app is likely to be used in a certain way—but not in other ways, then it might makes sense to do the minimal preload necessary to only support the particular app usage that is likely to occur. For example, a social network app such as Facebook might notify the user when he receives a message and provide an option to immediately open the app with the message displayed. In this case, it might be more likely for the user to open Facebook to view a message than to open Facebook to view his feed. Thus the Facebook app might provide one instance of preload code for opening up Facebook to view the feed, and a separate instance of preload code for opening up Facebook to view messages. In each case, the Preloader might execute only the minimum operations needed to support the initial user app access.

Another example of when multiple preload options might be needed for a single app is when the app can be loaded with different tabs displayed. For example, a publisher's app might normally load with a business tab displayed (with business content) during the week for a particular user but load with a sports tab displayed on weekends. The Preloader might allow this publisher's app to provide two different versions of the app preload code to support these two types of app launch. In this case, there would be separate entrees for each type of launch in the calculated preload list (and in the preload policy discussed in the sequel).

In some cases, the preload list might determine that some of the preload options should only be executed "just-in-time", similar to the JIT prefetch option discussed in Section 3.53.5. For example, in the above Facebook example, if a user usually checks his feed after reading a message, then the preload list might indicate that the feed preload should be triggered whenever the user reads a Facebook message. Similarly, additional components of the Facebook app might be preloaded when the user accesses his feed—based on what app links are available from the feed page.

5.2 In-App Content Preload

The focus of the discussion here has been on preloading an app (or part of an app) so that the initial app launch is carried out without delay. However, similar techniques to those discussed here apply also to preloading in-app content, such as articles and/or videos. For example, an article that is considered very likely to be accessed by the user might be prefetched and pre-rendered ahead of time. If the article is being displayed via a web view, the web view function may be called in the background so as to be ready for instant display. Similarly, if a video is considered very likely to be accessed by the user, the video player might be pre-launched in the background with an initial segment of the video.

Various techniques are discussed here to avoid skewing data analytics (including ad analytics) when preloading app code. Similar techniques can also be applied for the case of preloading in-app content.

In some embodiments, In-App content preload can be implemented using an API provided to App developers (to supply the necessary inputs, possibly including callback functions), whereas in other embodiments it could be implemented without an API by the OS itself.

5.3 Enhanced OS-App-Preloader Functionality

Figure 16:
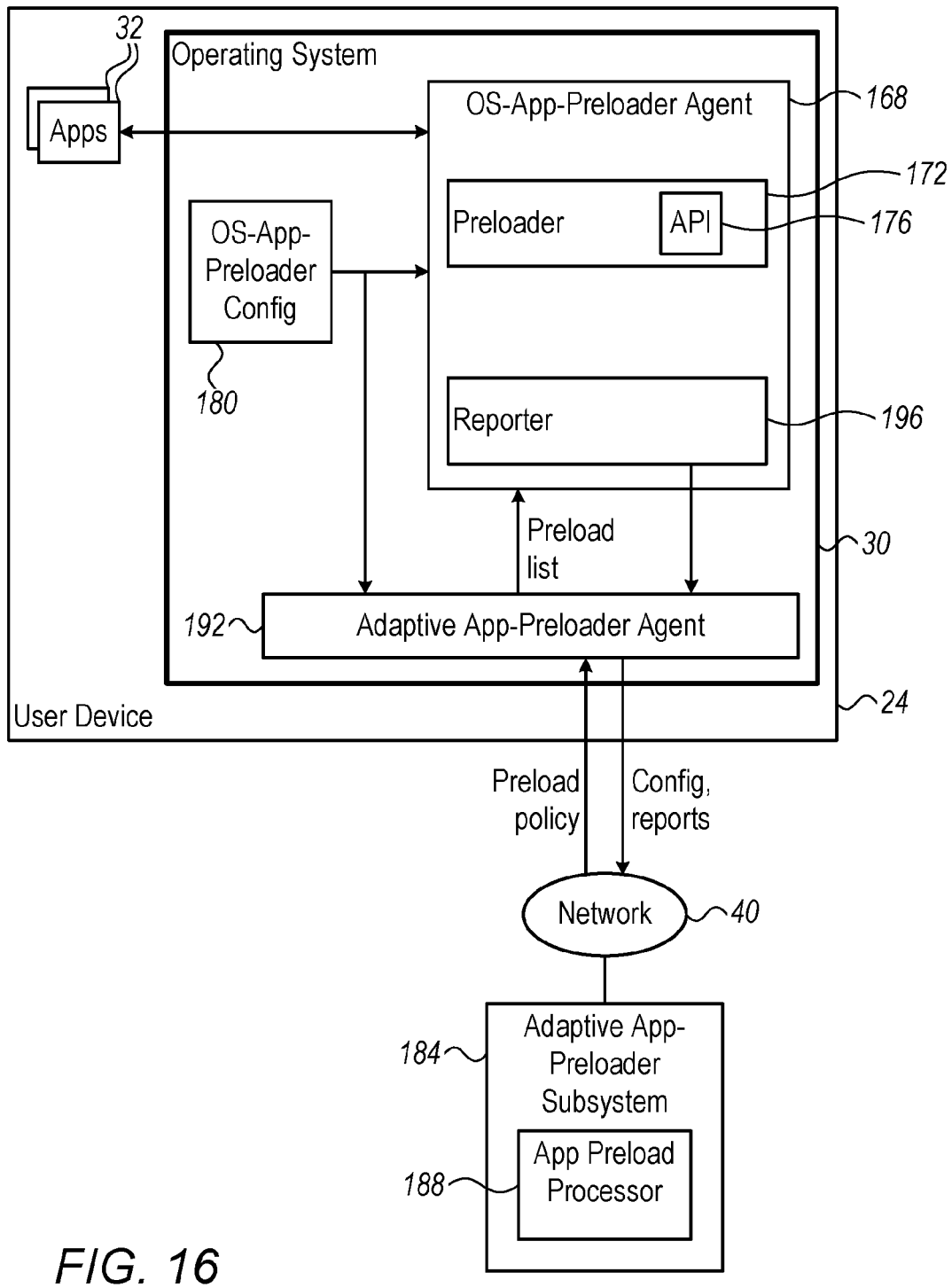
FIG. 16 is a block diagram that schematically illustrates an OS-Application-Preloader supported by cloud-based adaptive processing, in accordance with an embodiment of the present invention.

FIG. 16: High-level block diagram illustrating enhanced OS-App-Preloader functionality, supported by adaptive processing in the cloud.

The full potential of the OS-App-Preloader functionality can be realized when supported by sophisticated adaptive algorithms, e.g., machine learning algorithms. These machine learning algorithms can be used, for example, to better determine app preload policy, e.g., to determine what apps to preload and at what device contexts to preload it. Examples of such device contexts were given earlier, including time of day, device location, and device sensor status. These adaptive algorithms are used to estimate metrics that predict the likelihood that a user will access a particular app, and potentially when it will be accessed. An example embodiment of this approach is shown in FIG. 16 above, which includes the following components:

1. Adaptive App-Preloader Subsystem 184: This subsystem can be implemented at a physical or logical server available over the network. In a typical embodiment, all or much of the Adaptive Machine Learning Algorithms are implemented at this subsystem in order to create a preload policy to send to the User Device.

2. App Preload Processor 188: This component runs in the Adaptive App-Preloader Subsystem and receives the OS-App-Preloader configuration settings and reports from the devices. The App Preload Processor employs adaptive algorithms, e.g., machine learning algorithms, based on the reports it receives from the user devices in order to determine preload policy. The preload policy includes all relevant information gathered or produced at the Adaptive App- Preloader Subsystem in the cloud that should be sent to the User Device in order to determine what apps to preload and when (and in what context) to preload them. This allows the final preload decision to be taken at the User Device, thus enabling the most up to date information at the User Device (e.g., sensors status) to be taken into account. For example, if the battery level is extremely low at the device the Preloader at the device might not preload the app despite preload policy indicating a high likelihood of user access. In some embodiments, the preload policy may include user-specific likelihood metrics indicating the likelihood of user app access as a function of time, location, and other device contexts. For example, the access likelihood for a particular app might be very high when the user is at a work location in the afternoon, but very low otherwise. Similarly, the access likelihood for a particular app might be very high when another particular app has been recently invoked. As another example, the likelihood metrics might include an estimate of when the user will likely use the app. Thus if the user is not expected to use the app until the evening, then loading the app in the afternoon is probably inefficient if the content and user interface are expected to substantially change before the user actually accesses the app. All of these preload metrics, rules, and strategies might be captured in the preload policy. In some embodiments, the preload policy might be coupled to the prefetch policy. For example, a refresh of an App might be triggered each time a prefetch is completed that includes content affecting the initial display of the App. The potential coupling of preload and prefetch policy is discussed further in Section 5.10.

3. Adaptive App-Preloader Agent 192: This Agent at the User Device is an extension of the Adaptive App-Preloader Subsystem implemented in the cloud. It might receive OS-App-Preloader reports from the Reporter and forward this on to the Adaptive App-Preloader Subsystem (along with the OS-App-Preloader Config settings) in order to enable the calculation of preload policy. In a typical embodiment, this preload policy is then sent to the Adaptive App-Preloader Agent at the device. The main function of the Adaptive App-Preloader Agent is to provide the OS-App-Preloader Agent with the final preload decisions through a preload list, which indicates what apps should be preloaded and when they should be preloaded. In some embodiments adaptive machine learning algorithms can also be implemented by the Adaptive App-Preloader Agent at the User Device, in order to improve the preload decisions. In these embodiments, some of the inputs to the machine learning algorithms might include the most recent user activity or device state/sensor information. The OS-App-Preloader Config settings might also be taken into account by the Adaptive App-Preloader Agent in determining the preload list. In some embodiments, adaptive machine learning algorithms can be carried out at the Adaptive App-Preloader Agent without (or with minimal) additional machine learning algorithms in the cloud. In some of these embodiments the Adaptive App-Preloader Agent may function without any cloud Subsystem. In some embodiments the OS-App-Preloader Agent and the Adaptive App-Preloader Agent might be merged into a single Agent supporting their respective functionalities.

4. Reporter 196: An optional Reporter component can be activated as part of the OS-App-Preloader Agent functionality. The Reporter collects critical User Device-based information that can be used to better determine preload policy. This might include things like user location, user interests, recent and historical app usage activity, recent and historical internet usage activity, recent and historical device sensor information (such as velocity, exposure to light, external temperature, background noise-level, etc.), and network conditions experienced by the user. The OS-App-Preloader Agent makes all of this information available for sophisticated adaptive machine learning algorithms that can be used to set preload policy. In some embodiments the Reporter collects user, device, and/or network information from generally available APIs or OS functions and makes it available to OS-App-Preloader clients. The Reporter might also track and make available changes to this information over time. In some embodiments, the Reporter processes this information in order to make it available in a form which is useful for the adaptive algorithms implemented at the Adaptive App-Preloader Agent and the Adaptive App-Preloader Subsystem. In some embodiments, the Reporter tracks the user internet and app usage activity through the OS-App-Preloader Agent intercepting the access requests of the user. In other embodiments internet and app usage activity is provided as a service from the cloud (e.g., Google Analytics), where detailed website traffic statistics are calculated and made available. In further embodiments, an API is available at the Reporter (not shown) for the apps to directly report user app activity and possibly relevant associated metadata. In yet further embodiments, a single Reporter component running in the OS at the User Device might be used by both the OS-MCD module described in Section 3 and the OS-Adaptive-Preloader module.

The oval in the figure represents the network providing the communications connectivity between the various components in the figure. This network may comprise, for example, the Internet, a Local Area Network (LAN), a wireless network such as a cellular network or Wireless LAN (WLAN), or any other suitable network or combination of networks.

The Adaptive App-Preloader Subsystem typically has substantially more processing power than the User Device. Thus although the Adaptive App-Preloader Subsystem is optional, it is a critical component for enabling the realization of the full potential benefits from the OS-App-Preloader module. It enables the use of powerful machine learning algorithms in order to optimize the preload decisions. In addition, the processing that takes place at the Adaptive OS-App-Preloader Subsystem can take into account information gleaned from other users (e.g., "crowd wisdom"). Thus each user can benefit from data reported from other users—either implicitly through machine learning algorithms (e.g., that exploit underlying correlations between user data) or explicitly based on some common attribute. For example, if many users in a given area are suddenly opening their CNN app, then the preload priority of the CNN app for other nearby users in the same general area should go up.

In some embodiments, some users might not make certain information available to help calculate the preload policy for other users. For example, a user might not report its app usage activity to the cloud so that it can be used in the calculation there of preload policy for any user. In some such cases, the information might not even be available for calculating the preload policy of same said user. This might occur, for example, if the user does not give permission for reporting app usage activity (or other user/device related information), possibly due to privacy concerns. In such embodiments, the calculation of the user's preload policy might continue to take into account "crowd wisdom" based on the reports of other users. Alternatively, the use of other user reports in calculating preload policy might not be permitted unless the user enables similar such reports. Thus the user might be encouraged to allow reporting by being informed that this will enable access to similar other users reports when calculating preload policy (leading to improved preload performance).

In yet additional embodiments, a user that has disabled preload might continue to report its internet usage activity so that the preload policy for other users can benefit from the crowd wisdom, despite the fact that preload policy is not needed for said user with disabled preload. In some embodiments the Adaptive App-Preloader Subsystem might notify the Adaptive App-Preloader Agent at the User Device if a significant change in the preload policy is detected. A significant change might be the addition of a new app that is considered a likely candidate for preload. It might also be a significant change in the access likelihood metrics for apps in the preload policy (including changes to when and in what contexts an app is likely to be accessed), or any other metrics or metadata included in the policy that might affect preload priority. If such a change is detected, a preload notification might be sent to the User Device through a variety of notification methods, such as the popular Google Cloud Messaging (GCM)/Firebase Cloud Messaging (FCM) used for Android devices, and Apple Push Notification (APN) used for iOS devices.

The Adaptive App-Preloader Agent can request and receive from the Adaptive App-Preloader Subsystem an updated preload policy. It can then decide whether to issue a preload request based on this policy and various other relevant factors about its current state (e.g., battery level, device orientation and movement, etc.) It might also take into account whether the content needed to support the app launch is already locally available on the device. For example, if the needed content is not locally available, and the device is found to currently have no network connection, then it often does not pay to preload the app, since anyway the app cannot be accessed until network connectivity returns. The final preload decisions are passed on to the OS-App-Preloader Agent through the preload list.

In some embodiments, the Adaptive App-Preloader Subsystem can send a preload policy update directly in the preload notification sent to the device.

In some embodiments, an update of a preload policy is sent differentially to the User Device. In other words, a patch to update the preload policy is sent which only (or mainly) contains the changes to the preload policy. Using differential updates also increases the likelihood that the updates will be small enough to fit inside the preload notifications themselves.

In some embodiments the Reporter sends its information to the Adaptive App-Preloader Agent, which forwards it to the Adaptive App-Preloader Subsystem. In other embodiments, the Reporter directly reports its collected information to the Adaptive App-Preloader Subsystem. The specific types and formats of Reporter information that should be sent might be configured in a configuration file (e.g., saved and accessed by the Adaptive App-Preloader Agent), along with the destination address for the reporting (e.g., address of the Adaptive App-Preloader Subsystem). This configuration might also be defined or referenced by the OS-App-Preloader Config.

The Reporter might combine/compress historical app and internet usage activity across multiple apps to enable efficient reporting to the Adaptive App-Preloader Subsystem. This information can be jointly used to better predict preload needs for each individual app. For example, a user that has recently downloaded a movie is more likely to soon access the movie player app on his device.

In some embodiments the functionality described for the OS-App-Preloader Agent and the Adaptive App-Preloader Agent can be split differently. For example, a single Agent can be implemented that includes the functionality of both agents.

5.3.1 Additional Factors

In some embodiments, additional factors can be taken into account besides the likelihood metrics when deciding whether to preload (or refresh) an app. Examples include:

1. The amount of locally cached prefetched content that supports the app load. For example, if all or much of the content to support the app load is already available at the device, this increases the desirability to preload the app, (possibly including prefetching missing content).

2. Whether the app regularly synchronizes its content and/or its user interface with the app server. For apps that automatically update, leaving the app loaded in the background automatically ensures that it remains synchronized with the app server. An example of this is the Gmail app, which automatically regularly updates its content and user interface in the background.

3. The relevance of aged app content to the user. An app whose locally available content (cached at the device) is completely out of date and irrelevant to the user, might be a less desirable candidate to preload, especially if a content prefetch is not going to be carried out as part of the preload. For example, preloading the CNN app so that a user launch initially brings up yesterday's news is much less useful than preloading the Facebook app, where yesterday's content is more likely to be of interest to the user.

4. The availability of a network connection to the app server. If a network connection is not available, and the locally cached content supporting the app load is insufficient or irrelevant, then this would make the app a less desirable candidate for preload.

5. Battery, CPU, and/or RAM resources. This might include the resources required by the app to be preloaded, as well as the current and future predicted resources needed by other apps.

6. Process Priority. This includes the priority of the preload candidate app process, and priorities of other app processes currently running on the device.

7. The potential latency savings when the app is accessed by the user.

8. The type of network connection currently available. For example, if Wi-Fi is currently available it is a favorable time to execute a preload where the required content needed to support the app is prefetched.

9. The quality of the network connection currently available. For example, if a strong cellular connection is currently available, it is a favorable time to execute a preload where the required content needed to support the app is prefetched.

10. The type or quality of network connection expected to be available in the future. For example, if a better network connection is expected to be available before the user accesses an app, then it might be decided to postpone executing a preload until the better network connection is available.

11. The likelihood of a network outage occurring in the future. If a network outage is expected to occur in the near future, then it might be decided to preload the app now, in order to prefetch the required content needed to support the app.

12. Content Source update rate—If an app's Content Source changes at a very high update rate, it might not be efficient to preload the app, since it is more likely that the user will access the app after the current preload becomes out of date (e.g., the content or the user interface or the application data becomes out of date).

13. Expected time of access—If the potential time of access is not for a significant amount of time, then the decision might be to delay preload even if the likelihood of access is very high. For example, if the user is not expected to access the app within a short time, then the chances that a preload will become out of date before the user finally accesses the content is higher.

It should be noted that many of these factors might also be taken into account by the OS-MCD module, e.g., when making prefetch decisions.

5.4 Enhanced OS-App-Preloader Platform

Figure 17:
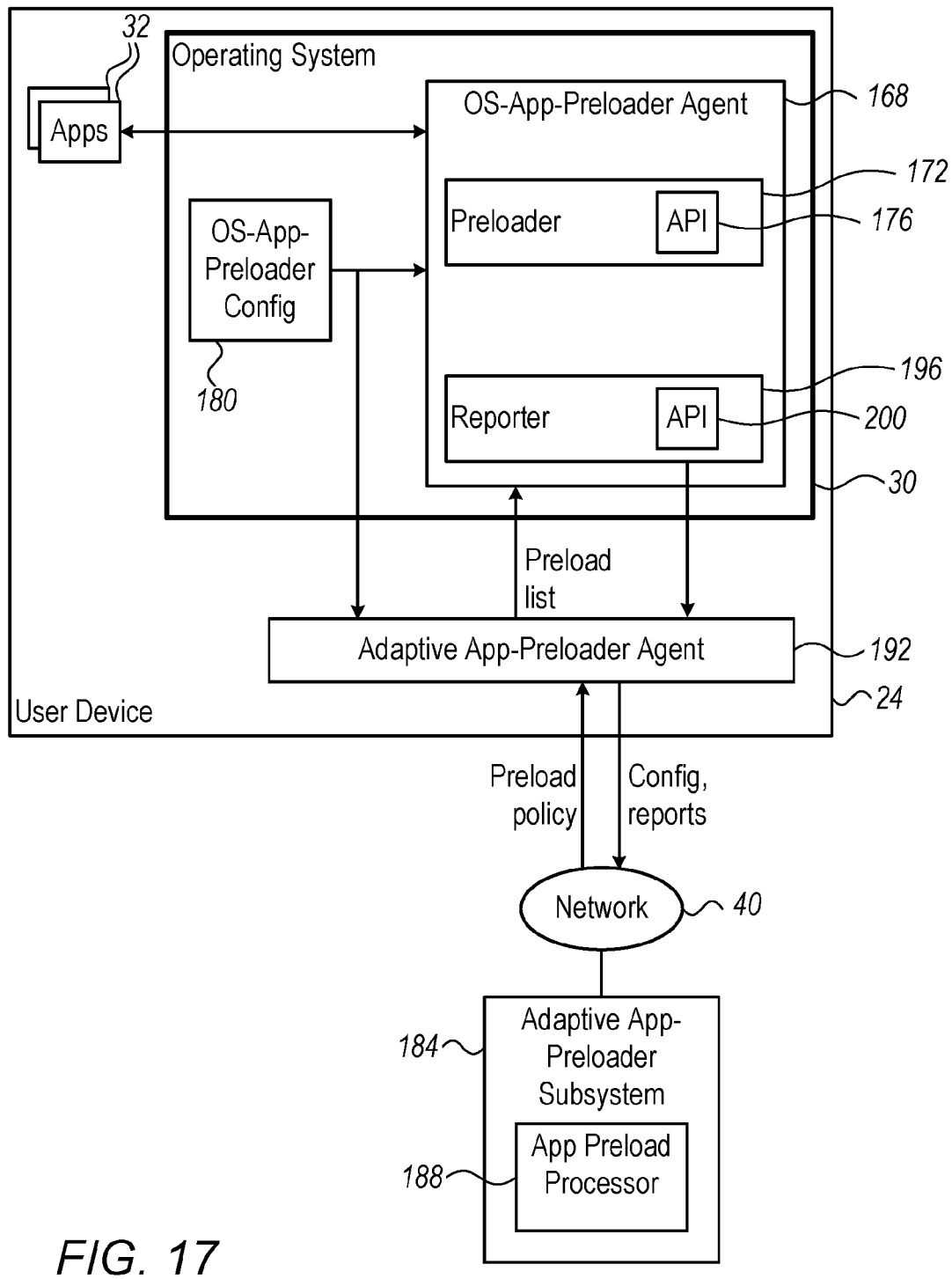
FIG. 17 is a block diagram that schematically illustrates an OS-Application-Preloader providing OS-Application-Preloader functions both inside and outside the OS, in accordance with an embodiment of the present invention.

FIG. 17: High-level block diagram where the OS-App-Preloader Agent provides basic OS-App-Preloader functionality in the OS at the User Device, and also supports enhanced OS-App-Preloader functionality implemented outside the OS.

In some embodiments, the OS-App-Preloader Agent might be implemented in the operating system, while the Adaptive App-Preloader Agent might be implemented outside the operating system on the User Device, e.g., as an app, as an SDK in an app, or as a proxy server. In this case, the OS-App-Preloader Agent, which provides basic OS-App-Preloader functionality, can serve as a platform to enable the implementation of a third party package to support enhanced OS-App-Preloader functionality. This third party package might include both an Adaptive App-Preloader Agent at the User Device and an Adaptive App-Preloader Subsystem in the cloud, as illustrated in FIG. 17.

In the embodiment described in FIG. 17, the interface between the two agents might be implemented through one or more APIs. For example, the OS-App-Preloader Agent might provide an API that enables the software agent running outside the OS to provide it a preload list. A Reporter API 200 might be used to provide user/device reports to the Adaptive App-Preloader Agent (and also possibly directly to the Adaptive App-Preloader Subsystem) that are needed for calculating preload policy. In further embodiments, an additional API is available at the Reporter for the apps to directly report user app activity and possibly relevant associated metadata.

5.5 OS-App-Preloader Config

The OS-App-Preloader Config is an optional block. It can hold configuration parameters that control the determination of the preload list. Thus it might configure the operation of the OS-App-Preloader Agent, Adaptive App-Preloader Agent, and Adaptive App-Preloader Subsystem. In some embodiments a user interface can be provided to allow the user to manually configure these parameters. This can be done, for example, through a graphical user interface (GUI), or an interactive bot/chatbot. In some cases, the Apps might be able to directly access and adjust configuration parameters in the OS-App-Preloader Config.

In some embodiments, different criteria might be weighted in the OS-App-Preloader Config settings indicating how preload priority should be optimized. Two examples are quality of experience (QoE) and battery life. If the QoE is ranked much higher than battery life, this might lead to a very aggressive preload policy that minimizes app load latency but causes significant reduction to battery life. If both QoE and battery life are ranked highly, then a more measured preload approach might be followed.

Different modes of operation can be configured through the OS-App-Preloader Config.

1. A mode that enables a "Preload-Now" feature that allows the user to manually trigger immediate preload of all apps that have been defined for this feature.

2. An automatic mode based on adaptive machine learning, where preload operation is automatically optimized 3. A mode based on adaptive machine learning where suggestions are given to the user to manually adjust the OS-App-Preloader Config settings to improve preload performance.

4. A mode that allows certain Apps to automatically make adjustments to the OS-App-Preloader Config settings.

5. A mode that allows the Adaptive App-Preloader Agent to automatically make adjustments to the OS-App-Preloader Config settings based on preload performance feedback.

6. A mode that allows the user to directly indicate what apps should be preloaded, when they should be preloaded, and in what device contexts. Examples of these settings are discussed further below.

The OS-App-Preloader Config might include settings that allows the user to specify which apps should be considered for preload. In addition, a preload priority ranking might be given for different apps. In addition, an option to use adaptive machine learning algorithm to optimize which apps to consider for preload (or how to prioritize them) might also be available.

In some embodiments, the Preload-Now feature mentioned above might be engaged by a Preload-Now button/icon/widget displayed on the screen of the User Device that triggers the feature when pressed by the user. In additional embodiments the Preload-Now feature might automatically be triggered whenever the Sync-Now feature (described in Section 3 as part of the OS-MCD module) is engaged, or after the sync of an app is completed. In some embodiments the Preload-Now feature might include an option to define an amount of time during which the app should be kept loaded (and refreshed) or an amount of time within which the app must be initially loaded. The various other additional features, options, and settings discussed here for the OS-App-Preloader Config might also be implemented when the Preload-Now feature is triggered. In some cases, these various other settings are defined separately for the Preload Now mode of operation.

In some cases, if adaptive machine learning algorithms are enabled the configured preferences in the OS-App-Preloader Config might be overridden. In other cases, the adaptive machine learning algorithms might receive the configured settings as additional inputs to be taken into account when generating preload policy and making the final preload decisions.

The OS-App-Preloader Config might also include settings to influence the preload timing. Examples of this are 1. Times of day/week that app preload should be carried out. This can be a relative time (e.g., within 1 hour from now), a specific time (10 pm at night), or a specified time window (e.g., between 8 am and 8:30 am each day).

2. A time window might also be defined for the length of time that an app should be kept loaded and ready (refreshed). Similarly, an update rate might be defined for how often to refresh an app that is already loaded.

3. Enabling the use of adaptive machine learning algorithms to determine when to preload the apps.

4. JIT Preload—Various settings might control how much to rely on "just-in-time" preload techniques (similar in concept to JIT prefetch techniques). In these techniques portions of an app are loaded in response to current user app activity shortly before the user might want to access them. For example, a portion of an app's code or data might be loaded only when the current webpage contains a link which accesses said portion. Note further that JIT Preload includes all possible levels of preload defined earlier—from only loading app code and/or data into RAM (without any code execution, prefetch, pre-render, etc.) to completely preloading the app including pre-rendering the visual display. In another example of JIT Preload, the app (or browser) links that are available from the current visible display are pre-loaded (including pre-rendering) in the background so that when the user clicks on a link the associated visible display is immediately available (i.e., can be moved to the foreground). This approach can be extended to other links that may not be immediately visible, but the likelihood of the user accessing these links in the near future is very high. For example, if the distance from visibility metric (described in [11]) for certain content links are less than a certain threshold, then we might decide to preload these links.

In some cases, preload operation (including preload timing) might also be conditioned on certain events or context. For example:

1. Preload might be configured to be triggered based on the setting of an alarm clock. For example, a user might indicate that preload be carried out according to the OS-App-Preloader Config settings before his alarm goes off in the morning, e.g., to preload his NY Times app.

2. Preload for certain apps might be conditioned on whether the wireless link is based on Wi-Fi. For example, the user might know that he only uses his video streamer when Wi-Fi is available.

3. Preload might be enabled for certain apps only if reliable network connectivity is available. For example, apps that depend on network connectivity might not be considered for preload if the device is in outage. Similarly, the quality of the network connectivity might need to be sufficiently high to realistically support the app in order to consider it for preload.

4. Preload preferences might be conditioned based on location of the User Device 5. Preload preferences might be conditioned based on device sensor state (e.g., velocity, position, light exposure, etc.)

6. Preload preference might be conditioned on battery level or charging state.

The above list provides examples where preload preference/policy might be conditioned on various conditions or contexts that the user or device is currently experiencing. However, similar conditioning can be done based on a predicted condition or context that is expected to occur in the future. For example, an aggressive preload policy for a particular app might be triggered if the user is predicted to soon be in a particular location.

In some embodiments, the OS-App-Preloader Config might offer various combinations of configuration options. For example, many of the above configuration options might be set the same for all Apps, or might be set differently for different Apps.

5.6 OS-App-Preloader Performance

Figure 18:
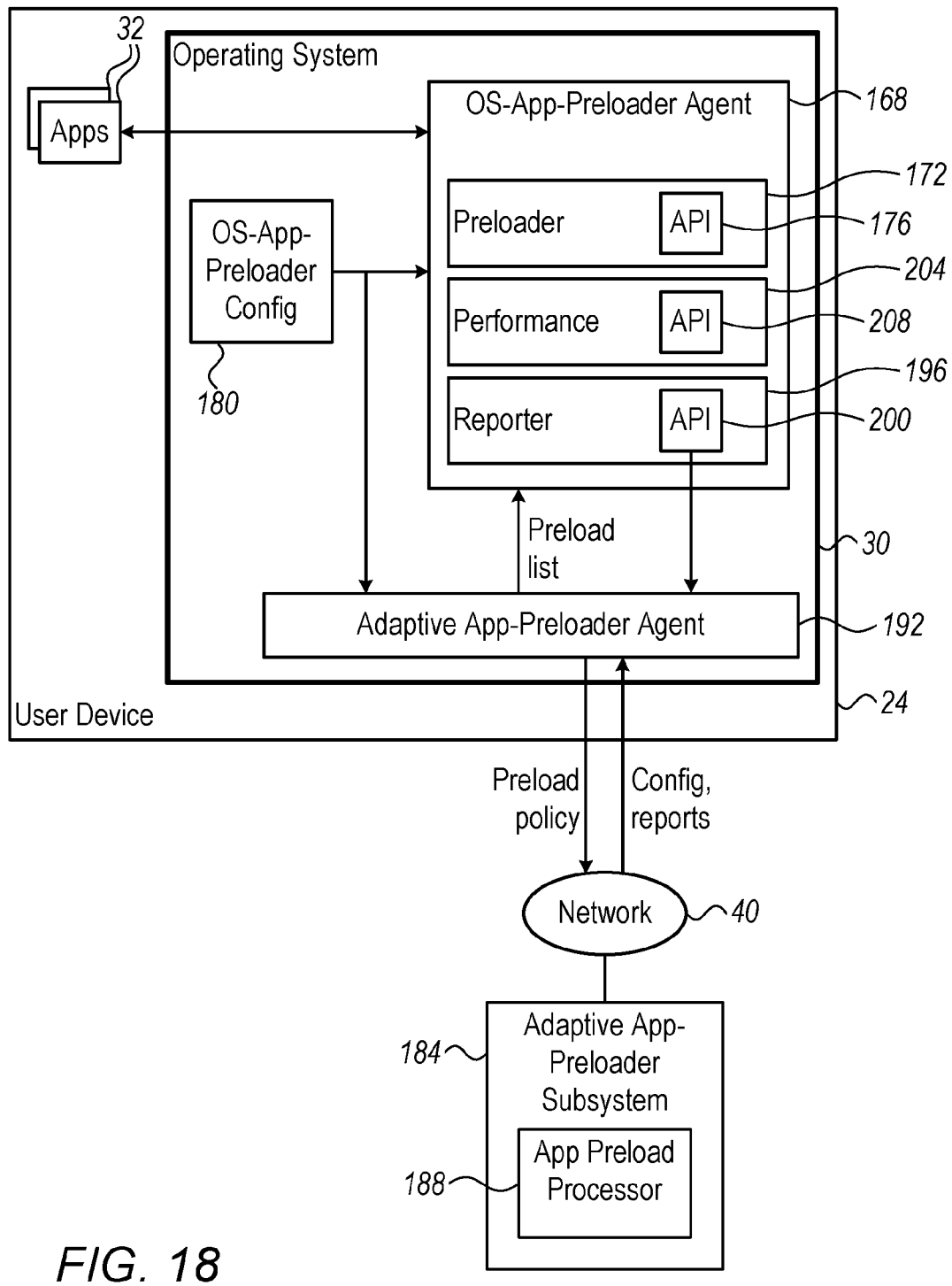
FIG. 18 is a block diagram that schematically illustrates an OS-Application-Preloader comprising a Performance module for providing preload performance, in accordance with an embodiment of the present invention.

FIG. 18: High-level block diagram illustrating enhanced OS-App-Preloader functionality, including a Performance component 204 that provides preload performance.

In some embodiments the OS-App-Preloader Agent can also calculate key performance indicators (KPI) indicating the benefits and costs that derive from the preload activity, as well as the general efficiency of the preload operation. FIG. 18 includes such a Performance component as part of the OS-App-Preloader Agent in accordance with these embodiments. Examples of metrics that might be provided are listed below. The metrics can generally be provided per app. In addition, in some cases the Performance component might provide an average value across multiple apps (or some other statistical measure).

Reduction in app launch latency. As one example, this might be estimated based on how long it took to perform the preload steps in the background. However, in this case, a correction factor might need to be applied since background processes often run with lower priority.

Effect on battery consumption—An estimate of how much preload operation has reduced battery life. The effect on battery consumption might also be provided relative to the battery usage caused by the user accessing the app (e.g., excluding preload).

Percentage of preloaded apps that are eventually accessed within a specified period of time.

Percentage of app accesses that were already loaded before the user's request. This might be a percentage of all user app accesses, which would provide an indication of the user experience achieved through the OS-App-Preloader module. Alternatively, it might be a percentage of all user app accesses for which the preload functionality was enabled. This latter metric would provide an indication of the efficacy of the algorithms used by the OS-App-Preloader module (e.g., the machine learning algorithms) to predict which apps to preload.

In addition to providing results per App, the Performance might also be broken down in other ways—such as per day. Thus, for example, it might become clear that preload operation is working well during the week, but poorly on the weekends.

In some embodiments, these metrics are displayed to the user which may help the user better configure the OS-App-Preloader Config settings. For example, if the metrics are available per App, then the user might decide to disable preload for Apps where preload costs appear to outweigh benefits, while leaving preload enabled for other Apps.

As one specific example, the Performance module might report that preload has saved an average of 3 seconds from app load latency for the CNN app, while costing only 0.1% on battery life (e.g., averaged over a week); on the other hand, it might report that preload has saved only 0.1 seconds on average for the NY Times app, while reducing battery life by 1%. In this case, the user might disable preload for the NY Times app, or alternatively fine tune the preload settings in the OS-App-Preloader Config to improve its performance.

These metrics can also be made available to the Adaptive App-Preloader Agent (e.g., through a Performance API 208) in order to help refine the preload decisions. For example, the Adaptive App-Preloader Agent might adjust the settings of the OS-App-Preloader Config or directly adjust the actual preload decisions in the preload list based on the feedback of these performance metrics. Furthermore, the performance metrics might be passed to the Adaptive App-Preloader Subsystem In some embodiments, these metrics can be provided to the Apps, which might automatically adjust the OS-App-Preloader Config settings to improve performance. For example, an App that is notified by the Performance component that preload costs outweigh the benefits might automatically disable preload for itself.

5.7 DNS Prefetch

DNS resolution is needed at the device in order for it to fetch/prefetch a content item. Thus the device will typically query the DNS server for the needed DNS information at the time of fetch (i.e., the IP addresses of the servers holding the desired content). However, the DNS information is typically small and may result in an inefficient data transfer (as discussed in Sec. 3.4). In addition, the DNS query is sometimes time consuming and causes a significant increase in MODEM activity time at the time of fetch. All of this leads to a waste of power and network resources.

Therefore, in some embodiments of the present invention, DNS prefetch is one of the steps that might be taken at the device as part of a preload operation (of the app or in-app content). For the case that the DNS information is already cached at the device, the DNS preload might include simply accessing this DNS information so that it is immediately available without delay for a fetch/prefetch from the associated content sources.

Additional details discussing DNS prefetch and DNS tracking can be found in Sec. 3.12.

5.8 Data Analytics and Advertising

As already discussed, the preload code provided by the apps to the Preloader API should allow preload to occur without skewing data analytics:
  App usage analytics
  Content usage analytics
  UI effects (e.g., how many "new items" are available since the last user access)
  Advertising analytics (possibly including the generation of ad impressions)

For cases where an app does not actively provide preload code, but instead the app is simply launched (as if a user invoked it) in the background a number of approaches are proposed in Section 7.4.

It is also important to make sure that analytics are properly reported when the user actually accesses the preloaded app. In some cases, where analytics reporting is triggered each time the data (e.g., content, ads) are displayed then this is automatically supported. In other cases, where the analytics reported will not automatically be triggered when the user accesses a preloaded app, then the OS-App-Preloader Agent can trigger the analytics reporting when the background preloaded app is actually accessed.
  In some embodiments, we might store the analytics report generated at the time of preload/refresh and report it when the app is actually accessed. In this case, the generated analytics is processed so that redundant reports are not issued. In other words, a loaded app might refresh multiple times before it is actually accessed by a user—but only one analytics report should be reported in this case.
  In other embodiments, we save the actual function call and inputs for reporting the analytics and execute it when the app is actually accessed. Here too, the analytics function calls are processed to avoid redundant analytics reporting.

The case of interstitial ads that pop up when the user first launches an app might be particularly challenging, since normally an app loaded in the background will not display the interstitial ad when it switches to the foreground. One approach to this might be for the OS to save the status of the loaded app—i.e., that it was preloaded and that the interstitial has not yet been shown to the user or that it was fully launched and the interstitial has already been shown. Then when the user requests access for a loaded app, the OS can conditionally load the interstitial ad, i.e., it can load the interstitial ad only if it has not yet been shown. A similar approach might be for the actual interstitial ad function call to include support for handling preloaded apps. In this case, the function call itself might conditionally load the interstitial ad based on a flag set in the OS indicating whether an interstitial ad still needs to be displayed.

In some embodiments, the inputs for the analytics reporting may change with time. For example, a time stamp might be generated as part of the analytics report based on when the app/content/ad was accessed. In this case, a new time stamp should be generated at the time that the app is actually launched.

In some embodiments, the OS-App-Preloader module implements a detector in order to detect whether the analytics report changes as a function of time or other device context. Such a detector can be implemented, for example, as follows:
  Each time a preload or refresh operation is executed for a particular app the OS-App-Preloader module can save the set of resulting function calls with inputs (i.e., the analytics report).
  These function calls can be compared at different times to see if the analytics reports are identical. If they are, then there is no problem in storing the analytics report at preload and actually reporting it later. If they differ, we have detected a varying analytics report situation (based on time or other context), and it might be problematic to simply store and report the analytics report later at the time of actual app access.

It should be noted that several types of function calls might be triggered (e.g., to refresh a feed view, to initially load an app, etc.). Furthermore, these functions might be called in a different order each time. Therefore, when comparing analytics reports, we need to compare the set of function calls regardless of the order of the function calls each time.

In some embodiments, the OS-App-Preloader Agent might analyze the analytics reports and detect the varying report situation described above. It then might also identify how the reports vary and automatically generate a correction at the time of the actual report. For example, if the difference between analytics reports is caused due to different time stamps, then we might identify where the time stamp is stored in the report and update it automatically at the time of the actual report.

5.9 Transparent Background App Preload

In some embodiments, the preloading of apps takes place in a way that is at least partially transparent to the user [37]. In various embodiments, this transparency can be implemented in various ways, including one or more of the following:
  1. The loading of the app might impact the user interface (UI) in some way, but take place only when the screen is off (so that the UI impact is not seen by the user).
  2. The loading of the app might take place even when the screen is on, but in the background such that it does not affect the user interface. This can include a complete rendering of the user interface in the background.

3. The loading of the app is done such that when the user subsequently accesses the app, the app response is identical to that expected if the app had not been preloaded in RAM, including the display of the user interface.

4. The loading of the app might take place without the app appearing in the Recent Tasks list.

In some embodiments, multiple such steps are carried out in the background such that the preload is completely transparent to the user, i.e., such that it does not impact the user interface in any way (other than enabling a faster launch when the user subsequently accesses the app).

We note that the term app here is used in the general sense, and includes any software application running on the user device, including a browser.

We also note that while the description here focuses on the preload of an app, embodiments of the present invention also apply to any subset of app components. For example, if a loaded app has a displayed feed which offers access to additional screens/components (e.g., through displayed links) then one or more of these additional screens/components might be preloaded in the background so that response time will be fast if the user eventually accesses them. This can include, for example, an in-app article or video referenced by the app.

The software agent that implements the app preload might reside in the user device, possibly as part of the OS. Alternatively, some or all of the app preload functionality might be implemented on a server in the cloud. Moreover, in some embodiments, the software agent carrying out the app preload executes a call-back function provided by said app on the device (e.g., through an API), as discussed earlier.

5.10 Additional OS-App-Preloader Variations

The present description has described the functionality supported by the disclosed OS-App-Preloader module. Various embodiments were described in FIG. 15 through FIG. 18. It should be noted that many additional ways are possible to break up this functionality across the different components. For example, in some embodiments, some of the OS-App-Preloader Agent might be implemented outside the OS, or even outside the device over the network. The specific partitions between functionality implemented in the device itself and functionality implemented outside the device (e.g., in the cloud) described here for the disclosed embodiments represent only some such possible partitions.

In some embodiments, the preload of an app and prefetch for an app might be coupled in some way. For example, the code provided by the app (to the Preloader API) for preload might also automatically include the prefetch of the immediate content needed to support the subsequent launch of the app, or even the prefetch of additional supporting app content that might not be needed immediately. This prefetched content would typically reside in the app's internal cache.

In some embodiments, the coupling of preload and prefetch might take place at the OS level. For example, the OS-MCD Agent of the OS-MCD module described in Section 3 might automatically include the preload of an app when the app's "launch-relevant" content has been prefetched. As another example, the OS-App-Preloader Agent might automatically prefetch all necessary "launch-relevant" content when an app is preloaded, or even additional app content not immediately relevant for app launch. In some embodiments, both the apps to preload and the content items to prefetch might be included together in a joint catalog. Similarly, both app preload data and content prefetch data might be included together in a joint prefetch/preload policy. Thus likelihood metrics and other metrics indicating priority might be evaluated and recorded in the joint policy for preload and prefetch, and the final decision on whether to preload might be taken by the OS-MCD module similar to other prefetch decisions. In some embodiments, the prefetch of content that affects the initial visible portion of an app (which could be indicated in the prefetch/preload policy received at the device) might trigger the refresh of the app (upon completion of the prefetch). Various additional embodiments are possible where the functionality described here for the OS-MCD-module and the OS-App-Preloader module are integrated together, including the full merging of the two into a single component.

In some embodiments, the OS-Mapper module described in Section 4 might work in tandem with the OS-App-Preloader module. For example, in some embodiments the OS-Map calculated at the Adaptive OS-Mapper Subsystem might include access likelihood metrics indicating the likelihood of a user requesting access for particular apps (and when this might occur). In this case, the Reporter at the OS-Mapper Agent in the OS at the User Device might include some of the information described here to be gathered by the Reporter at the OS-App-Preloader Agent. Thus in some embodiments, the OS-Mapper module described above might effectively replace (or be merged with) much of the functionality described here for the OS-App-Preloader module, particularly the functionality described by the Adaptive App-Preloader Agent and the Adaptive App-Preloader Subsystem.

In some embodiments the predicted outputs of the OS-Mapper machine learning algorithms (discussed in Section 4) are used as additional feature inputs to machine learning algorithms in support of preloading. For example, the predicted charging time might be used as a feature input to the OS-App-Preloader machine learning algorithms in order to restrict app preloading to scenarios where there will be sufficient remaining battery to handle upcoming expected user activity.

6 Managing Loaded Apps

6.1 Refreshing an App in the Background

This section addresses the case where an app is loaded in the background, e.g., due to preload, and needs to be refreshed. See also [39]. For example, a refresh would be needed if a content update associated with the app load occurs such that the background app load is no longer up to date in some way.

In some embodiments of the present invention, when (i) an app is loaded in the background of a user device, and (ii) an update associated with the app load becomes available, then (i) the app is conditionally refreshed in the background to reflect the update (depending on a refresh decision), and (ii) subsequent user access of the refreshed app is based on the refreshed update.

Note that the reference here to an app loaded in the background refers to any portion of the loaded app, including the app feed and/or in-app content. Furthermore, the term app can refer to any software application running on the user device, including a browser.

The refresh operation might include for example:
Prefetching content if the cached content supporting the app preload is out of date.

Updating a user interface of the app if out of date (this can be any screen or display associated with the app, including of the app feed and/or in-app content).

Updating application data that is out of date

The background loaded app might come about due to:

1. Preload—The app might be preloaded in the background in advance of user access (e.g., user click) in order to reduce subsequent access latency. Examples of preload causing an app to at least partially exist in the background include one or more of the following operations (as was discussed earlier, e.g., Sec. 5):

1.1. The OS process associated with the app is initialized 1.2. The app code or app data is loaded into RAM 1.3. Initial components of the code are run, e.g., code associated with the Android Application class or the app's initialization steps 1.4. The user interface (UI) of the app might be pre-rendered. For example, the visual display is created in the background, or the rendering results are directed to a virtual display.

2. Foreground app moved to background—The app might have been in the foreground and moved to the background, typically due to user action (e.g., user presses the Home button).

In some embodiments, the available update might directly affect the UI associated with the app load, i.e., the UI displayed to the user when the user initially accesses the background app load (including above and below the fold); in other embodiments it might even refer to updates that don't directly affect the UI associated with the app load. Examples of updates directly affecting the UI associated with the app load:

1. Content change at the source that impacts the visible UI above the fold

2. Content change at the source that impacts the UI below the fold (i.e., only visible after scrolling)

3. A change in the resolution of an image that is part of the UI

4. An update to an ad to be displayed (e.g., for the case of real-time ads that are determined based on context at the time of access [8-10]). This includes the actual ad and/or the ad identity.

5. Change in the DNS information associated with content displayed from the UI (e.g., for the case where the DNS information was prefetched, but not the content)

6. Any change in the configuration file (e.g., the JSON, XML, HTML files) that affects the UI 7. The identity of a content item that has changed (e.g., in the case where the actual updated content item has not been prefetched, but the identity of the updated item is known)

Examples of updates that do not directly affect the UI associated with the app load:

1. A change in the configuration file (e.g., the JSON, XML, HTML files) that does not affect the UI associated with the app load. Examples of this include a change in a URL address for one of the links available from the UI and/or a change to the associated HTML request header (e.g., identifying a different orientation for an image associated with the URL address).

2. A change in the content accessible via links available from the UI associated with the app load (e.g., for the case where this content is prefetched)

3. A change in the DNS information associated with content links available from the UI (e.g., for the case where this DNS information is prefetched)

4. A change in the estimated likelihood that a user will access an item associated with the app loaded in the background.

5. A change in a java script associated with the app load that does not change the display.

In some embodiments, the updates associated with an app loaded in the background are tracked for prefetch, such as via a crawler at the content source or any other content tracking technique (e.g., [1-4, 11]). The tracking results might be analyzed in the cloud with the identity of the updates reported to the device. Alternatively, the tracking results might be reported to the device, with the identity of the updates determined at the device. In either case, relevant properties associated with the update might also be calculated, such as (1) whether the update affects the UI associated with the app load, (2) whether the update affects the UI above or below the fold, and (3) the likelihood that the update is needed by a particular user.

In some embodiments, an update prefetched to the device might be the identity of an ad associated with an app loaded in the background, or the ad itself. This might be the case, for example, for real-time ads that are determined at the time of the content access [8-10]. Thus, here too, these real-time ad updates might be tracked.

In some embodiments, an update prefetched to the device might refer to prefetching the entire content item (e.g., configuration file, article, image, etc.) containing the update. In alternative embodiments, however, a differential prefetch of an updated item might be carried out where only the changed portion of the item is prefetched (i.e., relative to the previous item version already prefetched).

The refresh of the app loaded in the background involves updating the app load to reflect the update. In other words, when the user subsequently accesses the app loaded in the background, the user's interaction with the app is consistent with the update. This might involve, for example, reloading app data into RAM from memory if there has been a change to the app data. As another example, this might involve refreshing the UI display rendered in the background to reflect the update.

In the case that the update affects the UI display rendered in the background, the refresh might be implemented by executing a new render from scratch in the background. Alternatively, a partial refresh might be carried out, such as replacing a particular image in the existing background UI with an updated image.

In some cases, an update occurs to a portion of the UI display (e.g., an image) rendered in the background, but the updated content (e.g., the new image) might not have been prefetched. Thus, here only the identity of the updated content has been prefetched. In this case, in some embodiments, the UI display might be refreshed in the background with the out of date content replaced by a visual place holder (e.g., an image frame of the appropriate size without an actual image displayed). If the user subsequently accesses the background app before the update has been prefetched, the missing update can then be fetched and added to the display in real time. Alternatively, the initial display shown the user might include the image place holder, with the actual image added to the display when it becomes available.

In some embodiments, the app loaded in the background was moved from the foreground by the user. In this case, only updates that are consistent with expected app behavior might be applied to the background loaded app. For example, if the UI display associated with an app that moved to the background has changed but the app has been recently used, then typically the UI display should be restored to the user as it was last accessed (and not reflecting the prefetched update associated with the UI). However, if the app has not been recently used (i.e., it is "NRU") then prefetched updates would typically be applied to the UI display.

In some embodiments, an app might be preloaded in the background with several possible access options. For example, an app might be accessed at different entry points depending on various factors (e.g., depending on method of accessing the app, or depending on context at the time of access). This might even translate to maintaining several different renders in the background associated with an app. For example, an app might have several "tabs" with associated UI displays, where the tab displayed to the user might depend on side factors (e.g., the time of day when the user clicks). In these cases, the refresh might be executed for one or more of the preload options (or one or more of the background renders), depending on which ones are affected by the update.

In some embodiments, the refresh creates an additional instance of the app loaded in the background, so that both the original instance and the updated instance are available in the background. For example, an app's feed might be kept rendered in the background unaffected by the update, but an additional instance of the app's feed might be rendered in the background (pre-rendered) that reflects the update. This might be carried out in the case where a recently used app has been moved to the background (thus user access should yield the old display), but it is considered likely that the user will request a refresh of the content in the near future.

There are many factors that might impact whether to refresh an app loaded in the background in response to identifying an update. In general, the factors discussed earlier in Sec. 5 for calculating preload likelihood metrics (i.e., for estimating likelihood of app access) and the additional factors discussed in Sec. 5.3.1 are also relevant for making the refresh decision. For example, if the decision would be to preload the app if it was not in the background, then it is likely that the decision would be to refresh the app if necessary. Similarly, if the various factors do not currently support preload at all, then it is likely that the decision would be to not refresh the app.

Additional factors that might be considered when deciding whether to refresh an app:

1. The portion of the UI affected by the update: For example, in some embodiments, only if the update affects the background app above the fold of the UI (i.e., accessed without scrolling) then the background refresh might be carried out in advance.

2. The estimated likelihood that the user will access the update associated with the app loaded in the background. For example, in some embodiments, only if it is estimated to be sufficiently likely that the user will scroll enough such that the update impacts the user experience, then the background refresh might be carried out in advance.

3. The importance of the update to the user experience. For example, in some embodiments, only if the update is significant for the user experience then the background refresh might be carried out in advance.

4. The time it takes to apply the update after the user accesses the background app. For example, in some embodiments, only if the refresh will take significant time to carry out in real time, then the background refresh might be carried out in advance.

5. The amount of resources required for the refresh. For example, in some embodiments, only if the update requires sufficiently low power consumption, then the background refresh might be carried out in advance. In one such example, if the size of a content update is small then the decision might be to refresh the app.

6. If all updates are available. For example, in some embodiments, only if all of the identified content updates have been prefetched to the device, then the background refresh might be carried out in advance. In another example, if a large content update is needed, the decision might be to refresh to preserve the future user experience; however, if the size of the content update is small, then the decision might be to fetch the update in real-time when the user accesses the app or in-app content (due to the fact that a small fetch is more likely to be fast and low cost anyway).

7. Potential memory leakage issues. Certain apps that remain loaded for long periods of time might suffer from memory leakage issues. Such apps might be periodically refreshed.

8. The app's level in the "importance hierarchy" defined by the OS. For example, the RAM manager might be more likely to refresh a service process rather than a cached process.

In some embodiments, combinations of these factors and/or the preload/prefetch factors discussed earlier might be taken into account when determining whether to carry out a background refresh.

In some embodiments, the updates that have not been refreshed are saved (e.g., by the OS) so that when the user accesses the background app, the updates are refreshed—either in real-time before the app UI is displayed, or in parallel to displaying the background app. In the latter case, the initial UI is displayed without some updates but then refreshed to the updated UI when the refresh is completed in the background.

In some embodiments, the refresh operation is executed based on code (e.g., a callback function) supplied by the app developer, e.g., through an API. In other embodiments, the refresh operation is executed without the cooperation of the app. In this case, the code to refresh the app is not provided by the app, but rather the app might be launched in the background based on a set of instructions defined in advance for the app (e.g., defined for a software agent in the device, possibly residing in the OS). Alternatively, a refresh might be accomplished by killing the process running the app and issuing a launch request for the app (as if the user had clicked on the app) or for the in-app content (as if the user had clicked on the in-app content link)—with a key difference being that the refresh takes place in the background.

In some embodiments, the refresh of the app loaded in the background should be carried out in a way that is at least partially transparent to the user (similar to transparent preload discussed in Sec. 5.9). In various embodiments, this transparency can be implemented in various ways, including one or more of the following:

1. The refresh of the app might impact the user interface (UI) in some way, but take place only when the screen is off (so that the UI impact is not seen by the user).

2. The refresh of the app might take place even when the screen is on, but in the background such that it does not affect the user interface. This can include a complete rendering of the user interface in the background.

3. The refresh of the app is done such that when the user subsequently accesses the app, the app response is identical to that expected if the app had not been loaded in RAM, including the display of the user interface.

4. The refresh of the app might take place without the app appearing in the Recent Tasks list.

5. The refresh should avoid skewing what is presented to the user (UI effects), such as affecting the number of "new items" reported to the user (since last access).

In some embodiments, multiple such steps are carried out in the background such that the refresh is completely transparent to the user, i.e., such that it does not impact the user interface in any way (other than enabling a faster launch when the user subsequently accesses the app).

In addition to user transparency, the refresh of a background app might differ from the refresh of a foreground app in additional ways, such as:

1. The data analytics calculations should not be affected, including both app usage analytics, content usage analytics, advertising analytics.

2. It should avoid generating ad impressions in the case that this automatically causes the ad to be counted as having been served.

3. It should avoid running repetitive code, such as java scripts that fetch new data and update the UI every few seconds.

4. If the OS maintains an activity stack, then refresh of the background app should preferably preserve the order of the activities.

5. The LRU (Least Recently Used) metrics saved by the OS per process should preferably also not be affected, i.e., it should not be skewed the prefetch, preload, or prerender operations.

In some embodiments, the software agent that manages the refresh operation of the background apps is the device OS, such as an Android or iOS operating system. This might be implemented, for example, by an OS vendor or a device manufacturer. Alternatively the software agent might reside outside the OS, possibly at least partly outside the device.

In some embodiments, the Preloader component uses the preload list to determine whether to refresh an app that has new prefetched "launch-relevant" content available. In this case, any app that has sufficient preload priority to warrant preload might also be refreshed if necessary. In other embodiments, the Preloader might maintain a separate preload list and refresh list due to the fact that preload and refresh considerations, while similar, are not identical. For example, the cost of a preload and refresh might be significantly different. Thus, if the preload involves a substantial battery expenditure, but refresh only requires a small battery cost then the decision might be to refresh even in cases where we would not have preloaded the app if it had not already been loaded. In this case, each time new prefetch content that is "launch-relevant" arrives at the User Device, the Preloader consults the refresh list to determine whether to issue a refresh request. The refresh list would be created by the Adaptive App-Preloader Agent in a similar way that it creates the preload list. Thus the preload policy might also include additional relevant information for determining refresh decisions.

In some situations, the latency reduction due to a refresh operation might be small. For example, if most of the app launch latency has been eliminated through the initial preload, and the refresh needed to update the prefetched content to fully support opening the app has a very small impact on latency then the priority of the refresh might be lowered. Note however that the OS needs to remember the status of the previously executed preload/refresh so that it knows what steps have been carried out and what remains to be done, e.g., when the user accesses the content. Thus if there is content that has not yet been prefetched this should be reported back to the app from the OS when launching the loaded app.

In some embodiments, whether or not an app's prefetched content to support opening the app is fully up to date might be taken into account in determining whether to refresh the loaded app. For example, an app might be listed in the refresh list, but if the prefetched content needed to support opening the app is not fully up to date, then the Preloader might not refresh the loaded app. In additional embodiments involving these scenarios, the Adaptive App-Preloader Agent might not add the app to the refresh list, or even might remove the app from the existing refresh list. Thus the highest load refresh priorities might be given to apps that have all content needed to support launch residing in local cache (e.g., due to prefetch). In some cases, a network connection to update the content needed to support launch might not be available. This also might make it more likely not to refresh the loaded app, since we are unable to update the required app content anyway.

In some embodiments, the refresh (or preload) of an app might automatically occur whenever all content needed for the initial display of the app is available (i.e., all UI components are available in the cache)—in other words, when the prefetch of all needed content is completed. In a case that such content is not available, a flag should be raised by the OS and reported to the App when the user accesses it, so that the App knows that there is content that still needs to be fetched and that the UI will subsequently need to be refreshed.

In some embodiments, there might be a setting available in the OS-App-Preloader Config that determines whether an app's display is refreshed in the background. For example, a user might specify a preference for certain apps in the OS-App-Preloader Config that the display not be refreshed in the background. In some cases, the decision on whether to refresh the display might be based on how much time has gone by without user action. For example, if not much time has gone by then don't refresh/pre-render the display; otherwise, refresh/pre-render the display.

In some embodiments, the decision on whether to refresh a loaded app might depend on various contexts determined at the User Device. For example, if the battery level is low, it might be preferable to pursue a less aggressive refresh policy. Similarly, if the RAM is already being heavily used by relatively high priority processes, then it might be preferable to pursue a less aggressive refresh policy.

6.2 Enhanced RAM Utilization for the User Device

The OS of a mobile device keeps a prioritized list of running processes in order to decide which to kill when the device is low on RAM memory. For example, if an app is loaded in the background for a certain amount of time without any foreground activity and/or user interaction, then typically the OS is more likely to kill the process running the app when it needs to free up RAM for other processes. In the case of the Android OS, prioritization of running processes are mostly based on its level in the "importance hierarchy" and based on an LRU (Least Recently Used) metric that takes into account how recently the app was accessed. The drawback of the conventional approach is that it does not take into account the likelihood of the user accessing the app again. As a result, a subsequent user app launch will take significantly longer than it would have taken had the app's process not been killed.

The OS also often kills an app in response to user actions, such as force-quit (e.g., in iOS this is requested by double clicking the Home button and then swiping-off the app, and in Android this is requested by clicking on Recents and then swiping-off the app), force-stop, and others.

In some embodiments of the present invention, the decision on which apps to kill (either due to low RAM or due to user actions) is taken based on the estimated likelihood that the user will reuse the apps (see also [38]). Moreover, if this likelihood is high enough, not only might the app not be killed—but the decision might be to refresh the app. This substantially reduces the app load time for subsequent user requests, thus leading to enhanced user experience.

In the approach suggested here, an enhanced RAM manager makes decisions on whether to kill or refresh a loaded app based on metrics provided by an estimator of the likelihood that the user will reuse the apps. The final decision on which apps to kill or refresh would typically be taken by a software agent residing on the device, possibly as part of the OS. The likelihood metrics might also be calculated by a software agent at the device, possibly as part of the OS. In some embodiments of the present invention, however, the likelihood metrics are calculated at least in part at a server over the network and then sent to the enhanced RAM manager at the device.

In some embodiments, the decision on which apps to kill or refresh might also be taken outside the device and passed to the device in order to be carried out.

We note that while the description here focuses on improving decisions regarding killing and refreshing apps, embodiments of the present invention also apply to any subset of loaded app components. For example, if an Android app has several associated activities/processes loaded in the background, the decision might be to kill activities that are unlikely to be used by the user again, while leaving its other activities loaded in RAM.

We also note that the term app here is used in the general sense, and includes any software application running on the user device, including a browser.

As mentioned above, in some cases the need to kill an app is taken in order to free up RAM for other apps/processes that need to run on the device. Under these circumstances the RAM manager will choose the best app to kill, i.e., at least partly based on the aforementioned likelihood metrics. However, as mentioned above, in other cases the user might directly request a specific app to be killed. In some embodiments, the RAM manager has the option to reject this request, e.g., based on the likelihood metrics.

In some embodiments, although an app remains loaded in RAM despite a user request to kill it, the RAM manager ensures subsequent app behavior that at least partly imitates the expected behavior as if it had been killed. For example:

The task related to the app is removed from the Recent Tasks list

A subsequent launch request of the app by the user will launch the app with a display of the app's initial screen (e.g., the "feed") as if it was launched from scratch (and not with the last screen the user was accessing when the kill was requested).

In some embodiments, the RAM manager implements both of these steps, as well as any other steps necessary to ensure that the fact that the app is still loaded will not be noticeable to the user (other than the fact that the load response will be much faster).

As an example, if a user of the USA Today app is accessing an article available from the USA Today feed when he issues a kill command (e.g., "swipe-off" of the app), then the app might be removed from the Recent Tasks list and a subsequent launch will display the top of the USA Today app feed, as if it had been launched from scratch. The only observable impact to the user might be the fact that a launch request will occur much faster.

Examples of factors that might be taken into account when estimating the likelihood that the user will access an app were discussed earlier in the context of estimating likelihood metrics for prefetch and preload. The app likelihood metrics might also be used to compute the associated process priority that would be given to the app that we are considering for preload or refresh (if the app exists in the background). For example, if the likelihood is high that the user will access an app in the near future, the priority of the app's process might be set higher. This priority might be compared to the priorities of the other processes running in the OS in order to better decide whether to preload or refresh the app. For example, if a running app is likely to soon be killed based on its current priority (taking into account its app access likelihood metric) compared to other running apps, then the decision would likely be to not refresh the app. Similarly, we would likely not preload an app that is expected to have a priority that is low relative to most of the other running processes.

In some embodiments, additional factors can be taken into account besides the likelihood metrics when deciding whether to kill or refresh an app. Examples of such factors include those discussed earlier in the context of making preload or prefetch decisions, e.g., Sec. 5.3.1. Two additional examples:

1. Potential memory leakage issues. Certain apps that remain loaded for long periods of time might suffer from memory leakage issues. Such apps might be periodically killed or refreshed despite the app load being fully up to date.

2. The app's level in the "importance hierarchy" defined by the OS. For example, the RAM manager might be more likely to kill a cached process rather than a service process.

6.3 Minimizing Prerender

In some embodiments, an option to preload without prerender might often be utilized. Here, some or all of the preload steps enumerated earlier are carried out without the prerendering of the app (or in-app content) in the background.

Advantages of this approach include that it saves power, reduces load on system resources, and might reduce occurrences of extraneous ads and analytics generation.

In this approach, when there are changes to the content at the app's portal, prefetch is carried out—but there is no need to keep refreshing the background prerender.

Using this approach, only when the user finally accesses the app/content might the rendering need to be executed in the foreground.

In a similar approach, only when the likelihood is high that the user will access the content before additional content changes occur will the system prerender the app/content in the background. In other words, prerender is triggered when the estimated likelihood is low for needing a refresh of the render before user access. Alternatively, prerender is triggered when the number of refreshes estimated to be needed before user access is low. The likelihood of refresh before the predicted user access (or the number of predicted needed refreshes) can be estimated based on various parameters including The estimated time until user access (possibly described as a probability distribution)

The frequency of content changes at the portal (e.g., affecting the potential prerender)

For example, if the app's feed changes several times an hour and the chances are good that the user will not access the app feed in the next hour—then prerender is not carried out, even though other preload steps are carried out. On the other hand, if the app's feed changes several times an hour and the chances are high that the user will access the app feed in the next 10 minutes—then the prerender might be triggered in addition to other preload steps.

In some embodiments, a certain maximum number of prerenders might be permitted for a particular preloaded content. For example, an app might be preloaded once with prerender, but all additional updates/refreshes might be carried out without prerender.

If the user accesses preloaded app content with a prerender that is out of date, then the prerender might be updated in real-time before being displayed to the user. Alternatively, the out of date prerender might be displayed immediately to the user, while the steps needed to update the refresh of the display are taken in parallel.

7 Passive Apps Techniques

In some cases an app might not be actively cooperating with the modules described in Sections 3, 4, and 5, making the OS API's useless. Such a scenario might occur, for example, when a handset vendor implements these modules. The handset vendor can alter the operating system included in its devices, but it is less common that a handset vendor provides OS API's for the app developers that are specific to its own devices. In this section we therefore explore techniques that enable the OS-based functionality described in Sections 3, 4, and 5 despite the app remaining passive and even possibly unaware of it.

7.1 OS-MCD Module

The two main components of the OS-MCD module are the Prefetcher and the Reporter that should now be implemented without an API accessed by the apps. There are a number of alternate ways to implement the functionalities that were described earlier as depending on the active cooperation of the apps. These techniques are described below.

The Prefetcher

In one embodiment of the present invention, instead of the app providing code to the Prefetcher through an API, the Prefetcher triggers the fetching of content by emulating user clicks of the app. This can be done by the OS via known techniques, so that the app behaves as if the user clicked on it or on certain components of it. Thus, for example, the feed view might be prefetched by triggering a launch of the app (as if the user had clicked on the app icon). Similarly, specific articles might be prefetched by emulating user clicks on specific content links. Once a click is emulated, options for handling the prefetched content include:

- One option is to allow the app itself to cache the prefetched content in its own internal cache. Then when the user accesses the content the app will automatically find the content cached in its own internal cache.
- Another option is for the Prefetcher to intercept the incoming content and cache it in a separate Content Cache which the OS-MCD Agent manages.

This approach may be very useful for apps that require login credentials, app-specific login procedures, and/or personalized apps (i.e. apps with different content for different users). Instead of asking the user to somehow pass his or her login credentials to the cloud so that a crawler could crawl the relevant content, the whole crawling mechanism could be avoided and the system simply uses the app itself (that already holds the user credentials) to get the needed content. Such an approach, avoids both a cloud based crawler and the need to pass the user log in credentials to the cloud. In effect, each mobile device effectively implements its own device-based personal crawler, which is based on the app's own fetch mechanism (hence there is no difficulty in handling app-specific login procedures, user login credentials, and/or personalized apps). Personalized apps, such as for example social networks, often require a crawler per user (because of the different user contents). Apps with many users, lead to many needed crawlers which may become too computationally expensive to centrally implement over all users. With this emulated clicks approach, however, this complexity is reduced by distributing the crawling among all the devices. The downside is that this approach typically tracks content updates based on a polling mode, where the device polls the portal from time to time to see if new content is available. Polling mode is less efficient in terms of battery, bandwidth and data plan than a crawler based scheme, therefore careful tuning of the polling rate according to the user content consumption behavioral pattern and the content source change patterns is required. Such tuning, may be done "off-line" in the cloud using machine learning algorithms, with the optimized polling strategy sent to the device. Also, polling strategy and rate may depend on the device sensor readings. For example, polling can be stopped whenever the device is sensed to be not in use (e.g. not moving for a long enough period of time with the screen off).

In the embodiment described above, there are different ways that polling can be implemented. One approach would be for the emulation of a content click to cause a fetch of the content to the User Device. Then the fetched content could be compared to the locally cached content to determine if there are any content updates that need to be cached. Another approach would be for the emulated content click to cause a conditional fetch, where the actual content is only transferred to the device if an update is available. For example, the content item could be requested using the "if-modified-since" HTTP request header (a conditional HTTP request in which the server returns an updated version of the requested content only if the content was modified since a time indicated in the request, and a "not modified" indication otherwise). In another example, the conditional fetch can be issued using the "if-none-match" HTTP request header along with an etag value (a conditional HTTP request in which the server returns an updated version of the content only if the etag hash value supplied in the request header does not match the locally computed etag value). These two example implementations are fast and efficient, but need to be supported on the server side (e.g., content source).

In order to improve this device-based crawling approach, the device might try to map emulated clicks at different points on the virtual display to the different links that are available. This can be learned by various strategies at the user device, such as through trial and error (while keeping track of the click locations and responses). Another approach might be to analyze this for different apps and different types of devices in the cloud and then report the results to the devices.

Another disadvantage of this device-based crawling approach is that it does not permit the preprocessing of the content before being delivered to the device (such as described in Sections 3.3.2 and 3.4.1). Therefore, in some embodiments, the OS-MCD Agent intercepts the device-based crawling requests (the polling cause by the emulated clicks) and routes them to the Adaptive OS-MCD Subsystem in the cloud. The content delivered to the device could then be the preprocessed content. On the other hand, this approach requires the Adaptive OS-MCD Subsystem to directly access content from the Content Source, which leads to other challenges already discussed (e.g., providing the user's login credentials and handling personalized apps).

In some embodiments, a combination of approaches could be used to track the available content at the Content Source. For example, the polling approach (using emulated clicks at the device) described above can be used along with a cloud-based crawler.

In another embodiment, the Prefetcher functionality is implemented by the OS prefetching the content for the app, i.e., not using a callback function provided by the app through the Prefetcher API. This can be performed in a number of ways. For example the part of the app code that is used to download content can be identified offline and used for prefetch. This requires customizing the prefetch code for different Content Sources.

In some embodiments a catalog of URL's is sent from the cloud to the device, and the OS downloads and caches the contents contained at these URL's. The OS intercepts network requests and when a pre-cached URL is requested, it is served from the local cache rather than from the network. Enhancements to this approach can be made, where the catalog not only contains the URL's but also specific instructions on how to properly fetch them. Such instructions may include a specific set of HTTP headers to download said URL's, a security token to download said URL's (e.g. for paid content and/or for DRM protected content), and more. The specific set of URL's and potentially their download instructions could be optimized off line in the cloud by some other entity and sent to the device. The login credentials needed to crawl the user's content or the permission to crawl the user's content can be provided by the user.

In some embodiments, although the App might be passive, the Content Source might actively cooperate in the prefetching. For example, the Content Source might provide an API that allows the OS-MCD module to track user content for updates at the Content Source. Alternatively, an API available in the cloud (e.g., at the Adaptive OS-MCD Subsystem) can offer an API for the Content Sources to send content updates.

Reporter

Instead of the app providing content usage data to the optional Reporter through an API, the Reporter might intercept the user content access requests for the various apps through an interceptor component. The intercepted information could be processed either at the device or in the cloud in order to compile detailed internet usage activity. It should be noted, however, that it is often difficult to figure out what the user actually clicked on based on the outgoing content access requests. The reason for this is that many apps request additional content along with the actual user request. For example, a user might click on article 18 in the feed and the app might request article 17, 18, and 19—in order to have articles 17 and 19 immediately available (in a form of just-in-time or JIT prefetch). In a variation of this example, a user might click on article 18 in the feed and the app might only request article 19—because articles 17 and 18 are already in its internal cache. Furthermore, interception of outgoing traffic will not provide potentially important metadata information associated with the content, such as the type of content. One approach to dealing with these challenges is to use the content catalog to figure out what content was actually requested, what type of content it is, and other metadata (e.g., position in the feed). For example, the outgoing content access request traffic might be sent to the Adaptive MCD Subsystem in the cloud where it is analyzed based on known rules describing the behavior of each app, and based on the content catalog's description of each content item. In the above examples, if the outgoing requests were for a particular app that is known to additionally request the articles positioned before and after in the feed, then using the catalog and knowledge of past internet usage (i.e., what articles may have already been cached by the app) we could often identify which content was actually requested by the user (along with the metadata recorded for it in the catalog).

Another option might be for the user's internet usage activity across multiple apps to be provided as a service from the cloud (e.g., Google Analytics), where detailed website traffic statistics are calculated and made available.

In yet another embodiment of implementing the reporter functionality when the app is passive, the OS can also monitor calls to various data analytics functions. For example, if an app calls a certain analytic function whenever an article is clicked with some article identifier (e.g. its URL), the OS can intercept these calls and use the article identifier to discover what exactly was clicked. Other analytics function calls could be intercepted in order to discover when the app icon was clicked (i.e. when loading the feed), when a video was clicked, and more. Regarding the app click, simply having the OS recording the app process launches (by the user) could be used to discover feed load by the reporter.

Figure 19:
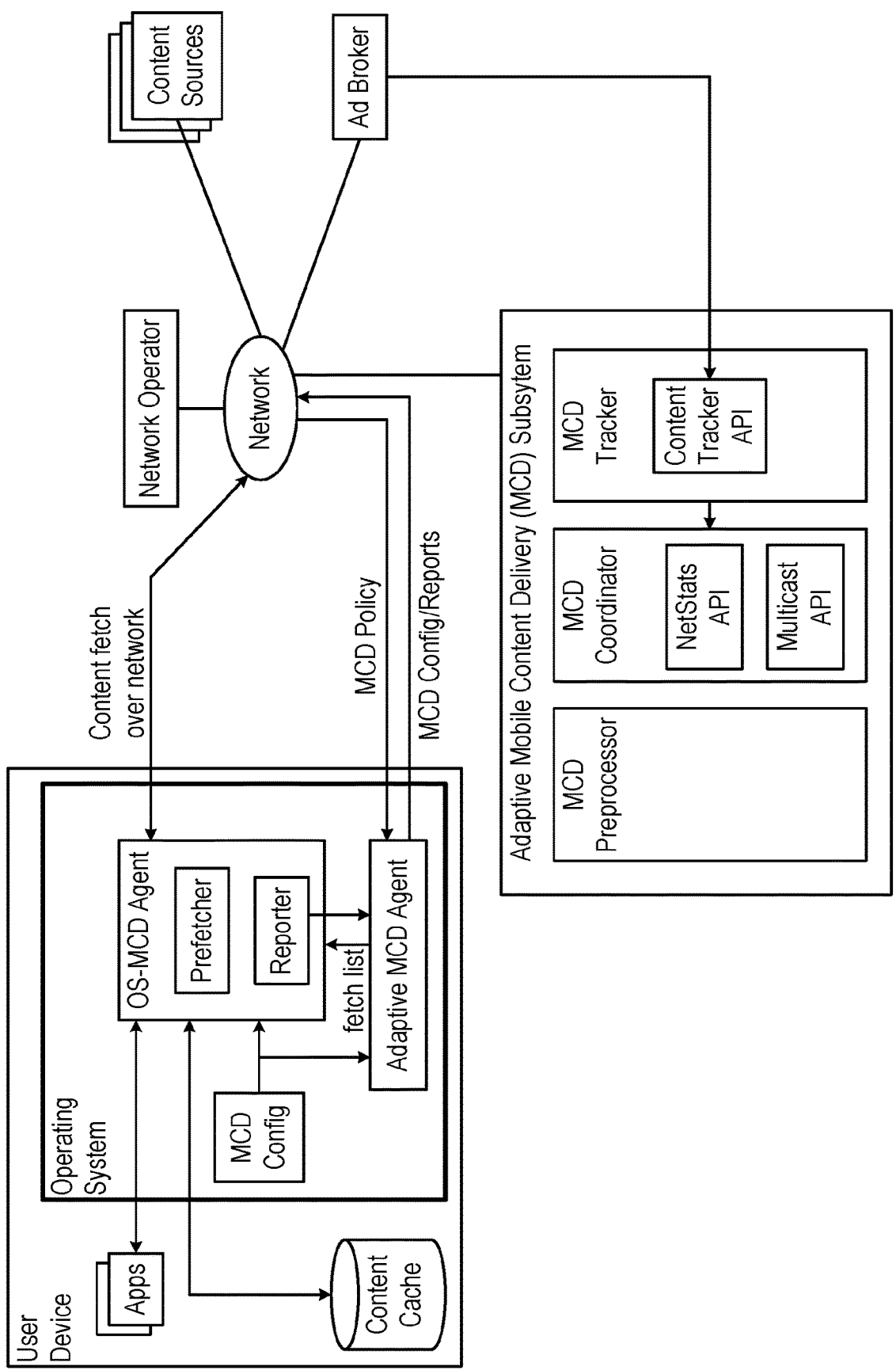
FIG. 19 is a block diagram that schematically illustrates an OS-MCD, in accordance with an alternative embodiment of the present invention.

An embodiment of the OS-MCD module is shown in FIG. 19 where the app remains passive (and possibly even unaware of the OS-MCD functionality). The difference between this figure and FIG. 10 is that the Prefetcher component and the optional Reporter component of the OS-MCD Agent are drawn without APIs.

FIG. 19: High-level block diagram illustrating enhanced OS-MCD functionality where the Apps on the User Device don't actively pass inputs to the OS-MCD Agent through APIs.

In some embodiments the Prefetcher and Reporter components might include APIs that can be optionally accessed by apps. But in addition, they might also support passive apps that do not access these APIs.

Various combinations of the embodiments described here are also possible. For example, the app might actively provide prefetch code to the Prefetcher through an API, but interact passively with respect to the Reporter. As another example, the app might actively provide content usage data to the Reporter through an API, but interact passively with respect to the Prefetcher.

If the Prefetcher triggers the app to fetch content (i.e., as if a user had clicked on the app or on a content link) then it is important for the Prefetcher to block the reporting of analytics, including app usage, content usage, and advertising analytics. Various solutions to handling analytics when the app is passive are proposed in Section 7.4.

7.2 OS-Mapper Module

Figure 20:
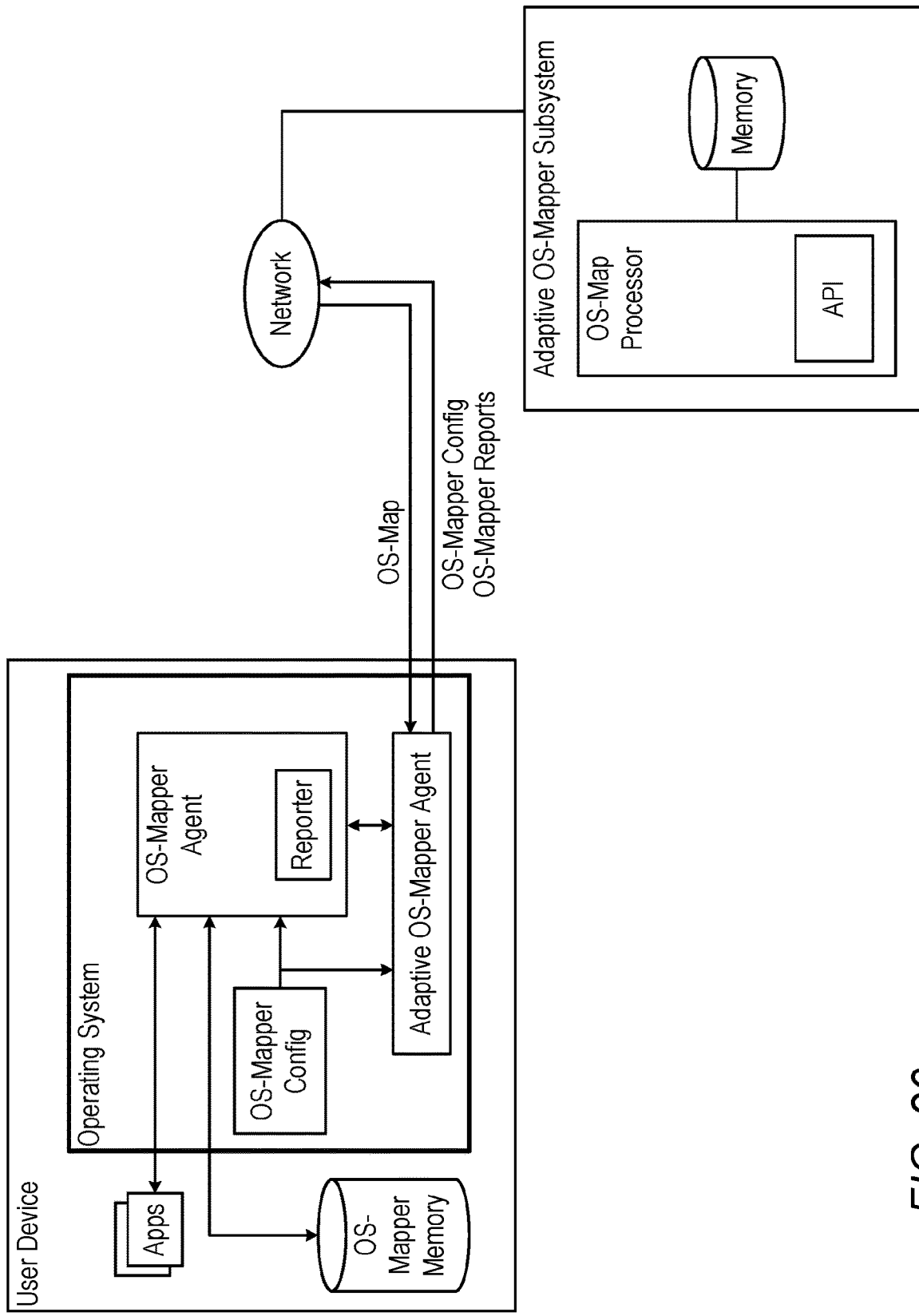
FIG. 20 is a block diagram that schematically illustrates an OS-Mapper, in accordance with an alternative embodiment of the present invention.

FIG. 20: A high-level diagram illustrating basic OS-Mapper functionality where the Apps don't actively provide inputs to the Reporter component of the OS-Mapper module.

An embodiment of the OS-Mapper module is shown in FIG. 20 where the app remains passive. The difference between this figure and FIG. 12 is that Reporter component of the OS-Mapper Agent is drawn without an API. Therefore, instead of the Apps passing inputs to the OS-Mapper Agent to help define performance metrics (e.g., the "start time" and "stop time" of an app load or content load) the OS-Mapper Agent needs to calculate the performance metrics on its own. Thus the Agent collects information available to the OS that describes device performance and device context as a function of time, location and possibly other device context. This information can be included in the OS-Map and saved to OS-Mapper Memory.

If the Reporter does not include any API, then the reporting of information is also available only at the OS-level. Thus the Reporter may provide a function (or functions) to the OS that enables the OS to access the device performance and context information stored in the OS-Map. In this case, the Apps cannot directly access performance and device context information from the OS-Map through a Reporter API.

In some embodiments, the Reporter might include an API for directly providing performance/context reports to components outside the operating system, such as to the Apps on the device (where some information might be restricted to be available only to certain Apps or to a single App) or to app developers (e.g., through reports to Google Play Developer Console). In these embodiments a Reporter API is used to provide information to clients outside the OS, but the Apps remain passive as far as supplying inputs for the performance metric calculation.

In some embodiments the Reporter might include APIs that can be optionally accessed by the apps (either for providing inputs to the calculation of performance metrics, or for receiving performance/context reports). But in addition, they might also support passive apps that do not access these APIs.

Other variations of the embodiments described here are also possible. For example, the Reporter might include an API that enables the Apps to provide inputs for defining performance metrics, but not include an API that enables the Apps to access performance/context reports.

7.3 OS-App-Preloader Module

Figure 21:
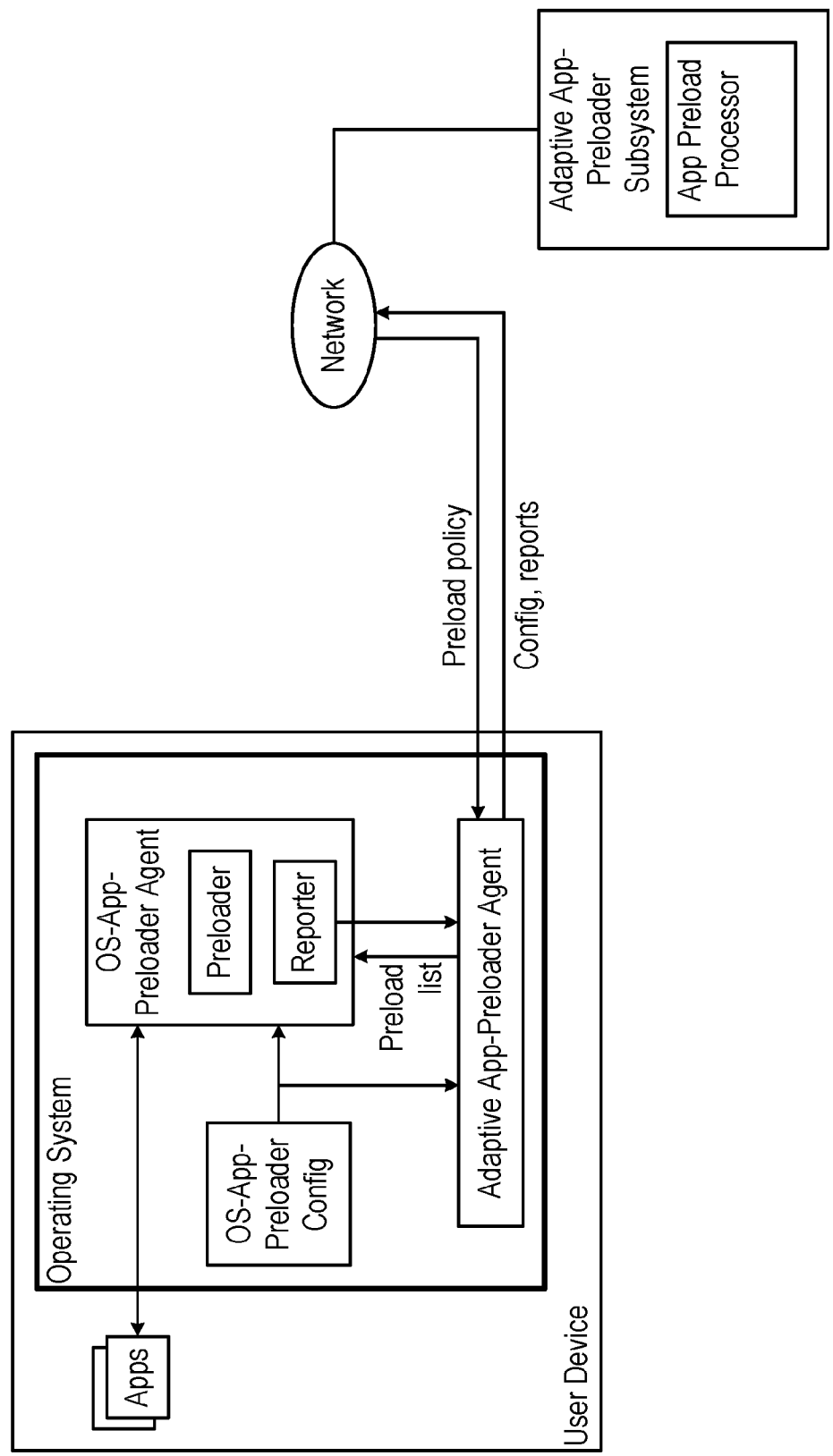
FIG. 21 is a block diagram that schematically illustrates an OS-Application-Preloader, in accordance with an alternative embodiment of the present invention.

FIG. 21: High-level block diagram illustrating enhanced OS-App-Preloader functionality, where the Apps don't actively interact with the OS-App Preloader Agent through APIs.

An embodiment of the OS-App-Preloader module is shown in FIG. 21 where the app remains passive (and even possibly unaware of the OS-App-Preloader functionality). The difference between this figure and FIG. 16 is that the Preloader component and the optional Reporter component of the OS-App-Preloader Agent are drawn without APIs.

Preloader—Instead of the app providing code to the Preloader through an API, the Preloader triggers the preload or refresh of an App. As explained in Section 5, there could be different levels to such a pre-load or refresh operation. In some cases, no app participation is necessary—such as for initializing the associated OS process, loading the app code into RAM from memory, and running certain initial components of the code (e.g., the code associated with the Android Application class). For more advanced preload and refresh operations, including executing app activities, prefetching content, and pre-rendering display, app cooperation through APIs would typically be preferable. In the embodiments discussed here, where the apps are passive, alternative approaches can be used. In one approach, the Preloader functionality is implemented by the OS, i.e., not using a callback function provided by the app through a Preloader API. This can be performed in a number of ways. For example the part of the app code that is used to preload an app (or to preload in-app content) can be identified offline (e.g., by examining the app's code) and made available to the Preloader. However, this requires customizing the preload/refresh code for different Content Sources. In another approach, the OS-Preloader might trigger a preload or refresh of an app by emulating a user click of the app. Similarly, preload/refresh of in-app content might be triggered based on emulating a user click of a link (e.g., article link) available from the app. In this case, execution of a preload/refresh would normally also cause undesired effects such as skewing the analytics, as discussed in the context of the Prefetcher in Section 7.1. Techniques to handle these effects are described in Section 7.4. Note that in this latter approach, If only some of the preload steps are desired to be executed, then the other preload steps triggered by emulating a user click would need to be blocked. Furthermore, in the case of refresh, using this approach would require first killing the app before restarting it from scratch (by the emulated user click). This approach would typically be less efficient than providing code optimized for a refresh operation.

Reporter—Instead of the app providing app usage data (and possibly content usage data) to the Reporter through an API, the Reporter might intercept the user app (and content) access requests for the various apps through an interceptor component. The intercepted information could be processed either at the device or in the cloud in order to compile detailed app usage activity. This might include tracking the app context within which the app was accessed, such as the type of data that was accessed. (Intercepting and identifying content access requests was discussed further in Section 7.1.)

Another option might be to obtain app usage analytics over multiple apps by analyzing the analytics provided from a cloud service (e.g., Google Analytics).

Yet an additional option might be to intercept and analyze calls to various analytics functions in order to derive the desired analytics for the Reporter, as was suggested in the context of the OS-MCD Reporter in Section 7.1.)

Depending on the level of preloading, in many cases the preloading of the app (or app content) might trigger data analytics reporting (including ad analytics), despite the fact that the user has not actually interacted yet with the app. This can lead to skewing of the analytics. Various solutions to handling this problem are proposed in Section 7.4. In some embodiments the Preloader and Reporter components might include APIs that can be optionally accessed by the apps. But in addition, they might also support passive apps that do not access these APIs.

Various combinations of the embodiments described here are also possible. For example, the app might actively provide preload code to the Preloader through an API, but interact passively with respect to the Reporter. As another example, the App might actively provide app/content usage data to the Reporter through an API, but interact passively with respect to the Preloader.

7.4 Analytics

The prefetch/preload (or refresh) operations should be implemented without skewing analytics calculations:

App usage analytics

Content usage analytics

UI effects (e.g., how many "new items" are available since the last user access)

Advertising analytics (possibly including the generation of ad impressions)

For cases where the apps provide the prefetch/preload code through an API, the code should preferably prevent the skewing of the analytics. For cases where the apps are passive and do not actively provide prefetch/preload code (or they do but without preventing analytics reporting), then several approaches might be taken to handle analytics calculations:

1. One option is to simply accept the skewing of the analytics.

2. A second option is to attempt to estimate how skewed the analytics are due to prefetch or preload/refresh and apply a correction factor to the calculated analytics. For example, if on average 50% of the preload/refresh operations do not result in app access we might reduce the calculated app usage statistics by a factor of 2.

3. Another option is to intercept and block specific function calls. In this case a list of known functions that are used to calculate analytics are stored in the OS. Each time one of these functions is called, it can be blocked. In some embodiments, this list of function calls can be dynamically updated at the devices as new such function calls become known.

a. In some cases instead of blocking the analytics reporting function calls, we might identify and block the app-specific function calls that call the generic analytics reporting functions.

b. In the case of advertising, in some embodiments we might block all ad generation activity at the time of prefetch and preload/refresh. This would also prevent misleading ad analytics reporting. In this case, although the ads would then not be ready when the app is actually launched or the prefetched content is accessed, this often does not degrade the user experience much since the ads are typically loaded asynchronously, and therefore will not hold up the app load/render process. In other embodiments, however, we might allow the initial request to the ad broker to generate ads for the app or prefetched content and just block the reporting of the analytics report. These embodiments would require a generated ad impression to not be automatically counted at the server side as having been served, which is often not the case today.

4. Yet another option is to allow the analytics function calls to be executed but to block the resulting communication with the internet (i.e., with the analytics server). In some cases, this approach might be sufficient. In other cases, if the analytics report fails, the analytics are saved and reported again later. Thus in these cases eventually the misleading usage statistics will eventually be reported.

a. A similar approach could be taken with ad generation function calls, where the network connection required to trigger the generation of an ad at the ad server is blocked.

5. Yet another option is to disable the analytics reporting itself. For example, the Google Analytics SDK has a flag that prevents any data from being sent to Google Analytics. This flag is typically used to prevent reporting during testing or debugging of an app. But the flag could also be set each time before a prefetch or preload/refresh function call so that reporting is disabled, and then the flag could be unset after the prefetch/preload/refresh has finished executing. Similarly, ad generation could be disabled before prefetch/preload operations are executed and enabled after they have completed.

Yet another option is for the prefetch/preloader agents at the user device (e.g., the OS-MCD Agent of Section 3 and the OS-App-Preloader Agent of Section 53) to block ads from being served. This might be implemented in various ways, including (1) intercepting and blocking certain URL requests for ads, (2) intercepting and blocking certain ad requests based on IP addresses, and (3) intercepting and blocking certain function calls for ads. In some embodiments, this feature might be enabled selectively. For example, it might be enabled for ads that are causing a reduction in user experience or that are problematic for the prefetch/preload operations to handle properly (e.g., to handle analytics reporting properly). It should be noted that whether disabling the analytics reporting, blocking analytics function calls, or blocking analytics communication, in all cases when the prefetch or preload/refresh tasks are completed the usual analytics reporting needs to be restored.

It is also important to make sure that analytics are properly reported when the user actually accesses the prefetched content or the preloaded app. Techniques to accomplish this are discussed in Section 5.8.

7.5 Additional Variations

In some embodiments, versions of the OS-MCD, OS-Mapper, and OS-App-Preloader modules that support Apps that passively interact with the modules are all implemented on the User Device.

In additional embodiments, other combinations of the OS-MCD, OS-Mapper, and OS-App-Preloader modules are possible, where some but not necessarily all of the modules support passive interaction with the Apps (at least in part).

There could also be different partitions between functionalities implemented in the device itself and functionalities implemented outside of the device (e.g. as in the cloud). The embodiments with the specific partitions mentioned here represent only some possible such partitions.

8 Additional Embodiments

8.1 Maximizing User Privacy

User privacy concerns is a major issue today. Many users don't want to grant permission for the tracking of their internet content usage. Therefore, some embodiments of the present invention restrict the tracking and/or reporting of user internet activity.

For example, the OS-MCD module can be implemented entirely without utilizing user reports of content usage. Instead prefetch decisions might depend on general information collected over all users—such as the rating of the content item (the number of users that are currently accessing a content item, the number of users that have recently accessed a content item, etc.). Prefetch decisions might also be based on the size of the content, the type of content (e.g., feed text, article text, images, videos) the change pattern of the content, the type of network connection (Wi-Fi versus cellular), the network conditions (e.g., based on a network map [6, 22, 23]), a distance-to-visibility metric [19] (indicating how close the content item is to being visible on the screen display, e.g., through scrolling), the current availability of content links (e.g., JIT prefetch [20]), etc. Thus in these embodiments the OS-MCD module might not collect and report information from the User Device. All other sources of information might be used to determine prefetch policy and prefetch decisions.

In some embodiments, the user internet activity might be tracked and used only within the device for the purposes of prefetch, but not reported outside the user device. In these embodiments, the prefetch policy determined outside the user device, e.g., at the Adaptive MCD Subsystem, would be formed without utilizing user reports of content usage. However, the final prefetch decisions taken at the user device could also take the user's recent and/or historical internet activity into account.

In further embodiments, user internet activity might be tracked at the user device, but only selectively reported outside of the device, e.g., to the Adaptive MCD Subsystem. For example, the internet activity associated with certain websites or certain types of websites might not be reported. Similarly, information marked or identified as sensitive might not be reported. The information not reported would not be used to set prefetch policy outside the device at the Adaptive MCD Subsystem, but might still be used at the user device in making the final prefetch decisions.

In further embodiments, although a user might not report certain information outside the device (so that it can be used to help calculate the prefetch policy of other users), the calculation of this user's prefetch policy might continue to take into account reports of similar certain information from other users that do report this information. This was discussed earlier in Sec. 3. The embodiments discussed in this section to improve user privacy can be extended to include all types of user information (i.e., not just user internet activity). Such information might include location information, sensor information, and information related to ecommerce transactions. In some embodiments, various types of such user information might not be tracked and reported. In other embodiments, various types of such user information might be tracked, but not reported outside the device (i.e., but possibly used within the user device to improve prefetch decisions). In yet additional embodiments, certain types of information might be blocked from being tracked at all, other types of information might be tracked but not reported outside the device, and yet additional types of information might not be restricted from tracking at the device and reporting outside the device.

Another privacy issue relates to the storing of prefetch content at the device. In some embodiments, prefetched content might be centrally located in the OS and jointly managed over all apps on the device. However, this might occasionally create security/privacy issues since it might be easier for certain apps to access content associated with other apps. Therefore, in some embodiments the prefetched content for each app might be stored in separate caches (e.g., belonging to each app). In further embodiments, the user might decide which apps can use the central (e.g., OS-based) cache and which should use the app-specific cache. This might depend on the nature of the app and the content. Certain apps deal with particularly sensitive content, and certain apps implement higher levels of security. Thus the user might specify certain apps or certain types of content that should be excluded from the joint prefetch cache.

8.2 Cloudless Solutions

In some embodiments, the OS-based modules described here function without any cloud/server based functionality. Such an OS-MCD module (Section 3) embodiment is described in FIG. 2 where the MCD Coordinator is implemented entirely on the User Device. In this case the Content Sources directly send information regarding available content (including possibly metadata) directly to the User Device. The MCD Coordinator receives the various content information and might coordinate the prefetch requests over multiple Content Sources which minimizes the awake time of the wireless modem at the User Device, and thus saves battery.

In these embodiments, the MCD Coordinator determines the fetch list based on information available at the device, and possibly based on information provided by the Content Sources. All of the prefetched content is prefetched directly from the Content Source (without intermediate server preprocessing as described earlier for other embodiments).

When a user requests content, the Prefetcher checks the Content Cache. If the content is found to be locally available, it is served from cache; otherwise it is fetched from over the network. The freshness of content served from cache might be checked doing a conditional fetch over the network with an ETAG request header (where a ETAG hash value representing the cached content is sent along with the request for content; if the ETAG matches then Content Source responds with a "Not Modified"; otherwise it sends the updated content) or a "if-modified-since" request header (where the device sends a time stamp along with the request to the Content Source that corresponds to when the content was received; if the content has not been modified since, then a "Not Modified" is returned, otherwise the Content Source sends the updated content.)

In another embodiment of a cloudless prefetch solution, the Content Source might carry out the preprocessing techniques discussed here, and the preprocessed content could be directly prefetched from the Content Source to the user device. For example, the Content Source might provide a differential update patch for content already cached at the device, instead of a new copy of the content (thus reducing the data consumption at the device). This approach was discussed earlier in Sec. 3.3.2.

A cloudless solution for the OS-Mapper was described for the embodiment illustrated in FIG. 11 in Section 4.

Similarly, the full range of possible preload/refresh options discussed in Section 5 can be supported without any support from cloud/server based functionality. Such a solution is described for the embodiment illustrated in FIG. 15 in Section 5.

8.3 MODEM Override

In some embodiments, an additional function supported by the OS is the ability to override when the MODEM will be turned on. In these embodiments, user actions and MODEM activity are essentially decoupled in certain conditions. Thus at least some of the content related user actions will not trigger network activity. Instead some content would be served from internal device memory. This content might be old content fetched in the past (possibly somewhat out of date) or it might be prefetched content downloaded ahead of time.

For example, a network connection might normally be created automatically when a user clicks on a particular app. Some embodiments of the present invention, however, allow the OS to deny a network connection based on conditions at the device. These conditions might relate to the cost of establishing a network connection, such as whether a Wi-Fi or strong cellular connection is available. The amount of data plan remaining to the user or the remaining battery level at the device also might be taken into account when deciding whether to open a network connection. Alternatively, it might depend on whether the app is currently sufficiently supported by prefetched content for offline access. For example, if an app was fully synchronized within the last 30 minutes so as to enable app usage during network outage, then the OS might decide (e.g., partly based on the current battery level at the device) that it is not worth opening up a network connection (e.g., to check freshness of the prefetched content). Instead the app should run offline based on the already available prefetched content, and no network connection is triggered when the user invokes the app. This feature complements the coordinated prefetch techniques described in Section 3.4 as part of the OS-MCD module. This allows the OS-MCD module to choose the best times to activate the MODEM for all content delivery to the device, instead of allowing each app to activate the MODEM for content in an uncoordinated ad-hoc way. This functionality could also be implemented by an entity outside of the OS.

8.4 Voice Activation

As mentioned earlier, in some embodiments, prefetch might be triggered by voice activation. Examples of this include:

1. Invoking Sync-Content feature—A voice command might trigger the activation of this feature (discussed earlier). This might cause a GUI to display which provides access to various Sync-Content settings.
2. Invoking Sync-Now feature—A voice command might trigger the activation of this feature (discussed earlier). This might cause the immediate invoking of prefetch according to defined prefetch settings.
3. Invoking Prefetch for a particular app—A voice command might allow the user to cause prefetch synchronization at the device with the content source for a particular app, e.g., "Sync BBC" or "Sync Facebook".
4. Invoking Prefetch for a particular type of content—A voice command might allow the user to specify synchronization at the device with the content source for certain types of content. For example, the user might say "Sync BBC Feed" and the feed of the BBC app will be updated, but not the in-app content.

Similarly, a voice command might also be used to invoke preload. For example, the user might say "load BBC", and the BBC app might preload in the background including updating prefetched content if necessary and prerendering the app feed in the background.

8.5 Thin Client

We have focused on the case where an app is installed and runs on the device. However, similar prefetch and preload techniques can be implemented for the case of apps that run (at least in part) in the cloud, with the UI provided at the device. In this case, prefetch and/or preload might involve prefetching display screen pixels or instructions to create the display screen at the device.

8.6 Variations

The functionality described here for the OS-MCD, OS-Mapper, and OS-App-Preloader modules can be divided up in different ways in other embodiments. For example, in some embodiments, all three modules can be merged into a single unit. In addition, in some embodiments, the functionality of the different modules might also overlap. Furthermore, many embodiments are possible where only a subset of the full set of features for these three modules are available. Thus any one or two out of the three modules might be implemented without the remaining modules. Furthermore, a subset of the functionality of any of these three modules might be implemented without the remaining functionality described here.

9 Example Use Cases

9.1 Gaming Apps

In some embodiments, preload and/or prefetch might be applied to gaming apps. This might include either an online game that requires at least part of the game to be accessed over the network, or to a game that is entirely available locally on the device. In many cases a game is paused in the middle and its state is saved so that the user (or users) can smoothly resume play based on when it was paused. In these embodiments, the game state can be saved to local cache and loaded in advance (possibly including pre-render) when the game is predicted to be accessed. If the game data is saved in the cloud over the network, then this data could also be prefetched in advance.

9.2 Navigation Apps

In some embodiments, preload and/or prefetch might be applied to navigation apps, such as Waze. Thus the user's preferred navigation app might be preloaded in anticipation of when the user is expected to access it. The preload could also take into account the current location of the user in order to make sure the initial relevant maps and other information are available and preloaded. If the needed maps and other data are not yet available at the device, then it can also be prefetched from over the network.

Examples of data that could be used to help predict when a user is likely to access a navigation app are:
1. Past history of the user accessing the navigation app
2. Current accessing of navigation apps by nearby users
3. User device sensors indicating movement at car speeds
4. Detection that the user is approaching his car. For example, this might be based on storing the location of where the car was last parked. Another example: the user device might receive inputs from the user's car sensors as to where it is currently parked.

9.3 Publisher Apps

In some embodiments, preload and/or prefetch might be applied to publisher apps, such as news media apps or sports news apps. The app's feed could be prefetched in advance of an expected user access, possibly along with some of the app's articles. In some embodiments, certain types of content might be prioritized for prefetch. For example, the app's feed might be continuously kept updated at the device through prefetch. Another example: the text related to the app's feed and possibly the text related to the app's articles might be continuously kept updated at the device through prefetch. Another example: articles that are estimated to be of greater interest to the user (or to have a higher likelihood of being requested by the user) can be prioritized for prefetch.

In addition to prefetch, a predicted user app access can also be supported by the preload operations described here. For example, the app's feed can be preloaded, which can include some or all of the preload steps described in Section 5, e.g., including pre-rendering. Similarly, specific articles can be preloaded and possibly pre-rendered so that when the user clicks on an article referenced by the feed, the article is instantly displayed.

9.4 Social Network Apps or Aggregator Apps

Similar to publisher apps, social network apps (such as Facebook) or aggregator apps (such as SmartNews) can be supported by the preload and/or prefetch operations described here in order to improve the user experience (e.g., [28]). This includes support for the app's home page or feed, as well as for the individual content links found there. In this case, personalized content tracking methods, as described in Section 3, are required to be used. The reason is that each user typically has a personalized feed that references specific content of interest to that user. Thus if a Crawler approach to tracking is used, then each user would require a separate personalized Crawler. On the other hand, if each Content Source provides content updates through a cloud API then it can designate which content is relevant for each user. In some cases, the MCD Coordinator might also play a role in determining which content is relevant for each user. Also, since the content is personalized, the contents recorded in the contents catalog for each user will be different.

9.5 Instant Messaging and Email Apps

In some embodiments, preload and/or prefetch might be used to support Email and Instant Messaging apps, such as WhatsApp [29]. For example, when a message arrives (possibly signaled to the user) the app can be preloaded so that when the user clicks on the app it is immediately displayed. Moreover, the content referenced by the links in the message (e.g., images, videos, articles) might be prefetched from over the network so that it will be locally cached before the user clicks on them.

In some embodiments, the receiving of a video link in a message (through a messaging/email app) might further trigger preloading a video player app (possibly including pre-render) in addition to prefetching the video (or a portion of the video). This idea can also be applied to images and articles that require certain apps to be viewed.

In determining whether to preload a messaging/email app or to prefetch and/or preload in support of links received through a messaging/email app various factors the likelihood of the user clicking on the link can also be taken into account. For example, if the user generally clicks on sports content but not fashion content, then preload/prefetch might be activated if the user receives a video link related to the world series, but not for a video tagged as related to fashion.

9.6 E-commerce Apps

E-commerce apps can also have their user experience improved through preload and/or prefetch techniques. The Ecommerce app itself could be preloaded, as well as linked screens that are generated as the user accesses the different screens of the app. The use of prefetch to support Ecommerce apps was also discussed in [29, 31]. Examples include prefetching supporting information about the items being sold by an app, or updating the inventory of items to the device cache. In some embodiments, an optimized extension to an E-commerce server can be implemented at the user device that supports a subset of the products/items available at the full E-commerce server [31]. In general the data needed for this optimized extension varies with time, such as item price changes, inventory changes, and changes in the selection of the items to be supported at the device (i.e., adding and/or removing items from the device-based E-commerce server extension). The prefetch techniques discussed here can be used to track the changes in the subset of items supported at the device, and to deliver updates when appropriate. Moreover, in some cases it might pay to implement some of the preloading techniques discussed here, including pre-rendering of the E-commerce screens. This would all translate to excellent user experience, both in loading the E-commerce app and in accessing the subset of items that is supported at the optimized extension on the device.

10 Designating Guaranteed and Soft Preload Activities

Additional embodiments of the present invention address the selection of user app activities to preload (e.g., fetches to prefetch, app/in-app loads to preload) in order to eliminate delay and improve the user experience.

The disclosed technique proposes to designate a First Set and/or a Second Set of user app activities that can be preloaded at a user device in the background in advance of user executing said activities, where

- The decision on whether to preload user app activities designated in the First Set is made independently of predicting the current likelihood of the user executing said activities.
- The decision on whether to preload user app activities designated in the Second Set is at least in part based on predicting the current likelihood of the user executing said activities, and
- Where the amount of preload carried out for the user app activities designated in the Second Set varies based on the predicted current likelihood.

User app activities are app-related operations carried out at the user device in response to using an app at the device. Examples of types of user app activity are:

1. Loading app code and/or app data into RAM from memory
2. Initializing the OS process associated with the app's instance
3. Running some initial components of the code (e.g., the code associated with the Android Application class)
4. Fetching DNS information
5. Fetching content or data from over the network needed for the app
6. Rendering a visual display (e.g., screen) associated with the app These activities can be initiated by the user, for example, by clicking on an app and/or a link available from within the app. We refer to executing fetch in advance in the background as prefetch, executing rendering in advance in the background as prerender, and executing any activities related to app load or in-app load (possibly including prefetch and/or prerender) as preload.

In some embodiments, the preload of at least some of the user app activities designated in the First Set is guaranteed subject to preload cost factors, as discussed in the sequel.

In some embodiments, the preload of user app activity might be carried out by a software agent on the device, possibly residing in the OS. Moreover, the software agent might make available APIs to the app developer in order to enable the app to supply inputs needed to support preload operations, such as prefetch and pre-render. In some embodiments, these inputs are callback functions supplied by the app to the API.

10.1 Predicting the Current Likelihood

The likelihood of a user executing a user app activity is a metric that can vary over time that represents the likelihood that the user will execute said user app activity. Thus, the current likelihood is the likelihood metric associated with the current point in time, or associated with a time window that includes the current point in time.

In some embodiments, the current likelihood metric might additionally or alternatively be defined as the likelihood metric estimated at the current point in time or within a time window that includes the current point in time. In these embodiments, the likelihood metric might refer to the likelihood that the user will execute said user app activity at some future point in time.

In further embodiments, the current likelihood metric might additionally or alternatively be defined as the likelihood metric estimated based on inputs available at the current point in time or within a time window that includes the current point in time.

In some embodiments, predicting the current likelihood might refer to predicting one or more of the following:

Predicting the current likelihood that at least some of the user app activities designated in the second set will be executed by the user Predicting the current likelihood that at least some user app activities associated with a particular app designated in the second set will be executed by the user Predicting the current likelihood that a particular user app activity designated in the second set will be executed by the user In some embodiments, the dependence of preload for user app activities on predicting the current likelihood of the user executing said activities refers to calculating the current likelihood metrics for user app activities and comparing them to a threshold.

The likelihood of the user executing a particular user app activity can be estimated in the cloud, at the user device (possibly by the OS), or at a combination of the two. This can be carried out based on many factors including those that are user-related (e.g., gender, location, interests, recent and historical internet activity, etc.), environment-related (e.g., time-of-day, traffic conditions, weather, current events, sporting occasions, etc.), content-related (e.g., content topic/category, content key words, identity of content source, current popularity/rating of content, etc.) and device related, (e.g., screen status, sensors status, etc.). In some embodiments, these and other factors can be inputted to an algorithm that estimates likelihood metrics that predicts how likely it is that the user will execute particular user app activities. In these embodiments, the larger the value of the likelihood metric, the more likely the user is to execute the particular user app activity.

In some embodiments, the algorithm used to estimate the likelihood metrics is a machine learning algorithm.

In some embodiments, the likelihood metrics associated with certain user app activities are constrained to be either 0 or 1. For example, a classification machine learning algorithm might be used that only outputs a 1 if a particular video should be preloaded (e.g., because it is sufficiently likely that the user will access it) or a 0 if it should not be preloaded. In this case, any threshold between 0 and 1 can be used to decide whether the user app activity should be preloaded or not.

10.2 Designating User App Activities

In some embodiments, user app activities can be designated based on one or more of the following criteria:

1. Types of preload operations—Example types of preload operations are listed earlier, including preloading app code and/or data into RAM for a predicted app load, prefetching content items needed for a predicted user app activity, and prerendering content items needed for a predicted user app activity. Thus, example embodiments include: (1) Only fetch is designated for preload (i.e., only prefetch operations). (2) Only fetch and rendering are designated for preload (i.e., only prefetch and pre-rendering operations). (3) Only DNS prefetch is designated for preload. (4) Only prefetch and loading the app code and/or app data into RAM from memory are designated for preload.

2. Properties of an app associated with the predicted user app activity—such as the identity of an app or apps designated for preload.

3. Properties of content items needed for predicted user app activities to be preloaded. Examples:

3.1. Types of content items—Examples of types of content items that might be designated for preload are an app load (feed) configuration file (e.g., a JSON or XML file), and in-app configuration file (e.g., an HTML file) such as for an article, an image, a video, an ad, a java script, and a content page (which may contain a number of content items). Thus, in an example embodiment, only the feed content of a particular app might be designated for prefetch and/or prerender.

3.2. Availability of content items on foreground screen—This refers to whether a content item is currently available on the foreground screen. Thus, in an example embodiment, if the content item will be displayed after scrolling the current screen in the foreground, then the content item is designated for preload.

3.3. Placement of content items on screen—This refers to whether a content item is above the fold (visible without scrolling) or below the fold, or whether the data is not visible at all. It might also refer to the amount of scrolling required to reach a content item. Thus, in an example embodiment, only feed content items above the fold or available within two full scrolls might be designated for prefetch and/or prerender. In another example, only article images that will appear above the fold when initially accessed might be designated for prefetch.

3.4. Depth of link associated with the content item—This refers to how many link clicks are necessary to reach the content item. For example, a content item displayed on a content page would have a depth of zero relative to the content page; however, if the content item is only available through a link displayed on the content page, then it would have a depth of 1 relative to the content page. Thus, in an example embodiment, all content items with a depth of 0 or 1 with respect to the feed content page would be designated for preload.

3.5. Resolution of content item—This refers to the resolution of the digital representation of the content, such as an image, audio, or video file. Thus, in an example embodiment, only standard definition video files might be designated for prefetch. In another example, only image files below a defined resolution might be designated for preload.

3.6. Size of content item—This refers to the number of bytes that make up the content item. Thus, in an example embodiment, only content items that are smaller than 100 KB are designated for preload.

3.7. Metadata associated with the content item—Examples of content metadata include tags, category, title string, and key words. For example, only sports-related content of a particular app might be designated for preload.

4. Amount of a content item associated with a predicted user app activity to be preloaded. Examples:

4.1. Number of bytes of the content item to preload—For example, only up to the first 100 KB of an image might be designated for prefetch.

4.2. Percentage of the content item to preload—For example, only up to the first 50% of a content page might be designated for prefetch.

4.3. Amount of time of a video or audio clip to preload—For example, the first 2 minutes of a video or audio clip might be designated for prefetch.

4.4. Number of video segments to preload—For example, the first two HLS segments of a video might be designated for prefetch.

4.5. Resolution of the content item to preload—For example, only low resolution versions of the feed images might be designated for prefetch.

4.6. Distance of the content from the top of the display—For example, only content that appears within 2 scroll downs from the top of the screen display might be designated for prefetch and/or prerender.

In various embodiments, a combination of these and other criteria can be used in order to designate user app activities for preload. Moreover:

If the designation is for the First Set, then a decision to preload the designated user app activities is determined independent of predicting a likelihood of the user executing user app activity.

If the designation is for the second set, then the decision on whether to preload the designated user app activities is determined based on predicting a likelihood of the user executing app activity.

In an example embodiment, the First Set of designated user app activity comprises:

The feed configuration file of 5 designated apps

The feed images that appear above the fold for the 5 designated apps.

And the Second Set of designated user app activity comprises:

The remaining feed images (i.e., below the fold) for the 5 apps designated for the First Set.

In this example, the feed of these 5 designated apps are preloaded along with the first few images (above the fold) independently of predicting how likely the user is to access the app's feed. Regarding the remaining feed images, in three variations of this example:

The remaining feed images will be preloaded for all 5 apps only if the predicted current likelihood metric for the user accessing at least one of these apps is above a threshold.

The remaining feed images will be preloaded for an app only if the predicted current likelihood metric for clicking on the app is above a threshold.

The remaining feed images will be preloaded for an app only if the predicted current likelihood metric for clicking on the app and subsequently scrolling the app is above a threshold.

In various embodiments, the designation might be made by various means, for example:

Manually by the user, e.g., based on settings available from a user interface on the user device. For example the user might designate certain apps for preload. As another example, the user might designate sports and business related content for preload.

Calculated at a server in the cloud and/or by a software agent on the device (possibly residing in the OS), possibly without user input.

The calculation might be carried out in a user-specific way. In this case, the user app activities designated for each set might be different for different users.

In some embodiments, the calculation is based on average app and/or content usage statistics. Thus for example, the 5 most commonly used apps by a user might be designated for preload. As another example, sports and business content might be designated for preload for a user that frequently accesses such content.

In further embodiments, the designation might be updated occasionally. For example, the user might change settings defining the designation. As another example, an app being installed on the device might lead to it being added (via a calculation) to the list of apps for which preload may be carried out. As a further example, an increase in the usage amount of an app on the device, might lead to it being added to the list of apps for which preload may be carried out.

10.3 Updating Preloaded User App Activities

In some cases, certain user app activities that have been preloaded might become out of date. For example, content prefetched to a device cache might have been updated at the app's server (i.e., at the content source). Other examples include a prerendered visual display that is no longer up to date, or preloaded app data that is no longer up to date. In this case, the preload might refer to carrying out an update of previously preloaded user app activity. This might include, for example, prefetching an update for content already in device cache, refreshing a visual display already rendered in the background [39], and/or reloading an update for app data already preloaded in RAM. The decision on whether to update a preloaded user app activity might depend on how out of date the associated content/data is. For example, if the app's feed is up to date except that the order of the feed items has changed, then the decision might be to delay an update until a more significant change occurs.

In some cases, the user might access out-of-date preloaded user app activity. In this case, the out-of-date content/data associated with the user app activity might be presented to the user with a time stamp indicating how fresh it is. Additionally or alternatively, the freshness of the content might be checked in parallel, and updated during the user access if the content is found to be out of date [25, 26].

10.4 Varying Preload Based on Current Likelihood

In the disclosed embodiments, the amount of preload carried out for user app activities designated in the Second Set varies with the current likelihood metric(s). In other words, a larger current likelihood metric might lead to more preload of user app activities and a smaller current likelihood metric might lead to less preload of user app activities. Thus, the user app activities can be defined for preload in a "soft" manner, based on the likelihood metrics, and possibly other factors.

In some embodiments, the varying of the amount of preload based on the predicting current likelihood refers to calculating the current likelihood metrics for user app activities and comparing them to multiple thresholds. For example, if the metric exceeds threshold T1, then some of the associated user app activities designated in the Second Set are preloaded; and if the metric also exceeds threshold T2>T1, then additional associated user app activities designated in the Second Set are preloaded.

The same criteria described earlier that can be used to designate user app activities in the First Set or the Second Set, can also be used to vary the amount of preload for the user app activities in the Second Set. A number of examples are given below, where it is assumed that the user app activities being preloaded based on the current likelihood metric have also been designated for preload in the Second Set of user app activities.

1. Types of preload operations—The value of the current likelihood metric might determine the types of preload operations designated in the Second Set for which preload is carried out. For example, if the current likelihood metric associated with app load:

1.1. Exceeds threshold T1, then app code and/or app data is preloaded into RAM 1.2. Exceeds threshold T2>T1, then DNS information is also prefetched for the app feed 1.3. Exceeds threshold T3>T2>T1, then content is also prefetched for the feed 1.4. Exceeds threshold T4>T3>T2>T1, then prerender of the feed is also carried out 2. Amount of preload carried out for a content item—The value of the current likelihood metric might determine the amount of preload that is carried out for a particular content item in the Second Set.

2.1. For example, if the current likelihood metric associated with app load exceeds T1, then up to 100 KB are prefetched for each feed image. However, if the metric exceeds T2>T1 then all of the feed images are prefetched.

2.2. For example, if the current likelihood metric associated with a video access exceeds T1, then the first 2 minutes of the video are prefetched. However, if the metric exceeds T2>T1, then 50% of the video clip is prefetched. Moreover, if the metric exceeds T3>T2>T1, then the entire video clip is prefetched.

2.3. For example, if the current likelihood metric associated with an image exceeds T1, then the lowest resolution available of an image is prefetched and prerendered. However, if the metric exceeds T2>T1, then a medium resolution version of an image is prefetched and prerendered. Moreover, if the metric exceeds T3>T2>T1, then the video clip is prefetched in the highest resolution available.

2.4. For example, if the current likelihood metric associated with an image exceeds T1, then all feed images above the fold are prefetched and prerendered. However, if the metric exceeds T2>T1, then all feed images within 2 scroll downs of the top of the content page are prefetched and prerendered. Moreover, if the metric exceeds T3>T2>T1, then all feed images are prefetched and prerendered.

3. Properties of the app or the content items associated with the designated user app activities—The value of the current likelihood metric might determine the amount of preload that is carried out for an app designated in the Second Set.

3.1. For example, if the current likelihood metric associated with user app activity exceeds T1, then preload might be carried out for two of the four apps designated for preload in the Second Set. However, if the metric exceeds T2>T1, then preload might be carried out for all four apps designated for preload in the Second Set.

3.2. For example, if the current likelihood metric associated with app load exceeds T1, then prefetch might be carried out for the feed configuration files of the e.g., 5 apps designated in the Second Set. However, if the metric exceeds T2>T1, then the feed images might also be prefetched. Moreover, if the metric also exceeds T3>T2>T1, then feed ads might also be prefetched.

3.3. For example, if the current likelihood metric associated with app load exceeds T1, then prefetch and prerender might be carried out for all visible feed images (i.e., above the fold). However, if the metric exceeds T2>T1 then prefetch and prerender might be carried out for all feed images when the associated screen display becomes active (i.e., is in the foreground).

3.4. For example, if the current likelihood metric associated with app load exceeds T1, then prefetch and prerender might be carried out for the entire feed of an app. However, if the metric exceeds T2>T1 then prefetch and prerender might also be executed for all content links that appear in the feed.

3.5. For example, if the current likelihood metric associated with app load exceeds T1, then prefetch and prerender might be carried out for all low resolution feed images or all feed images of size less than S bytes. However, if the metric exceeds T2>T1 then prefetch and prerender might also be executed for all feed images.

In further embodiments, a combination of these and other criteria can be used in order to vary the amount of preload carried out for the user app activities designated in the Second Set. For example, if the current likelihood metric associated with app load exceeds T1, then prefetch of the feed configuration file is carried out. However, if the metric exceeds T2>T1, then prefetch of the visible feed images is also carried out. Moreover, if the metric exceeds T3>T2>T1, then prefetch and prerender of the feed is carried out (without the non-visible feed images). Finally, if the metric exceeds T4>T3>T2>T1, the prefetch and prerender of the entire feed is carried out.

10.5 Dynamically Varying Preload Based on Cost

In some embodiments, the amount of preload can be increased, decreased or suspended for the designated First Set of user app activities and/or for the designated Second Set of user app activities based on various factors related to the cost associated with the preload activity. For example, a lower cost associated with certain user app activities might translate to an increase in the amount of preload of said user app activities. Similarly, a higher cost associated with certain user app activities might translate to a decrease in the amount of preload of said user app activities. As another example, a higher potential cost savings from preloading certain user app activities might translate to an increase in the amount of preload of said user app activities. Similarly a lower potential cost savings from preloading certain user app activities might translate to a decrease in the amount of preload of said user app activities. Examples of cost factors associated with preload activity include:

1. Data consumption cost for the preload. A critical preload activity is the prefetch of content from over the network. This activity is particularly critical because (1) Fetching content from over the network is often the source of the majority of the delay associated with user app activity, and (2) Other potential preload steps that are a significant source of the in-device processing delay are also dependent on prefetch taking place, e.g., such as prerendering the content. However, there is often a data cost associated with the prefetch. For example, if the prefetch takes place over a metered network such as a cellular network, then the amount of data transferred reduces the remaining data allowance in the user's cellular data plan. As another example, if the user is roaming, then the monetary cost of the data transfer is often higher. Therefore, some example embodiments of taking data consumption cost into account for preload are:

1.1. Amount of preload is increased when connected to a non-metered network (such as Wi-Fi).

1.2. Amount of preload is decreased when roaming.

1.3. Amount of preload is increased when connected to a non-roaming cellular network if the user is predicted to subsequently be roaming.

1.4. Amount of prefetch is suspended when the data allowance remaining in the user's data plan goes below a threshold.

2. Power consumption cost for the preload. The transfer of data associated with prefetch can also lead to significant power consumption at the device. The MODEM can be a major consumer of power at the user device, particularly if the wireless link network conditions are poor. For example, a device in poor cellular coverage will require more power to transfer data. (This is the case even for download fetches, because of the increased power on the uplink required to support the downlink.) Similarly, a device connected through a low-power pico-cell or strong Wi-Fi link will typically require less power for a data transfer than if connected to a cellular macro-cell. In addition, the available data rate also impacts the power expended during a fetch: higher rates mean shorter download times, which translates to shorter MODEM activation time and thus lower power consumption. Moreover, coordinating data transfers reduces the power overhead associated with activating and deactivating the MODEM (due to starting up and winding down of MODEM activity). Therefore, some example embodiments of taking power consumption cost into account for preload are:

2.1. Amount of preload is increased if the MODEM is active for any reason.

2.2. Amount of preload is increased when the network link conditions are good, and decreased when the network link conditions are poor.

2.3. Amount of preload is increased when the network connection is through a low power pico-cell or strong Wi-Fi link.

2.4. Amount of preload is increased when the available download rate is high and decreased when the available download rate is low. Moreover, if the download rate falls below a certain threshold, prefetch might be suspended.

2.5. Amount of preload is decreased when the battery level falls below 20%, and preload is suspended when the battery level falls below 15%.

2.6. Amount of preload is increased when the device is charging or if the device is predicted to soon be charging.

2.7. Preload is suspended while the device is in a power saving mode such as Doze.

3. RAM/CPU cost for the preload. Some of the steps involved in preloading an app take up RAM and CPU resources, such as preloading app code and/or app data into RAM or prerendering app content. Therefore, some example embodiments of taking RAM/CPU consumption cost into account for preload are 3.1. Amount of preload is increased if RAM/CPU resources are currently not very loaded (or loaded by low priority processes).

3.2. Amount of preload is decreased if RAM/CPU resources are currently very loaded with high priority processes, or are predicted to soon be very loaded with high priority processes.

In some embodiments, increasing preload activity due to cost factors includes designating additional user app activities to the First Set and/or to the Second Set. Similarly, decreasing preload activity includes removing certain user app activities from the First Set and/or from the Second Set.

In some embodiments, increasing or decreasing preload activity for the designated Second Set of user app activities includes, additionally or alternatively, changing the thresholds applied to the likelihood metrics that determine the amount of preload activity. For example, if a nominal cellular link is available, the first 100 kB of each feed image are always prefetched as part of the First Set, and the rest of each feed image is prefetched only if the feed likelihood metric is above a threshold T1. However, if a strong Wi-Fi link is available, then the first 200 kB of each feed image is designated to be prefetched as part of the First Set, and the rest of each feed image is prefetched only if the feed likelihood metric is above a threshold T2<T1.

11 Additional Embodiments

In some embodiments, the device referred to above is a mobile device connected to a network through a wireless link, a scenario where prefetch is particularly valuable for improving the quality of the user experience. This includes smartphones, smart TVs, wearables, mobile car devices, tablets and laptops. However, it also applies to other scenarios where the user device is connected to a network with a limited communication link (possibly not wireless) that suffers from content latency problems, connection outage problems, and/or a variable cost/quality communication link.

The disclosed solution can also be used when the transfer of content to the device is not significantly limited by the communication link, but rather by the processing time of the app at the device when it is accessed. In this case, preloading the app in the background is the critical component for reducing access latency and the prefetch of content to the device is mainly carried out in order to enable the preload of the app (and not because of network latency).

Note that the updates referred to might be available over the network or might be available directly from another device (e.g., through a device-to-device connection). In the network case, it may comprise, for example, the Internet, a Local Area Network (LAN), a wireless network such as a cellular network or Wireless LAN (WLAN), or any other suitable network or combination of networks.

The configurations of the various systems and system elements described herein and shown in FIGS. 1-21 are example configurations, which are chosen purely for the sake of conceptual clarity. In alternative embodiments, any other suitable configurations can be used. Generally, the functions of the different system elements described herein can be partitioned in any other suitable way than the example partitioning described.

Each of the disclosed system elements (including user devices and network-side elements) comprises a suitable interface for communicating over network 40. In the case of user device 24, the interface may comprise, for example, a cellular or Wi-Fi data modem. In the case of network-side elements, the interface may comprise a suitable network interface controller (NIC), for example. Thus, in the context of the present patent application and in the claims, the disclosed techniques are carried out by one or more processors and one or more network interfaces. Any of the processors and network interfaces may reside in the user device and/or on the network side.

Although the embodiments described herein refer mainly to human users, the term "user" refers to machine users, as well. Machine users may comprise, for example, various host systems that use wireless communication, such as in various Internet-of-Things (IoT) applications.

The different system elements described herein may be implemented using suitable software, using suitable hardware, e.g., using one or more Application-Specific Integrated Circuits (ASICs) or Field-Programmable Gate Arrays (FPGAs), or using a combination of hardware and software elements. The various caches or cache-memories described herein may be implemented using one or more solid-state memory or storage devices of any suitable type. The functions of any of the processors described herein may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

REFERENCES

1. "Efficient Content Delivery over Wireless Networks Using Guaranteed Prefetching at Selected Times-Of-Day," U.S. Patent Application Publication 2016/0021211, filed Apr. 21, 2015.
2. "Methods and apparatus for handling content freshness in systems that employ content pre-fetching," United States Provisional Patent Application, No. 62/241,779, Oct. 15, 2015.
3. "Efficient Pre-fetch Notifications," United States Provisional Patent Application, No. 62/287,918, Jan. 28, 2016.
4. "Pre-fetch of Interactive Content," United States Provisional Patent Application, No. 62/314,422, Mar. 29, 2016.
5. "Device-based E-Commerce Server," United States Provisional Patent Application, No. 62/345,807, Mar. 29, 2016.
6. "Network Mapping for Improved Communications," United States Provisional Patent Application, No. 62/300,934, Feb. 29, 2016.
7. "Methods and apparatus for handling real-time advertisement with content pre-fetching," United States Provisional Patent Application, No. 62/042,262, filed Aug. 27, 2014.
8. "Handling of Real-Time Advertisement with Content Pre-fetching," U.S. patent application Ser. No. 14/821,747, filed Aug. 9, 2015.
9. "Method and Apparatus for Device-Based Real-Time Advertising," United States Provisional Patent Application, No. 62/267,920, Dec. 16, 2015.
10. "Real-Time Pre-Bidding," United States Provisional Patent Application, No. 62/274,394, Jan. 4, 2016.
11. "Methods and apparatus for minimizing the delivery of unused content in systems that employ pre-fetching," United States Provisional Patent Application, No. 62/383,431, Sep. 4, 2016.
12. "Methods and apparatus for combating man-in-the-middle scenarios in systems that employ pre-fetching," United States Provisional Patent Application, No. 62/241,782, Oct. 15, 2015.
13. "Selecting a Content Delivery Network," U.S. patent application Ser. No. 14/821,746, filed Sep. 8, 2015.
14. "Extending Content Support for Network Outage," United States Provisional Patent Application, No. 62/310,819, filed Mar. 21, 2016
15. "Extending Mobile Device Content Support for Network Outage," United States Provisional Patent Application, No. 62/310,820, filed Mar. 21, 2016.
16. "Content Tracking through Crowd Wisdom," United States Provisional Patent Application, No. 62/343,134, filed May 31, 2016.
17. "Content Pre-fetch for Wireless Networks Using Direct Device-to-Device Connectivity," United States Provisional Patent Application, No. 62/300,842, filed Feb. 28, 2016.
18. "Method and Apparatus for Pre-fetching of Alert Notifications," United States Provisional Patent Application, No. 62/271,367, filed Dec. 28, 2015.
19. "Methods and apparatus for minimizing the delivery of unused content in systems that employ pre-fetching," United States Provisional Patent Application, No. 62/383,431, filed Sep. 4, 2016.
20. "User-Specific Just in Time Prefetch," United States Provisional Patent Application, No. 62/271,356, filed Dec. 28, 2015.
21. "Partial Pre-fetch for Improved Video-on-Demand," United States Provisional Patent Application, No. 62/302,837, filed Mar. 2, 2016.
22. "Efficient pre-fetching using network mapping," U.S. patent application Ser. No. 15/285,503, filed Oct. 5, 2016.
23. "Efficient data services using network mapping," U.S. patent application Ser. No. 15/285,506, filed Oct. 5, 2016.
24. "Prevention of erroneous content caching in systems that employ prefetching," U.S. patent application Ser. No. 15/279,473, filed Sep. 29, 2016.
25. "Freshness-aware presentation of content in communication terminals," U.S. patent application Ser. No. 15/279,488, filed Sep. 29, 2016.
26. "Freshness-aware presentation of content in communication terminals," PCT Patent Application, no. PCT/IB2016/055835, filed Sep. 29, 2016.
27. "Efficient Cache Management Using Guaranteed Cache Status Updates," United States Provisional Patent Application, No. 62/412,864, filed Oct. 26, 2016.
28. "Content Aggregation Pre-fetch," United States Provisional Patent Application, No. 62/308,315, filed Mar. 15, 2016.
29. "Pre-fetch Support for Personal Communications," United States Provisional Patent Application, No. 62/287,916, filed Jan. 28, 2016.
30. "Multi-Version Image Pre-fetch," United States Provisional Patent Application, No. 62/293,346, filed Feb. 10, 2016.
31. "Device-based E-Commerce Server," United States Provisional Patent Application, No. 62/424,617, Nov. 21, 2016.
32. "Methods and apparatus for pre-fetching in the context of multiple equivalent content pointers," United States Provisional Patent Application, No. 62/396,237, filed Sep. 19, 2016.
33. "Methods and apparatus for efficient content delivery over Cellular Networks," United States Provisional Patent Application, No. 62/025,021, filed Jul. 16, 2014.
34. "Improving Cyber Security for Content Delivered to a User Device through Prefetch," United States Provisional Patent Application, No. 62/426,612, filed Nov. 28, 2016.

35. "Selective Enabling of Data Services to Roaming Wireless Terminals," U.S. patent application Ser. No. 15/092,638, filed Apr. 7, 2016.
36. "Partial Pre-render at a User Device," United States Provisional Patent Application, No. 62/432,606, Dec. 11, 2016.
37. "Transparent Background App Load at a User Device," United States Provisional Patent Application, No. 62/459,686, Feb. 16, 2017.
38. "Enhanced RAM Utilization for the User Device," United States Provisional Patent Application, No. 62/459,675, Feb. 16, 2017.
39. "Refreshing an App in the Background," United States Provisional Patent Application, No. 62/534,791, Jul. 20, 2017.
40. "Coordinating content fetches over Multiple Apps," United States Provisional Patent Application, No. 62/515,557, filed Jun. 6, 2017.
41. "Opportunistic Coordinated Content Fetch based on MODEM Activity," United States Provisional Patent Application, No. 62/515,558, filed Jun. 6, 2017.
42. "Opportunistic Content Tracking for the Mobile Device," United States Provisional Patent Application, No. 62/515,560, filed Jun. 6, 2017.
43. "Presenting content metadata to improve user content access experience," United States Provisional Patent Application, No. 62/422,638, filed Nov. 16, 2016.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
one or more interfaces, configured to communicate over a communication network; and
multiple processors, wherein at least a first processor from among the processors is comprised in a user device and at least a second processor from among the processors is comprised in a server external to the user device, the processors configured to track content items that are provided by one or more content sources and to deliver at least some of the content items to one or more applications installed in the user device,
wherein the first processor is configured to:
receive, from an application, via an Application Programming Interface (API), executable code for performing one or both of (i) prefetching content for the application and (ii) refreshing the application while the application is running in a background mode; and
prefetch one or more content items or refresh the application by executing the executable code.

2. The system according to claim 1, wherein the second processor is comprised in a cloud-based infrastructure system.

3. The system according to claim 1, wherein the processors are configured to prefetch one or more of the content items over the communication network, from the content sources to a cache of the user device.

4. The system according to claim 1, wherein the processors are configured to preload an application installed in the user device, before a user requests to activate the application.

5. The system according to claim 1, wherein the first processor is configured to run an Operating System (OS) of the user device, including running within the OS a software component that prefetches the one or more of the content items from the content sources over the communication network to a cache of the user device.

6. The system according to claim 5, wherein the first processor is configured to run the API within the OS.

7. The system according to claim 5, wherein the first processor is configured to choose, using the software component running within the OS, depending on resource availability in the user device, which content items are to be prefetched.

8. The system according to claim 1, wherein the second processor is configured to send over the communication network to the first processor a prefetch policy, which assists the user device in prefetching the one or more of the content items.

9. The system according to claim 1, wherein, in tracking the content items, the processors are configured to estimate, for at least a given content item, a property of the given content item indicative of an impact of prefetching the given content item on user experience.

10. The system according to claim 1, wherein the first processor is configured to run an Operating System (OS) of the user device, including running within the OS a software component that preloads an application installed in the user device before the application is activated by a user.

11. The system according to claim 1, wherein the first processor is configured to run an Operating System (OS) of the user device, including running within the OS a software component that performs, in response to an update of one or more of the content items, refreshing of the application.

12. The system according to claim 1, wherein the second processor is configured to track one or more of the content items by crawling one or more of the content sources.

13. The system according to claim 1, wherein the second processor is configured to track one or more of the content items by receiving indications of updates to one or more of the content items from one or more other user devices.

14. The system according to claim 1, wherein the second processor is configured to receive, directly from one or more of the content sources, information relating to tracking one or more of the content items.

15. The system according to claim 14, wherein the second processor is configured to receive from one or more of the content sources indication that one or more of the content items have changed.

16. The system according to claim 1, wherein the second processor is configured to receive, from an advertisement source, one or more advertisement items to be presented in association with one or more of the content items, or to receive information relating to the one or more advertisement items.

17. The system according to claim 1, wherein the second processor is configured to send over the communication network to the first processor a policy, which assists the user device in deciding one or more of (i) which of the content items are to be delivered to the applications, and (ii) which of the applications are to be provided with the content items.

18. The system according to claim 1, wherein the second processor is configured to apply a machine-learning process, for deriving a model that predicts one or more of (i) which of the content items are to be used by the applications, and (ii) which of the applications are to be invoked by a user of the user device.

19. The system according to claim 18, wherein the machine-learning process is based at least partially on information reported to the second processor over the communication network by the first processor.

20. The system according to claim 18, wherein the first processor is configured to receive the model from the second processor over the communication network, and to predict using the model one or more of (i) which of the content items are to be used by the applications, and (ii) which of the applications are to be invoked by a user of the user device.

21. The system according to claim 18, wherein the first processor is configured to preload the applications that are predicted by the model.

22. The system according to claim 21, wherein, in preloading the applications, the first processor is configured to prefetch one or more of the content items to be provided to the applications.

23. The system according to claim 21, wherein, in preloading the applications, the first processor is configured to pre-render one or more of the content items provided to the applications.

24. The system according to claim 1, wherein the processors are configured to receive differential prefetch updates from one or more of the content sources.

25. The system according to claim 1, wherein the processors are configured to deliver differential prefetch updates.

26. A method, comprising:
using multiple processors, wherein at least a first processor from among the processors is comprised in a user device and at least a second processor from among the processors is comprised in a server external to the user device, tracking content items that are provided by one or more content sources; and
delivering, using the processors, at least some of the content items to one or more applications installed in the user device, including, using the first processor:
receiving, from an application, via an Application Programming Interface (API), executable code for performing one or both of (i) prefetching content for the application and (ii) refreshing the application while the application is running in a background mode; and
prefetching one or more content items or refreshing the application by executing the executable code.

27. The method according to claim 26, wherein the second processor is comprised in a cloud-based infrastructure system.

28. The method according to claim 26, wherein delivering the content items comprises prefetching one or more of the content items over the communication network, from the content sources to a cache of the user device.

29. The method according to claim 26, wherein delivering the content items comprises preloading an application installed in the user device, before a user requests to activate the application.

30. The method according to claim 26, wherein delivering the content items comprises running in the first processor an Operating System (OS) of the user device, including running within the OS a software component that prefetches one or more of the content items from the content sources over the communication network to a cache of the user device.

31. The method according to claim 30, wherein delivering the content items comprises running the API in the first processor, within the OS.

32. The method according to claim 30, wherein delivering the content items comprises choosing in the first processor, using the software component running within the OS, depending on resource availability in the user device, which content items are to be prefetched.

33. The method according to claim 26, wherein delivering the content items comprises sending by the second processor, over the communication network to the first processor, a prefetch policy that assists the user device in prefetching the one or more of the content items.

34. The method according to claim 26, wherein tracking the content items comprises estimating, for at least a given content item, a property of the given content item indicative of an impact of prefetching the given content item on user experience.

35. The method according to claim 26, wherein delivering the content items comprises running in the first processor an Operating System (OS) of the user device, including running within the OS a software component that preloads an application installed in the user device before the application is activated by a user.

36. The method according to claim 26, wherein delivering the content items comprises running in the first processor an Operating System (OS) of the user device, including running within the OS a software component that performs, in response to an update of one or more of the content items, refreshing of the application.

37. The method according to claim 26, wherein tracking the content items comprises crawling one or more of the content sources.

38. The method according to claim 26, wherein tracking the content items comprises receiving indications of updates to one or more of the content items from one or more other user devices.

39. The method according to claim 26, wherein tracking the content items comprises receiving, directly from one or more of the content sources, information relating to tracking one or more of the content items.

40. The method according to claim 39, wherein tracking the content items comprises receiving from one or more of the content sources indication that one or more of the content items have changed.

41. The method according to claim 26, wherein delivering the content items comprises receiving in the second processor, from an advertisement source, one or more advertisement items to be presented in association with one or more of the content items, or receiving information relating to the one or more advertisement items.

42. The method according to claim 26, wherein delivering the content items comprises sending from the second processor over the communication network to the first processor a policy, which assists the user device in deciding one or more of (i) which of the content items are to be delivered to the applications, and (ii) which of the applications are to be provided with the content items.

43. The method according to claim 26, wherein delivering the content items comprises applying by the second processor a machine-learning process, for deriving a model that predicts one or more of (i) which of the content items are to be used by the applications, and (ii) which of the applications are to be invoked by a user of the user device.

44. The method according to claim 43, wherein the machine-learning process is based at least partially on information reported to the second processor over the communication network by the first processor.

45. The method according to claim 43, and comprising receiving the model by the first processor from the second processor over the communication network, and predicting using the model one or more of (i) which of the content items are to be used by the applications, and (ii) which of the applications are to be invoked by a user of the user device.

46. The method according to claim 43, and comprising, using the first processor, preloading the applications that are predicted by the model.

47. The method according to claim 46, wherein preloading the applications comprises prefetching one or more of the content items to be provided to the applications.

48. The method according to claim 46, wherein preloading the applications comprises pre-rendering one or more of the content items provided to the applications.

49. The method according to claim 26, wherein tracking the content items comprises receiving differential prefetch updates from one or more of the content sources.

50. The method according to claim 26, wherein delivering the content items comprises delivering differential prefetch updates.

* * * * *